US010228819B2

(12) United States Patent
Dostie et al.

(10) Patent No.: US 10,228,819 B2
(45) Date of Patent: Mar. 12, 2019

(54) METHOD, SYSTEM, AND APPARATUS FOR EXECUTING AN ACTION RELATED TO USER SELECTION

(71) Applicant: 602531 British Columbia Ltd., Vancouver (CA)

(72) Inventors: Mark Dostie, Richmond (CA); Justin Robert Desjardins, New Westminster (CA)

(73) Assignee: 602531 British Cilumbia Ltd., Vancouver (CA)

( * ) Notice: Subject to any disclaimer, the term of this patent is extended or adjusted under 35 U.S.C. 154(b) by 218 days.

(21) Appl. No.: 14/168,309

(22) Filed: Jan. 30, 2014

(65) Prior Publication Data
US 2014/0223372 A1    Aug. 7, 2014

Related U.S. Application Data

(63) Continuation of application No. PCT/CA2013/000094, filed on Feb. 4, 2013, which is
(Continued)

(51) Int. Cl.
*G06F 3/0482* (2013.01)
*G06F 3/0481* (2013.01)
*G06F 3/0488* (2013.01)

(52) U.S. Cl.
CPC .......... *G06F 3/0482* (2013.01); *G06F 3/0481* (2013.01); *G06F 3/04886* (2013.01)

(58) Field of Classification Search
CPC .............. G06F 17/2735; G06F 17/243; G06F 17/30038; G06F 17/3064; G06F 3/0482; G06F 3/0481; G06F 3/04886
See application file for complete search history.

(56) References Cited

U.S. PATENT DOCUMENTS 3,644,898 A    2/1972  Post
4,211,497 A    7/1980  Montgomery
(Continued)

FOREIGN PATENT DOCUMENTS

EP    0 352 377 A1    1/1990
EP    0 643 357 A2    3/1995
(Continued)

OTHER PUBLICATIONS

"GtkPieMenu" 1999 orfelyus (2 pages).
(Continued)

*Primary Examiner* — Sherrod L Keaton
(74) *Attorney, Agent, or Firm* — Kilpatrick Townsend & Stockton LLP

(57) ABSTRACT

A method of executing an action related to data input by a user via a personal computing device is disclosed. The method involves receiving first input data via a keyboard, and associating the first input data with a secondary application available to the user via the personal computing device by causing an icon to be displayed on a display device for selection, the icon associated with the secondary application. The method also involves monitoring for user selection of the icon, and, in response to detecting user selection of the icon, activating the secondary application to generate second data contextually associated with the secondary application for display on the display device. Apparatuses and systems are also disclosed.

24 Claims, 87 Drawing Sheets

Related U.S. Application Data a continuation of application No. PCT/CA2013/000451, filed on May 6, 2013.

(56) References Cited

U.S. PATENT DOCUMENTS

| | | |
|---|---|---|
| 4,330,845 A | 5/1982 | Damerau |
| 4,396,992 A | 8/1983 | Hayashi et al. |
| 4,471,459 A | 9/1984 | Dickinson et al. |
| 4,499,553 A | 2/1985 | Dickinson et al. |
| 4,559,598 A | 12/1985 | Goldwasser et al. |
| 4,648,044 A | 3/1987 | Hardy et al. |
| 4,689,768 A | 8/1987 | Heard et al. |
| 4,730,252 A | 3/1988 | Bradshaw |
| 4,744,050 A | 5/1988 | Hirosawa et al. |
| 4,774,666 A | 9/1988 | Miyao et al. |
| 4,782,464 A | 11/1988 | Gray et al. |
| 4,783,761 A | 11/1988 | Gray et al. |
| 4,786,765 A | 11/1988 | Yamanami et al. |
| 4,807,181 A | 2/1989 | Duncan, IV et al. |
| 4,847,766 A | 7/1989 | McRae et al. |
| 4,891,786 A | 1/1990 | Goldwasser |
| 4,969,097 A | 11/1990 | Levin |
| 4,980,855 A | 12/1990 | Kojima |
| 5,040,113 A | 8/1991 | Mickunas |
| 5,060,154 A | 10/1991 | Duncan, IV |
| 5,067,165 A | 11/1991 | Nishida |
| 5,096,423 A | 3/1992 | Goldwasser |
| 5,203,704 A | 4/1993 | McCloud |
| 5,218,536 A | 6/1993 | McWherter |
| 5,220,649 A | 6/1993 | Forcier |
| 5,220,652 A | 6/1993 | Rowley |
| 5,258,748 A | 11/1993 | Jones |
| 5,261,112 A | 11/1993 | Futatsugi et al. |
| 5,297,041 A | 3/1994 | Kushler et al. |
| 5,305,205 A | 4/1994 | Weber et al. |
| 5,327,161 A | 7/1994 | Logan et al. |
| 5,329,609 A | 7/1994 | Sanada et al. |
| 5,347,295 A | 9/1994 | Agulnick et al. |
| 5,392,447 A | 2/1995 | Schlack et al. |
| 5,487,616 A | 1/1996 | Ichbiah |
| 5,500,935 A | 3/1996 | Moran et al. |
| 5,543,818 A | 8/1996 | Scott |
| 5,559,942 A | 9/1996 | Gough et al. |
| 5,574,482 A | 11/1996 | Niemeier |
| 5,594,640 A | 1/1997 | Capps et al. |
| 5,596,699 A | 1/1997 | Driskell |
| 5,606,674 A | 2/1997 | Root |
| 5,621,641 A | 4/1997 | Freeman |
| 5,623,406 A | 4/1997 | Ichbiah |
| 5,629,733 A | 5/1997 | Youman et al. |
| 5,649,223 A | 7/1997 | Freeman |
| 5,657,397 A | 8/1997 | Bokser |
| 5,666,139 A | 9/1997 | Thielens et al. |
| 5,689,667 A | 11/1997 | Kurtenbach |
| 5,704,029 A | 12/1997 | Wright, Jr. |
| 5,724,457 A | 3/1998 | Fukushima |
| 5,734,749 A | 3/1998 | Yamada et al. |
| 5,745,116 A | 4/1998 | Pisutha-Arnond |
| 5,758,324 A | 5/1998 | Hartman et al. |
| 5,790,115 A | 8/1998 | Pleyer et al. |
| 5,805,158 A | 9/1998 | Bertram et al. |
| 5,805,159 A | 9/1998 | Bertram et al. |
| 5,805,167 A | 9/1998 | Van Cruyningen |
| 5,805,911 A | 9/1998 | Miller |
| 5,812,697 A | 9/1998 | Sakai et al. |
| 5,818,437 A | 10/1998 | Grover et al. |
| 5,821,512 A | 10/1998 | O'Hagan et al. |
| 5,835,635 A | 11/1998 | Nozaki et al. |
| 5,838,302 A | 11/1998 | Kuriyama et al. |
| 5,845,300 A | 12/1998 | Comer et al. |
| 5,864,340 A | 1/1999 | Bertram et al. |
| 5,881,169 A | 3/1999 | Henry, Jr. |
| 5,896,321 A | 4/1999 | Miller et al. |
| 5,911,485 A | 6/1999 | Rossmannlain |
| 5,914,708 A | 6/1999 | LaGrange et al. |
| 5,926,178 A | 7/1999 | Kurtenback |
| 5,926,566 A | 7/1999 | Wang |
| 5,943,039 A | 8/1999 | Anderson et al. |
| 5,953,541 A | 9/1999 | King et al. |
| 5,959,629 A | 9/1999 | Masui |
| 5,963,666 A | 10/1999 | Fujisaki et al. |
| 5,963,671 A | 10/1999 | Comerford et al. |
| 5,974,558 A | 10/1999 | Cortopassi et al. |
| 5,977,887 A | 11/1999 | Grimmett |
| 5,977,948 A | 11/1999 | Nishibori |
| 5,982,351 A | 11/1999 | White et al. |
| 6,002,390 A | 12/1999 | Masui |
| 6,005,549 A | 12/1999 | Forest |
| 6,008,799 A | 12/1999 | Van Kleeck |
| 6,011,554 A | 1/2000 | King et al. |
| 6,026,233 A | 2/2000 | Shulman et al. |
| 6,037,942 A | 3/2000 | Millington |
| 6,084,576 A | 7/2000 | Leu et al. |
| 6,088,649 A | 7/2000 | Kadaba et al. |
| 6,094,197 A | 7/2000 | Buxton et al. |
| 6,097,392 A | 8/2000 | Leyerle |
| 6,097,841 A | 8/2000 | Gunji et al. |
| 6,098,086 A | 8/2000 | Krueger et al. |
| 6,101,461 A | 8/2000 | Ukigawa et al. |
| 6,111,985 A | 8/2000 | Hullender et al. |
| 6,144,378 A | 11/2000 | Lee |
| 6,148,104 A | 11/2000 | Wang |
| 6,154,758 A | 11/2000 | Chiang |
| 6,167,411 A | 12/2000 | Narayanaswamy |
| 6,167,412 A | 12/2000 | Simons |
| 6,188,789 B1 | 2/2001 | Marianetti, II et al. |
| 6,256,030 B1 | 7/2001 | Berry et al. |
| 6,262,719 B1 | 7/2001 | Bi et al. |
| 6,275,612 B1 | 8/2001 | Imoto |
| 6,282,315 B1 | 8/2001 | Boyer |
| 6,286,064 B1 | 9/2001 | King et al. |
| 6,292,179 B1 | 9/2001 | Lee |
| 6,295,372 B1 | 9/2001 | Hawkins et al. |
| 6,307,549 B1 | 10/2001 | King et al. |
| 6,369,807 B1 | 4/2002 | Nakashima |
| 6,377,965 B1 | 4/2002 | Hachamovitch et al. |
| 6,405,060 B1 | 6/2002 | Schroeder et al. |
| 6,424,983 B1 | 7/2002 | Schabes et al. |
| 6,442,295 B2 | 8/2002 | Navoni et al. |
| 6,473,006 B1 | 10/2002 | Yu et al. |
| 6,487,424 B1 | 11/2002 | Kraft et al. |
| 6,502,114 B1 | 12/2002 | Forcier |
| 6,539,421 B1 | 3/2003 | Appelman et al. |
| 6,608,639 B2 | 8/2003 | McGovern |
| 6,621,939 B1 | 9/2003 | Negishi et al. |
| 6,646,572 B1 | 11/2003 | Brand |
| 6,654,733 B1 | 11/2003 | Goodman et al. |
| 6,661,920 B1 | 12/2003 | Skinner |
| 6,734,881 B1 | 5/2004 | Will |
| 6,751,603 B1 | 6/2004 | Bauer et al. |
| 6,801,190 B1 | 10/2004 | Robinson et al. |
| 6,888,141 B2 | 5/2005 | Carr |
| 6,934,906 B1 | 8/2005 | Cheok |
| 6,970,513 B1 | 11/2005 | Puri et al. |
| 6,978,421 B1 | 12/2005 | Aida |
| 7,003,446 B2 | 2/2006 | Trower et al. |
| 7,224,409 B2 | 5/2007 | Chin et al. |
| 7,257,528 B1 | 8/2007 | Ritchie et al. |
| 7,322,023 B2 | 1/2008 | Shulman et al. |
| 7,937,688 B2 | 5/2011 | Vaidyanathan et al. |
| 8,552,984 B2 | 10/2013 | Knaven |
| 8,745,018 B1 * | 6/2014 | Singleton .......... G06F 17/30899 |
| | | 707/705 |
| 2001/0000962 A1 | 5/2001 | Rajan |
| 2001/0027468 A1 | 10/2001 | Okura |
| 2002/0067377 A1 | 6/2002 | McGovern |
| 2002/0087279 A1 | 7/2002 | Hall |
| 2003/0137605 A1 | 7/2003 | Chin et al. |
| 2004/0021691 A1 | 2/2004 | Dostie |
| 2005/0198144 A1 | 9/2005 | Kraenzel et al. |
| 2005/0210402 A1 | 9/2005 | Gunn et al. |
| 2005/0223308 A1 | 10/2005 | Gunn et al. |
| 2006/0212510 A1 * | 9/2006 | Nielsen .............. G06F 17/2705 |
| | | 709/203 |

(56) References Cited

U.S. PATENT DOCUMENTS

| | | | |
|---|---|---|---|
| 2006/0265208 A1 | 11/2006 | Assadoliahi | |
| 2007/0049262 A1* | 3/2007 | Jung | G06F 3/04895 455/418 |
| 2007/0188472 A1 | 8/2007 | Ghassabian | |
| 2010/0178947 A1* | 7/2010 | Kim | H04M 1/72552 455/466 |
| 2011/0010655 A1 | 1/2011 | Dostie et al. | |
| 2012/0185798 A1 | 7/2012 | Louch et al. | |
| 2013/0024185 A1 | 1/2013 | Parikh | |
| 2013/0297317 A1* | 11/2013 | Lee | H04M 1/72552 704/270.1 |
| 2014/0164981 A1* | 6/2014 | Colley | G06F 3/0237 715/780 |
| 2014/0189572 A1* | 7/2014 | Martens | G06F 3/04817 715/780 |

FOREIGN PATENT DOCUMENTS

| | | |
|---|---|---|
| EP | 0 643 357 A3 | 3/1996 |
| EP | 0 844 570 A2 | 5/1998 |
| EP | 0 844 571 A2 | 5/1998 |
| EP | 0 858 023 A2 | 8/1998 |
| EP | 0472444 A2 | 8/1998 |
| EP | 0 858 023 A3 | 9/1998 |
| EP | 0 844 570 A3 | 8/1999 |
| EP | 0 844 571 A3 | 8/1999 |
| EP | 0982676 A1 | 3/2000 |
| EP | 2500854 A1 | 9/2012 |
| JP | 10105324 A2 | 4/1998 |
| JP | 10154033 A2 | 6/1998 |
| JP | 10154144 A2 | 6/1998 |
| JP | 11143614 A2 | 5/1999 |
| JP | 11167569 A2 | 6/1999 |
| JP | 10333818 A2 | 4/2002 |
| WO | WO 96/09579 | 3/1996 |
| WO | WO 98/11480 | 3/1998 |
| WO | WO 99/28811 | 6/1999 |
| WO | WO 0195095 | 12/2001 |
| WO | WO 2004107101 | 12/2004 |
| WO | WO 2011/117456 A1 | 9/2011 |

OTHER PUBLICATIONS

3Com "PalmPilot Handbook" 1997 3Com Corp. pp. 37-39.

IPER dated Dec. 9, 2003 issued for International Application No. PCT/CA01/01473.

IPER dated Jun. 19, 2001 issued for International Application No. PCT/CA00/00285.

Baeza-Yates "A New Approach to Text Searching" (Preliminary Version) Centre for the New O.E.D. & Data Structuring Group Department of Computer Science University of Waterloo pp. 168-175.

Bellman T. & MacKenzie I.S. (1998) A probabilistic character layout strategy for mobile text entry. Proceedings of Graphics interface '98 pp. 168-176 Toronto: Canadian Information Processing Society.

Bohan et al "A Psychophysical Comparison of Two Stylus-Driven Soft Keyboards" Department of Psychology Wichita State University.

Bohlman Eric "KeyCache—The Universal Input Accelerator Version 2.1" copyright Sep. 29, 1994 OMS Development documentation downloaded from <http://www.sac.sk/files.php?d=16&I=K> 12 pages.

Callhan et al1 abstract: . . . compare pie menus to linear menus.

Darragh et al. "The Reactive Keyboard: A Predictive Typing Aid" University of Calgary Nov. 1990 pp. 41-49.

Darragh et al.; "The Reactive Keyboard Cambridge Series on Human-Computer Interaction" Cambridge Univ. Press (c) 1992 186 pages.

Don Hopkins "A Description of Pie Menus" (http://catalog.com/hopkins/piemenus/PieMenuDescriptiom.html).

Don Hopkins "ActiveX Pie Menus" (http://catalog.com/hopkins/piemenus/ActiveXPieMenus.html).

Don Hopkins "Natural Selection: The Evolution of Pie Menus" BayCHI Oct. 13, 1998 (http://catalog.com/hopkins/piemenus/Natural Selection.html).

Don Hopkins "Pie Menu References" (http://catalog.com/hopkins/piemenu-references.html).

Don Hopkins "Pie Menus" (http://art.net/~hopkins/Don/piemenues/index.html).

Don Hopkins "The Design and Implementation of Pie Menus" Dr. Dobb's Journal Dec. 1991 (http://art.net/~hopkins/Don/piemenus/ddj/piemenus.html).

Extended European Search Report dated May 27, 2009 for European Patent Application No. 07022182.5.

Jakobsson Matti "Autocompletion in Full Text Transaction entry: A Method for Humanized Input" Univ. of Vaasa ACM © 1986 pp. 327-332.

Jason I. Hong "Java Pie Menus" Sep. 4, 1999 (jttp://www.cs.berkeley.edu/~jasonh/download/sotware/piemenu/).

Jones P.E. "Virtual Keyboard with Scanning and Augmented by Prediction" 1998 Proc. 2nd Euro. Conf. Disability Virtual Reality & Assoc. Tec. Skovde Sweden 1998 pp. 45-51.

Julie T9 Keyboard Review "The gadgeteer" available at www.the-gadgeteer.com/1998/08/27/t9_keyboard_review/ Aug. 27, 1998 (accessed Feb. 23, 2010) pp. 1 to 10.

MacKenzie et al. "Alphanumeric Entry on Pen-Based Computers" 1994 Intl. Journal of Human-Computer Studies 41 pp. 775-792 <http://www.yorku.ca/mack/IJHCS.html>.

MacKenzie et al. "Text Entry Using Soft Keyboard" 1999 Behavior & Information Tech. 18 pp. 235-244.

MacKenzie et al. "The Design and Evaluation of a High-Performance Soft Keyboard" 1999 ACM pp. 25-31.

Mankopff et al "Cirrin: A Word-level Unistroke Keyboard for Pen Input" 1998 ACM pp. 213-214.

Masui T. 1998 "An Efficient Text Input Method for Pen-based Computers" Apr. 18-23, 1998 In Proc. SIGCHI Conf. On Human Factors in Computing Systems (LC. Karat A. Lund J. Coutaz and J. Karat Eds. Conference on Human Factors in Computing Systems. ACM pp. 328-335.

Masui T. 1999 "POBox: An Efficient Text Input Method for Handheld and Ubiquitous Computers" In Proc. Of 1st Intl. Symp. On Computer Science vol. 1707. Springer-Verlag London 289-300.

Mercedes-Benz AG Auto Pilot System—Guide (Translation attached).

Mercedes-Benz COMAND Betriebsanleitung—Navigation Guide (Translation attached).

Mercedes-Benz Navigation System—Operation Guide © 1997 Mercedes-Benz of North America Inc. Technical Information Order No. S-2690-097 Printed in the United States.

National Council on Disability Document Archive software guide to alternative input and output programs circa 1996 downloaded from <http://www.dimenet.com/disnews/archive.php?mode=P&id=49> 12 pages.

NCIP listing of Word Prediction & Writing Tools circa 1997 downloaded from <http://www2.edc.org/ncip/LIBRARY/wp/Pubs.htm> 7 pages.

European Patent Application No. 01 981 991.1—Office Action dated Aug. 11, 2004.

European Patent Application No. 01 981 991.1—Office Action dated Jun. 23, 2005.

European Patent Application No. 00 910 460.5—Office Action dated Feb. 7, 2002.

European Patent Application No. 07022182.5—Partial European Search Report dated Mar. 4, 2009.

U.S. Appl. No. 09/631,101—Office Action dated Jan. 20, 2004.

U.S. Appl. No. 09/631,101—Office Action dated Jan. 14, 2005.

U.S. Appl. No. 09/631,101—Advisory Action dated Sep. 16, 2005.

U.S. Appl. No. 09/631,101—Office Action dated Jun. 14, 2005.

U.S. Appl. No. 09/631,101—Office Action dated Mar. 20, 2006.

U.S. Appl. No. 09/631,101—Office Action dated Jan. 5, 2007.

U.S. Appl. No. 09/631,101—Office Action dated Jun. 4, 2007.

U.S. Appl. No. 09/631,101—Notice of Allowability dated Aug. 8, 2007.

U.S. Appl. No. 10/399,560—Office Action dated Oct. 18, 2006.

(56) References Cited

OTHER PUBLICATIONS

U.S. Appl. No. 10/399,560—Office Action dated Jul. 17, 2007.
U.S. Appl. No. 10/399,560—Office Action dated Apr. 15, 2008.
U.S. Appl. No. 10/399,560—Office Action dated Jan. 7, 2009.
U.S. Appl. No. 10/399,560—Office Action dated Sep. 29, 2009.
U.S. Appl. No. 11/133,770—Office Action dated Jun. 7, 2007.
U.S. Appl. No. 11/133,770—Office Action dated Mar. 4, 2008.
U.S. Appl. No. 11/133,770—Office Action dated Nov. 24, 2008.
U.S. Appl. No. 11/133,770—Office Action dated Jun. 10, 2009.
U.S. Appl. No. 11/133,770—Notice of Allowance dated Dec. 28, 2009.
U.S. Appl. No. 11/134,759—Office Action dated May 18, 2007.
U.S. Appl. No. 11/134,759—Office Action dated Apr. 3, 2008.
U.S. Appl. No. 11/134,759—Office Action dated Feb 4, 2009.
U.S. Appl. No. 11/134,759—Office Action dated Feb. 25, 2010.
U.S. Appl. No. 11/134,810—Office Action dated Jan. 26, 2009.
U.S. Appl. No. 11/134,810 Notice of Allowance dated Nov. 30, 2009.
U.S. Appl. No. 11/871,887—Office Action dated Apr. 14, 2010.
U.S. Appl. No. 11/871,887—Notice of Allowance dated Nov. 30, 2010.
U.S. Appl. No. 11/871,900—Office Action dated Mar. 31, 2010.
U.S. Appl. No. 11/871,900—Notice of Allowance dated Nov. 26, 2010.
U.S. Appl. No. 11/871,900—Office Action dated Aug. 18, 2011.
U.S. Appl. No. 11/871,900—Office Action dated Jul. 18, 2012.
U.S. Appl. No. 11/871,900—Advisory Action dated Dec. 6, 2012.
U.S. Appl. No. 11/871,900—Office Action dated May 16, 2013.
U.S. Appl. No. 11/871,900—Pre-Brief Appeal Conference Decision dated Jan. 14, 2014.
U.S. Appl. No. 11/871,904—Office Action dated Apr. 14, 2010.
U.S. Appl. No. 11/871,904—Office Action dated Dec. 21, 2010.
U.S. Appl. No. 11/871,904—Office Action dated Oct. 17, 2011.
U.S. Appl. No. 11/871,904—Pre-Brief Conference Decision dated Apr. 19, 2012.
U.S. Appl. No. 11/871,904—Office Action dated Aug. 6, 2012.
U.S. Appl. No. 12/749,318—Office Action dated Dec. 20, 2012.
U.S. Appl. No. 12/749,318—Office Action dated Jun. 3, 2014.
U.S. Appl. No. 12/531,296—Office Action dated Jan. 18, 2013.
U.S. Appl. No. 11/036,267—Office Action dated Apr. 30, 2008.
U.S. Appl. No. 11/036,267—Office Action dated Jan. 26, 2009.
U.S. Appl. No. 11/036,267—Office Action dated Nov. 24, 2009.
U.S. Appl. No. 11/036,267—Office Action dated Aug. 13, 2010.
U.S. Appl. No. 11/036,267—Office Action dated Jul. 12, 2011.
U.S. Appl. No. 11/036,267—Office Action dated Mar. 29, 2012.
U.S. Appl. No. 11/036,267—Office Action dated Dec. 31, 2012.
Russell Nelson "Pie Menu Window Manager" Jun. 3, 1998 (http://www.crynwr.com/piewm/).
SofType 3.1 Help File circa 1997 downloaded from <http://orin.com/binaries/st31dmz.exe> 38 pages.
SofType Version 3.1 Screendumps generated from demo version of software downloaded from <http://orin.com/binaries/st31dmz.exe> 21 Figures.
Tom Nantais et al. IEEE Transactions on Rehabilitation Engineering "A Predictive Selection Technique for Single-Digit Typing With a Visual Keybaord" No. 3 Sep. 1994.
Toshiyuki Masui Sony Computer Science Laboratories Inc. Shinagawa Tokyo "Integrating Pen Operations for Composition by Example".
Toshiyuki Masui Sony Computer Science Laboratory Inc. Shinagawa Tokyo "An Efficient Text Input Method for Pen-based Computers" Proceedings of the ACM Conference on Human Factors in Computing Systems Apr. 1998 pp. 328-335.
Venolia "T-Cube: A Fast Self-Disclosing Pen-Based Alphabet" Boston Massachusetts USA Apr. 24-28, 1994 Human Factors in Computing Systems pp. 265-270.
Vitoria et al. "A Comparison of Prediction Techniques to Enhance the Communication Rate" Springer-Verlg 2004 pp. 400-417.
Wivik 2 Rep Software manual circa Feb. 1998 Orentke Romich Company downloaded from <http://web.archive.org/web/20001204165600/wivik.com/html/downloads.htm> 128 pages.
Wu and Manber "AGREP—A Fast Approximate Pattern-Matching Tool" (Preliminary Version) Department of Computer Science University of Arizona.

* cited by examiner

METHOD, SYSTEM, AND APPARATUS FOR EXECUTING AN ACTION RELATED TO USER SELECTION

BACKGROUND OF THE INVENTION

1. Field of Invention

This invention relates to executing an action related to user selection and more particularly to a method, system and apparatus for executing an action related to data input by a user via a data entry system.

2. Description of Related Art

When a user enters data into a smart phone or other personal computing device it is often desirable to look up information related to the text or other data that the user is entering or looking at via the device or to look up information related to the context. For example, users may wish to use applications other than the one they are currently using to look up such related information. In conventional systems, in order to retrieve related information, the options available for a user to do so are limited, awkward, and inefficient. For instance, the user must exit the text entry application that they are using, open a new application from which they can generate the information they wish to look up, retrieve the information, and then return to the text entry or display application they were previously using. Further, conventional keyboards and applications do not dynamically make available related application icons for user interaction based on what the user has typed or has selected on a display. Accordingly, users often struggle with having to follow similar steps for opening a related application regardless as to whether it could be predictable that the user will require such an application. Further, once the user has opened the related application, the user must often reenter information or text that the user has already entered in the text entry application. Accordingly, users often find that they are required to enter the same text multiple times when using a conventional text entry application in conjunction with a related application.

SUMMARY OF THE INVENTION

In general, there is provided a method, system and apparatus for executing an action on a computing device related to input received from a user in connection with another action.

In accordance with one aspect of the invention, there is provided a method of executing an action related to data input by a user via a personal computing device. The method involves receiving first input data via a keyboard, and associating the first input data with a secondary application available to the user via the personal computing device by causing an icon to be displayed on a display device for selection, the icon associated with the secondary application. The method also involves monitoring for user selection of the icon, and, in response to detecting user selection of the icon, activating the secondary application to generate second data contextually associated with the secondary application for display on the display device.

The first input data may be associated with a primary input action via a primary application.

Activating the secondary application may involve activating the secondary application to support a secondary input action different from the primary input action.

Activating the secondary application may involve activating the secondary application to support the secondary input action while the secondary application remains active.

Causing the icon to be displayed on the display device may involve causing the icon to be displayed in a status notification bar or notification region on the display device.

Causing the keyboard to be displayed on the display device.

Causing the icon to be displayed on the display device may involve causing the icon to be displayed on the display device below the keyboard.

Causing the icon to be displayed on the display device may involve causing the icon to be displayed on the display device above the keyboard.

Causing the icon to be displayed on the display device may involve causing the icon to be displayed on the display device within the keyboard.

Causing the icon to be displayed on the display device may involve causing the icon to be displayed on the display device to a left or right of the keyboard.

The method may involve associating the first input data with at least one additional secondary application available to the user via the personal computing device by causing at least one additional icon to be displayed on the display device for selection, the at least one additional icon associated with the at least one additional secondary application.

Causing the icon to be displayed may involve associating the icon and the at least one additional icon with a group icon and displaying the group icon on the display device for selection, and, in response to detecting selection of the group icon, causing the icon and the at least one additional icon to be displayed on the display device.

Causing the icon to be displayed and causing the at least one additional icon to be displayed may involve causing the icon and the at least one additional to be displayed in order according to respective ranks associated with the icon and the at least one additional icon The ranks may be based on respective historical selection frequencies associated with the icons and wherein causing the icon and the at least one additional icon to be displayed may involve causing the icon and the at least one additional icon to be displayed such that the icon and the at least one additional icon are displayed in order according to the historic selection frequencies associated with the icon and the at least one additional icon.

The method may involve causing the second data to be displayed on the display device.

The method may involve causing the second data to be stored in a database

The first input data may be stored in the database and causing the second data to be stored in the database may involve replacing the first input data stored in the database with the second data.

Causing the second data to be stored in the database may involve storing connecting text with the second data in the database.

Causing the second data to be stored in the database may involve causing the second data to be stored in a first location in the database and the method may involve receiving a paste message and, in response to receiving the paste message, copying the second data from the first location to a second location in the database such that the second data is displayed on the display device.

Activating the secondary application to generate the second data may involve causing the secondary application to store state information associated with the second data in the database, causing a resume state icon to be displayed on the display device for selection by the user, detecting selection of the resume state icon, and, in response to detecting selection of the resume state icon, reading the state information from the database and activating the secondary application to generate the second data for display on the display device based on the state information.

Associating the first input data with the secondary application may involve monitoring the first input data to determine if the first input data is associated with a predetermined category corresponding to the secondary application.

Monitoring the first input data to determine if the first input data is associated with the predetermined category may involve: applying a category test to the first input data to determine whether the first input data falls within the predetermined category, determining that the secondary application is associated with the predetermined category based on applying the category test.

Applying the category test may involve determining whether the first input data includes at least one of a plurality of patterns associated with the predetermined category.

Applying the category test may involve determining semantic information related to the first input data.

The plurality of patterns may include number patterns and applying the category test may involve determining whether the first input data includes one of the number patterns.

The plurality of patterns may include upper case word patterns and wherein applying the category test may involve determining whether the first input data includes one of the upper case word patterns.

The plurality of patterns may include unit of measurement patterns and applying the category test may involve determining whether the first input data includes one of the unit of measurement patterns.

The plurality of patterns may include currency patterns and applying the category test may involve determining whether the first input data includes one of the currency patterns.

The plurality of patterns may include phone number patterns and applying the category test may involve determining whether the first input data includes one of the phone number patterns.

The plurality of patterns may include address patterns and applying the category test may involve determining whether the first input data includes one of the address patterns.

The plurality of patterns may include email address patterns and applying the category test may involve determining whether the first input data includes one of the email address patterns.

The plurality of patterns may include recently used application names and applying the category test may involve determining whether the first input data includes one of the recently used application names.

The plurality of patterns may include recently installed application names and applying the category test may involve determining whether the first input data includes one of the recently installed application names.

The plurality of patterns may include advertisement patterns corresponding to a product and applying the category test may involve determining whether the first input data includes one of the advertisement patterns.

The plurality of patterns may include restaurant patterns and applying the category test may involve determining whether the first input data includes one of the restaurant patterns.

The plurality of patterns may include movie names and applying the category test may involve determining whether the first input data includes one of the movie names.

The plurality of patterns may include appointment patterns and applying the category test may involve determining whether the first input data includes one of the appointment patterns.

The plurality of patterns may include task list patterns and applying the category test may involve determining whether the first input data includes one of the task list patterns.

The plurality of patterns may include music patterns and applying the category test may involve determining whether the first input data includes one of the music patterns.

The method may involve receiving location information identifying a location of the personal computing device, applying the category test may involve applying a location based category test to the location information.

Applying the location based category test may involve determining whether the location information corresponds to an allowed location.

Activating the secondary application to generate the second data may involve generating the second data based on the first input data via said secondary application.

Generating the second data based on the first input data may involve detecting selection of a portion of the first data, and generating the second data based on the selected portion of the first data The method may involve displaying the second data on the display device for user selection.

Generating the second data may involve retrieving at least one contact having a plurality of contact information fields, at least one of the plurality of contact information fields corresponding to the first input data, and generating the second data to include at least one of the plurality of contact information fields.

The plurality of contact information fields may be selected from a group consisting of an email, a phone number, a name, an address, a profile picture, a company, a title, a birthday, and a spouse's name.

The first input data may include a first number and generating the second data may involve displaying the first number and at least one calculator key for selection by the user, detecting selection of at least one of the at least one calculator keys, generating a second number based on the first number and the at least one selected calculator key, and generating the second data to include the second number.

The first input data may include a formula and generating the second data may involve solving the formula and generating the second data to include a solution to the formula.

The first input data may include a first number and a first unit and generating the second data may involve generating a second number based on the first number and generating a second unit based on the first unit, and generating the second data to include at least one of the second number and the second unit.

The first unit may correspond to a first unit of measurement and the second unit may correspond to a second unit of measurement and generating the second number may involve generating the second number based on a ratio associated with the first and second units of measurements.

The first unit may correspond to a first currency and wherein the second unit may correspond to a second currency and generating the second number may involve generating the second number based on a ratio associated with the first and second currencies.

Generating the second data may involve retrieving at least one restaurant reservation having a plurality of restaurant reservation information fields, and generating the second data to include at least one of the plurality of restaurant reservation information fields.

Generating the second data may involve retrieving at least one theatre having a plurality of theatre information fields, at least one of the plurality of theatre information fields corresponding to the first input data and generating the second data to include at least one of the plurality of theatre information fields.

Generating the second data may involve retrieving at least one appointment having a plurality of appointment information fields, at least one of the plurality of appointment information fields corresponding to the first input data, and generating the second data to include at least one of the plurality of appointment information fields.

Generating the second data may involve retrieving at least one task having a plurality of task information fields, at least one of the plurality of task information fields corresponding to the first input data, and generating the second data to include at least one of the plurality of task information fields.

Generating the second data may involve retrieving at least one song having a plurality of song information fields, at least one of the plurality of song information fields corresponding to the first input data, and generating the second data to include at least one of the plurality of song information fields.

In accordance with another aspect of the invention, there is provided a method of executing an action related to data input by a user via a personal computing device. The method involves generating first input data based on user selection of a data input box, and associating the first input data with a secondary application available to the user via the personal computing device by causing an icon to be displayed on a display device for selection, the icon associated with the secondary application. The method also involves monitoring for user selection of the icon, and, in response to detecting user selection of the icon, activating the secondary application to generate second data contextually associated with the secondary application for display on the display device.

Associating the first input data with the secondary application may involve applying a category test to the first input data to determine that the first input data falls within a predetermined category, and determining that the secondary application is associated with the category based on applying the category test.

The first input data may include a context indicator and applying the category test to the first input data may involve determining that the context indicator of the first input data corresponds to a stored context indicator associated with the predetermined category.

The stored context indicator may include a username context indicator and applying the category test to the first input data may involve determining whether the context indicator corresponds to the username context indicator.

The stored context indicator may include a password context indicator and applying the category test to the first input data may involve determining whether the context indicator corresponds to the password context indicator.

The stored context indicator may include a phone number context indicator and applying the category test to the first input data may involve determining whether the context indicator corresponds to the phone number context indicator.

The stored context indicator may include an email address context indicator and applying the category test to the first input data may involve determining whether the context indicator corresponds to the email address context indicator.

The stored context indicator may include an image context indicator and applying the category test to the first input data may involve determining whether the context indicator corresponds to the image context indicator.

The stored context indicator may include a text context indicator and applying the category test to the first input data may involve determining whether the context indicator corresponds to the text context indicator.

Activating the secondary application to generate the second data may involve generating the second data based on the first input data via the secondary application.

The method may involve displaying the second data on the display device for user selection.

The first input data may include a username context indicator and generating the second data may involve reading a username from a database, and generating the second data to include the username.

The first input data may include a contact information context indicator and generating the second data may involve reading from a database at least one contact having at least one contact information field corresponding to the contact information context indicator, and generating the second data to include the at least one contact information field.

The contact information context indicator may be selected from a group consisting of an email context indicator, a phone number context indicator, a name context indicator, an address context indicator, a profile picture context indicator, a company context indicator, a job title context indicator, a birthday context indicator, and a spouse's name context indicator.

The first input data may include an image context indicator and generating the second data may involve reading from a database at least one image and generating the second data to include the at least one image.

The first input data may include a text context indicator.

The first input data may include first input text being in a first language and generating the second data may involve generating the second data to include a translation of the first input text from the first language into a second language.

The first input data may include a first word and generating the second data may involve generating the second data to include a second word having a similar meaning to the first word.

The first input data may include a first word and generating the second data may involve generating the second data to include a definition of the first word.

Generating the second data may involve searching for the second data via a network connection.

The method may involve receiving location information indicating a location of the personal computing device and searching for the second data via the network connection may involve searching for the second data via the network connection based on the location information.

The second data may include advertisement information.

Generating the second data may involve causing the second data to be sent to a social networking platform.

Generating the second data may involve reading from a database at least one secondary application identifier, and generating the second data to include the at least one secondary application identifier.

In accordance with another aspect of the invention, there is provided a method of executing an action related to data input by a user via a personal computing device. The method involves generating first input data via a word selector application and associating the first input data with a secondary application available to the user via the personal computing device by causing an icon to be displayed on a display device for selection, the icon associated with the secondary application. The method also involves monitoring for user selection of the icon, and in response to detecting user selection of the icon, activating the secondary application to generate second data contextually associated with the secondary application for display on the display device.

Generating the first input data via the word selector application may involve causing the display device to display selectable text and a selector having a plurality of text select icons, detecting selection of one of the plurality of text select icons, and generating the first input data to include a portion of the selectable text corresponding to the selected one of the plurality of text select icons.

The plurality of text select icons may include a word select icon and when the selected one of the plurality of text select icons includes the word select icon, generating the first input data to include the portion of the selectable text may involve generating the first input data to include a word of the selectable text.

The plurality of text select icons may include a word select icon and when the selected one of the plurality of text select icons includes the word select icon, generating the first input data to include the portion of the selectable text may involve generating the first input data based on a selected position within the word select icon.

The plurality of text select icons may include a sentence select icon and when the selected one of the plurality of text select icons includes the sentence select icon, generating the first input data to include the portion of the selectable text may involve generating the first input data to include a sentence of the selectable text.

The plurality of text select icons may include a paragraph select icon and when the selected one of the plurality of text select icons includes the paragraph select icon, generating the first input data to include the portion of the selectable text may involve generating the first input data to include a paragraph of the selectable text.

The plurality of text select icons may include a select all icon and when the selected one of the plurality of text select icons includes the select all icon, generating the first input data to include the portion of the selectable text may involve generating the first input data to include all of the selectable text.

In accordance with another aspect of the invention, there is provided a method of executing an action related to data input by a user via a personal computing device. The method involves generating network connection data associated with a network in communication with the personal computing device and associating the network connection data with a secondary application available to the user via the personal computing device by causing an icon to be displayed on a display device for selection, the icon associated with the secondary application. The method also involves monitoring for user selection of the icon and, in response to detecting user selection of the icon, activating the secondary application to generate second data contextually associated with the secondary application for display on the display device.

Associating the network connection data with the secondary application may involve applying a category test to the network connection data to determine whether the network connection data falls within a predetermined category, and determining that the secondary application is associated with the predetermined category based on applying the category test.

The network connection data may include a cost indicator indicating a cost of accessing the network and applying the category test may involve determining whether the cost indicator indicates that the cost of accessing the network is less than a threshold cost.

The network connection data may include a bandwidth indicator indicating a bandwidth of the network and applying the category test may involve determining whether the bandwidth indicator indicates that the bandwidth of the network is greater than a threshold bandwidth.

In accordance with another aspect of the invention, there is provided a method of executing an action related to data input by a user via a personal computing device. The method involves receiving location information identifying a location of the personal computing device and associating the location information with a secondary application available to the user via the personal computing device by causing an icon to be displayed on a display device for selection, the icon associated with the secondary application. The method also involves monitoring for user selection of the icon and, in response to detecting user selection of the icon, activating the secondary application to generate second data contextually associated with the secondary application for display on the display device.

Receiving the location information may involve receiving the location information via a Near Field Communication ("NFC") receiver.

Receiving the location information may involve receiving the location information via a Global Positioning System receiver.

Receiving the location information may involve receiving the location information via a network connection and wherein the location information includes a Service Set Identifier (SSID).

Associating the network connection data with the secondary application may involve: applying a category test to the location information to determine whether the location information falls within a predetermined category, and determining that the secondary application is associated with the predetermined category based on applying the category test.

Applying the category test may involve determining whether the location information corresponds to an allowed location In accordance with another aspect of the invention, there is provided a method of executing an action related to data input by a user via a personal computing device. The method involves receiving first input data via a keyboard and causing an icon to be displayed on a display device for selection, the icon associated with a secondary application. The method also involves monitoring for user selection of the icon and, in response to detecting user selection of the icon, activating the secondary application to generate second data contextually associated with the secondary application for display on the display device.

Activating the secondary application to generate the second data may involve generating the second data based on the first input data via the secondary application.

The method may involve displaying the second data on the display device for user selection.

The first input data may include first input text being in a first language and generating the second data may involve generating the second data to include a translation of the first input text from the first language into a second language.

The first input data may include a first word and wherein generating the second data may involve generating the second data to include a second word having a similar meaning to the first word.

The first input data may include a first word and generating the second data may involve generating the second data to include a definition of the first word.

Generating the second data may involve searching for the second data via a network connection.

The method may involve receiving location information indicating a location of the personal computing device and searching for the second data via the network connection may involve searching for the second data via the network connection based on the location information.

The second data may include advertisement information.

Generating the second data may involve causing the second data to be sent to a social networking platform.

Generating the second data may involve reading from a database at least one secondary application identifier and generating the second data to include the at least one secondary application identifier.

In accordance with another aspect of the invention, there is provided a computer readable medium having stored thereon codes for directing a processor to execute any of the above methods.

In accordance with another aspect of the invention, there is provided an apparatus for executing an action related to data input by a user via a personal computing device. The apparatus includes a processor operably configured to execute any of the above methods.

In accordance with another aspect of the invention, there is provided a system for executing an action related to data input by a user via a personal computing device. The system includes provisions for receiving first input data via a keyboard, provisions for associating the first input data with a secondary application available to the user via the personal computing device by causing an icon to be displayed on a display device for selection, the icon associated with the secondary application, provisions for monitoring for user selection of the icon, and provisions for, in response to detecting user selection of the icon, activating the secondary application to generate second data contextually associated with the secondary application for display on the display device.

In accordance with another aspect of the invention, there is provided a system for executing an action related to data input by a user via a personal computing device. The system includes provisions for generating first input data based on user selection of a data input box, provisions for associating the first input data with a secondary application available to the user via the personal computing device by causing an icon to be displayed on a display device for selection, the icon associated with the secondary application, provisions for monitoring for user selection of the icon, and provisions for, in response to detecting user selection of the icon, activating the secondary application to generate second data contextually associated with the secondary application for display on the display device.

In accordance with another aspect of the invention, there is provided a system for executing an action related to data input by a user via a personal computing device. The system includes provisions for generating first input data via a word selector application, provisions for associating the first input data with a secondary application available to the user via the personal computing device by causing an icon to be displayed on a display device for selection, the icon associated with the secondary application, provisions for monitoring for user selection of the icon, and provisions for, in response to detecting user selection of the icon, activating the secondary application to generate second data contextually associated with the secondary application for display on the display device.

In accordance with another aspect of the invention, there is provided a system for executing an action related to data input by a user via a personal computing device. The system includes provisions for generating network connection data associated with a network in communication with the personal computing device, provisions for associating the network connection data with a secondary application available to the user via the personal computing device by causing an icon to be displayed on a display device for selection, the icon associated with the secondary application, provisions for monitoring for user selection of the icon, provisions for, in response to detecting user selection of the icon, activating the secondary application to generate second data contextually associated with the secondary application for display on the display device.

In accordance with another aspect of the invention, there is provided a system for executing an action related to data input by a user via a personal computing device. The system includes provisions for receiving location information identifying a location of the personal computing device, provisions for associating the location information with a secondary application available to the user via the personal computing device by causing an icon to be displayed on a display device for selection, the icon associated with the secondary application, provisions for monitoring for user selection of the icon, provisions for, in response to detecting user selection of the icon, activating the secondary application to generate second data contextually associated with the secondary application for display on the display device.

In accordance with another aspect of the invention, there is provided a system for executing an action related to data input by a user via a personal computing device. The system includes provisions for receiving first input data via a keyboard, provisions for causing an icon to be displayed on a display device for selection, the icon associated with a secondary application, provisions for monitoring for user selection of the icon, provisions for, in response to detecting user selection of the icon, activating the secondary application to generate second data contextually associated with the secondary application for display on the display device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
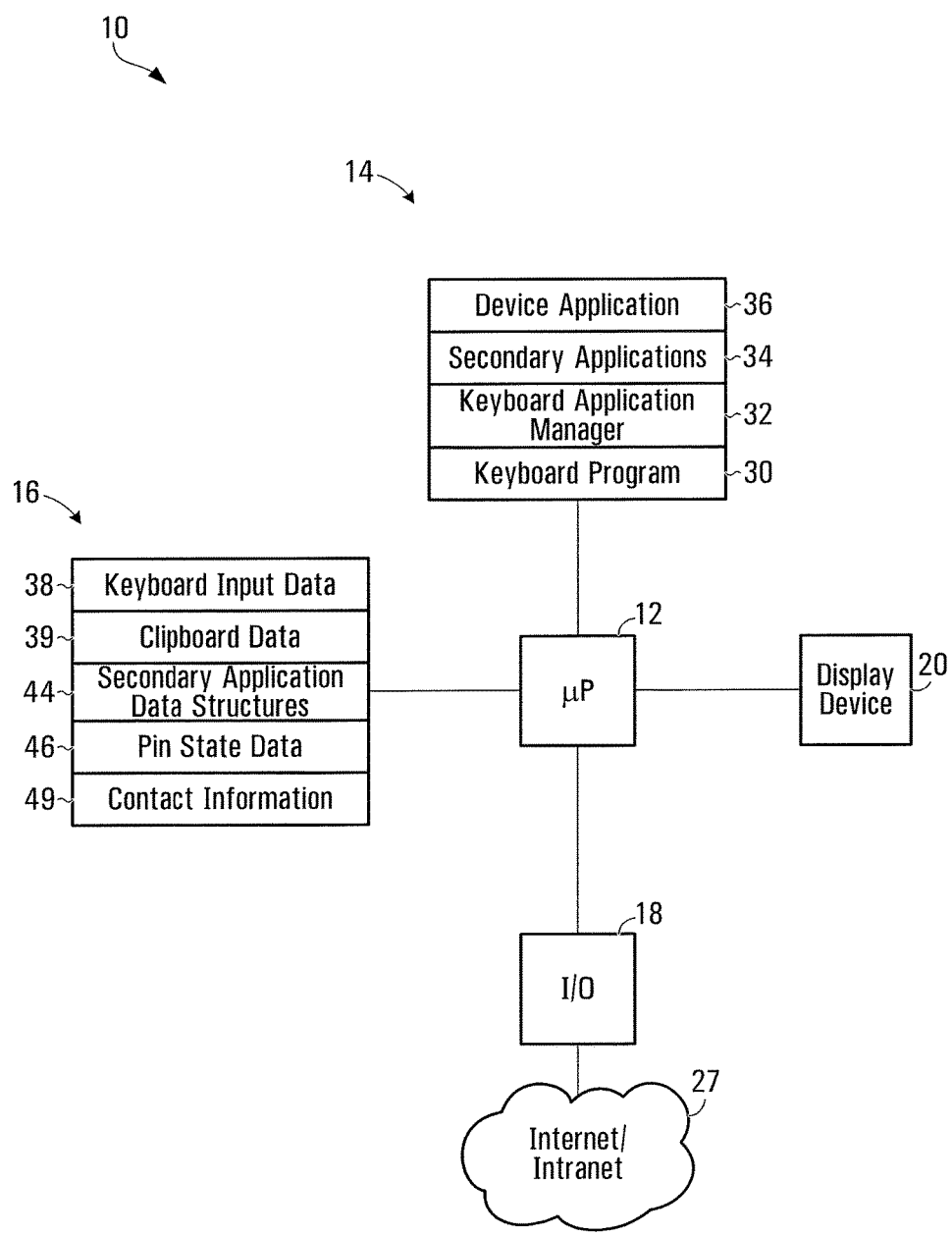
FIG. 1 is a block diagram of a personal computing device for executing an action related to data input by a user in accordance with one embodiment of the invention.

Generally, there is provided a method, system and apparatus for executing an action on a computing device related to input received from a user in connection with another action. In various embodiments, an input application manager (or keyboard application manager) identifies one or more secondary applications associated with the input data being entered by a user via a data entry system such as a keyboard, keypad, voice recognition-based entry system or other form of user input entry system. Icons or other visual cues associated with the secondary applications are displayed on a display for user selection. In various embodiments, upon user selection the corresponding secondary application associated with a selected icon is activated to provide enhanced functionality to the user.

In various embodiments, in the context of a keyboard-based approach, there is provided a personal computing device (or other computing device) running a keyboard program and a keyboard application manager. In various embodiments, the keyboard application manager may be included as part of the keyboard program. The keyboard program displays a virtual or digital keyboard on a display of the personal computing device and receives input data from the user in the form of user keystrokes or other recognizable user input. In various embodiments, the keyboard program and/or the keyboard application manager monitors the input data and performs a multitude of actions, such as, for example, any or all of the following:

(a) attempting to predict the next letters, words and phrases;
(b) attempting to "correct" using fuzzy logic what the user meant to type assuming they are typing incorrectly;
(c) learning what the user is typing if it is not something which is already understood;
(d) attempting to determine patterns and then categories associated with what the user is entering;
(e) monitoring a context in which the user is entering information (email context, password context, or context information indicating what application is currently being executed for example).

In various embodiments, the personal computing device may also run one or more device applications, such as, for example, a text entry application along with the keyboard program and the keyboard application manager. Some exemplary device applications which may, in various cases, act as text entry applications are various versions of web browser applications, Instant Messaging ("IM") applications, Short Message Service ("SMS") applications, social media applications, word processor applications, or note taking applications. In various embodiments, other versions of these text entry applications may also be implemented as secondary applications. In various embodiments, the personal computing device may also or alternatively run one or more device applications, such as, for example, a voice recognition application along with the keyboard program and the keyboard application manager.

In this specification, it will be understood that device applications are generally applications that may be run on the personal computing device independent of the keyboard application manager. Device applications encompass a wide range of third party applications that may run on the personal computing device and will vary depending on the operating system and the personal computing device involved. Examples of device applications include word processors, email applications, contact managers, calendars, audio/video players, photo workshop applications, social networking applications, and browsers, amongst many others.

In general, device applications are separate applications from secondary applications. A secondary application is an application that can be registered in association with at least one category managed by the keyboard application manager. A secondary application is generally adapted or configured to cooperate with the keyboard application manager, as illustrated in various embodiments set out in this specification. In various embodiments a secondary application provides functionality related to a device application and the secondary application may serve as an interface or gateway to a more function-rich device application.

In various embodiments, a device application may be invoked or activated by a secondary application in response to the secondary application being invoked or activated by the keyboard application manager. In other alternative arrangements, a device application may be invoked directly by the keyboard application manager where, for example, the device application is registered in association with at least one category managed by the keyboard application manager and configured to respond to instructions from the keyboard application manager.

In various embodiments, the keyboard application manager runs concurrently with the keyboard program, reads the input data received from the user via the keyboard program, and monitors the input data for various patterns associated with various predetermined categories. When a pattern is found in the input data, the keyboard application manager determines which category the input data falls within, based on the pattern found. In various embodiments, these patterns may include, by way of example only, patterns for identifying proper nouns, phone numbers, email addresses, addresses, units of measurement, or currency patterns for example.

Once the keyboard application manager has identified a category that the input data falls within, the keyboard application manager identifies one or more secondary applications associated with the category. The keyboard application manager then associates the input data with each applicable secondary application by causing icons associated with such secondary applications to be displayed on the display for selection by the user.

The keyboard application manager monitors for user selection of one of the icons, and once user selection of an icon is detected, the keyboard application manager activates the secondary application to generate second data for display. In various embodiments, when the keyboard application manager activates the secondary application, the keyboard application manager hands control of the personal computing device (or computing device) off to the secondary application, and the secondary application causes the personal computing device to display a user interface associated with the secondary application. In various embodiments, the secondary application may display the user interface within a portion of the display previously displaying a user interface associated with the keyboard program and the keyboard application manager. In various embodiments, the secondary application may display the user interface above, below, overlaying or in concert with the user interface displayed by the keyboard program and keyboard application manager.

Secondary applications provide enhanced functionality, over and above the functionality of the keyboard program, to a user with respect to a wide range of different roles to which those secondary applications may be programmed. In various embodiments, secondary applications are adapted and/or configured to cooperate with the keyboard application manager to provide such enhanced functionality. Secondary applications may be referred to as keyboard applications, apps, applets, mini-apps, micro-apps, internal applications, or interapps for example. Some examples of secondary applications are: contact managers, login information managers, interfaces to reservation systems, measurement converters, currency converters, calculators, enterprise tools, database lookups, web searches, or translators.

In various embodiments, a secondary application may generate data contextually associated with, or related to, the secondary application. For example, a contact manager application may generate data contextually associated with contact management. In various embodiments, secondary applications may generate data based on the input data received via the keyboard. The secondary applications may receive the input data from the keyboard application manager or may access the input data directly from memory. Thus, when a secondary application is invoked the secondary application can be presented to the user "preloaded" with additional information retrieved or generated based on the input data already received from the user or context. In this way, secondary applications appear to the user to predict what information the user is going to be looking for. As a result, in various embodiments, secondary applications launched via the keyboard application manager are able to save the user time in accessing or generating additional data related to the input data received via the keyboard. In various embodiments, the additional data is contextually relevant to the activity that the user is carrying out with the keyboard immediately prior to invoking the applicable secondary application.

In various embodiments, the additional data retrieved or generated in a secondary application relates to information that the user entered via the keyboard and is information the user wants to quickly retrieve without having to exit the device application they are currently executing to search for it in a separate application. For example, the additional data in various embodiments represents the contact information of a third party that is readily retrieved by the secondary application that was invoked and activated via the keyboard application manager. In another example, the additional data in various embodiments represents measurement conversion information that is generated by the secondary application based on a first measurement provided in the input data, the secondary application having been invoked and activated via the keyboard application manager. In a further example, the additional data in various embodiments represents login or password information that is readily retrieved by the secondary application again invoked and activated via the keyboard application manager.

Further, in various embodiments only secondary applications which are associated with categories within which the input data falls are accessible by the user through the selection of relevant icons. Accordingly, in various embodiments, only secondary applications which may be relevant to the input data are accessible to the user via the keyboard application manager. Thus, in various embodiments, by using the keyboard application manager via a personal computing device a user is able to quickly invoke or activate the most relevant secondary applications to that user at the time, more quickly and easily than if all of the secondary applications available on the personal computing device were accessible to the user for manual selection.

In various embodiments, the user may be entering text into a text entry application having data input boxes or forms. When the user selects one of the data input boxes, the keyboard application manager (or input application manager) or the text entry application may generate context information based on a context associated with the selected data input box. The context information acts as input data and the keyboard application manager then determines which, if any, category the input data including the generated context information falls within. In various embodiments, the context information may include, by way of example only, username context information, password context information or contact information context information such as email context information, phone number context information, name context information, address context information, profile picture context information, company context information, title context information, or birthday context information, for example.

Some examples of secondary applications which may be associated with context based categories are: form based applications, contact managers, login information managers (e.g. password vaults), image entry applications, or enterprise tools.

In various embodiments, the keyboard application manager or a network analysis application may generate network connection information based on a network connection currently available to the user. The network connection information acts as input data and the keyboard application manager then determines which, if any, category the network connection falls within. In various embodiments, the network connection information may include, by way of example only, wireless connection information, such as Wifi™ connection information or mobile phone network connection information, Bluetooth connection information, network bandwidth information, or network identification (ID) information, for example.

Some examples of secondary applications which may be associated with network connection based categories are: heavy bandwidth use applications or applications dedicated to use when connected to a certain network, such as, for example, enterprise tools.

In various embodiments, the keyboard application manager or a location application may generate location information based on a location of the user. The location information acts as input data and the keyboard application manager then determines which, if any, category the location information falls within. In various embodiments, the location information may include, by way of example only, network location information, GPS based location information, or NFC location information, for example.

Some examples of secondary applications which may be associated with location based categories are: heavy bandwidth use applications, or applications dedicated to use when the user is a in a certain location, such as, for example, enterprise tools.

In various embodiments, some icons associated with some secondary applications may be persistent and thus always displayed by the keyboard application manager. Some examples of secondary applications which may be persistent are: searching, advertising, translation, dictionary, or thesaurus applications, for example.

Personal Computing Device

Referring to FIG. 1, a personal computing device for executing an action related to data input by a user according to one embodiment is shown generally at 10. In the embodiments described below with reference to FIGS. 1-80, the personal computing device 10 is a smart phone. In various embodiments, however, the personal computing device 10 may be any of a variety of computing devices including a personal computer, a laptop, a tablet, an e-book, a web book, a watch, a Macbook™, a Chromebook™, a web-enabled wall or table, a gaming system, glasses, glass technology, an internet set top box, a personal video recorder ("PVR"), or a television, for example.

The personal computing device 10 includes a processor 12, a program memory 14, a variable memory 16, an input/output (I/O) interface 18, and a touch sensitive display or display device 20.

In the embodiment shown in FIG. 1, the program memory 14 and the variable memory 16 are included as part of the personal computing device 10. In various embodiments, the program memory 14, the variable memory 16, or both may be separate from the personal computing device 10 and may be in communication with the processor 12 through the I/O interface 18, for example, or through one or more networks 27, such as the Internet or an intranet, connected to, or in communication over the I/O interface 18. In various embodiments the I/O interface 18 enables a wireless connection such as, for example, a mobile network connection or a Wi-Fi™ connection to the one or more networks 27. In other embodiments, the I/O interface 18 may enable a wired connection to the one or more networks 27.

In various embodiments, program codes for directing the processor 12 to carry out various functions are stored in the program memory 14, which may be implemented as a read only memory (ROM), random access memory (RAM), a hard disk drive (HDD), a network drive, flash memory, any other form of computer-readable memory or storage medium, and/or a combination thereof.

In the first embodiment, the program memory 14 includes a block of codes 30 for directing the personal computing device 10 to effect keyboard program functions, a block of codes 32 for directing the personal computing device 10 to effect keyboard application manager functions, a block of codes 34 for directing the personal computing device 10 to effect secondary application functions, and a block of codes 36 for directing the personal computing device 10 to effect device application functions.

The variable memory 16 includes a plurality of storage locations including location 38 for storing keyboard input data, location 39 for storing clipboard data, location 44 for storing secondary application data structures, location 46 for storing pin state information, and location 49 for storing contact information. In various embodiments, the plurality of storage locations may be stored in a database in the variable memory 16.

The variable memory 16 is implemented as RAM in the embodiment shown. However, in various embodiments, the variable memory 16 may be substituted with a hard drive, a network drive, flash memory, a memory stick or card, any other form of computer-readable storage medium or a combination thereof.

Overview of the Keyboard Application Manager

As discussed above, in various embodiments, the keyboard application manager (as defined in the block of codes 32, for example) runs concurrently with the keyboard program, reads the input data received from the user and monitors the input data to determine whether the input data falls within various predetermined categories. In various embodiments, this may involve determining whether a pattern is found in the input data, and determining which category the input data falls within, based on the pattern found. Once the keyboard application manager has identified a category (an identified category) that the input data falls within, the keyboard application manager identifies at least one secondary application associated with that category and associates the input data with the secondary application by causing an icon associated with the secondary application to be displayed on the display 20 for selection by the user. In general, the icon serves as a visual representation or cue to the user that there are one or more secondary applications associated with the identified category that the user may activate for further processing using or based on the input data. The keyboard application manager then monitors for user selection of the icon, and once user selection of the icon is detected, the keyboard application manager activates the secondary application to retrieve or generate secondary data for display on the display.

In this specification, it may be stated that certain encoded entities such as applications perform certain functions. For example, a secondary application may be described as storing data in the variable memory 16. Whenever an application is described as taking an action, it will be understood that a processor (e.g. the processor 12) is directed to take the action by code defining the application.

Figure 2:
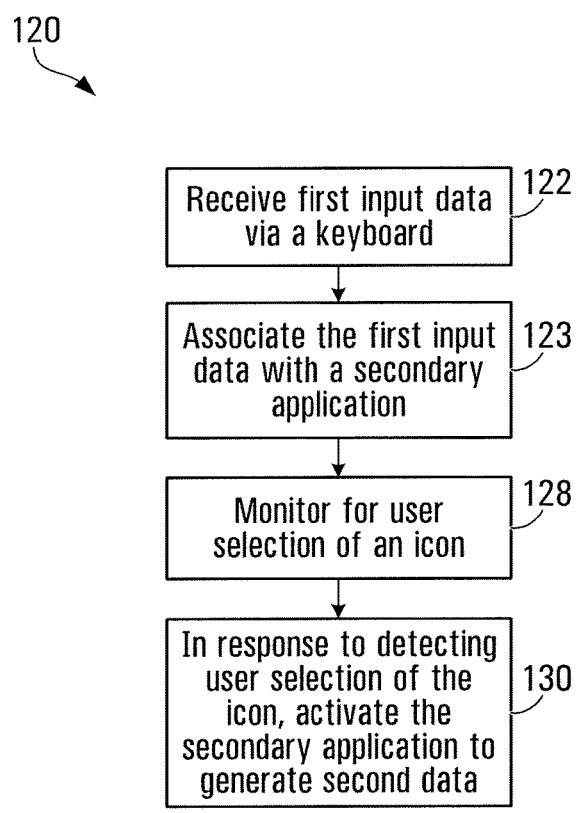
FIG. 2 is a flowchart depicting blocks of code for directing the personal computing device shown in FIG. 1 to perform keyboard application manager functions in accordance with one embodiment of the invention.

Referring to FIG. 2, a flowchart is shown generally at 120 for directing the personal computing device 10 shown in FIG. 1 to perform keyboard application manager functions in accordance with one embodiment. Referring to FIGS. 1 and 2, the flowchart 120 may be encoded in the block of codes 32 for directing the personal computing device 10 to effect keyboard application manager functions. Thus, in various embodiments, the flowchart 120 depicts a process effected by the keyboard application manager. In various embodiments, where blocks of code are indicated herein as different from one another, the steps described herein as executed by different blocks of code may be carried out in one or more common blocks of code, provided the steps are followed as disclosed herein.

The flowchart 120 begins with block 122 which directs the keyboard application manager to receive first input data via a keyboard. The first input data may be stored in the location 38 of the variable memory 16, for example. In some variations, for example, the first input data may include input text.

Block 123 directs the keyboard application manager to associate the first input data with a secondary application available to the user via the personal computing device 10. In various embodiments, block 123 directs the keyboard application manager to cause an icon to be displayed on the display 20 for selection by the user, the icon being associated with a secondary application. The icon may be stored in memory in association with a secondary application and the keyboard application manager may cause the icon to be displayed by reading the icon from the memory. In some variations, for example, the icon may be stored in memory (e.g. in the location 44 of the variable memory 16), as part of a secondary application data structure.

Block 128 directs the keyboard application manager to monitor for user selection of the icon. The keyboard application manager may be directed to detect user selection of the icon through conventional mechanisms for touch sensitive displays such as by detecting contact on the display 20. In other embodiments, any other mechanism known to one of ordinary skill in the art may be employed to detect selection of the icon. For example, whether or not a touch sensitive display may be employed, a pointing device such as a pointer controlled by a mouse may be used to select the icon. Alternatively, an icon may be selected by a voice activation or recognition-based command or another form of input-based selection. In various other embodiments, an external (physical or digital/virtual) keyboard or other input device such as a button on a device such as a watch or a remote control may be used to select the icon.

Block 130 directs the keyboard application manager to, in response to detecting user selection of the icon, activate the secondary application associated with the selected icon to generate second data contextually associated with the secondary application for display on the display 20. In various embodiments, activating the secondary application may involve handing control of the personal computing device 10 over to the secondary application. Handing control of the personal computing device 10 over to the secondary application may involve allowing the secondary application to control the display 20. In various embodiments, the secondary application may have control over a portion of the display previously controlled by the keyboard program and the keyboard application manager. The second data may be generated based on the first input data and the second data may relate to the secondary application associated with the selected icon.

Contact Manager Overview

Referring to FIG. 1, in various embodiments, the personal computing device 10 provides the user with a Contact Manager application for use via the display 20 and a virtual (digital) keyboard. Here, the Contact Manager application is a secondary application adapted to cooperate with and be activated by the keyboard application manager. When an icon associated with the Contact Manager application is selected, the Contact Manager application provides the user with immediate access to contact information stored in memory (e.g. in the location 49). In various embodiments, the contact information may be stored in an external database accessible by the personal computing device via the one or more networks 27 for example. In various embodiments, the Contact Manager application uses the input data received from the user via the keyboard or a portion thereof to display contact information related to the input data. In various embodiments, the Contact Manager may use the input data to look up a contact having contact information fields that correspond to a portion of the input data, and display the contact on the display 20 for user selection.

Keyboard Program

Figure 3:
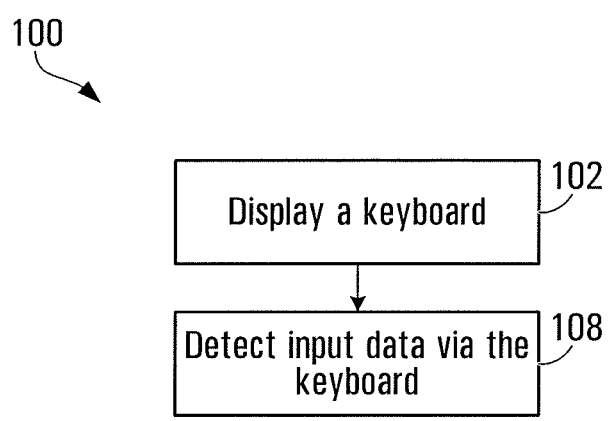
FIG. 3 is a flowchart depicting blocks of code for directing the personal computing device shown in FIG. 1 to perform keyboard program functions in accordance with one embodiment of the invention.

Referring to FIG. 3, a flowchart for directing the personal computing device 10 shown in FIG. 1 to perform keyboard program functions to generate input data in accordance with one embodiment is shown generally at 100. The flowchart 100 may be encoded in the block of codes 30 for directing the personal computing device 10 to effect keyboard program functions. The flowchart 100 may thus depict a process effected by the keyboard program. In various embodiments, the block of codes 30 or a portion thereof may be included in blocks of codes defining an operating system ("OS") running on the personal computing device 10. In various embodiments the OS may be any form of operating system supporting the operation of software on the personal computing device. By way of example only, the OS may be Android™, iOS™, Windows™ Phone OS, Blackberry™ OS, Blackberry™ Tablet OS, Symbian™, webOS™, Windows™ 8 (or another version thereof), Mac™ OS, Mac™ OS X, Linux, UNIX, Firefox™ OS, or a variation of any of the foregoing operating systems. In various embodiments, execution of the flowchart 100 may be invoked by the block 122 of the flowchart 120 shown in FIG. 2.

In various embodiments, the OS causes a currently selected input method to be displayed on the display 20 in response to a request from a currently running device application. Where the device application is a text entry application and the device application has requested a keyboard, the OS may activate or invoke the keyboard program by invoking the flowchart 100.

Figure 4:
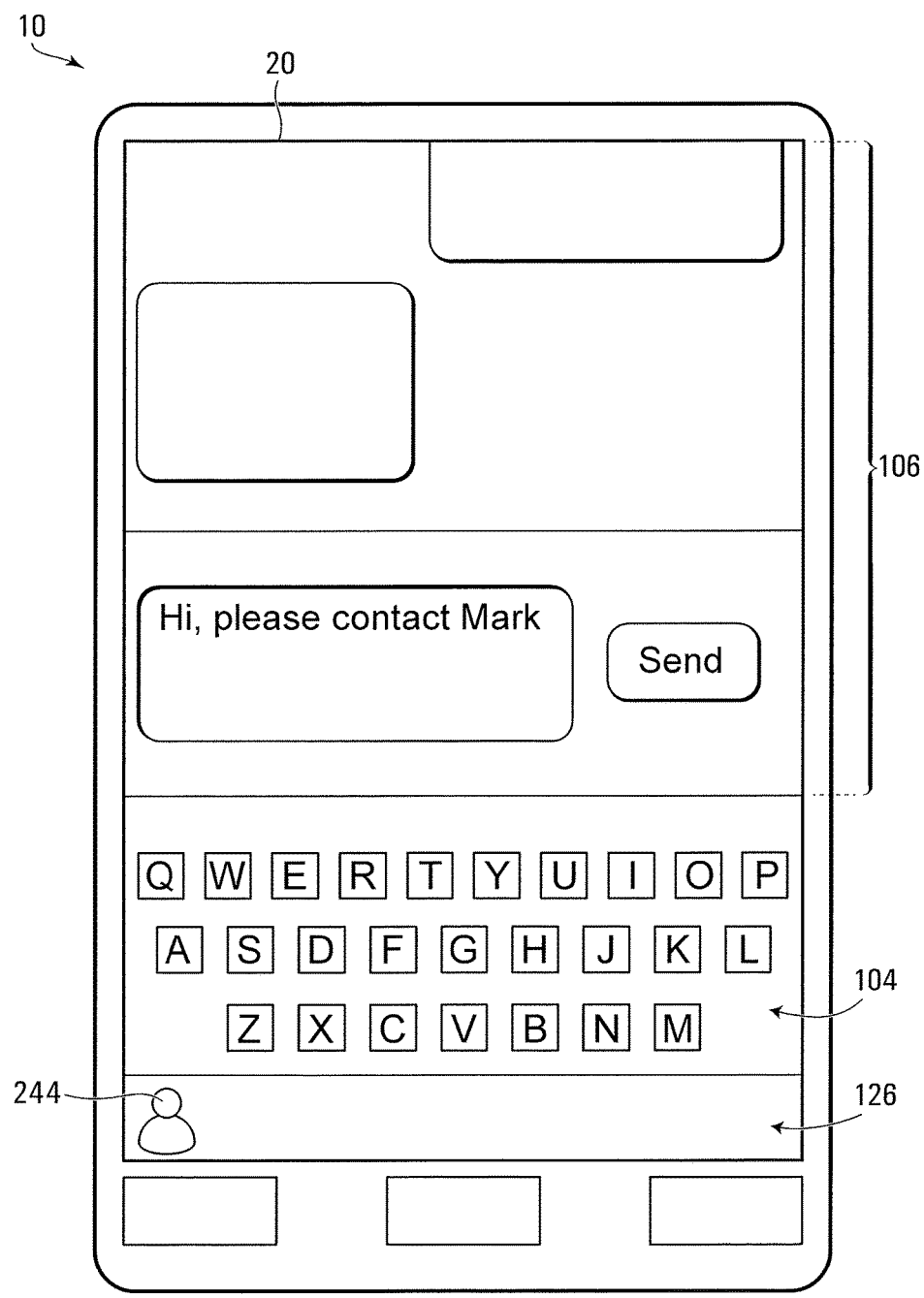
FIG. 4 is a front view of the personal computing device shown in FIG. 1 including a display showing a screenshot in accordance with one embodiment of the invention.

The flowchart 100 begins with block 102 which directs the keyboard program to cause the display 20 to display a virtual or digital version of a keyboard 104 as shown in FIG. 4. FIG. 4 is a front view of the personal computing device 10 including the display 20 showing a screenshot according to one embodiment. In the embodiment shown in FIG. 4, the keyboard 104 is a standard QWERTY keyboard, however it will be understood that in other embodiments, the keyboard 104 may be any type of keyboard or keypad configured to serve as an input device for users, such as, for example, any keyboard adapted for user input of symbolic or alphanumeric characters or entries.

In the embodiment shown in FIG. 4, the keyboard 104 is displayed in conjunction with a portion 106 of the display 20 displayed or controlled by the device application. In the embodiment shown in FIG. 4, the device application is a text messaging application acting as a text entry application. However in various embodiments, various different device applications which allow for data input may be used in place of the text messaging application shown in FIG. 4. In some variations, for example, the device application may be a version of a web browser application, IM application, SMS application, social media application, word processor application, or note taking application. In the embodiment shown, the keyboard 104 is displayed on the display 20 at the bottom of the screen in portrait mode. However in various embodiments, the keyboard 104 may also be displayed in landscape mode.

Referring back to FIG. 3, block 108 directs the keyboard program to cause the keyboard 104 to detect input data by detecting keystrokes, received from a user, on the keyboard 104 and interpreting the keystrokes as the input data. In various embodiments, a tap on the screen acts as a keystroke and provides a set of x, y coordinates which are translated by the keyboard program into a position on the keyboard 104 and also a key. The taps can be "immediate" where the there is a touch and then a quick release or they can "linger" where the user holds down or holds down and slides or flicks causing a movement on the screen. These movements can be interpreted in many different ways.

In various embodiments, block 108 directs the keyboard program to store the input data in memory. In the example shown in FIG. 4, the input data includes input text, "Hi, please contact Mark", and block 108 is directed to store the input text in memory (e.g. in the location 38 of the variable memory 16). In various embodiments, input data stored in the location 38 is accessible to the device application and is recognized by the device application as data received via the keyboard program. In the embodiment shown in FIG. 4, the input data stored in the location 38 is accessed and displayed in the portion 106 of the display 20 by the device application. In various embodiments, the input data may be sent by the keyboard program to the device application to be stored in memory.

In various embodiments, if the keyboard program detects a tap or a "long-press" or a "gesturing move" the keyboard program may interpret the tap or "long-press" or "gesturing move" and store or send text information to the device application.

In various embodiments, the keyboard program acts as a primary application and the detection of keystrokes received from the user on the keyboard 104 acts as a primary input action.

One of ordinary skill in the art would understand the general function of keyboards using touch sensitive displays or otherwise, and recognize that the above described keyboard functions may be implemented using various known keyboards. In various embodiments, where a keyboard having dedicated physical keys is used, the keyboard functions may not include the block 102 directing the keyboard program to cause the display 20 to display the keyboard layout since this would be unnecessary with a physical keyboard. In other embodiments, the keyboard may be separate from the personal computing device 10 and may be in communication with the personal computing device via an I/O interface such as, for example, the I/O interface 18 or another I/O interface not shown.

Category Test

Figure 5:
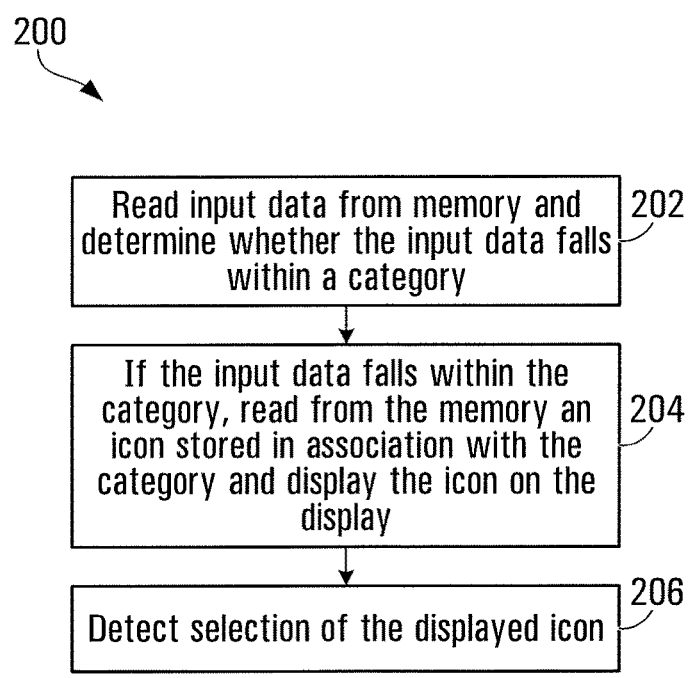
FIG. 5 is a flowchart depicting blocks of code for directing the personal computing device shown in FIG. 1 to perform keyboard application manager functions in accordance with one embodiment of the invention.

In various embodiments, after the flowchart 100 concludes or concurrently with the execution of the flowchart 100, the keyboard application manager is directed to effect or execute a flowchart 200 shown in FIG. 5.

In various embodiments the flowchart 200 directs the keyboard application manager to monitor the first input data to determine if the first input data is associated with a predetermined category. In various embodiments, the monitoring of the first input data occurs in the background while the user generates the first input data as part of a primary input action. In various embodiments, the flowchart 200 directs the keyboard application manager to apply a category test to the input data to determine whether the input data falls within the predetermined category. If the keyboard application manager determines that the input data falls within the predetermined category, the keyboard application manager reads an icon from the memory, the icon being stored in association with the predetermined category, and displays the icon, or causes the icon to be displayed, on the display 20 for selection by the user. In various embodiments, the flowchart 200 then directs the keyboard application manager to detect selection of the displayed icon, and upon detecting selection of the displayed icon, the keyboard application manager activates or invokes a secondary application associated with the selected icon.

The flowchart 200 may be encoded in the block of codes 32 for directing the personal computing device 10 to effect keyboard application manager functions. Accordingly, it can be said that the flowchart 200 depicts a process that is effected by the keyboard application manager. In other embodiments, the flowchart 200 may be encoded in the block of codes 30 for directing the computing device 10 to effect keyboard program functions.

The flowchart 200 begins at block 202 which directs the keyboard application manager to read the input data from memory (e.g. in the location 38 of the variable memory 16) and determine whether the input data falls within a category. In some embodiments, the input data may be sent by the keyboard program to the keyboard application manager such that the keyboard application manager can determine whether the input data falls within a category. In various embodiments, block 202 directs the keyboard application manager to monitor the first input data to determine if the input data is associated with a predetermined category corresponding to a secondary application. In various embodiments, block 202 directs the keyboard application to apply a category test to the input data to determine whether the input data falls within a predetermined category. As will be described in greater detail below, in various embodiments there may be provided a plurality of different category tests which may be applied to the input data in block 202.

In certain embodiments, block 202 directs the keyboard application manager to read the input data from memory (e.g. the location 38 of the variable memory 16), and apply a Proper Noun Category test to determine whether the input data includes a word beginning with an upper case character and thus falls within a Proper Noun Category. In such embodiments, any text having a space character followed by an upper case character may act as a Proper Noun pattern.

In various embodiments, block 202 may direct the keyboard application manager to apply a category test to a threshold number of the most recently entered words of the input data stored in the variable memory. The threshold number may be 1, 2, 3, or 4, or more. In various embodiments, the threshold number is 3 such that block 202 directs the keyboard application manager to apply the category test to only the last 3 words of text generated by the keyboard 104 and stored in the variable memory 16. However in other embodiments, block 202 may direct the keyboard application manager to apply the category test to the entirety of the input data stored in memory (e.g. in the location 38 of the variable memory 16).

In the example shown in connection with FIG. 4, where the input data includes the input text, "Hi, please contact Mark", received from the user via the keyboard program, the input data includes a space character followed by an upper case character, "M". Referring to FIG. 5, in such an embodiment, the keyboard application manager determines at block 202 that the input data includes a word beginning with an upper case character and thus falls within the Proper Noun Category.

If the input data falls within the category, as determined by applying the category test, block 204 then directs the keyboard application manager to read from memory an icon stored in association with the category and display the icon on the display 20. In various embodiments, where there are a plurality of icons stored in association with the category, block 204 may direct the keyboard application manager to read and display each of the plurality of icons.

Figure 6:
FIG. 6 is a depiction of a Contact Manager application data structure stored in the memory of the personal computing device shown in FIG. 1, in accordance with one embodiment of the invention.

In various embodiments, block 204 directs the keyboard application manager to, if the input data falls within the Proper Noun category, read from the memory (e.g. from the location 44) an icon stored in association with a Proper Noun category identifier and display the icon on the display. FIG. 6 shows an exemplary Contact Manager application data structure 240 stored in the memory. The Contact Manager application data structure 240 includes an identifier 242, an icon 244, and a plurality of category identifiers 246, 248, 250, 252, 254, 256, 258, 260, and 262 stored in association with the identifier 242 and the icon 244, and thus stored in association with the categories corresponding to the category identifiers. In various embodiments, there may be a plurality of secondary application data structures similar to the Contact Manager application data structure 240 stored in the memory. Indeed, in various embodiments, there is a secondary application data structure stored for each secondary application installed on the personal computing device 10. In this embodiment, the icon 244 is a contact manager icon and is stored in association with the Proper Noun Category identifier 246 and thus the icon 244 is stored in association with the Proper Noun category. Accordingly, in this embodiment, block 204 directs the keyboard application manager to read the icon 244 from the variable memory 16 and display the icon 244 on the display 20, as shown in FIG. 4.

Figure 7:
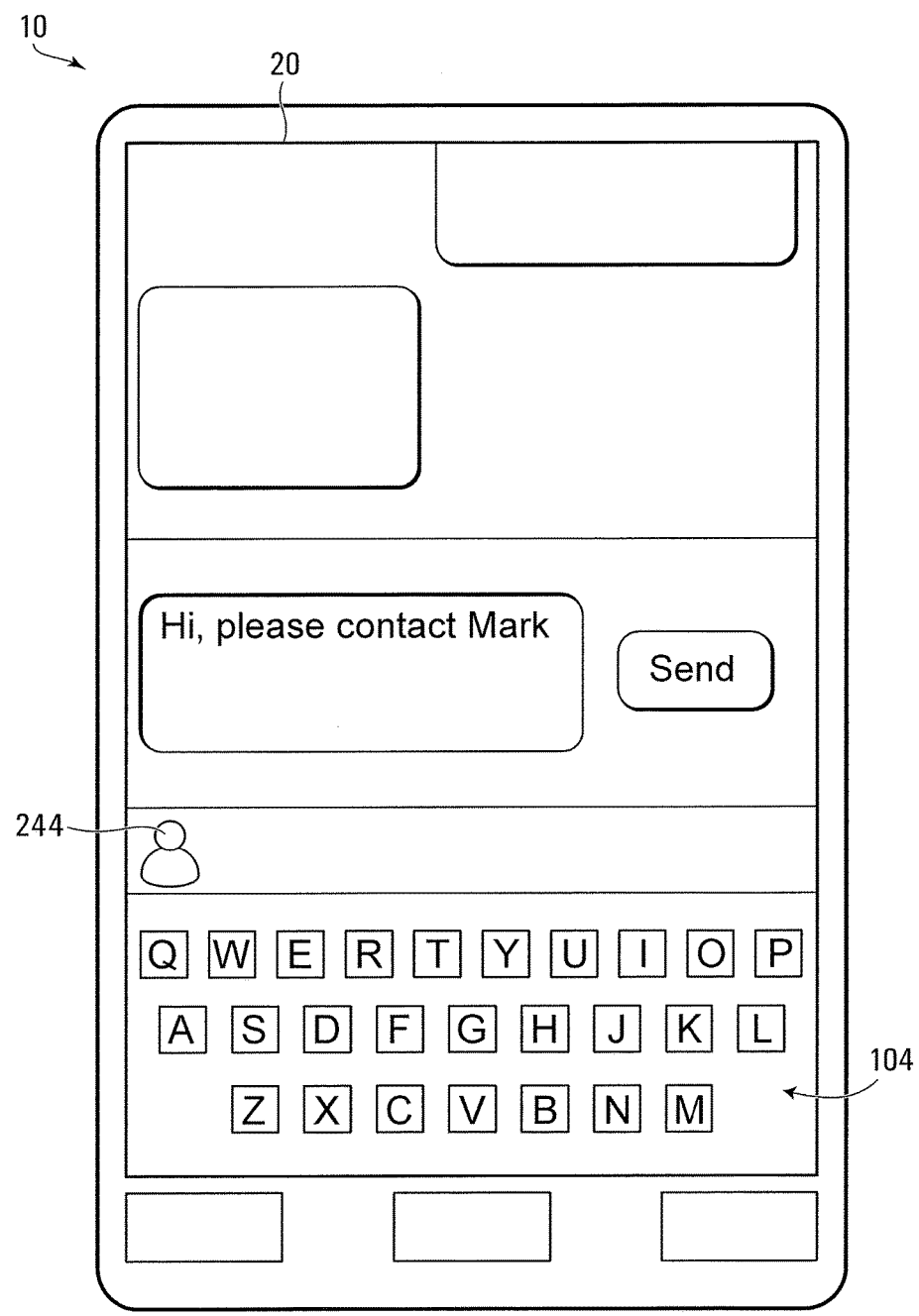
FIG. 7 is a front view of the personal computing device shown in FIG. 1 including a display showing a screenshot in accordance with one embodiment of the invention.
Figure 8:
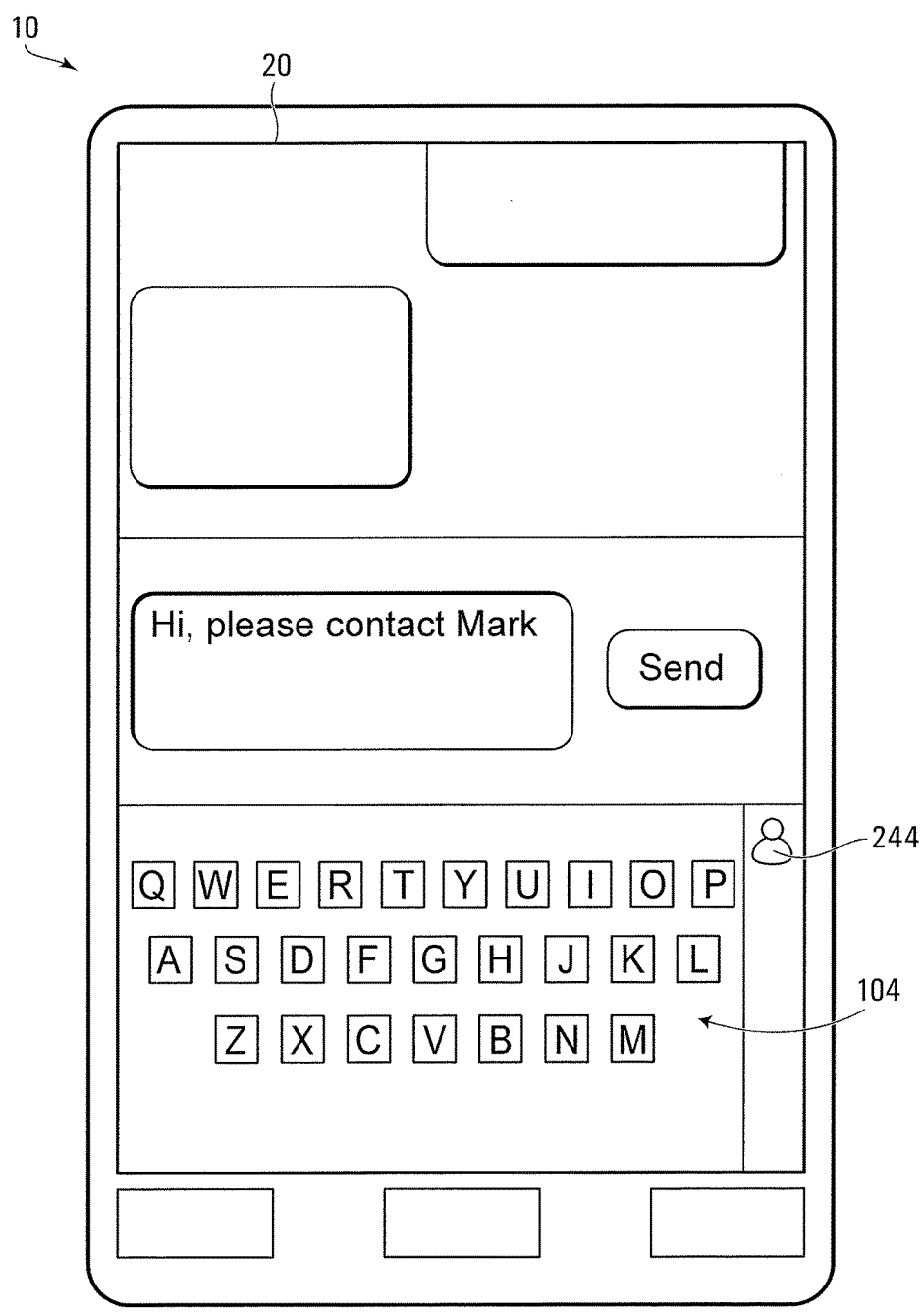
FIG. 8 is a front view of the personal computing device shown in FIG. 1 including a display showing a screenshot in accordance with one embodiment of the invention.
Figure 9:
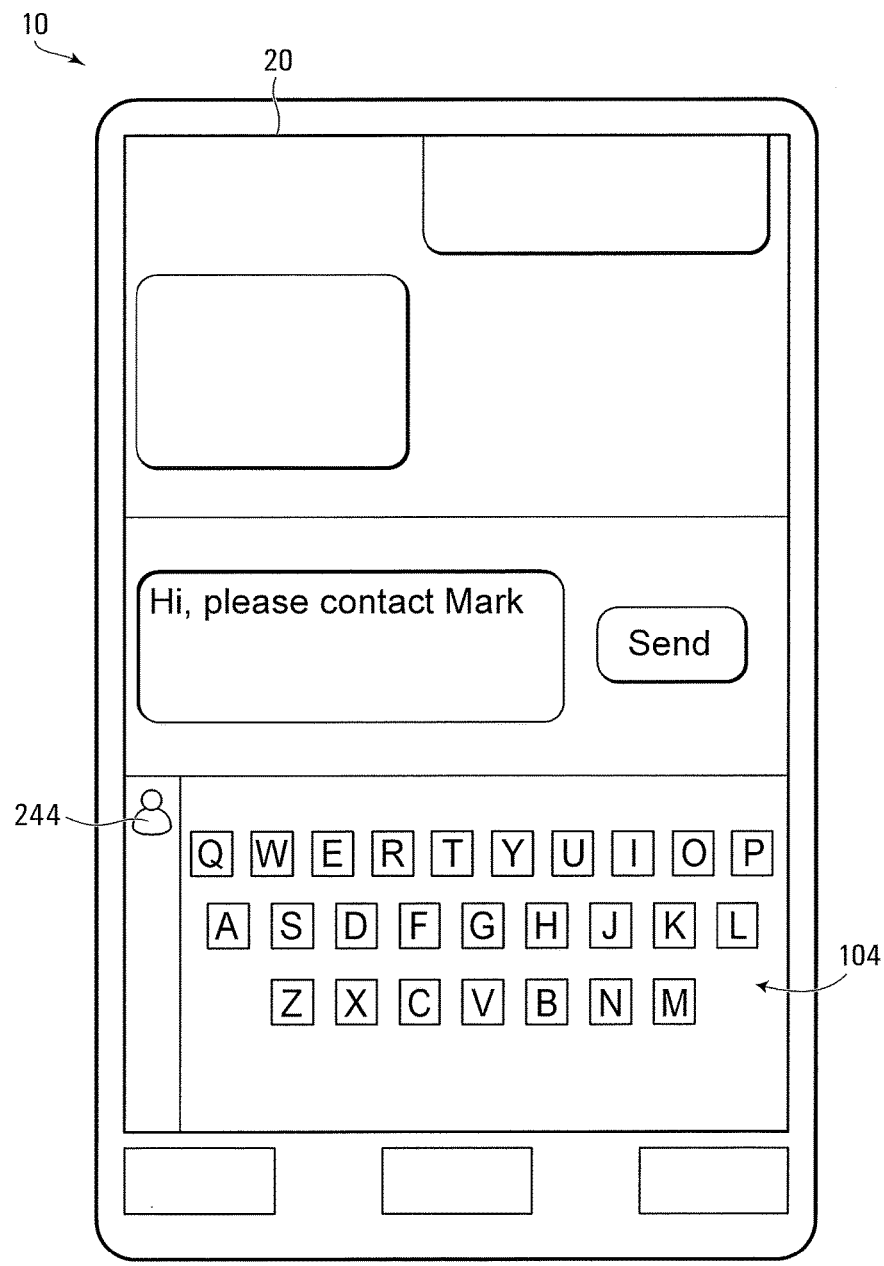
FIG. 9 is a front view of the personal computing device shown in FIG. 1 including a display showing a screenshot in accordance with one embodiment of the invention.
Figure 10:
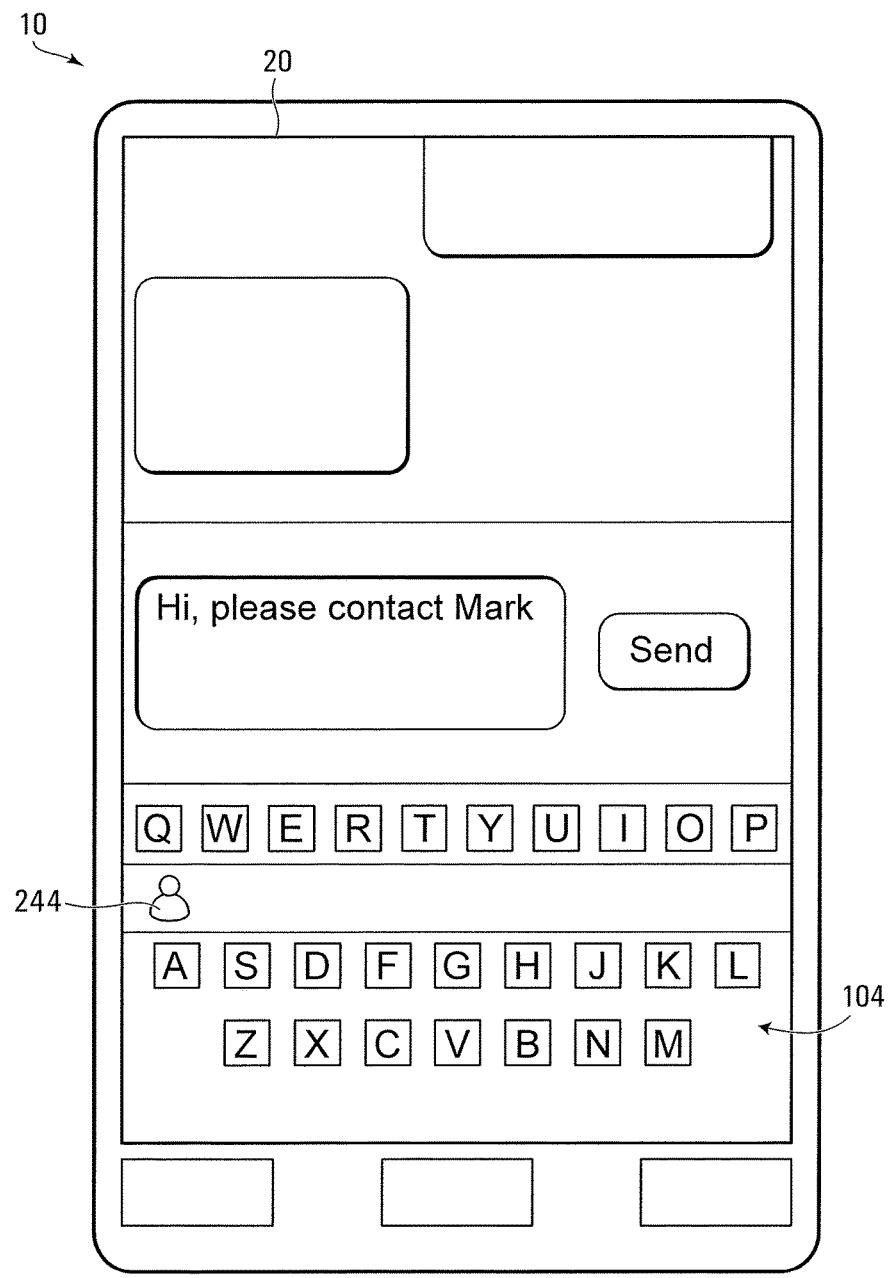
FIG. 10 is a front view of the personal computing device shown in FIG. 1 including a display showing a screenshot in accordance with one embodiment of the invention.

For the embodiment shown in FIG. 4, block 204 of FIG. 5 directs the keyboard application manager to display the icon 244 on the display 20 below the keyboard 104 in a status notification bar 126 (or other form of notification region) displayed within a user interface displayed to the user. The notification bar or region serves as a portion of the user interface in which icons or visual notifications can be presented visually informing a user of the availability of one or more secondary applications that can make use of the input data generated by the user to perform a secondary task for the user. However, in various embodiments icons associated with secondary applications such as the icon 244 may be displayed in various locations on the display 20 including above the keyboard 104, as shown in FIG. 7, to either side of the keyboard 104 as shown in FIGS. 8 and 9, within the keyboard 104 as shown in FIG. 10, or elsewhere. In various embodiments, icons associated with secondary applications may be selectively hideable (i.e. out of view or not displayed) at the option of the user. In such embodiments, the user may slide a pointer, such as the user's finger for example, in from a side of the display 20 to cause the icons to be displayed at that side and may select and drag the icons to the side of the display 20 to hide the icons.

Referring back to FIG. 5, block 206 then directs the keyboard application manager to detect selection of the displayed icon. In various embodiments, block 206 directs the keyboard application manager to, in response to detecting selection of the icon, activate or invoke a secondary application associated with the selected icon to generate second data contextually associated with the secondary application for display on the display 20. In the embodiment shown in FIG. 4, where the icon 244 of the Contact Manager application data structure 240 is displayed on the display 20 and the icon 244 is selected by the user, block 206 directs the keyboard application manager to detect user selection of the icon 244.

In various embodiments, where there are a plurality of categories installed on the personal computing device 10, blocks 202 and 204 may be invoked and re-executed for each category.

Generating Second Data Based on First Input Data

If, at block 206, as shown in FIG. 5, the keyboard application manager detects selection of the displayed icon, the keyboard application manager activates or invokes a secondary application associated with the selected icon, to generate second data contextually associated with the secondary application for display on the display 20. In various embodiments, second data may be based on the input data and the secondary application may store the second data in the variable memory 16. In various embodiments, any data generated by the secondary application may act as second data. In various embodiments, the secondary application is activated to support a secondary input action different from the detection of keystrokes received from the user on the keyboard 104 which acts as the primary input action.

In various embodiments, activating any of the secondary applications described herein may involve handing control of the personal computing device 10 over to the secondary application which may involve providing the secondary application with control over the portion of the display 20, formerly controlled by the keyboard application manager and the keyboard program. In such embodiments, the keyboard application manager and the keyboard program may be suspended when the secondary application is invoked.

In various embodiments, the secondary application may have access to the input data, which in various embodiments may be received from the user via the keyboard program and stored in memory (e.g. in the location 38 of the variable memory 16).

In various embodiments, the keyboard application manager, upon activating any of the secondary applications described herein, may send the input data, or a portion thereof to the secondary application. In various embodiments, the portion of the input data that the keyboard application manager sends to the secondary application may be a portion of the input data that the keyboard application manager found to fall within the category.

In various embodiments, the keyboard application manager, upon activating any of the secondary applications described herein, may move the input data, or a portion thereof, from a first location (e.g. the location 38 of the variable memory 16) to a second location in memory (e.g. a location in the variable memory 16 that the secondary application has access to) such that the secondary application can read the input data or the portion thereof. In various embodiments, the portion of the input data that the keyboard application manager stores in the second location may be a portion of the input data that the keyboard application manager found to fall within the category.

Figure 11:
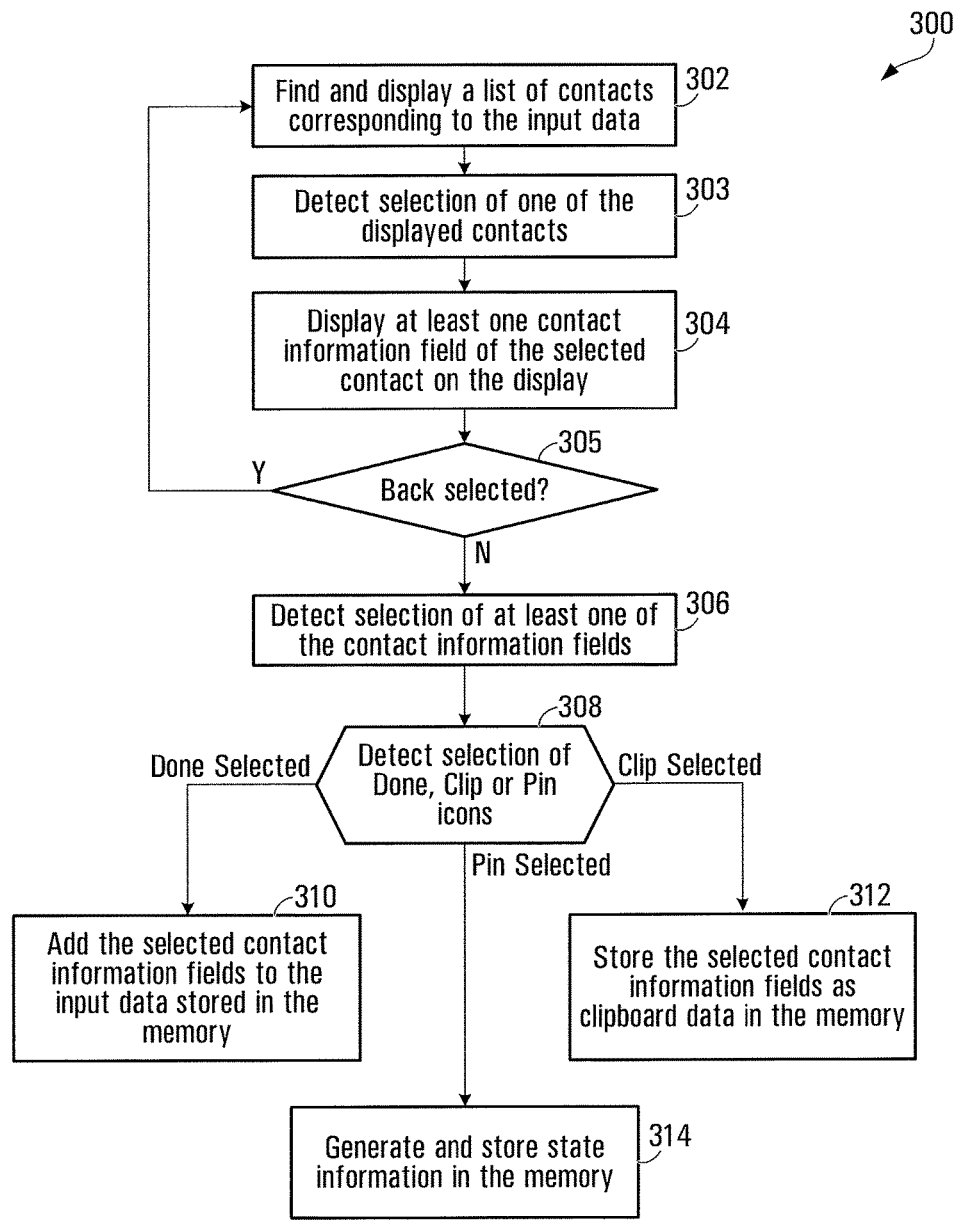
FIG. 11 is a flowchart depicting blocks of code for directing the personal computing device shown in FIG. 1 to effect Contact Manager application functions in accordance with one embodiment of the invention.

If the keyboard application manager detects selection of the icon 244, the keyboard application manager invokes the codes of flowchart 300 as shown in FIG. 11. In various embodiments, execution of the flowchart 300 may be initiated by block 128 of the flowchart 120 shown in FIG. 2. In various embodiments, if the keyboard application manager is configured to detect selection of the icon 244, the keyboard application manager may hand over control of all or a portion of the display 20 displaying the keyboard 104 and/or the status notification bar 126 to the secondary application associated with the selected icon 244.

In various embodiments, the codes in flowchart 300 may be encoded in a different block of codes from the block of codes 32 for directing the personal computing device 10 to effect keyboard application manager functions. In the embodiment shown in FIG. 11, the flowchart 300 is encoded in the block of codes 34 for directing the personal computing device 10, as shown in FIG. 1, to effect secondary application functions. More particularly, the flowchart 300 is encoded in a Contact Manager application block of codes within the block of codes 34. Thus, in various embodiments, the flowchart 300 depicts a process effected by the Contact Manager application.

In various embodiments, because the block of codes encoding the flowchart 300 is encoded separately from the flowchart 200 there is modularity between the blocks of codes encoding the flowcharts 200 and 300 and thus the blocks of codes encoding the flowcharts 200 and 300 may be encoded separately and by or with different entities. In various embodiments, the keyboard application manager may be configured by a first entity and secondary applications such as the Contact Manager application, may be configured by a second entity different from the first entity. In various embodiments, the keyboard application manager (or more generally the input application manager) is configured to, or to permit the second entity (e.g. an application running remotely on a server or other networked device) to, associate secondary application(s) related to the second entity with a category or categories defined in association with the first entity. In various embodiments this may be supported by registering, via the keyboard application manager, such secondary application(s) in association with a predetermined or configurable set of categories to which the second entity is or is to be associated with. In some embodiments, the keyboard application manager may be configured to permit the second entity to be involved in defining the category or categories that the second entity's secondary application is to be associated with. For example, the second entity may, via the keyboard application manager, define or identify various particular words or patterns to be associated with a particular category that the secondary application is to be associated with. The particular words or patterns to be associated with a particular category may be periodically updated by the second entity, such that the words or patterns associated with the category are dynamically configurable using the keyboard application manager. In some variations, for example, terms, words, or phrases which are to be included in Advertisement patterns, discussed below, may be defined by a remote entity in cooperative communication with a secondary application serving as an Advertisement application. For example the remote entity may be an online merchant service, such as Amazon.com™, Ebay™ or Groupon™. The Advertisement application may receive from the remote entity new or amended words or patterns to link or assign to a category in association with the Advertisement application, and in response to receiving instructions to do so, the Advertisement application can request that the keyboard application manager update the terms, words, or phrases included in the Advertisement patterns monitored by the keyboard application manager in association with the Advertisement application. These type of updates may be performed one, regularly or at various times at the prompting of the second entity (in this example the remote entity). For instance, such updates may be associated with a temporary sale or offer available from or through the online merchant service.

Figure 12:
FIG. 12 is a depiction of a contact stored in memory of the personal computing device shown in FIG. 1 in accordance with one embodiment of the invention.

The flowchart 300 begins with block 302 which directs the Contact Manager application to read contact information stored in memory (e.g. in the location 49 of the variable memory 16 shown in FIG. 1), to find and display contacts having respective contact information fields corresponding to the input data (e.g. as stored in the location 38 of the variable memory 16). In various embodiments, the contact information stored in the memory is stored and managed by a contact manager device application and is thus accessible to a plurality of applications, including the contact manager device application. An exemplary contact 320 stored in memory (e.g. in the location 49) is shown in FIG. 12. The contact 320 has various contact information fields including a first name field 324, a last name field 326, a home phone number field 328, a work phone number field 327, a mobile phone number field 329, an email address field 330, an address field 332, a city field 333, a postal code field 335, a birthday field 337, and a profile picture field 339. In various embodiments, the contact 320 may be stored as an XML, CSV, or any other data structure recognizable to the Contact Manager application, for example. Other contacts may include additional or fewer fields than those included in the contact 320 shown in FIG. 12. For example, some additional examples of contact information fields that may be included in an additional contact are: a company field, a title field, multiple address fields, a spouse's name field, or an appointment place field.

Figure 13:
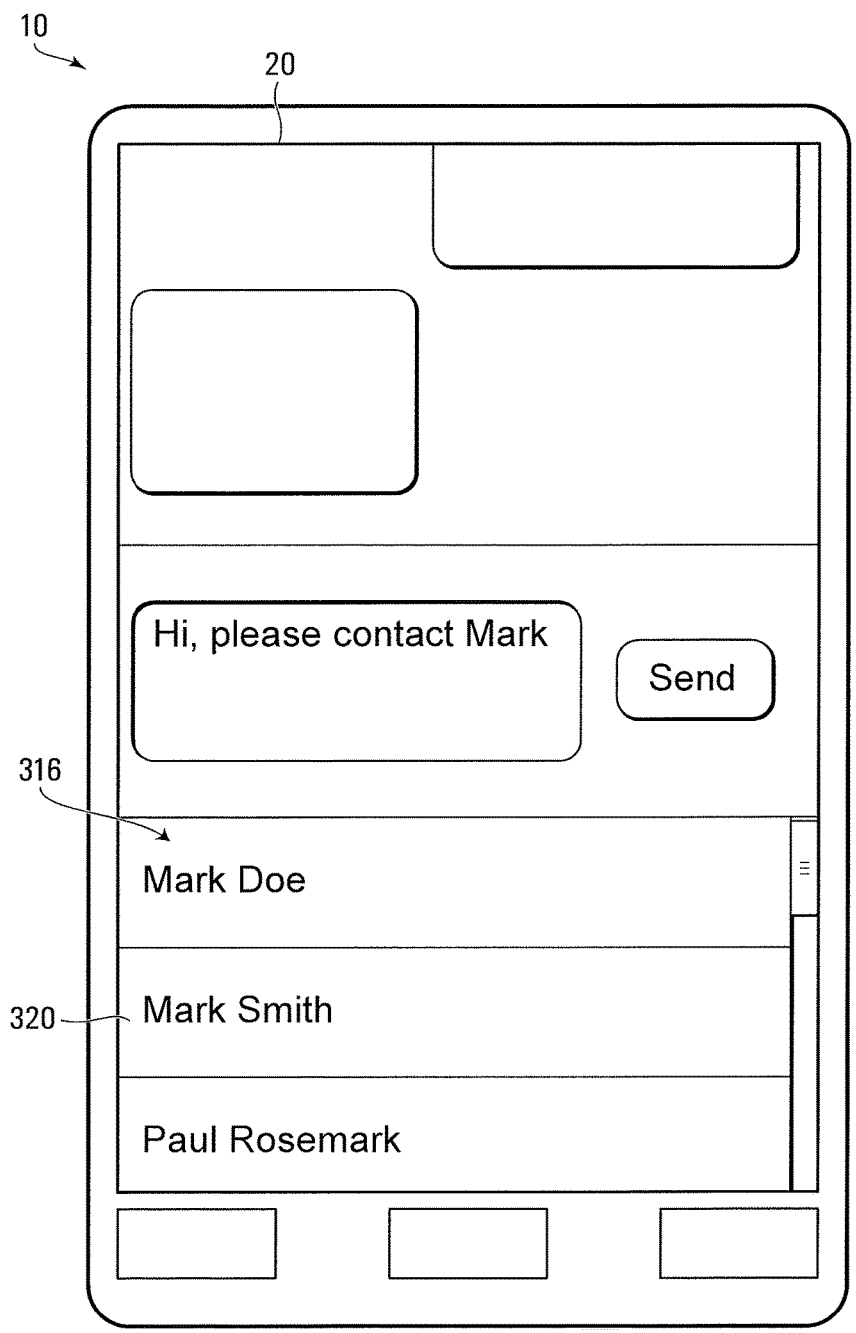
FIG. 13 is a front view of the personal computing device shown in FIG. 1 including a display showing a screenshot in accordance with one embodiment of the invention.

In various embodiments, if it was determined at block 202 of the flowchart 200 shown in FIG. 5, that the input data stored in the memory fell within the Proper Noun Category because the input data included a word starting with an upper case character, i.e. "Mark", block 302 shown in FIG. 11 directs the Contact Manager application to find and display a list of contacts 316 having a first name field or a last name field including the text included in the word that was found to begin with an upper case letter, i.e. "Mark", as shown in FIG. 13. In various embodiments, the keyboard application manager may send a portion of the input data found to fall within the category (in the example shown, the word "Mark"), to the Contact Manager application such that the Contact Manager application can find and display the list of contacts 316 having a first name field or a last name field including the text included in the word that was found to begin with an upper case letter.

In this embodiment, the contact 320 shown in FIG. 12 includes the word "Mark" in the first name field 324 and thus, block 302 directs the Contact Manager application to find and display the contact 320 in the list of contacts 316. In the embodiment shown in FIG. 13, other contacts having first name or last name fields including the word "Mark" are also found to correspond to the input data. For example, in the embodiment shown, contacts having the names Mark Doe, and Paul Rosenmark were found to include contact information fields corresponding to the input data.

Block 303 directs the Contact Manager application to detect user selection of one of the displayed contacts. In this embodiment, the Contact Manager application detects selection of the contact 320 and the Contact Manager application proceeds to block 304.

Figure 14:
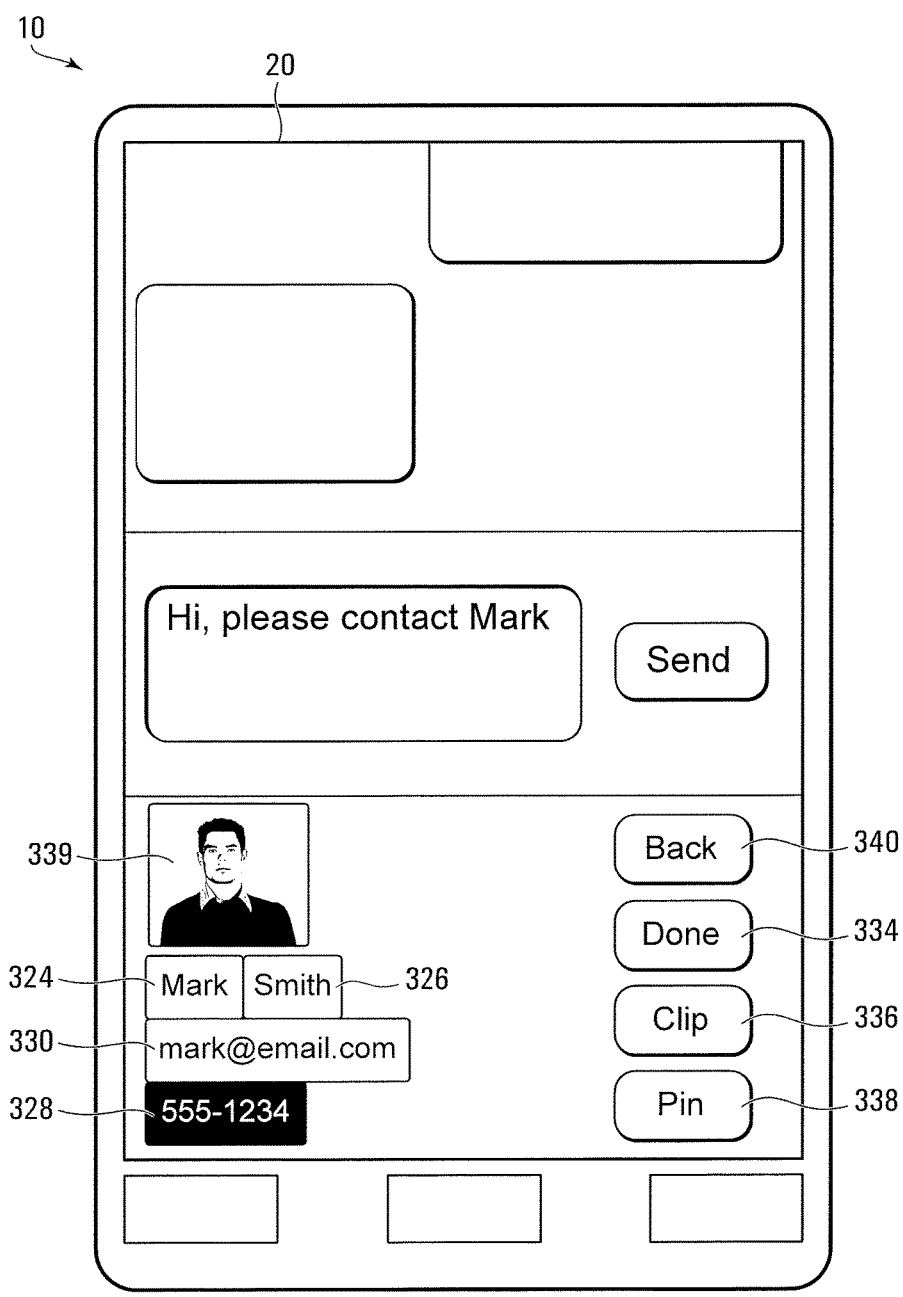
FIG. 14 is a front view of the personal computing device shown in FIG. 1 including a display showing a screenshot in accordance with one embodiment of the invention.

Block 304 directs the Contact Manager application to display at least one of the contact information fields of the selected contact on the display 20 for selection by the user. In the embodiment shown in FIG. 14, the Contact Manager detected user selection of the contact 320 at block 303 and thus various contact information fields of the contact 320 are displayed on the display 20. In the illustrated embodiment, the profile picture field 339, the first name field 324, the last name field 326, the home phone number field 328, and the email address field 330 are displayed on the display 20 for selection. Block 304 also directs the Contact Manager application to display a Back icon 340, a Done icon 334, a Clip icon 336, and a Pin icon 338 on the display 20 for user selection.

Block 305 directs the Contact Manager application to determine whether the Back icon 340 has been selected by the user, and if the Back icon 340 has been selected, the Contact Manager application is directed to return to block 302 to redisplay the list of contacts 316 on the display 20.

Block 306 then directs the Contact Manager application to detect selection of at least one of the contact information fields. In this way, the user can select which of the contact information fields that the user wishes to eventually store or use. In the embodiment shown in FIG. 14, the Contact Manager application detects selection of the home phone number field 328 and thus an area surrounding the home phone number field 328 is shown as shaded.

Block 308 directs the Contact Manager application to detect selection of one of the Done, Clip and Pin icons 334, 336, and 338. In various embodiments, each of the processes initiated by selection of one of the Done, Clip and Pin icons 334, 336, and 338 or any other similar icons described herein may act as a secondary input action different from the detection of keystrokes received from the user. If at block 308, the Contact Manager application detects selection of the Done icon 334, the process proceeds to block 310.

Block 310 directs the Contact Manager application to add the selected at least one contact information field to the input data stored in memory (e.g. in the location 38 of the variable memory 16). In various embodiments herein, when any secondary application is said to modify or add to the input data stored in memory and received from the keyboard program, this may involve sending a message to the keyboard application manager such that the keyboard application manager modifies or adds to the input data, or such that the keyboard application manager sends a message to the keyboard program to cause the keyboard program to modify or add to the input data.

Figure 15:
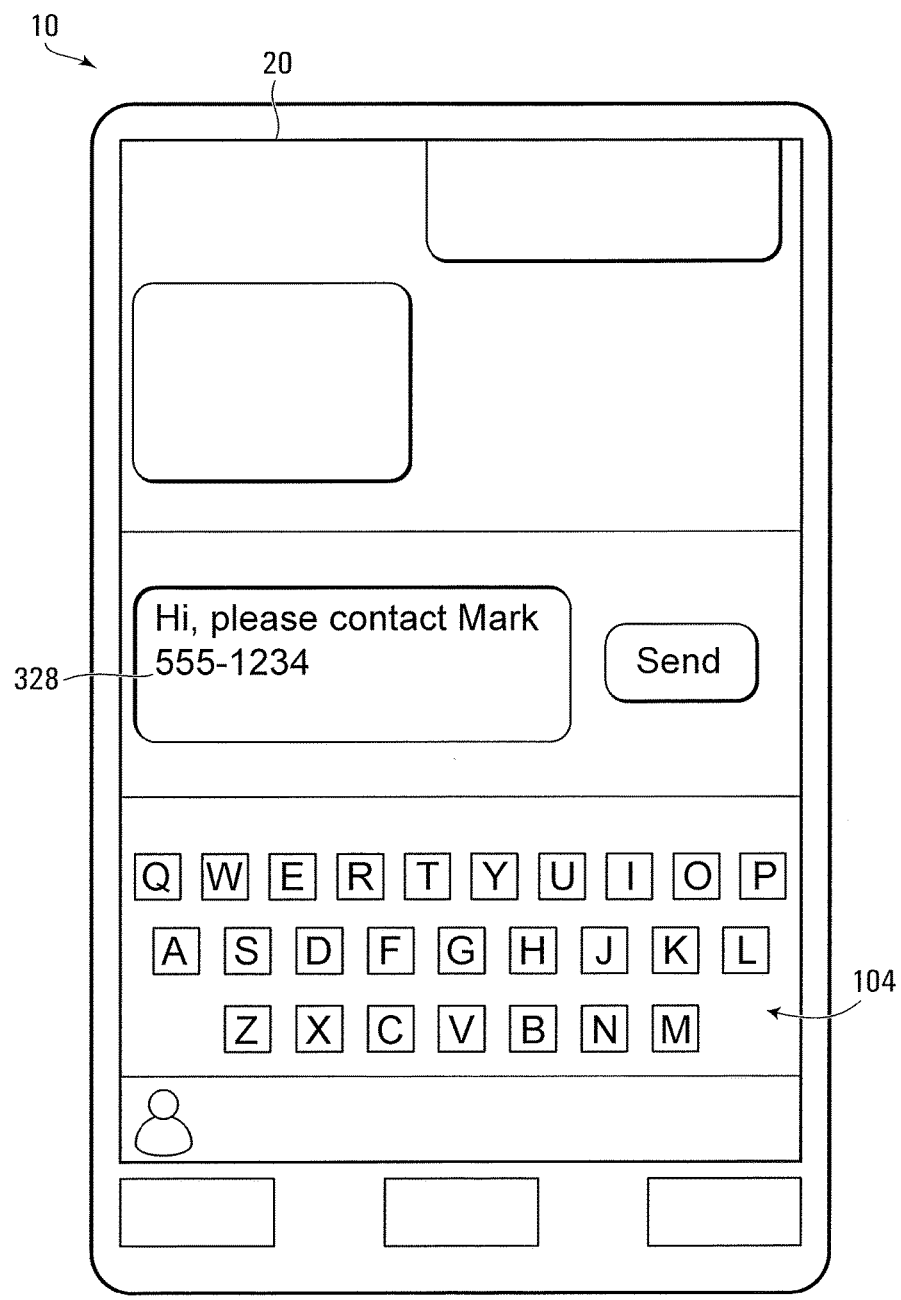
FIG. 15 is a front view of the personal computing device shown in FIG. 1 including a display showing a screenshot in accordance with one embodiment of the invention.

In various embodiments, block 310 also directs the Contact Manager application to cause the keyboard to be redisplayed, as shown in FIG. 15. In various embodiments, in this specification, when any secondary application is said to cause the keyboard to be redisplayed, this may involve handing control of the personal computing device 10 over to the keyboard program and the keyboard application manager. In other embodiments, block 310 may direct the Contact Manager application to continue to display the contact information fields such that the user can add multiple contact information fields without redisplaying the keyboard. In various embodiments, the user may redisplay the keyboard at any time during the flowchart by selecting a close secondary application icon, such as for example an "X" at the top right corner of the portion of the display 20 displayed by the Contact Manager application (not shown). In various embodiments, any of the secondary applications described herein may include similar functionality having regard to each of the secondary applications' respective Done or Add to icons.

Where the home phone number field 328 has been selected, block 310 directs the Contact Manager application to add the home phone number field 328 to the input data stored in memory (e.g. in the location 38 of the variable memory 16). In various embodiments, the input data is stored in a location (such as the location 38 of the variable memory) which is accessible to the device application displaying the portion 106 of the display 20 and is recognized by the device application as if the input data was received via the keyboard program. The device application thus displays the input data including the home phone number field 328, as if the input data including the phone number field had been provided via the keyboard program, as shown in FIG. 15. Accordingly, using the Contact Manager application, the user is able to quickly add contact information to input data as part of text, documents, emails or other words or phrases that the user may be creating or modifying. In various embodiments, block 312 directs the Contact Manager application to store the selected at least one contact information fields in memory in a markup language understandable by the device application, such as, for example in Extensible Markup Language ("XML").

In various embodiments block 310 may also direct the Contact Manager application to include connecting text with the selected contact information fields and add the connecting text and the selected contact information fields to the input data. The connecting text may allow the user to more easily understand the amendment to the input data. In some variations, for example, if the user selected the home phone number field 328, the Contact Manager may add the connecting text, "whose home phone number is" followed by the home phone number field 328 to the input data such that the input data would include the following text, "Hi, please phone Mark whose home phone number is 555-1234". In various embodiments, block 310 may also direct the Contact Manager application to add connecting text between the selected contact information fields when more than one contact information fields are selected by the user. In various embodiments, the Contact Manager may add the connecting text, "whose home phone number is" followed by the home phone number field 328, followed by the connecting text "and whose email address is" followed by the email address field 330 to the input data such that the input data would include the following text, "Hi, please phone Mark whose home phone number is 555-1234 and whose email address is mark@email.com". In various embodiments, the connecting text may be customizable by the user.

If at block 308, the Contact Manager application detects selection of the Clip icon 336, the process proceeds to block 312. Block 312 directs the Contact Manager application to store the selected at least one of the contact fields as clipboard data in memory (e.g. in the location 39 of the variable memory 16 for storing clipboard copied data) for later insertion into the input data or another editable field or document. In various embodiments herein, when any secondary application is said to store information as clipboard data, this may involve sending a message to the keyboard application manager such that the keyboard application manager stores the information as clipboard data, or such that the keyboard application manager sends a message to the keyboard program to store the information as clipboard data.

Figure 16:
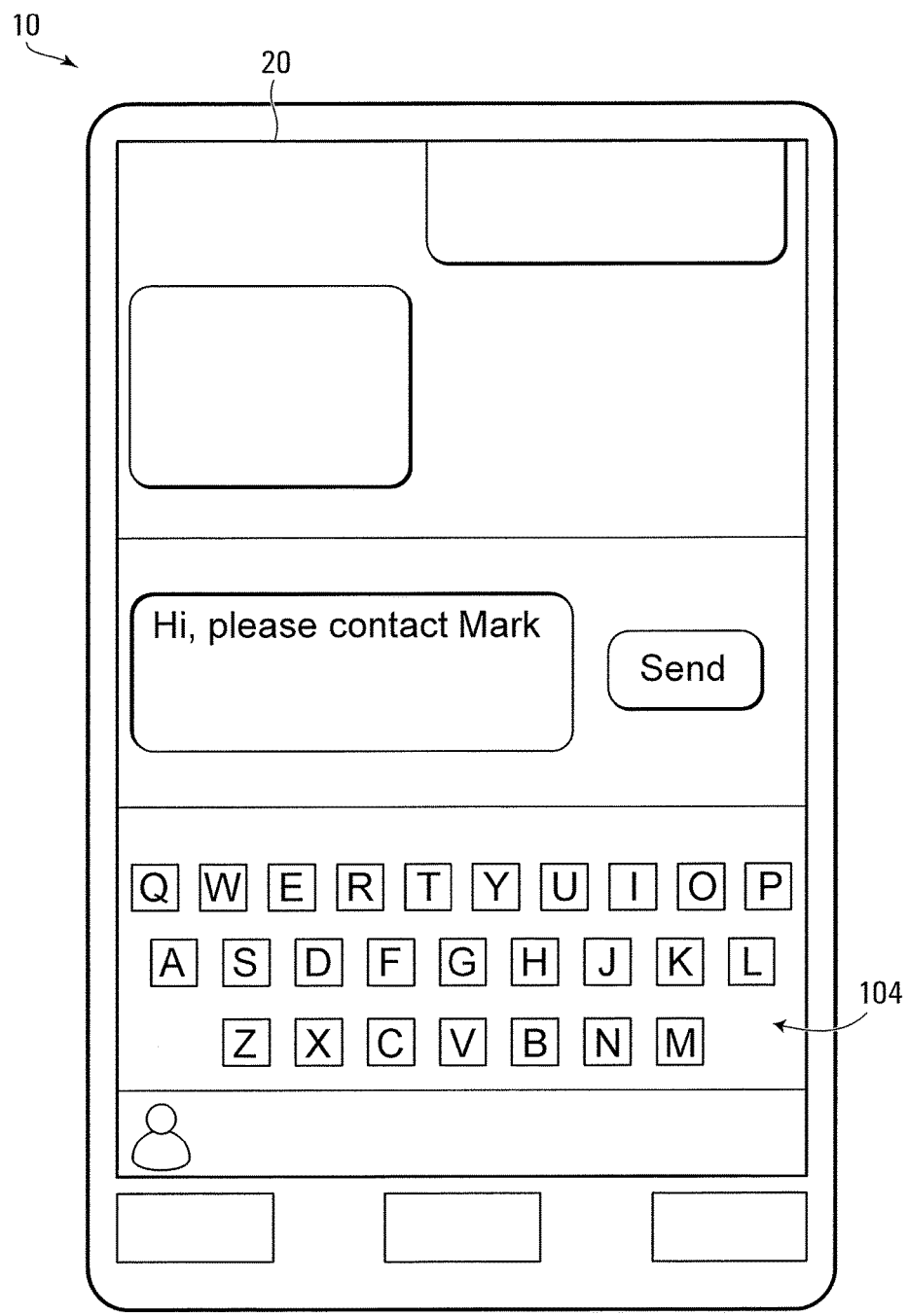
FIG. 16 is a front view of the personal computing device shown in FIG. 1 including a display showing a screenshot in accordance with one embodiment of the invention.

In various embodiments, block 312 may direct the Contact Manager application to cause the keyboard to be redisplayed and hand control of the personal computing device 10 back to the keyboard program and the keyboard application manager, as shown in FIG. 16. However in other embodiments, block 312 may direct the Contact Manager application to continue to display the contact information fields such that the user can copy and paste multiple contact information fields without redisplaying the keyboard. In various embodiments, the user may redisplay the keyboard at any time during the flowchart by selecting a close secondary application icon, such as for example an "X" at the top right corner of the portion of the display 20 displayed by the Contact Manager application (not shown). In various embodiments, any of the secondary applications described herein may include similar functionality having regard to each of the secondary applications' respective Clip icons.

As is understood by one of ordinary skill in the art, data stored as clipboard data in memory (e.g. in the location 39 of the variable memory 16) may be copied from memory and added to an input string (e.g. the input data stored in the location 38 of the variable memory 16) or to any editable text, field, or document at a later time whenever the user directs the processor 12 to execute a "paste" clipboard function. In various embodiments, block 312 directs the Contact Manager application to store the selected at least one of the contact fields in memory in a markup language such as, for example as XML data.

If at block 308, the Contact Manager application detects selection of the Pin icon 338, the process proceeds to block 314. Block 314 directs the Contact Manager application to generate state information defining a state of the Contact Manager application and store the state information in memory (e.g. in the location 46 of the variable memory 16). In various embodiments herein, when any secondary application is said to store state information, this may involve sending a message to the keyboard application manager such that the keyboard application manager stores the state information, or such that the keyboard application manager sends a message to the keyboard program to store the state information.

Figure 17:
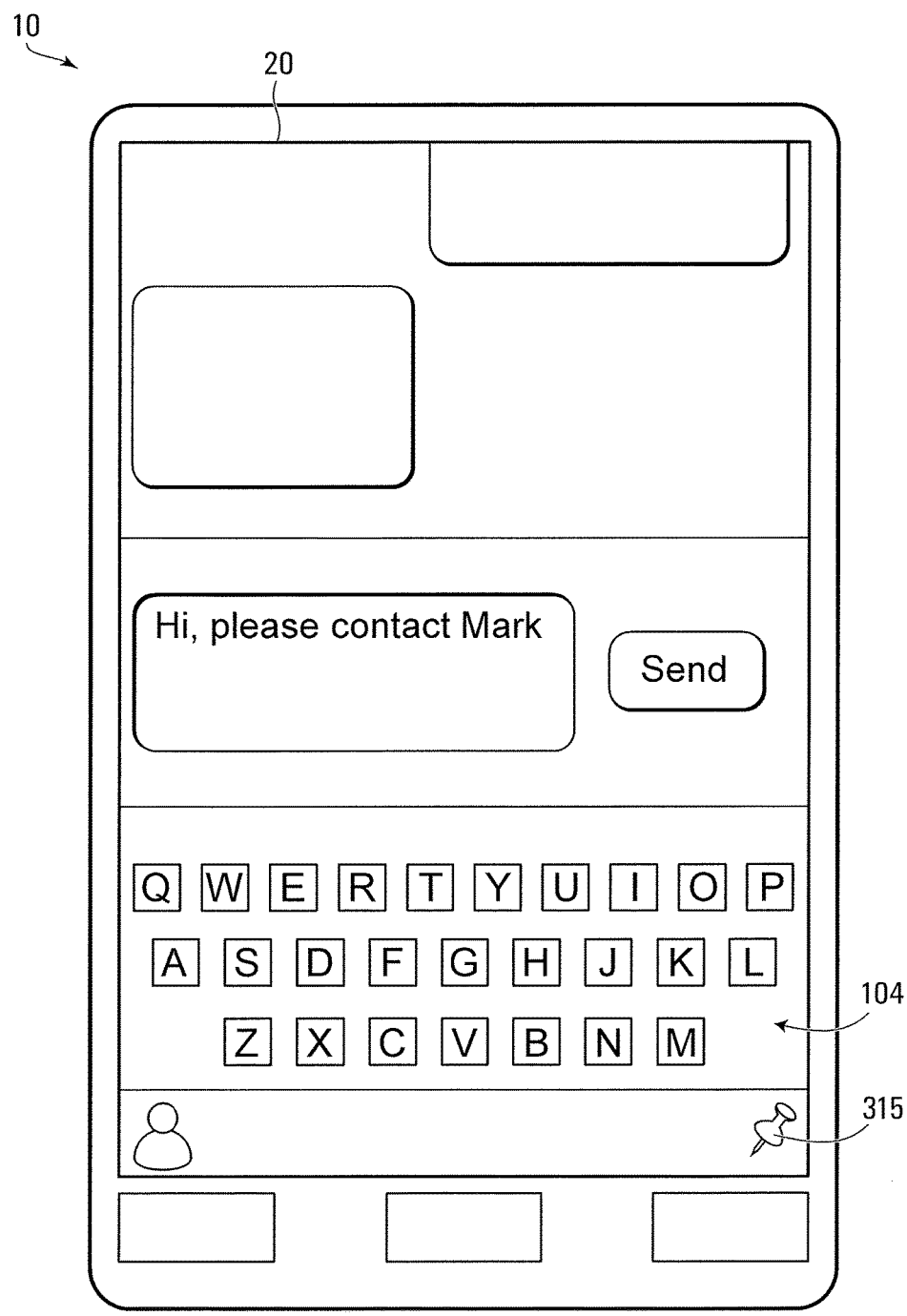
FIG. 17 is a front view of the personal computing device shown in FIG. 1 including a display showing a screenshot in accordance with one embodiment of the invention.

In various embodiments, the state information stored in memory may include a display identifier for identifying what the secondary application was displaying at the time that the Pin icon 338 was selected. In this embodiment, the state information may include a contact identifier for identifying a contact that was being displayed on the display 20 when the Pin icon 338 was selected. The state information stored in memory may also include a secondary application identifier and a copy of the input data or the portion of the input data that the keyboard application manager found to fall within the category at block 202 of the flowchart 200 shown in FIG. 5. In various embodiments, for example, the state information may include a contact identifier corresponding to the contact 320 (e.g. "Mark Smith"), a Contact Manager application identifier, and the text, "Mark". Block 314 also directs the Contact Manager application to cause the keyboard 104 to be redisplayed on the display 20 and to cause the keyboard application manager to display a resume state icon 315 on the display 20, as shown in FIG. 17. In various embodiments, the Contact Manager application may cause the keyboard application manager to display the resume state icon 315 by storing a resume state indicator in the memory, for indicating that a state has been stored in memory (e.g. in the location 46) such that the keyboard application manager reads the resume state indicator and, based on the resume state indicator, displays the resume state icon 315 on the display 20. In various embodiments, the Contact Manager application may cause the keyboard application manager to display the resume state icon 315 by sending the keyboard application manager a resume state message.

In various embodiments, once the resume state icon 315 is displayed on the display 20, blocks stored in the block of codes 32 of the program memory 14 direct the keyboard application manager to detect selection of the resume state icon 315 and, upon detecting selection of the resume state icon, direct the keyboard application manager to reactivate or reinvoke the Contact Manager application. In various embodiments, the keyboard application manager may send the Contact Manager application the state information or the Contact Manager application may be directed to read the state information stored in memory (e.g. in the location 46 of the variable memory 16) and, using the state information, proceed back to block 304 to display the contact that was being displayed on the display 20 when the Pin icon 338 was selected.

Other Contact Manager Categories

In various embodiments described above with reference to FIG. 5, block 202 of the flowchart 200 involved, for illustration purposes, applying the Proper Noun category test to the input data stored in the location 38 to determine whether the input data includes a word beginning with an upper case letter and thus fell into the Proper Noun category. However, in other embodiments, different category tests may be applied at block 202.

In various embodiments, block 202 directs the keyboard application manager to apply a category test by determining whether the input data stored in the memory (e.g. in the location 38 of the variable memory 16) includes at least one of a plurality of patterns detectable by the keyboard application manager.

In various embodiments, the plurality of patterns detectable by the keyboard application manager include phone number patterns and applying the category test involves determining whether the input data includes one of the phone number patterns and thus falls within a Phone Number category. In such an embodiment block 202 may direct the keyboard application manager to determine whether the input data includes one of the following patterns: "(NNN) NNN-NNNN", "NNN NNN NNNN", "NNN NNNN", "NNNNNNN", "NNNNNNNNNN", "NNN-NNN-NNNN", or "NNN-NNNN", where N indicates that the text could be any number. Although the above exemplary phone number patterns may identify most standard Canadian phone numbers, in various embodiments, the phone number patterns may differ to allow for identification of various regional or international phone number patterns.

Various secondary applications may be associated with the Phone Number category. In some variations, for example, the Contact Manager application may be associated with the Phone Number category. As shown in FIG. 6, in various embodiments, the Contact Manager application data structure includes a Phone number category identifier 248 and thus, the keyboard application manager may be directed to display the Contact Manager icon on the display 20 if the keyboard application manager determines that the input data stored in the memory (e.g. in the location 38 of the variable memory 16) falls within the Phone Number category. In this embodiment, if the user selects the Contact Manager, the keyboard application manager activates or invokes the Contact Manager application and block 302, as shown in FIG. 11 directs the keyboard application manager to find and display contacts having a phone number field which includes a portion of the input data that matched the one of the phone number patterns. For example, if the input data included a portion of text that read "555-1234", block 202 would direct the keyboard application manager to determine that the input data included the pattern NNN-NNNN and block 302 would direct the Contact Manager application to find and display contacts having a phone number field including "555-1234". In various embodiments, the phone number field could include additional numbers and still be found to include the "555-1234". In some variations, for example, a contact having a phone number field of "604-555-1234" may be found to correspond to the input data including 555-1234.

In various embodiments, the plurality of patterns detectable by the keyboard application manager include address patterns and applying the category test involves determining whether the input data stored in memory (e.g. in the location 38 of the variable memory 16) includes one of the address patterns and thus falls within an Address category. In such embodiments block 202 may direct the keyboard application manager to determine whether the input data includes a number having one or more digit followed by a space followed by a word (or in various embodiments, 1, 2, 3 or more words) followed by a street indicator such as, for example, one of the following: "Road", "Rd.", "Street", "St.", "Avenue", "Ave.", or some other street related input pattern.

Various secondary applications may be associated with the Phone Number category. For example, in some embodiments, the Contact Manager application may be associated with the Phone Number category. As shown in FIG. 6, the Contact Manager application data structure 240 includes an Address category identifier 250 and thus, the keyboard application manager may be directed to display the Contact Manager icon on the display 20 if the keyboard application manager determines that the input data stored in memory falls within the Address category. In this embodiment, if the user selects the Contact Manager, the keyboard application manager activates or invokes the Contact Manager application, such as by invoking the flowchart 300 shown in FIG. 11, and block 302 directs the Contact Manager application to find and display contacts having respective address fields which include a portion of the input data that matched the one of the address patterns. In some variations, for example, if the input data included a portion of text that read "1234

Broadway St.", block 202 directs the keyboard application manager to determine that the input data includes a number having more than one digit (i.e. 1234), followed by a space, followed by a word (i.e. Broadway), followed by a street indicator (i.e. "St.") and block 302 directs the Contact Manager application to find and display contacts having an address field including "1234 Broadway St.".

In various embodiments, the plurality of patterns detectable by the keyboard application manager include email address patterns and applying the category test involves determining whether the input data from the user (e.g. the input data stored in the location 38 of the variable memory 16) includes one of the email address patterns and thus falls within an Email Address category. In such embodiments, block 202 may direct the keyboard application manager to determine whether the input data includes e-mail permissible text, including hyphens, underscores, or periods, followed by an @ symbol, followed by further text including hyphens, underscores, or periods, followed by a top level domain, such as for example: .com, .ca, .net, .org, .biz, or some other top level domain.

Various secondary applications may be associated with the Phone Number category. For example, in some embodiments, the Contact Manager application may be associated with the Phone Number category. As shown in FIG. 6, the Contact Manager application data structure 240 includes an Email Address category identifier 252 and thus, the keyboard application manager may be directed to display the Contact Manager icon on the display 20 if the keyboard application manager determines that the input data stored in memory (e.g. in the location 38 of the variable memory 16) falls within the Email Address category. In some variations, for example, if the input data included a portion of text that read mark@email.com, block 202 directs the processor 12 to determine that the input data included e-mail permissible text (i.e. "mark") followed by an @ symbol, followed by text (i.e. "email") followed by a top level domain (i.e. ".com") and block 302, as shown in FIG. 11, directs the processor 12 to find and display contacts having respective email address fields including "mark@email.com". In such embodiments, when the user selects the Contact Manager icon, the keyboard application manager activates or invokes the Contact Manager application and block 302 directs the Contact Manager application to find and display contacts having email address fields which include the portion of the input data that matched the one of the email address patterns (i.e. mark@email.com).

In various embodiments, the above embodiments may be equally applied having regard to any of the contact information fields. In some variations, for example, there are provided at least one contact stored in memory (e.g. in the location 49 of the variable memory 16) that includes in the contact information fields, a place name, a company name, and/or a job name, and, in various embodiments, the Contact Manager application data structure 240 may include a place name category identifier, a company name category identifier, and/or a job name category identifier corresponding to a place name, company name, and job name category.

In such embodiments, the plurality of patterns detectable by the keyboard application manager may include place names, company names, or job names and applying the category test may involve determining whether the input data stored in memory (e.g. in the location 38 of the variable memory 16) includes one of the place names, company names or job names respectively to determine whether the input data falls within a place name, company name, or job name category, respectively.

In such embodiments, the keyboard application manager may be directed to display the Contact Manager icon on the display 20 if the keyboard application manager determines that the input data stored in the memory (e.g. in the location 38 of the variable memory 16) includes one of the place names, company names or job names and thus falls within one of the place name, company name, or job name category. In such embodiments, when the user selects the Contact Manager icon, the keyboard application manager can activate or invoke the Contact Manager application and block 302 can direct the Contact Manager application to find and display contacts having place name, company name, or job name fields which correspond to the portion of the input data that was determined to include the place name, company name, or job name pattern.

Conversion Applications

Figure 18:
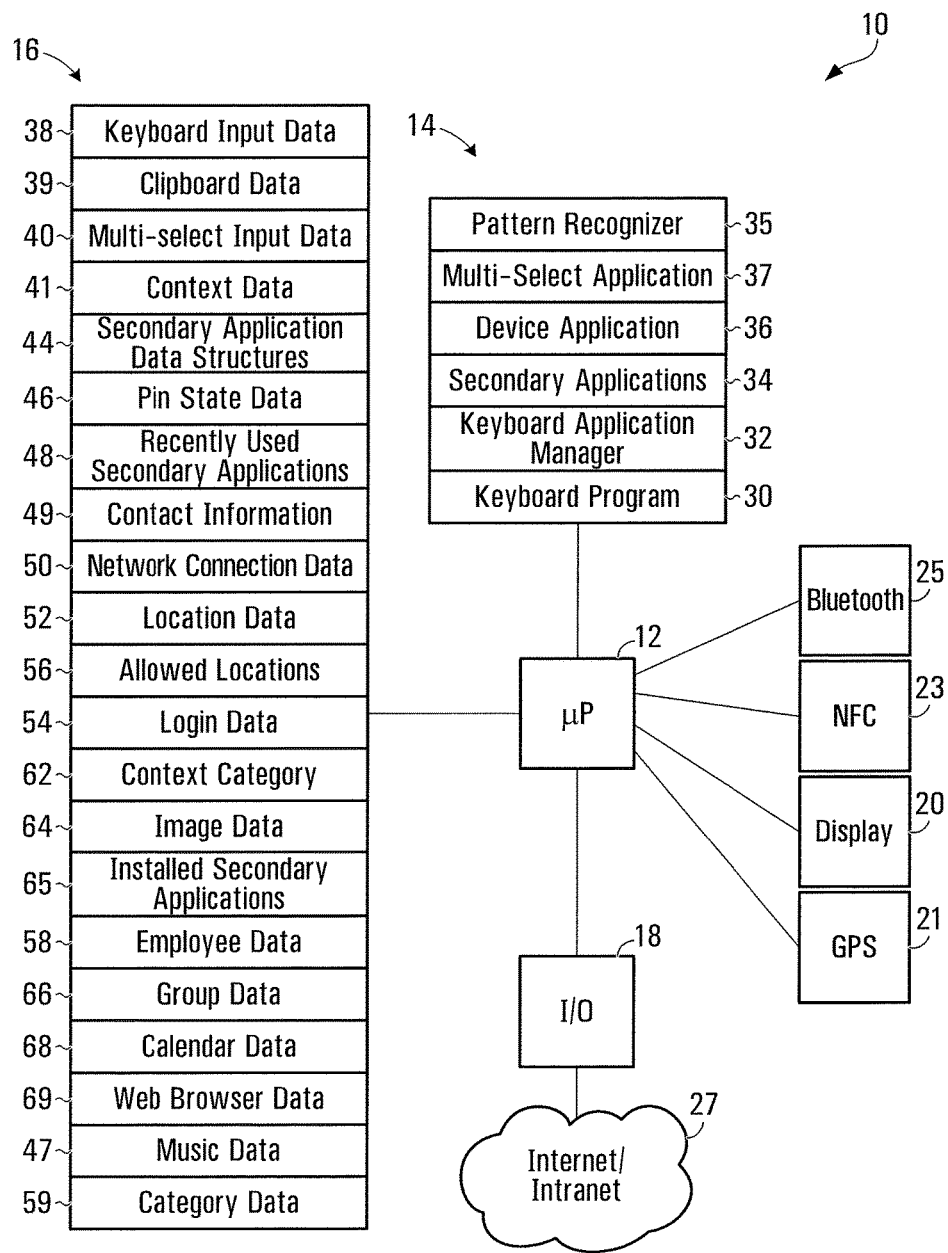
FIG. 18 is a block diagram of the personal computing device shown in FIG. 1 in accordance with another embodiment of the invention.

While, for illustration purposes, the above embodiments have been described having regard to the Contact Manager application, various secondary applications may be invoked by the keyboard application manager similarly. Referring now to FIG. 18, the personal computing device 10 shown in FIG. 1 is shown according to another embodiment. The personal computing device 10 shown in FIG. 18 includes all of the elements shown in FIG. 1 in addition to some further elements.

Referring to FIG. 18, the program memory 14 includes, in addition to the blocks of codes shown in FIG. 1, a block of code 37 for directing the personal computing device 10 to effect multi-select application functions and a block of code 35 for directing the personal computing device to effect pattern recognizer functions.

Further, in the embodiment shown in FIG. 18, the variable memory 16 includes, in addition to the locations shown in FIG. 1, location 40 for storing multi-select input data, location 41 for storing context data, location 48 for storing recently used secondary application data, location 50 for storing network connection data, location 52 for storing location information, location 56 for storing allowed location data, location 54 for storing login data, location 62 for storing context category data, location 64 for storing image data, location 65 for storing installed secondary applications data, location 58 for storing employee data, location 66 for storing secondary application group data, location 68 for storing calendar data, location 69 for storing web browser data, and location 47 for storing music data. Of course, the variable memory 16 may also include additional locations not shown in FIG. 18.

Further, in the embodiment shown in FIG. 18, the personal computing device 10 includes, in addition to the elements shown in FIG. 1, a global positioning system (GPS) receiver and transmitter 21, a near field communication (NFC) receiver and transmitter 23, and a Bluetooth receiver and transmitter 25 which cooperate under the direct or indirect control of the processor 12. In various embodiments, the NFC receiver and transmitter 23 or the Bluetooth receiver and transmitter 25 may enable a network connection similar to as described above for the I/O interface 18. In various embodiments, the personal computing device 10 may also include a gyroscope or accelerometer (not shown).

Referring now to FIGS. 5 and 18, in various embodiments, block 202 directs the keyboard application manager to apply a category test by determining whether the input data stored in the memory (e.g. in the location 38 of the variable memory 16) includes at least one of a plurality of patterns detectable by the keyboard application manager.

In various embodiments, the plurality of patterns detectable by the keyboard application manager include units of measurement patterns and applying the category test involves determining whether the input data from the user (e.g. the input data stored in the location 38 of the variable memory 16) includes one of the unit of measurement patterns to determine whether the input data falls within a Measurement Conversion category. In various embodiments, the unit of measurement patterns may be a number followed by text corresponding to a unit of measurement. In such embodiments, block 202 may direct the keyboard application manager to determine whether the input data includes a number followed by a unit of measurement such as, for example, any of the following text: meters, m., grams, g., kilograms, kg., litres, l., feet, ft., inches, in., yards, yd., or other measurable units. In the embodiment shown in FIG. 19, the input data includes a number (i.e. "1300") followed by text corresponding to one of the unit of measurement patterns (i.e. "kg") and thus, block 202 directs the keyboard application manager to determine that the input data falls within the Measurement Conversion category.

Figure 19:
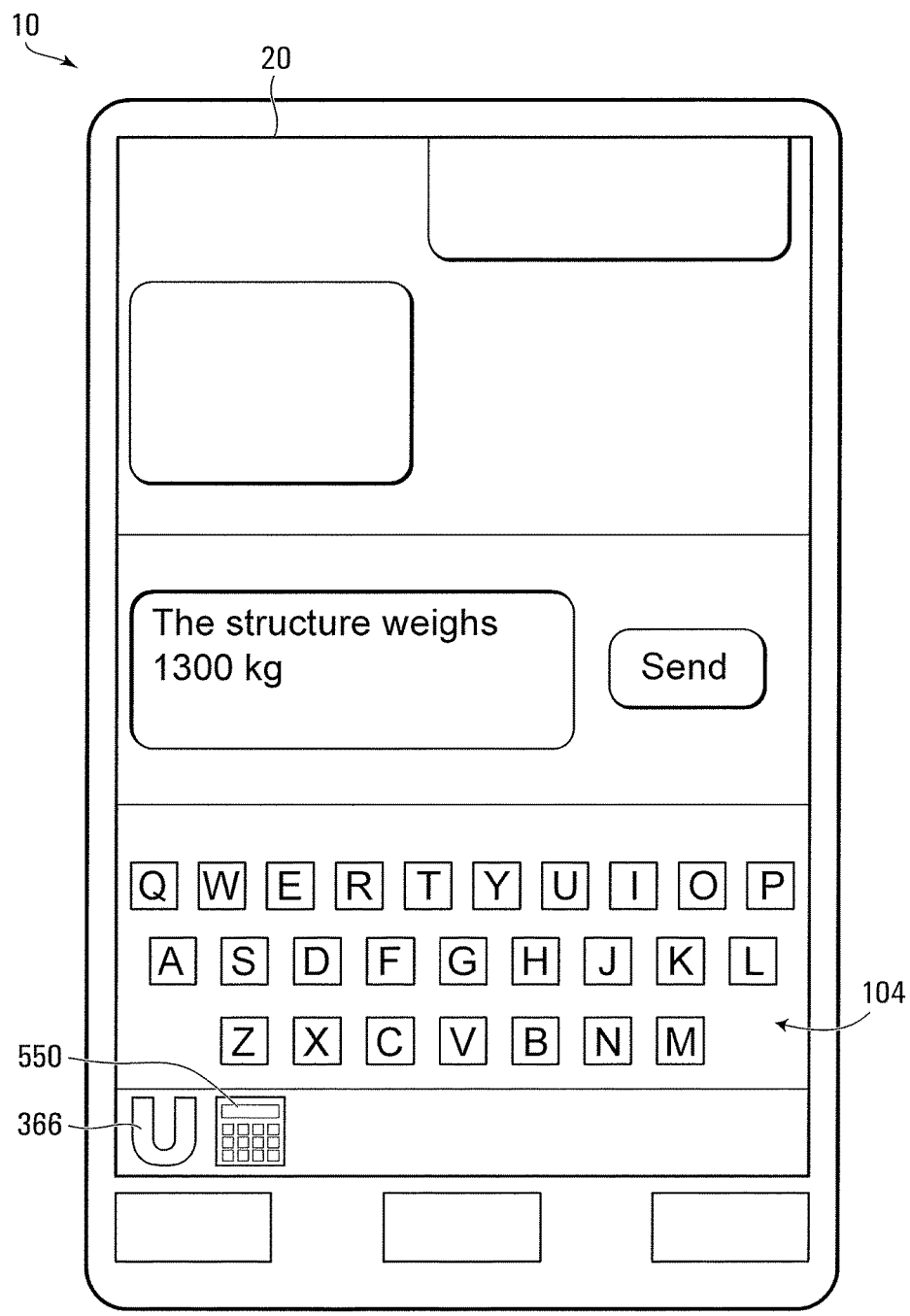
FIG. 19 is a front view of the personal computing device shown in FIG. 18 including a display showing a screenshot in accordance with one embodiment of the invention.
Figure 20:
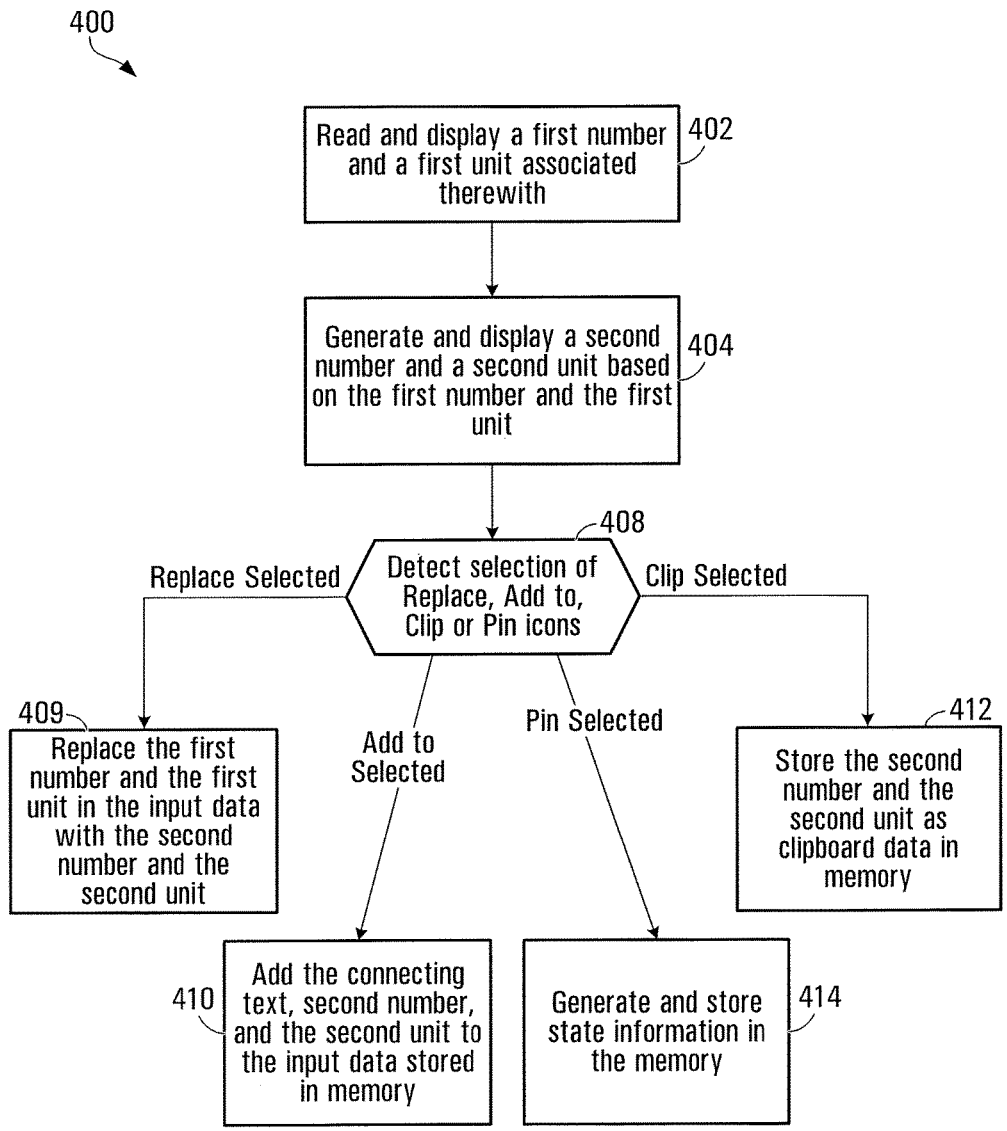
FIG. 20 is a flowchart depicting blocks of code for directing the personal computing device shown in FIG. 18 to effect Measurement Conversion application functions in accordance with one embodiment of the invention.

Various secondary applications may be associated with the Measurement Conversion category. In some variations, for example, a Measurement Conversion application may be provided as a form of secondary application for converting units of measurements entered by the user and may be associated with the Measurement Conversion category. In various embodiments, the Measurement Conversion application may be defined in the block 34 of the program memory 14 as shown in FIG. 18. A Measurement Conversion application data structure similar to the Contact Manager application data structure 240 shown in FIG. 11 may be stored in memory (e.g. in the location 44 of the variable memory 16) and may include a Measurement Conversion category identifier identifying the Measurement Conversion category. Thus, in various embodiments, block 204 of the flowchart 200 shown in FIG. 5 may direct the keyboard application manager to display a Measurement Conversion application icon 366 on the display 20 for selection, as shown in FIG. 19 if the input data stored in memory (e.g. in the location 38 of the variable memory 16) is determined to fall within the Measurement Conversion category. In various embodiments, if at block 206, the keyboard application manager detects selection of the Measurement Conversion application icon 366, the keyboard application manager is directed to activate or invoke the Measurement Conversion application by invoking flowchart 400 shown in FIG. 20.

As described for the flowchart 300 shown in FIG. 11, the flowchart 400 may be encoded in a different block of codes from the block of codes 32 for directing the personal computing device 10 to effect keyboard application manager functions. For example, the flowchart 400 may be encoded in a Measurement Conversion application block of codes within the block of codes 34. Thus, in various embodiments, the flowchart 400 depicts a process effected by the Measurement Conversion application.

Figure 21:
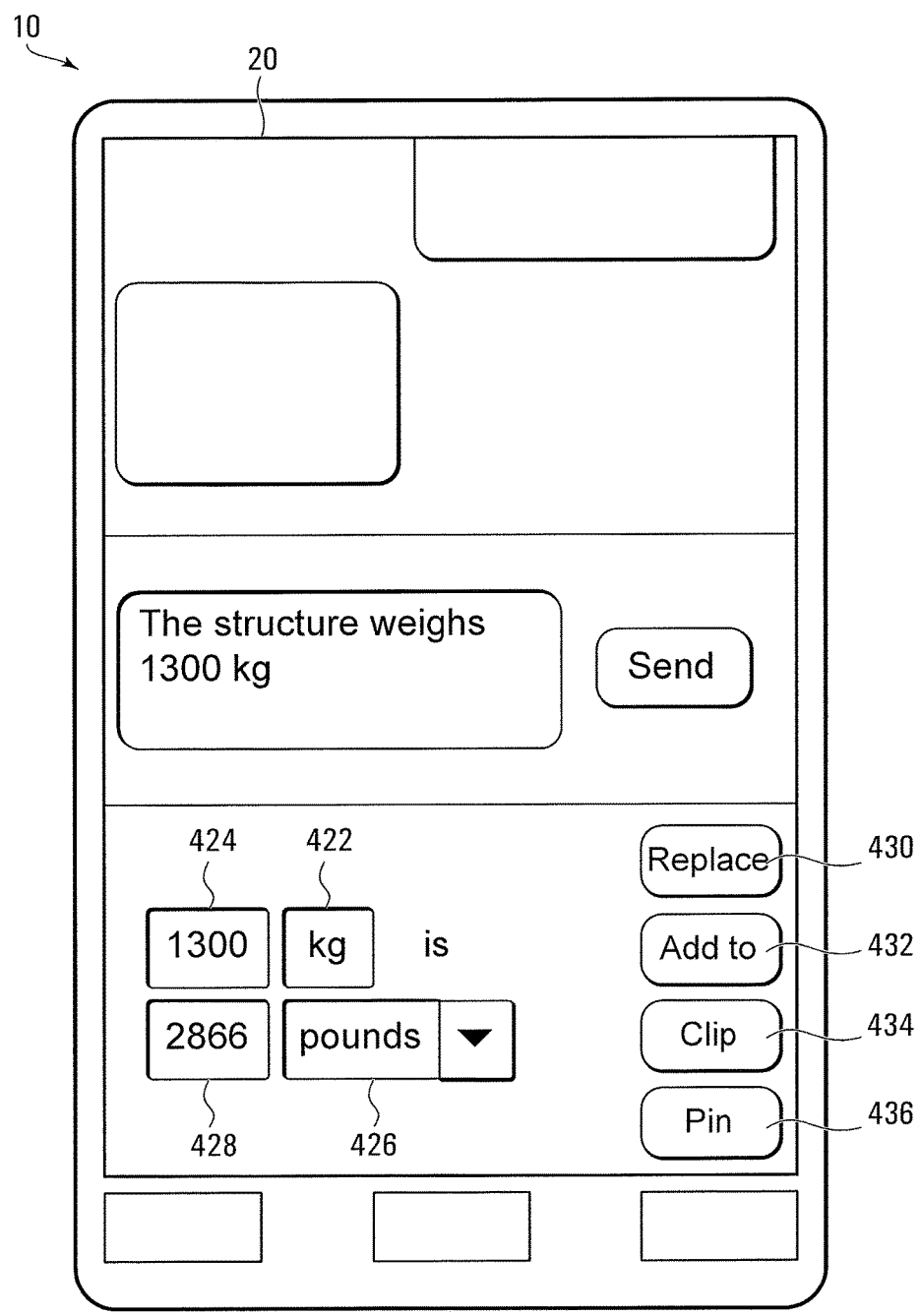
FIG. 21 is a front view of the personal computing device shown in FIG. 18 including a display showing a screenshot in accordance with one embodiment of the invention.

The flowchart 400 begins at block 402 which directs the Measurement Conversion application to read and display on the display a first number 424 and a first unit 422 identified from the input data (e.g. as stored in the location 38 of the variable memory 16), as shown in FIG. 21. In this embodiment, where the input data includes "1300 kg", the first unit 422 is a unit of measurement and in various embodiments, may be identified by the Measurement Conversion application by comparing the input data to stored units of measurements in memory. The first number 424 may be identified by the Measurement Conversion application as a number in the input data immediately preceding the first unit of measurement.

For example, in the embodiment shown in FIG. 21, where the input data includes the text "The structure weighs 1300 kg", block 402 may direct the Measurement Conversion application to read the first unit of measurement as "kg" and the first number as "1300".

Block 404 then directs the Measurement Conversion application to generate and display a second number 428 and a second unit 426 based on the first number 424 and the first unit 422 and to display a Replace icon 430, an Add To icon 432, a Clip icon 434, and a Pin icon 436. In various embodiments, the second unit 426 is a unit of measurement retrieved by the Measurement Conversion application from memory. The second unit 426 may be chosen from stored units of measurements associated with the first unit. For example, in the embodiment shown where the first unit 422 is a unit for measuring mass, the second unit 426 may be chosen from stored units that are also units of mass and thus associated with the first unit 422. In various embodiments, the second unit may be displayed in association with an arrow selectable to activate a pull down menu displaying a plurality of alternate units of measurement and the user may select the pulldown menu to choose a different second unit from the plurality of alternate units of measurement.

In various embodiments, block 404 directs the Measurement Conversion application to generate the second number 428 by retrieving a stored ratio associated with the first and second units of measurement 422 and 426 from the variable memory 16 and applying the stored ratio to the first number 424. In the embodiment shown, the stored ratio associated with the first and second units of measurement 422 and 426 is 2.20462 and the second number 428 is generated by multiplying the first number by 2.20462. In various embodiments, the stored ratio may be stored in memory separate from the personal computing device 10 and may be accessible by the Measurement application via a network such as the one or more networks 27 via the I/O interface 18, for example.

Block 408 directs the Measurement Conversion application to detect selection of one of the Replace, Add To, Clip, and Pin icons 430, 432, 434, and 436. In various embodiments, each of the processes initiated by selection of one of the Replace, Add To, Clip, and Pin icons 430, 432, 434, and 436 or any other similar icons described herein may act as a secondary input action different from the detection of keystrokes received from the user. If at block 408, the Measurement Conversion application detects selection of the Replace icon 430, the process proceeds to block 409.

Figure 22:
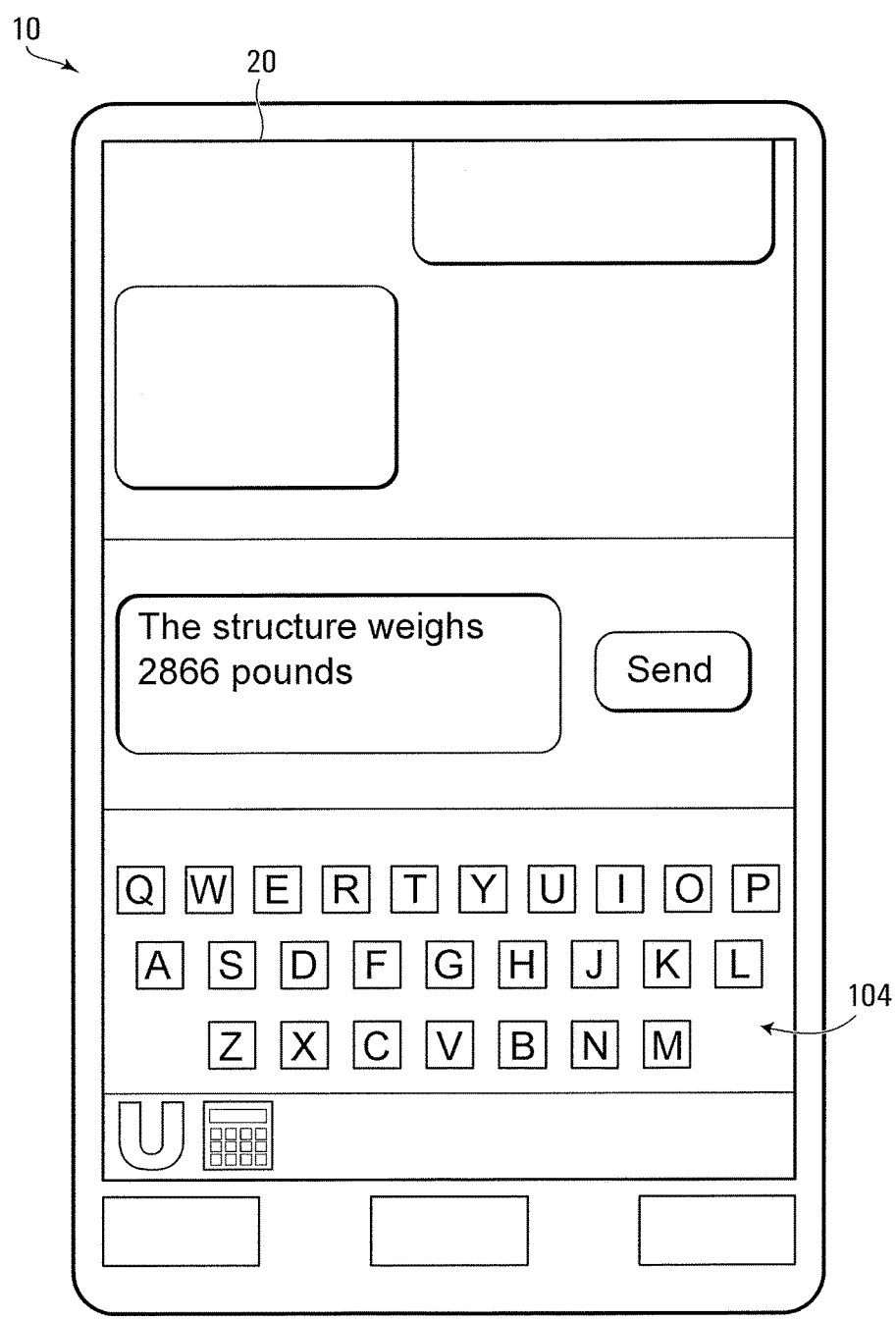
FIG. 22 is a front view of the personal computing device shown in FIG. 18 including a display showing a screenshot in accordance with one embodiment of the invention.

Block 409 directs the Measurement Conversion application to replace the first number and the first unit 424 and 422 in the input data (e.g. as stored in the location 38 of the variable memory 16) with the second number and the second unit 428 and 426 as generated by the Measurement Conversion application. In various embodiments, such as in the embodiment shown in FIG. 21, where the second number is 2866 and the second unit is "pounds", block 409 directs the Measurement Conversion application to amend the input data (e.g. as stored in the location 38 of the variable memory 16) to include the text "The structure weighs 2866 pounds". Block 409 then directs the Measurement Conversion application to cause the keyboard 104 to be redisplayed on the display 20 as shown in FIG. 22.

Figure 23:
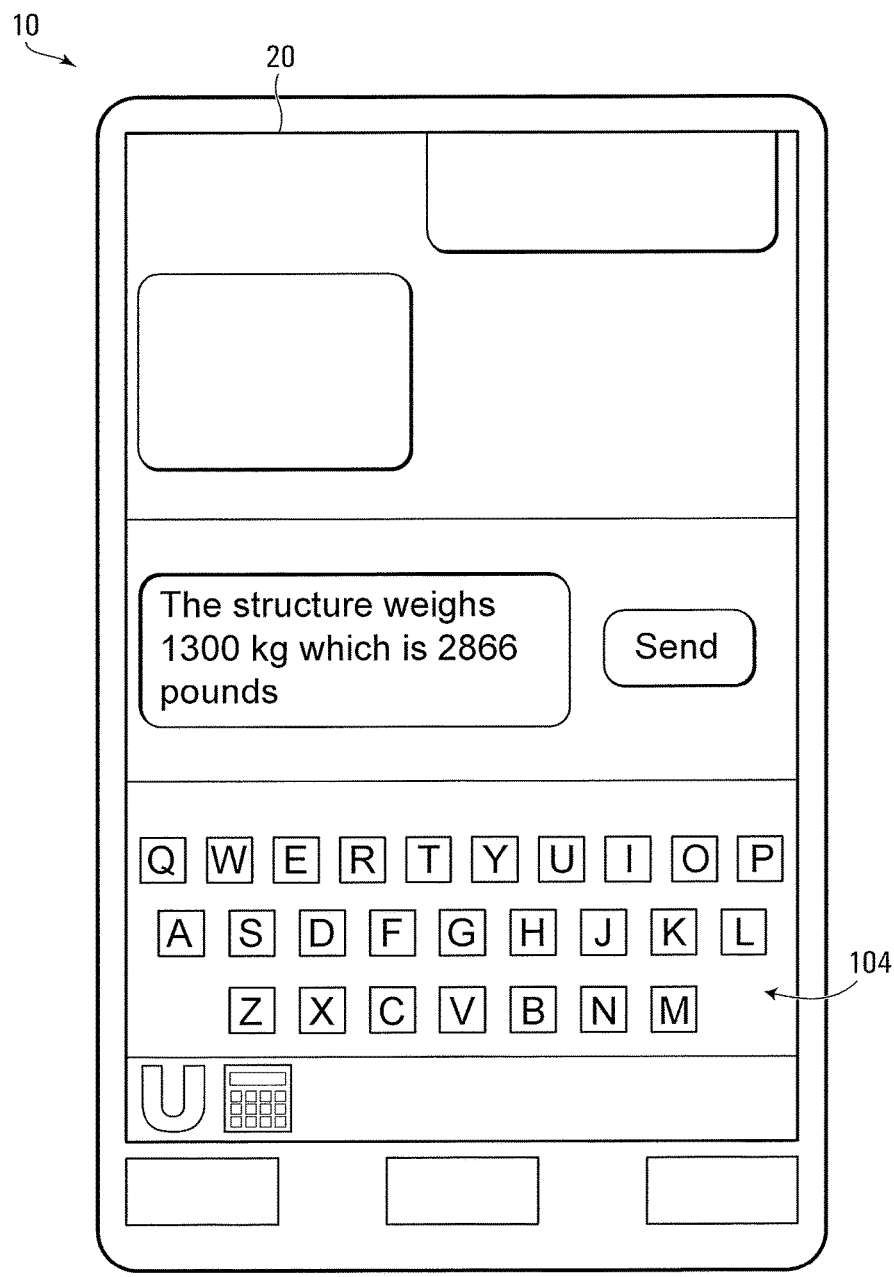
FIG. 23 is a front view of the personal computing device shown in FIG. 18 including a display showing a screenshot in accordance with one embodiment of the invention.

If, at block 408, the Measurement Conversion application detects selection of the Add To icon 432, the process proceeds to block 410. Block 410 directs the Measurement Conversion application to add connecting text, the second number 428 and the second unit 426 to the input data stored in memory (e.g. in the location 38 of the variable memory 16) and cause the keyboard 104 to be redisplayed, as shown in FIG. 23. In various embodiments, the connecting text may be "which is" and thus where the second number is 2866 and the second unit is "pounds", block 410 may direct the Measurement Conversion application to amend the input data (e.g. as stored in the location 38 of the variable memory 16) to include the text "The structure weighs 1300 kg which is 2866 pounds" which may be displayed on the display 20 by the device application as shown in FIG. 23.

If at block 408, the Measurement Conversion application detects selection of the Clip icon 434, the process proceeds to block 412. Block 412 directs the Measurement Conversion application to store the second number 428 and the second unit 426 in memory as clipboard data (e.g. in the location 39 for storing clipboard copied data) for later insertion into the input data or another editable field or document. In various embodiments, block 408 may then direct the Measurement Conversion application to cause the keyboard to be redisplayed, as shown in FIG. 19.

If at block 408, the Measurement Conversion application detects selection of the Pin icon 436, the process proceeds to block 414 which directs the Measurement Conversion application to generate state information defining a state of the Measurement Conversion application and store the state information in memory (e.g. in the location 46 of the variable memory 16). In various embodiments, the state information stored in memory may include a display identifier for identifying what the secondary application was displaying at the time that the Pin icon 436 was selected. In various embodiments, the state information may include the first number 424, the first unit 422, and the second unit 426. The state information may also include a secondary application identifier (i.e. a Measurement Conversion application identifier).

Figure 24:
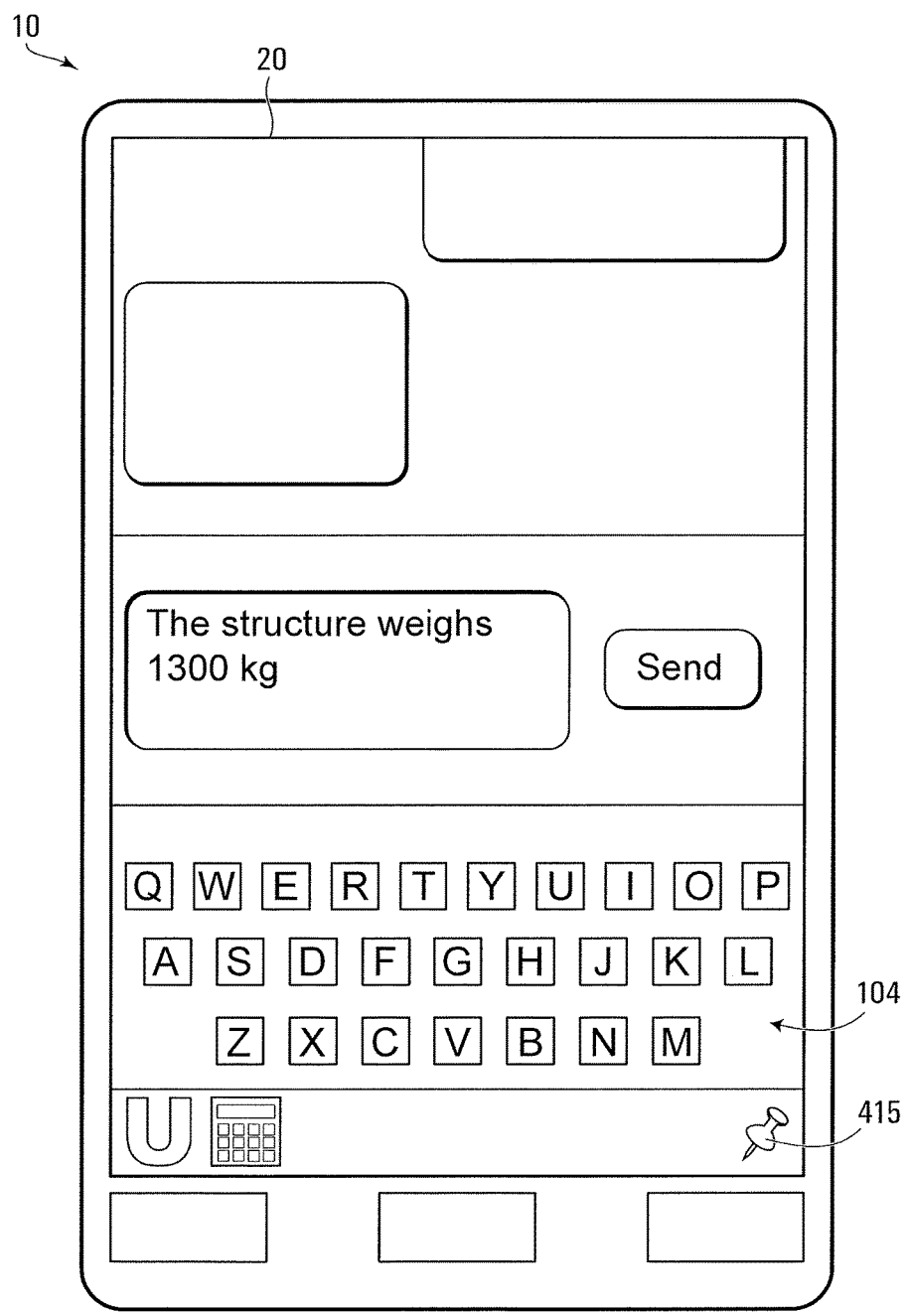
FIG. 24 is a front view of the personal computing device shown in FIG. 18 including a display showing a screenshot in accordance with one embodiment of the invention.

Block 414 directs the Measurement Conversion application to cause the keyboard 104 to be redisplayed on the display 20 and to cause the keyboard application manager to display a resume state icon 415 on the display 20, generally as described and shown above having regard to FIG. 17, for example, and as shown in FIG. 24. Additional blocks stored in the block of codes 32 of the program memory 14 may then direct the keyboard application manager to detect selection of the resume state icon 415 and upon detecting selection of the resume state icon, the additional blocks may direct the keyboard application manager to reactivate or reinvoke the Measurement Conversion application. The Measurement Conversion application is then directed to read the state information stored in memory (e.g. in the location 46 of the variable memory 16), and using the state information, reactivate or reinvoke the Measurement Conversion application, proceeding back to block 402 to display the first number 424 and the first unit 422 that were displayed on the display 20 when the Pin icon 436 was selected.

Currency

In another embodiment, the plurality of patterns detectable by the keyboard application manager include currency patterns and applying the category test involves determining whether the input data from the user (e.g. the input data stored in the location 38 of the variable memory 16) corresponds to one of the currency patterns and thus falls within a Currency category. In such an embodiment block 202 may direct the keyboard application manager to determine whether the input data includes a number followed by a currency indicator, such as for example, any of the following text: dollars, CAD, USD, pounds, Francs, F., Euros, or some other currency-related input pattern. or whether the input data includes any of the following currency symbols: $, £, €, or some other currency symbol related input pattern. followed by a number. In the embodiment shown in FIG. 27, the input data includes the following text, "That will cost $40". In such an embodiment, block 202 directs the keyboard application manager to determine that the input data includes one of the currency symbols (i.e. $) followed by a number (i.e. 40) and thus determines that the input data includes one of the currency patterns and falls within the Currency category.

Figure 25:
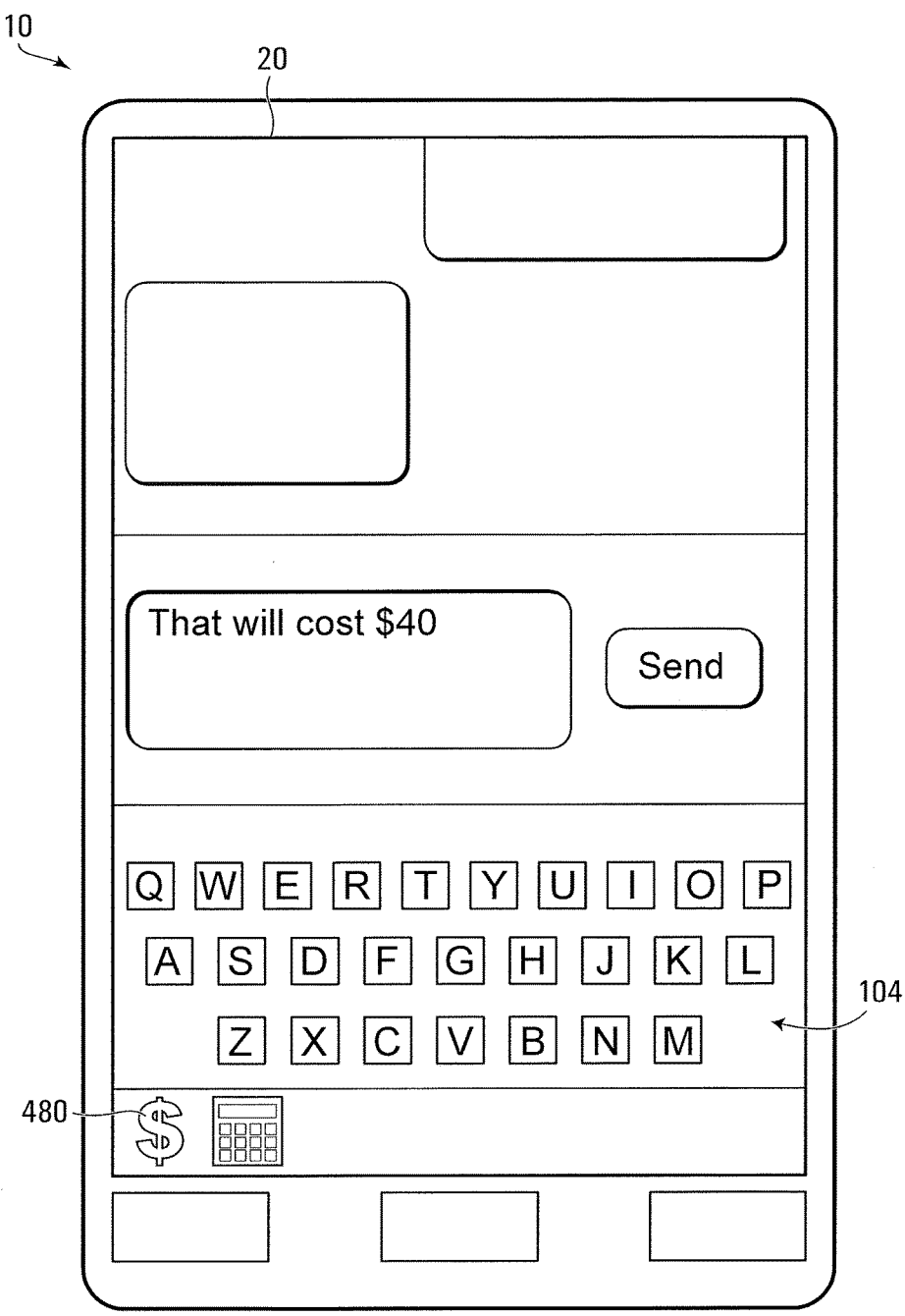
FIG. 25 is a front view of the personal computing device shown in FIG. 18 including a display showing a screenshot in accordance with one embodiment of the invention.
Figure 26:
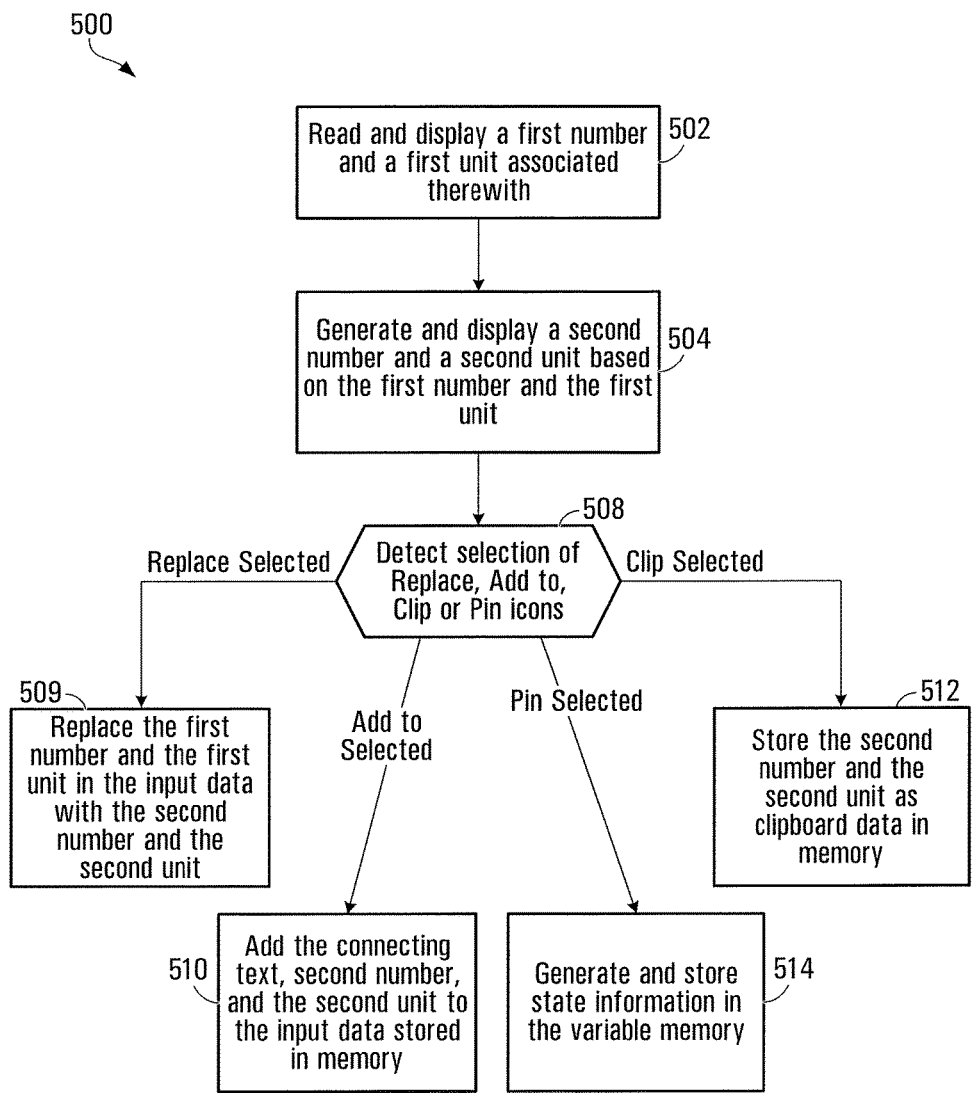
FIG. 26 is a flowchart depicting blocks of code for directing the personal computing device shown in FIG. 18 to effect Currency application functions in accordance with one embodiment of the invention.

Various secondary applications may be associated with the Currency category. In some variations, for example, a Currency application may be provided as a form of secondary application for converting between units of currency entered by the user and may be associated with the Currency category. In various embodiments, the Currency application may be defined in the block 34 of the program memory 14 as shown in FIG. 18. In such embodiments, a Currency application data structure similar in format to the Contact Manager application data structure 240 shown in FIG. 6, but including a Currency category identifier may be stored in memory (e.g. in the location 44 of the variable memory 16). Thus, block 204 of the flowchart 200 shown in FIG. 5 may direct the keyboard application manager to display a Currency icon 480 on the display 20 for selection when the input data stored is found to fall within the Currency category, as shown in FIG. 25. In various embodiments, if at block 206, the keyboard application manager detects selection of the Currency icon 480, the keyboard application manager may activate or invoke the Currency application by invoking a flowchart 500 as shown in FIG. 26, the flowchart 500 having blocks generally similar to the blocks included in the flowchart 400.

As described for the flowchart 300 shown in FIG. 11, the flowchart 500 may be encoded in a different block of codes from the block of codes 32 for directing the personal computing device 10 to effect keyboard application manager functions. In various embodiments, the flowchart 500 may be encoded in a Currency application block of codes within the block of codes 34. Thus, in various embodiments, the flowchart 500 depicts a process effected by the Currency application.

Figure 27:
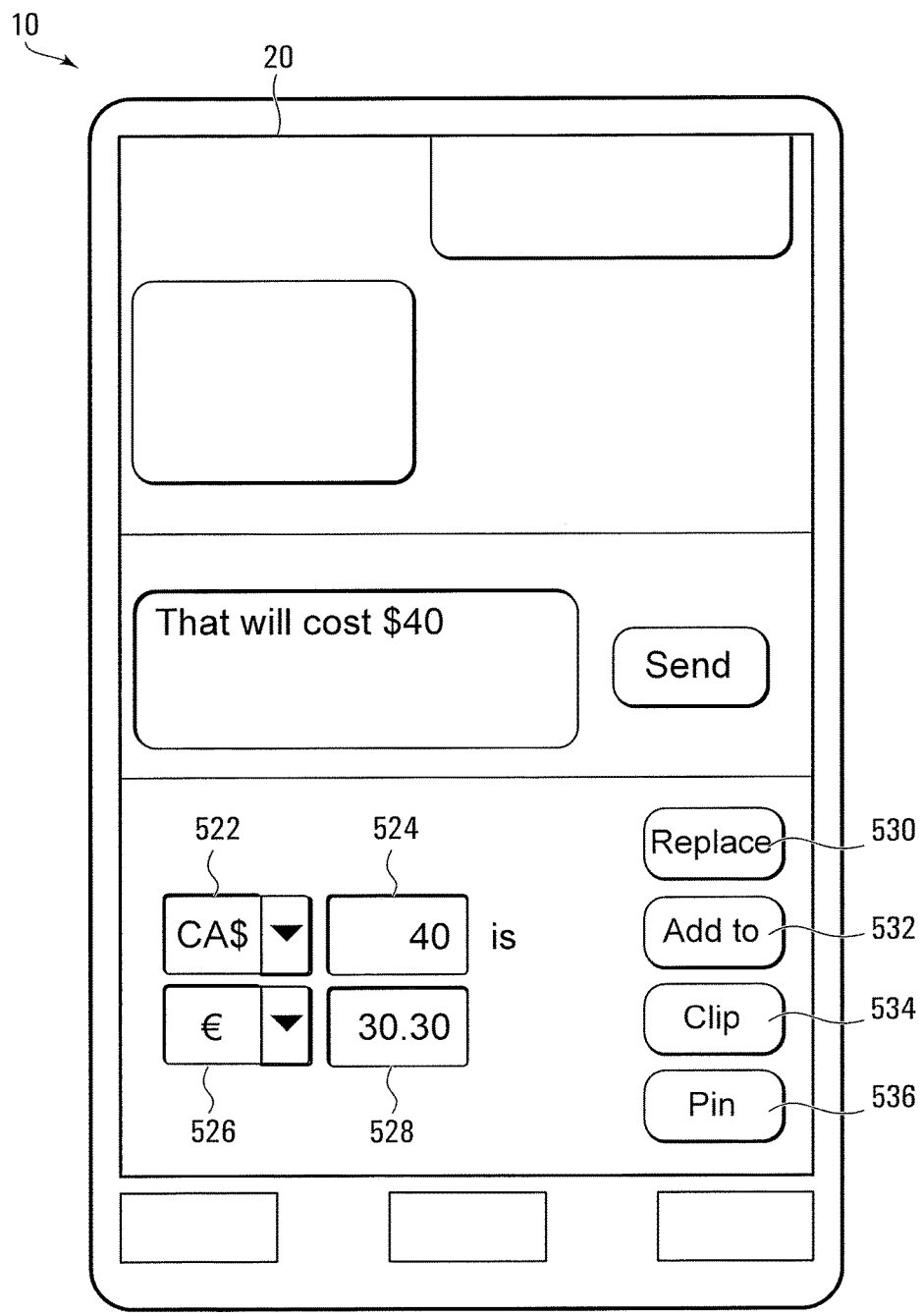
FIG. 27 is a front view of the personal computing device shown in FIG. 18 including a display showing a screenshot in accordance with one embodiment of the invention.

The flowchart 500 begins at block 502 which directs the Currency application to read and display on the display 20 a first number 524 and a first unit 522 identified from the input data (e.g. as stored in the location 38 of the variable memory 16), as shown in FIG. 27. In the embodiment shown in FIG. 27, where the input data includes "$40", the first unit 522 is a unit of currency identified by the Currency application by comparing the input data to stored units of currency in memory. In this embodiment, the first number 524 may be identified as a number immediately following the first unit 522 in the input data. For example, in the illustration shown, where the input data includes the text, "That will cost $40", block 502 may direct the Currency application to read the first unit 522 as "$" and the first number 524 as "40". In various embodiments, where the first unit 522 is identified as a unit that normally follows a number (i.e. where the first unit 522 is "dollars") the first number 524 may be identified as a number in the input data immediately preceding the first unit 522 and the first number 524 may be displayed on the display 20 to the left of the first unit 522.

Block 504 then directs the Currency application to generate and display a second unit 526 and a second number 528 based on the first unit 522 and the first number 524. Block 504 also directs the Currency application to display on the display 20, a Replace icon 530, an Add To icon 532, a Clip icon 534, and a Pin icon 536. In various embodiments, the second unit 526 is a unit of currency which is chosen by the user from a pull down menu including a plurality of units of currency stored in memory. In various embodiments, block 504 directs the Currency application to generate the second number 528 by retrieving a stored ratio associated with the first and second units of currency 522 and 526 from memory (e.g. from a location in the variable memory 16) and applying the stored ratio to the first number 524. In the embodiment shown, the stored ratio associated with the first and second units of currency 522 and 526 is an exchange rate of 0.76 and the second number 528 is generated by multiplying the first number 524 by 0.76. In various embodiments, the stored ratio may be stored in memory separate from the personal computing device 10 and may be accessible by the Currency application via a network such as the one or more networks 27 via the I/O interface 18, for example.

Block 508 directs the Currency application to detect selection of one of the Replace, Add To, Clip, and Pin icons 530, 532, 534, and 536. If at block 508, the Currency application detects selection of the Replace icon 530, the process proceeds to block 509.

Block 509 directs the Currency application to replace the first unit 522 and the first number 524 in the input data (e.g. as stored in the location 38 of the variable memory 16) with the second unit 526 and the second number 528 as generated by the Currency application. In the embodiment shown in FIG. 27, where the second number 528 is 30.30 and the second unit 526 is "€", block 509 directs the Currency application to amend the input data (e.g. as stored in the location 38 of the variable memory 16) to include the text "That will cost €30.30". Block 509 then directs the Currency application to cause the keyboard to be redisplayed on the display 20.

If, at block 508, the Currency application detects selection of the Add To icon 532, the process proceeds to block 510. Block 510 directs the Currency application to add connecting text, the second number 528 and the second unit 526 to the input data stored in memory (e.g. in the location 38 of the variable memory 16) and cause the keyboard to be redisplayed. The connecting text may be "which is", in this embodiment, where the second number is "30.30" and the second unit is "€", block 510 directs the Currency application to amend the input data (e.g. as stored in the location 38 of the variable memory 16) to include the text "That will cost $40 which is €30.30", which may be displayed on the display 20 by the device application.

If at block 508, the Currency application detects selection of the Clip icon 534, the process proceeds to block 512. Block 512 directs the Currency application to store the second unit 526 and the second number 528 in memory as clipboard data (e.g. in the location 39 for storing clipboard copied data) for later insertion into the input data or another editable field or document. In various embodiments, block 508 may then direct the Currency application to cause the keyboard to be redisplayed.

If at block 508, the Currency application detects selection of the Pin icon 536, the process proceeds to block 514 which directs the Currency application to generate state information defining a state of the Currency application and store the state information in the memory (e.g. in the location 46 of the variable memory 16). In various embodiments, the state information stored in memory may include a display identifier for identifying what the secondary application was displaying at the time that the Pin icon 536 was selected. In this embodiment, the state information may include the first number 524, the first unit 522, the second number 528 and the second unit 526. The state information may also include a secondary application identifier (i.e. a Currency application identifier)

Block 514 directs the Currency application to cause the keyboard to be displayed and to cause the keyboard application manager to display a resume state icon on the display 20 generally as described and shown above having regard to FIG. 17, for example.

Calculator

In various embodiments, the plurality of patterns detectable by the keyboard application manager include number patterns for identifying numbers and applying the category test involves determining whether the input data from the user (e.g. the input data stored in the location 38 of the variable memory 16) includes one of the number patterns to determine whether the input data falls within a Number category. In such an embodiment block 202 the number patterns may include a numeric sequence that is operable by a calculator, such as, for example, any number.

Figure 28:
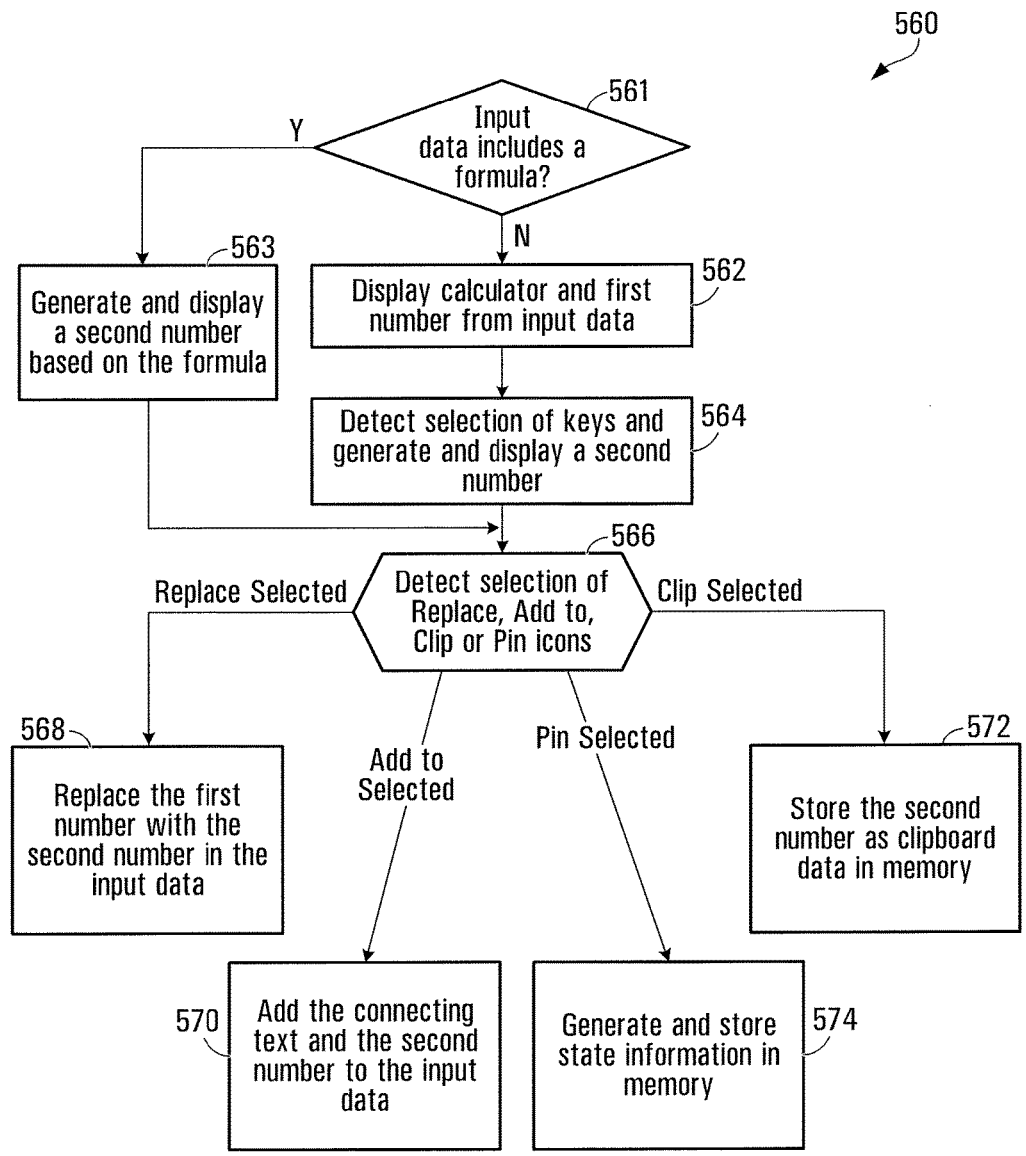
FIG. 28 is a flowchart depicting blocks of code for directing the personal computing device shown in FIG. 18 to effect Calculator application functions in accordance with one embodiment of the invention.

Various secondary applications may be associated with the Number category. In some variations, for example, a Calculator application may be provided as a form of secondary application for performing mathematical operations on numbers or functions included in the input data and may be associated with the Number category. In various embodiments, the Calculator application may be defined in the block 34 of the program memory 14. In such embodiments, a Calculator application data structure having a similar format to the Contact Manager application data structure 240 shown in FIG. 6, but including a Number category identifier may be stored in the variable memory 16 (e.g. in the location 44). Accordingly, block 204 may direct the keyboard application manager to display a Calculator icon on the display 20 for selection when the input data from the user is found to fall within the Number category. In the embodiment shown in FIG. 19, the keyboard application manager is directed to display the Calculator icon 550 on the display 20 since the input data includes a number (i.e. 1300). If at block 206, the keyboard application manager detects selection of the Calculator icon 550, the keyboard application manager is directed to activate or invoke the Calculator application by invoking a flowchart 560 as shown in FIG. 28.

As described for the flowchart 300 shown in FIG. 11, the flowchart 560 may be encoded in a different block of codes from the block of codes 32 and, more particularly, the flowchart 560 may be encoded in a Calculator application block of codes within the block of codes 34. Thus, in various embodiments, the flowchart 560 depicts a process effected by the Calculator application.

The flowchart 560 begins at block 561 which directs the Calculator application to determine whether the input data includes a formula. To do this, the Calculator application may determine whether the input data includes text corresponding to an operator and a number associated with the text. For example, the Calculator may determine whether the input data includes any of the following text: N/N, N*N, N+N, N−N, sin(N), cos(N), tan(N) which may or may not be followed by further such as for example an equals symbol (i.e. "="). If the input data does not include a formula, the process proceeds to block 562. For example, for the embodiment shown in FIG. 19, wherein for illustration purposes the input data includes "The structure weighs 1300 kg", the Calculator application would determine at block 561 that the input data does not include a formula and the process would proceed to block 562.

Figure 29:
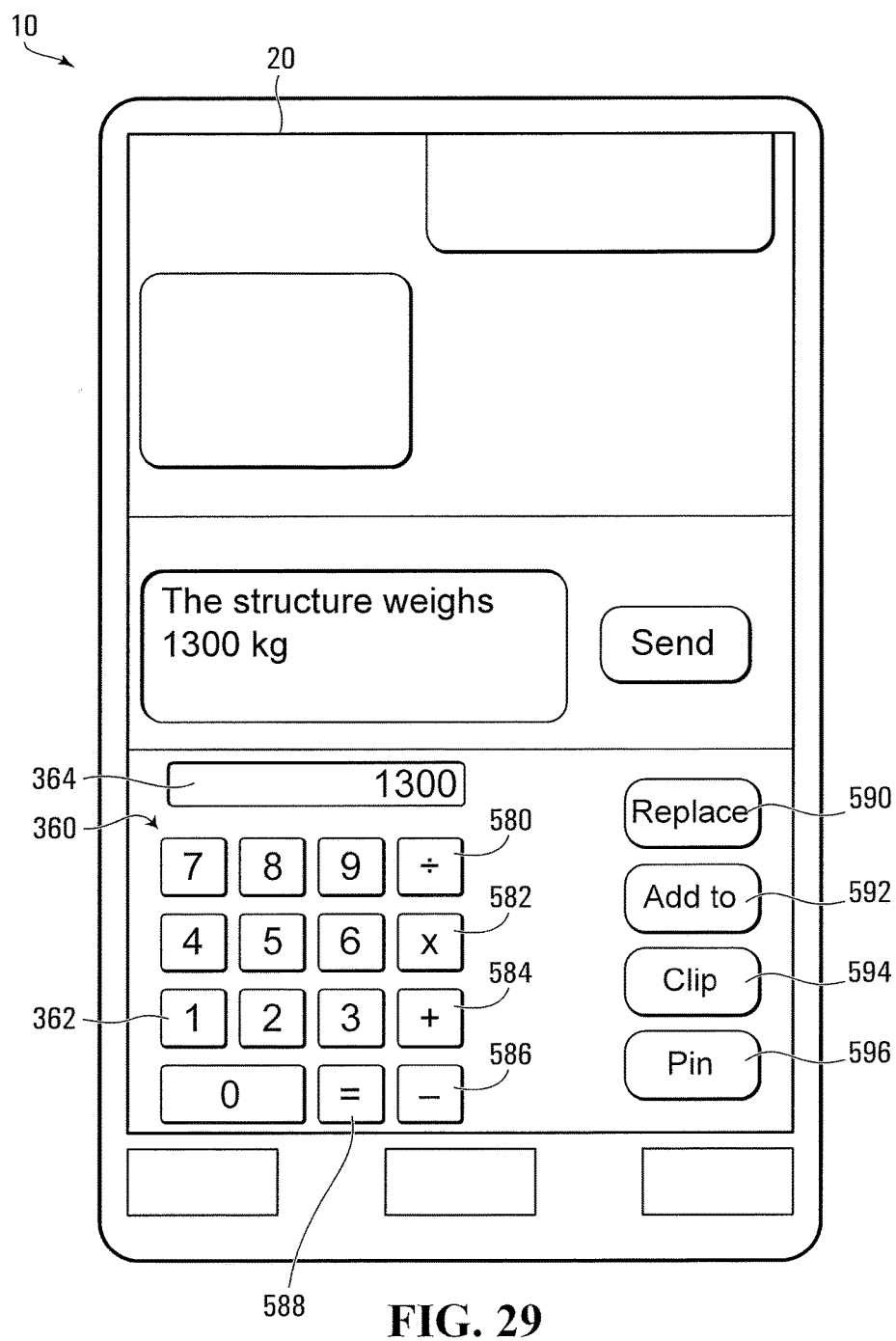
FIG. 29 is a front view of the personal computing device shown in FIG. 18 including a display showing a screenshot in accordance with one embodiment of the invention.

Block 562 directs the Calculator application to display a calculator 360 having a plurality of keys for user selection as shown in FIG. 29. In the embodiment shown, the plurality of keys for illustration purposes include number keys, only one of which is labeled at 362, a division key 580, a multiply key 582, an addition key 584, a subtraction key 586, and an enter or equals key 588. However in various embodiments, other calculator function keys may be displayed on the display 20 such as, by way of example only but not limited to sin, cos, tan, $x^y$, or $1/x$ keys.

Block 562 also directs the Calculator application to read a first number from the input data (e.g. as stored in the location 38 of the variable memory 16) and to display the first number in a calculator box 364. In the embodiment shown in FIG. 29, the input data for illustration purposes includes the text "The structure weighs 1300 kg" and the Calculator application is directed to read and display "1300" as the first number. Block 562 also directs the Calculator application to display a Replace icon 590, an Add To icon 592, a Clip icon 594, and a Pin icon 596 on the display 20.

Figure 30:
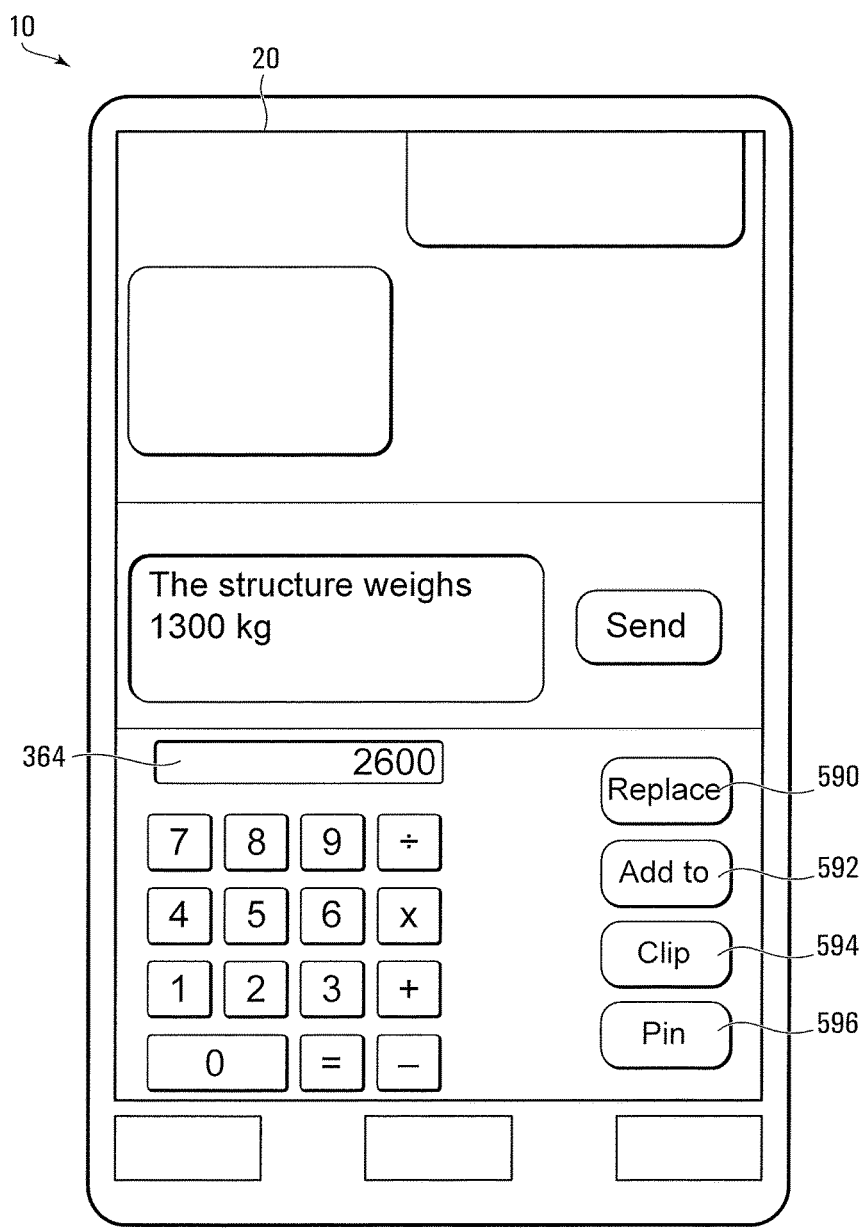
FIG. 30 is a front view of the personal computing device shown in FIG. 18 including a display showing a screenshot in accordance with one embodiment of the invention.

Block 564 directs the Calculator application to detect user selection of at least one of the plurality of keys, and generate and display a second number based on the first number and the selected at least one of the plurality of keys. In one embodiment, the Calculator application detects user selection of the multiply key 582, the number 2 key, and the enter key 588. In such an embodiment, block 564 directs the Calculator application to generate the second number to be equal to 1300 multiplied by 2 (i.e. 2600). Thus block 564 directs the Calculator application to display the second number (i.e. 2600) in the calculator box 364, as shown in FIG. 30.

Block 566 then directs the Calculator application to detect selection of one of the Replace, Add To, Clip, or Pin icons 590, 592, 594, and 596. If at block 566, the Calculator application detects selection of the Replace icon 590, the process proceeds to block 568.

Block 568 directs the Calculator application to replace the first number in the input data (e.g. as stored in the location 38 of the variable memory 16) with the second number as generated by the Calculator application. In this embodiment, where the second number is "2600" and the input data was originally "The structure weighs 1300 kg", block 568 directs the Calculator application to amend the input data (e.g. as stored in the location 38 of the variable memory 16) to be "The structure weighs 2600 kg". Block 568 then directs the Calculator application to cause the keyboard to be redisplayed on the display 20.

If, at block 566, the Calculator application detects selection of the Add To icon 592, the process proceeds to block 570. Block 570 directs the Calculator application to add connecting text and the second number to the input data stored in memory (e.g. in the location 38 of the variable memory 16) and cause the keyboard 104 to be redisplayed. In various embodiments, the connecting text may correspond to the calculator keys which were selected by the user. In this embodiment, the connecting text may be "×2=" and thus, where the second number is "2600" and the input data was originally "The structure weighs 1300 kg", block 570 may direct the Calculator application to amend the input data (e.g. as stored in the location 38 of the variable memory 16) to include the text "The structure weighs 1300×2=2600 kg".

If at block 566, the Calculator application detects selection of the Clip icon 594, the process proceeds to block 572. Block 572 directs the Calculator application to store the second number in memory (e.g. in the location 39 for storing clipboard copied data) for later insertion into the input data or another editable field or document. In various embodiments, block 572 then directs the Calculator application to cause the keyboard to be redisplayed. However in other embodiments, block 572 may direct the Calculator application to retain control of the display such that the user can copy and paste multiple numbers without redisplaying the keyboard. In various embodiments, the user may redisplay the keyboard at any time during execution of the Calculator application by selecting a close secondary application icon, such as for example an "×" at a top right corner of the portion of the display 20 displayed by the Calculator application (not shown).

If at block 566, the Calculator application detects selection of the Pin icon 596, the process proceeds to block 574 which directs the Calculator application to generate state information defining a state of the Calculator application and store the state information in the memory (e.g. in the location 46). In various embodiments, the state information stored in the variable memory 16 may include a display identifier for identifying what the secondary application was displaying at the time that the Pin icon 596 was selected. In this embodiment, the state information may include the second number. The state information stored in the memory may also include a secondary application identifier (i.e. a Calculator application identifier)

Block 574 directs the Calculator application to display the keyboard 104 and to direct the keyboard application manager to display a resume state icon on the display 20 generally as described and shown above having regard to FIG. 17, for example.

Additional blocks stored in block 32 of the program memory 14 then direct the keyboard application manager to detect selection of the resume state icon and upon detecting selection of the resume state icon, the additional blocks direct the keyboard application manager reactivate or reinvoke the Calculator application. The Calculator application is then directed to read the state information stored in the memory (e.g. in the location 46), and using the state information, reactivate or reinvoke the Calculator application, proceeding back to block 564 to display the second number as it was displayed on the display 20 when the Pin icon 596 was selected.

If at block 561 it is determined that the input data includes a formula, the Calculator application is directed to block 563. In various embodiments, the input data may include a formula such as "1300×2=" and thus block 561 would direct the Calculator Application to proceed to block 563.

Block 563 directs the Calculator application to generate a second number based on the formula identified in block 561 and display the second number in the calculator box 364. For example, where the formula is "1300*2=", the Calculator application would generate the second number to be 2600. The process may then proceed to block 566 and continue as described above.

Calendar

In various embodiments, the plurality of patterns detectable by the keyboard application manager include Appointment patterns for identifying appointments and applying the category test involves determining whether the input data from the user (e.g. the input data stored in the location 38 of the variable memory 16) includes one of the Appointment patterns to determine whether the input data falls within an Appointment category. In such embodiments block 202 may apply the category test to the entirety of the input data to determine whether the input data includes text which indicates that the user is referring to an appointment. In some variations, for example, the Appointment patterns include appointment related text, such as for example: "meet", "meeting", "get together", "lunch", "dinner", or some other appointment related input pattern. In various embodiments the Appointment patterns also include time related text such as for example, the following: "November", "December", "Monday", "noon", or some other appointment time-related input pattern. In various embodiments the keyboard application manager does not determine that the input data falls within the Appointment category until the keyboard application manager determines that the input data includes one of the appointment related text and one of the time related text and thus includes one of the appointment patterns. In the embodiment shown in FIG. 31 where for illustration purposes the input data includes the words "meeting" and "November", block 202 may direct the keyboard application manager to determine that the input data falls within the Appointment category.

Figure 31:
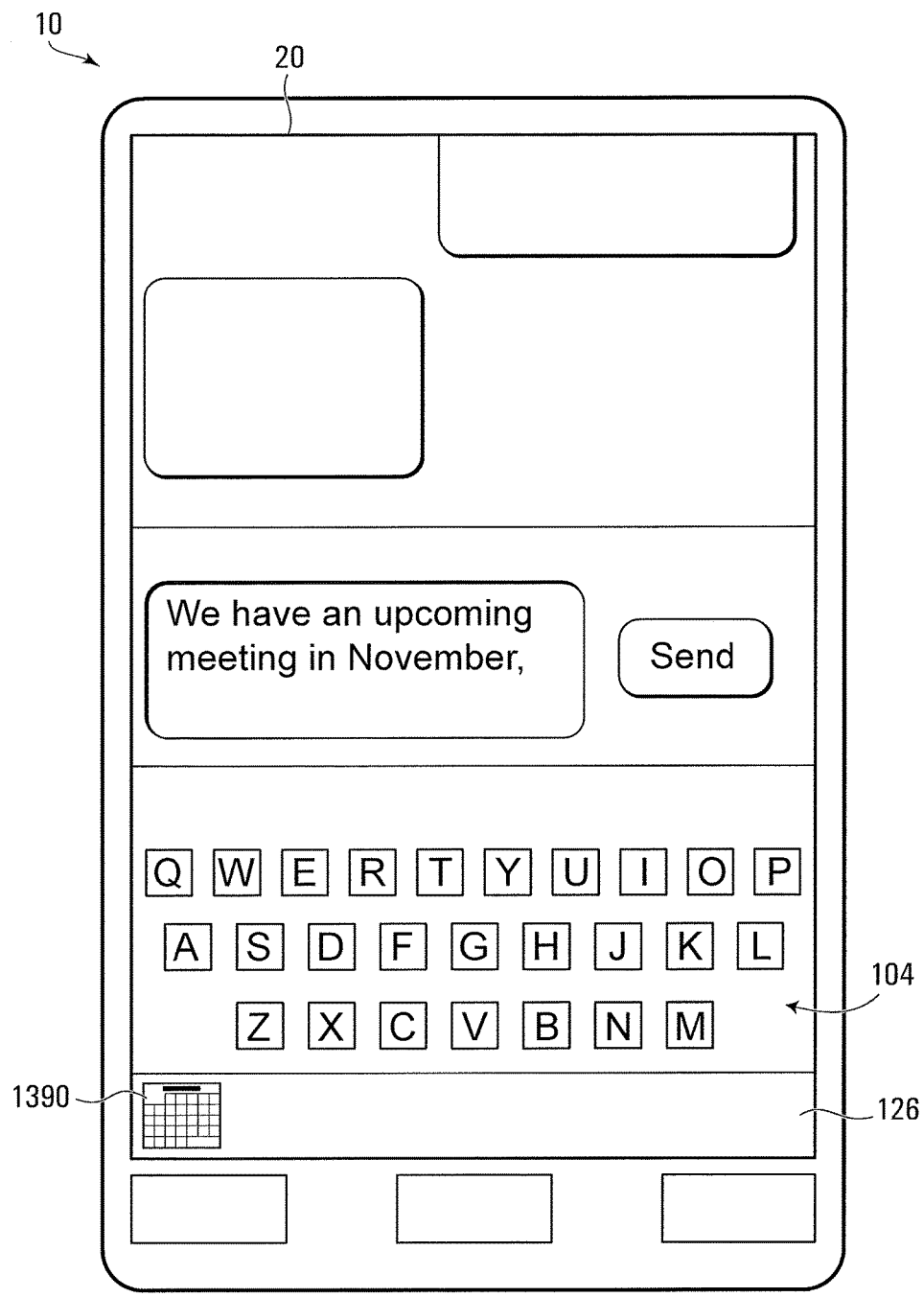
FIG. 31 is a front view of the personal computing device shown in FIG. 18 including a display showing a screenshot in accordance with one embodiment of the invention.
Figure 32:
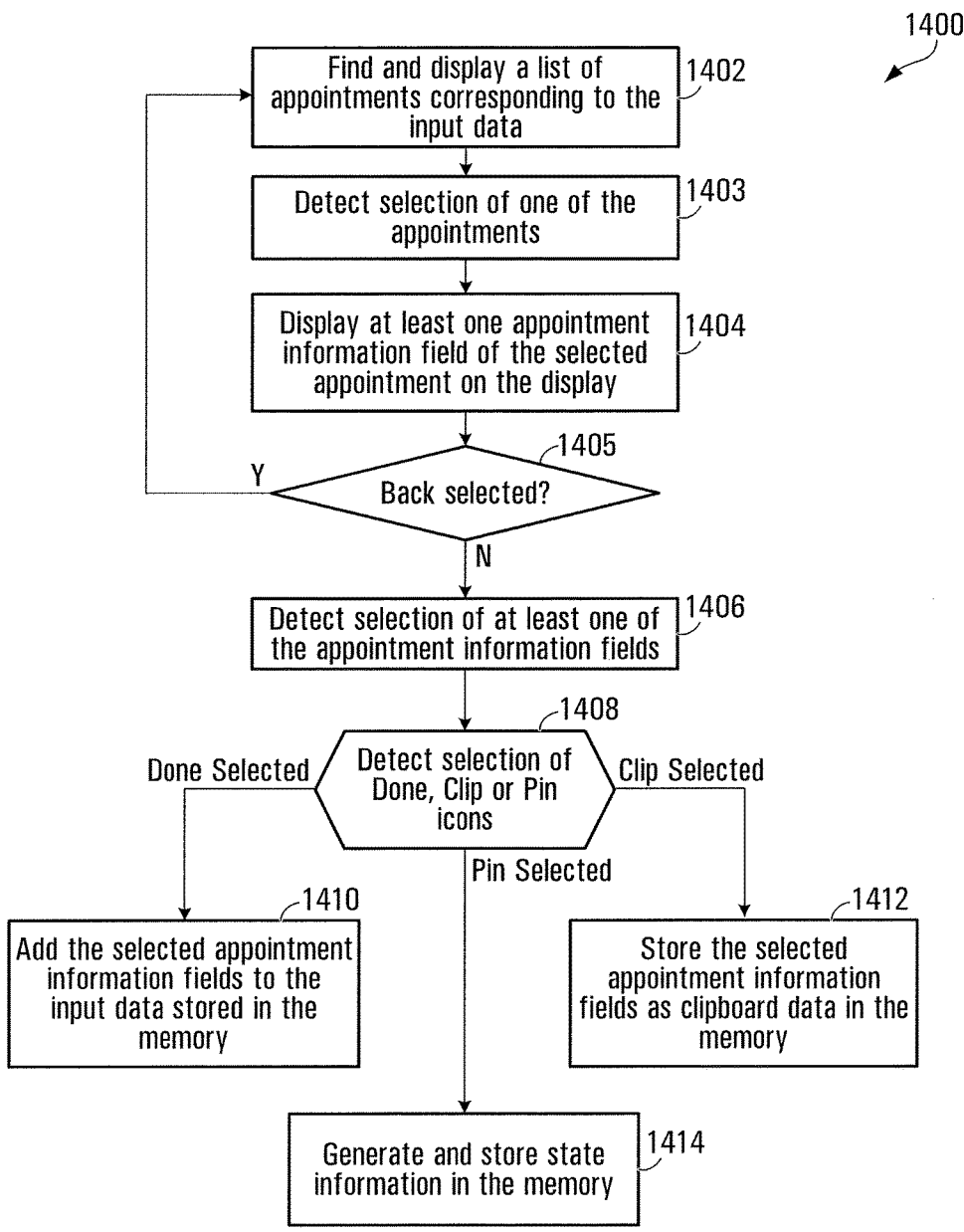
FIG. 32 is a flowchart depicting blocks of code for directing the personal computing device shown in FIG. 18 to effect Calendar application functions in accordance with one embodiment of the invention.

Various secondary applications may be associated with the Appointment category. In some variations, for example, a Calendar application may be provided as a form of secondary application for finding appointments related to input data received by the user and may be associated with the Appointment category. The Calendar application serves as a secondary application that is in cooperative communication with the keyboard application manager. In various embodiments, the Calendar application may be stored in block 34 of the program memory 14 shown in FIG. 18. In such embodiments, a Calendar application data structure having a similar format to the Contact Manager application data structure 240 shown in FIG. 6, but including an Appointment category identifier may be stored in memory (e.g. in location 44 of the variable memory 16). Accordingly, block 204 may direct the keyboard application manager to display a Calendar icon 1390 on the display 20, in the status notification bar 126, as shown in FIG. 31, for user selection when the input data from the user includes an appointment pattern recognized by the keyboard application manager as falling within the Appointment category. In the embodiment shown in FIG. 31, for illustration purposes the keyboard application manager is directed to display the Calendar icon 1390 on the display 20 since the input data includes both the words "meeting" and "November". In various embodiments, if at block 206, the keyboard application manager detects selection of the Calendar icon 1390, the keyboard application manager is directed to activate or invoke the Calendar application by invoking a flowchart 1400 as shown in FIG. 32.

As described for the flowchart 300 shown in FIG. 11, the flowchart 1400 may be encoded in a different block of codes from the block of codes 32 and, more particularly, the flowchart 1400 may be encoded in a Calendar application block of codes within the block of codes 34. Thus, in various embodiments, the flowchart 1400 depicts a process effected by the Calendar application. In various embodiments, the flowchart 1400 may include generally similar processes as those involved in the flowchart 300 shown in FIG. 11.

The flowchart 1400 begins with block 1402 which directs the Calendar application to find one or more appointments (if any are available) associated with the input data and to display the one or more appointments disclosed (or a subset of the results found if a plurality of matching appointments are found) for user selection.

In various embodiments, appointments may be stored in memory locally (e.g. in location 68 of the variable memory 16) or remotely accessible via a server or remote network device. In various embodiments, the Calendar application may invoke a calendar-based device application (a "Calendar Device application") that provides additional or more robust calendar functionality to find the one or more appointments. Examples of such a calendar-based device application include the calendar applications available on Android™, the calendar applications available on iOS™, the Google™ Calendar application available online, the Outlook™ application, or another calendar application operable locally on the personal computing device or remotely via the personal computing device.

Each appointment includes appointment-related information. For example, the appointments may include an appointment time and appointment details. In the embodiment shown in FIG. 31, where the input data for illustration purposes includes the words "meeting in November", identification of the time-related text portion of the input data (e.g. "meeting" and "November", "November" or "meeting in November"), block 1402 may direct the Calendar application to find and display at least one appointment from memory having an appointment time corresponding to the month of November.

Block 1403 directs the Calendar application to detect user selection of one of the displayed appointments.

Block 1404 directs the Calendar application to display at least one of the appointment information fields of the selected appointment on the display 20, for selection by the user. In the embodiment shown, block 1404 also directs the Calendar application to display a Back icon, a Done icon, a Clip icon, and a Pin icon on the display 20 for user selection.

Block 1405 directs the Calendar application to determine whether the Back icon has been selected by the user, and if the Back icon has been selected the Calendar application is directed to return to block 1402 to redisplay the list of appointments on the display 20.

Block 1406 then directs the Calendar application to detect selection of at least one of the appointment information fields.

Block 1408 directs the Calendar application to detect selection of one of the Done, Clip and Pin icons. If at block 1408, the Calendar application detects selection of the Done icon, the process proceeds to block 1410.

Block 1410 directs the Calendar application to add the selected at least one of the appointment fields to the input data stored in memory (e.g. in location 38 of the variable memory 16) and cause the keyboard to be redisplayed.

In various embodiments block 1410 may also direct the Calendar application to include connecting text with the selected appointment information fields and add the connecting text and the selected appointment information fields to the input data.

If at block 1408, the Calendar application detects selection of the Clip icon, the process proceeds to block 1412. Block 1412 directs the Calendar application to store the selected at least one of the appointment fields in memory (e.g. in location 39 for storing clipboard copied data) for later insertion into the input data or another editable field, document or file. In various embodiments, block 1412 may direct the Calendar application to cause the keyboard to be redisplayed. However in other embodiments, block 1410 may direct the Calendar application to continue to display the contact information fields, generally similar to as described above having regard to block 312 shown in FIG. 11.

If at block 1408, the Calendar application detects selection of the Pin icon, the process proceeds to block 1414. Block 1414 directs the Calendar application to generate state information defining a state of the Calendar application and to store the state information in the variable memory 16 (e.g. in the location 46) for further use. Block 1414 also directs the Calendar application to cause the keyboard to be redisplayed and to cause the keyboard application manager to display a resume state icon on the display 20 generally as described and shown above having regard to FIG. 17, for example.

In various embodiments, a user may select one of the appointment fields using an alternative selection method, such as, for example, by double clicking on or gesturing to the appointment field or by selecting a button or selectable region of the display associated with making the appointment field available for editing. If a user selects one of the appointment fields using the alternative selection method, the Calendar application may launch a calendar-based device application (e.g. the Calendar Device application referred to earlier above) to open and edit the selected one of the appointment fields. In launching the Calendar Device application, the Calendar application may send the Calendar Device application information, such as an identifier associated with the selected one of the appointment fields.

Task List/Personal Management

In various embodiments, the plurality of patterns detectable by the keyboard application manager include Task List patterns for identifying input data associated with task lists and applying the category test involves determining whether the input data from the user (e.g. the input data stored in the location 38 of the variable memory 16) includes one of the Task List patterns to determine whether the input data falls within a Task List category. In such embodiments block 202 may direct the keyboard application manager to determine whether the input data includes one of the Task List patterns. In various embodiments, the Task List patterns may include the following text, for example: "grocery", "groceries", "list", "store", "milk", or some other task-related input pattern.

Figure 33:
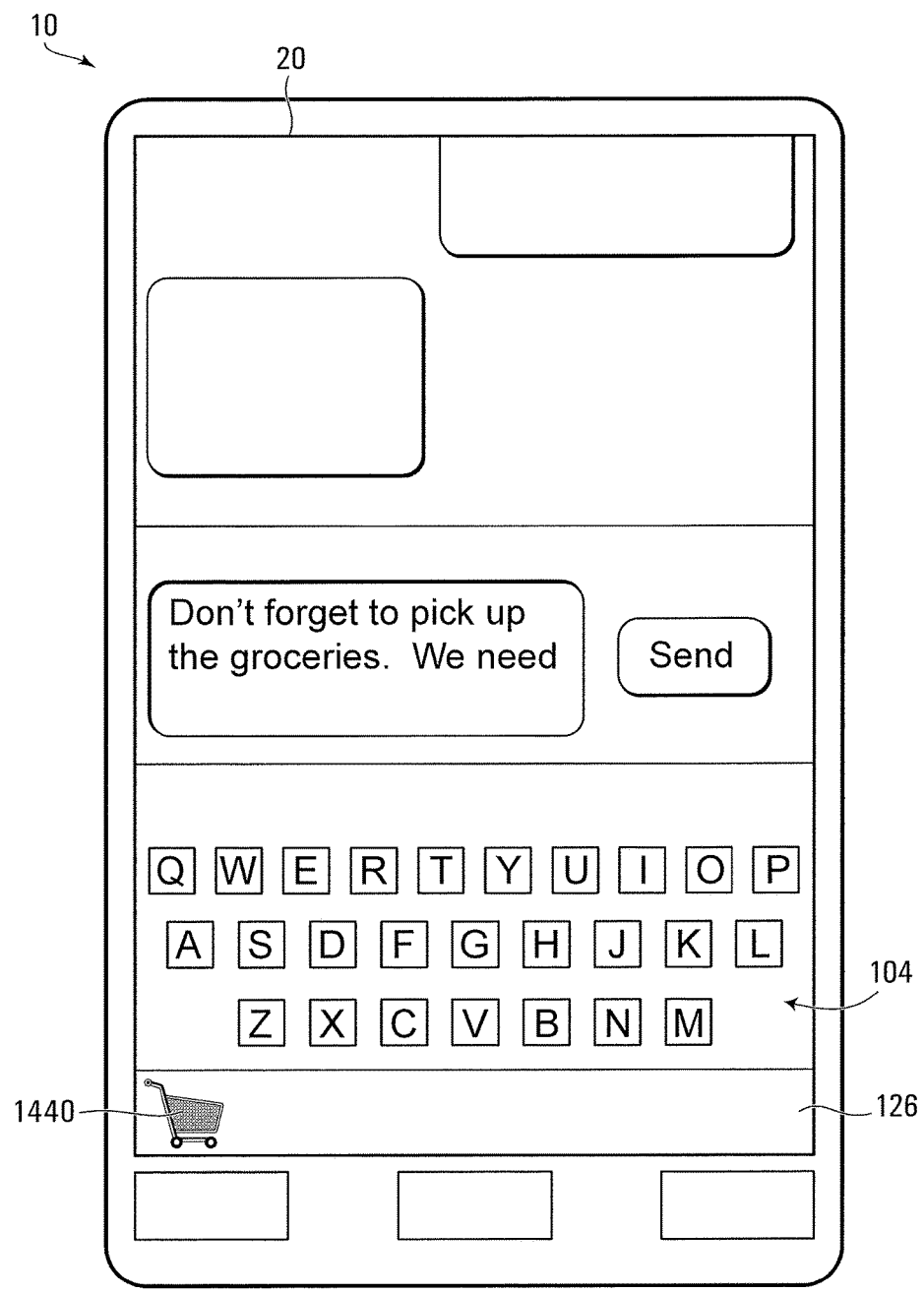
FIG. 33 is a front view of the personal computing device shown in FIG. 18 including a display showing a screenshot in accordance with one embodiment of the invention.
Figure 34:
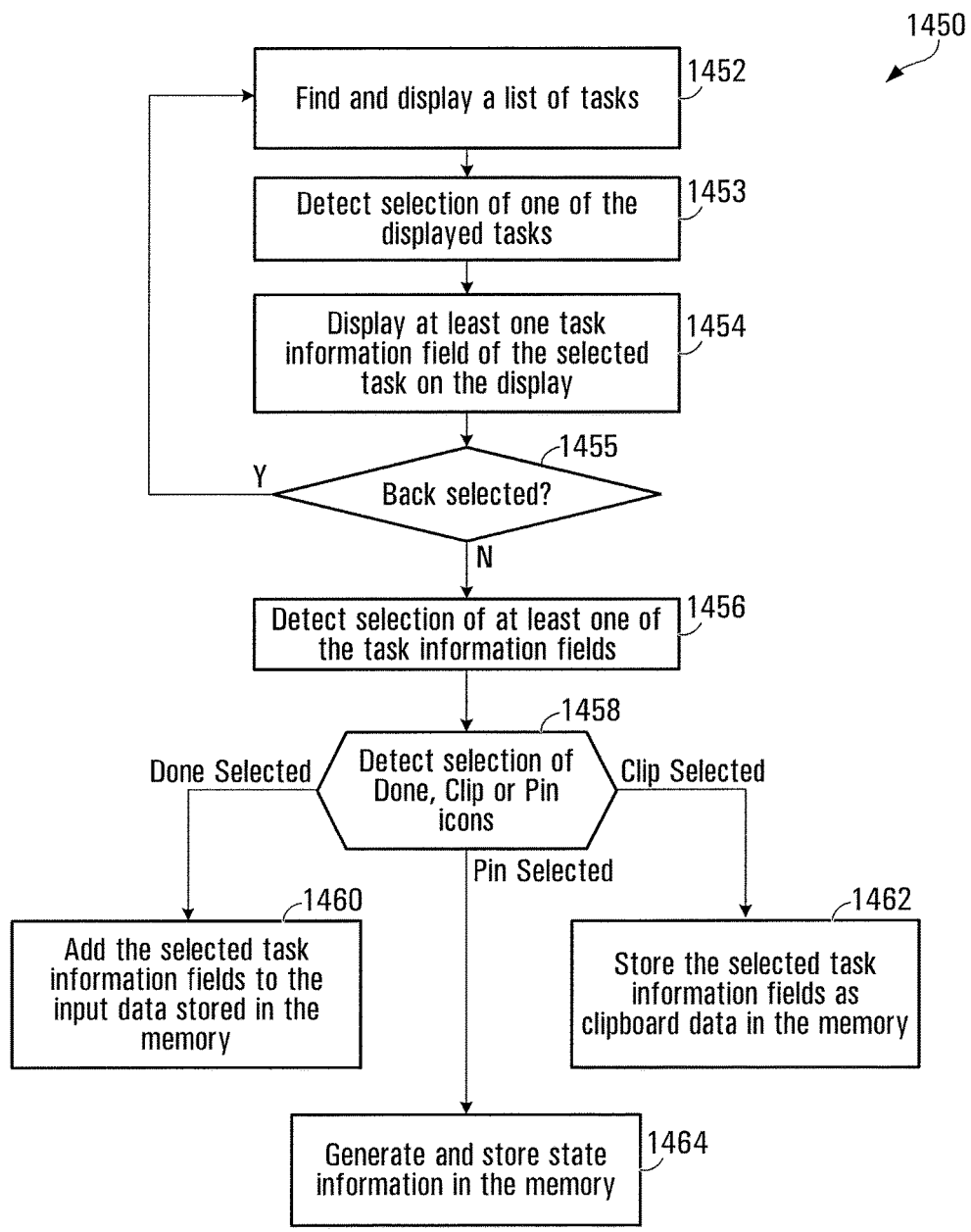
FIG. 34 is a flowchart depicting blocks of code for directing the personal computing device shown in FIG. 18 to effect Task List application functions in accordance with one embodiment of the invention.

Various secondary applications may be associated with the Task List category. In some variations, for example, a Task List application may be provided as a form of secondary application for finding and displaying tasks which may relate to the input data received from the user and may be associated with the Task List category. In various embodiments, the Task List application may be defined in the block 34 of the program memory 14 shown in FIG. 18. In such embodiments, a Task List application data structure having a similar format to the Contact Manager application data structure 240 shown in FIG. 6, but including a Task List category identifier may be stored in memory (e.g. in the location 44 of the variable memory 16). Accordingly, block 204 as shown in FIG. 5 may direct the keyboard application manager to display a Task List icon 1440 on the display 20, as shown in FIG. 33, for user selection when the input data from the user includes one of the Task List patterns and thus falls within the Task List category. In the embodiment shown in FIG. 33, the keyboard application manager is directed at block 204 to display the Task List icon 1440 on the display 20 since the input data includes one of Task list patterns, (i.e. "groceries"). If at block 206, the keyboard application manager detects selection of the Task List icon 1440, the keyboard application manager is directed to activate or invoke the Task List application by invoking a flowchart 1450 as shown in FIG. 34. In various embodiments, the flowchart 1450 may include generally similar processes as those involved in the flowchart 300 shown in FIG. 11.

As described for the flowchart 300 shown in FIG. 11, the flowchart 1450 may be encoded in a different block of codes from the block of codes 32 and, more particularly, the flowchart 1450 may be encoded in a Task List application block of codes within the block of codes 34. Thus, in various embodiments, the flowchart 1450 depicts a process effected by the Task List application.

The flowchart 1450 begins with block 1452 which directs the Task List application to find and display a list of tasks for user selection. In various embodiments the Task List application may find and display only tasks related to the input data. For example, for illustration purposes in the embodiment shown in FIG. 33, where the input data includes the word "groceries", the Task List application may find and display only grocery related tasks, such as a shopping list. In various embodiments, tasks may be stored in a server in communication with the personal computing device 10 via a network such as the one or more networks 27 shown in FIG. 18, for example. In various embodiments, the user may need to login to an account on the server in order to access the tasks. Some exemplary tasks may be "Buy groceries", "Return library books", or "order stationery" for example.

Block 1453 directs the Task List application to detect user selection of one of the displayed tasks.

Block 1454 directs the Task List application to display at least one task information field related to the selected task on the display 20, for selection by the user. Some exemplary task information fields may be a task name, a date, a time, or a type of task. Thus, for example, the task information fields of a particular task may be "Return library books", "February 1", "1:00 pm", and "Work" as the task name, date, time, and type of task respectively. In various embodiments, the task information fields of a particular task may include a list of items that are on a grocery list task, for example. Block 1454 also directs the Task List application to display a Back icon, a Done icon, a Clip icon, and a Pin icon on the display 20 for user selection.

Block 1455 directs the Task List application to determine whether the Back icon has been selected by the user, and if the Back icon has been selected the Task List application is directed to return to block 1452 to redisplay the list of tasks on the display 20.

Block 1456 then directs the Task List application to detect selection of at least one of the task information fields.

Block 1458 directs the Task List application to detect selection of one of the Done, Clip and Pin icons. If at block 1458, the Task List application detects selection of the Done icon, the process proceeds to block 1460.

Block 1460 directs the Task List application to add the selected at least one of the task information fields to the input data stored in memory (e.g. in the location 38 of the variable memory 16) and cause the keyboard to be redisplayed. In various embodiments block 1460 may also direct the Task List application to include connecting text with the selected task information fields and add the connecting text and the selected task information fields to the input data.

If at block 1458, the Task List application detects selection of the Clip icon, the process proceeds to block 1462. Block 1462 directs the Task List application to store the selected at least one of the task fields in memory (e.g. in the location 39 for storing clipboard copied data) for later insertion into the input data or another editable field or document. In various embodiments, block 1457 may direct the Task List application to cause the keyboard to be redisplayed. However in other embodiments, block 1457 may direct the Task List application to continue to display the task information fields, generally similar to as described above having regard to block 312 shown in FIG. 11.

If at block 1458, the Task List application detects selection of the Pin icon, the process proceeds to block 1464.

Block 1464 directs the Task List application to generate state information defining a state of the Task List application and store the state information in memory (e.g. in the location 46 of the variable memory 16). Block 1464 also directs the Task List application to cause the keyboard to be redisplayed and cause the keyboard application manager to display a resume state icon on the display 20 generally as described and shown above having regard to FIG. 17, for example.

Music List

In various embodiments, the plurality of patterns detectable by the keyboard application manager include Music patterns for identifying input data associated with Music Lists and applying the category test involves determining whether the input data from the user (e.g. the input data stored in the location 38 of the variable memory 16) includes one of the Music patterns to determine whether the input data falls within a Music category. In such embodiments block 202 may direct the keyboard application manager to determine whether the input data includes one of the Music patterns. In various embodiments, the Music patterns may include, for example, the following text: "song", "band", "album", "music", "hear", or some other music-related input pattern.

Figure 35:
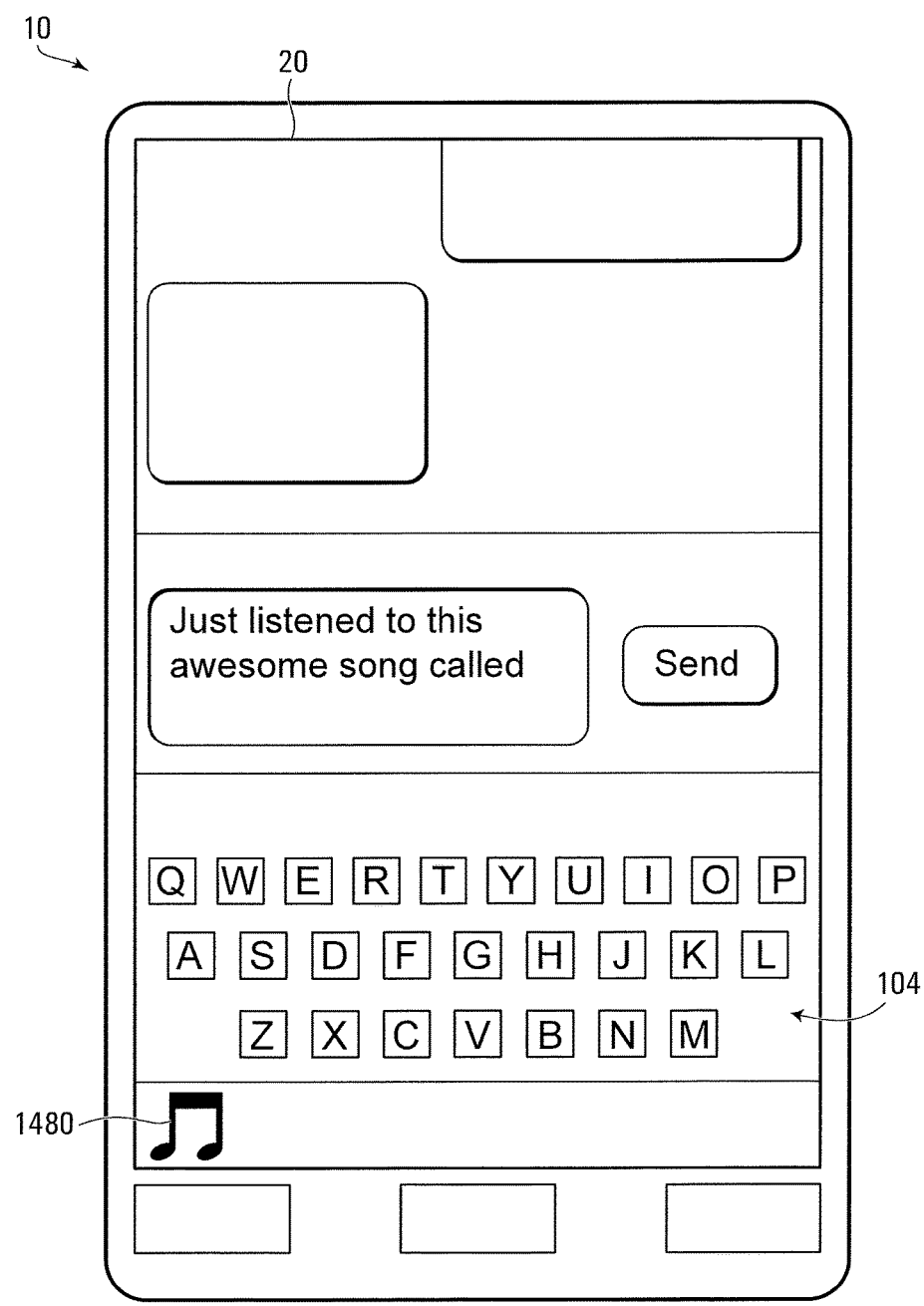
FIG. 35 is a front view of the personal computing device shown in FIG. 18 including a display showing a screenshot in accordance with one embodiment of the invention.
Figure 36:
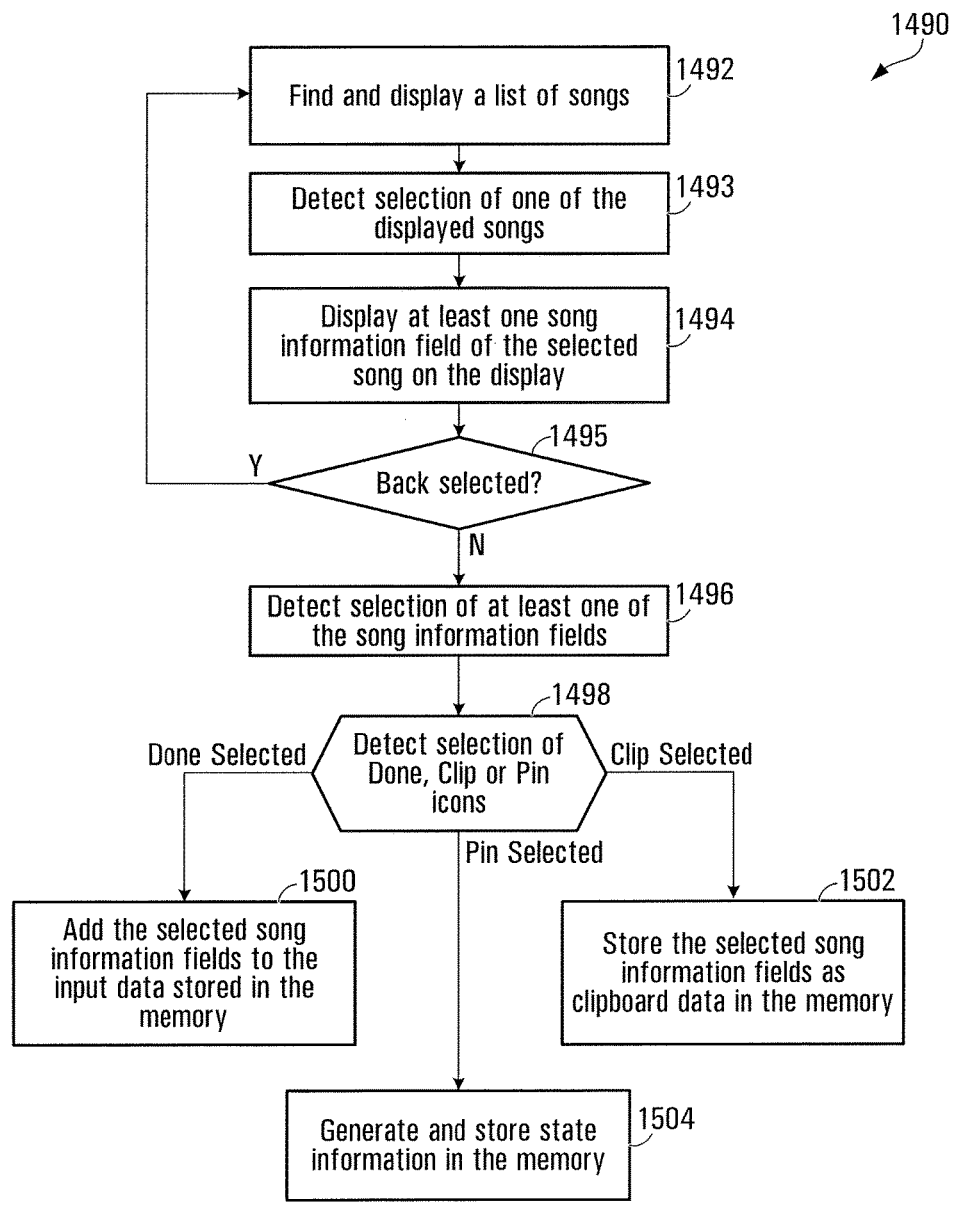
FIG. 36 is a flowchart depicting blocks of code for directing the personal computing device shown in FIG. 18 to effect Music List application functions in accordance with one embodiment of the invention.

Various secondary applications may be associated with the Music category. In some variations, for example, a Music List application may be provided as a form of secondary application for finding and displaying music related to the input data received from the user and may be associated with the Music category. In various embodiments, the Music List application may be defined in the block 34 of the program memory 14. In such embodiments, a Music List application data structure having a similar format to the Contact Manager application data structure 240 shown in FIG. 6, but including a Music category identifier may be stored in memory (e.g. in the location 44 of the variable memory 16). Accordingly, block 204 shown in FIG. 5 may direct the keyboard application manager to display a Music List icon 1480 on the display 20, as shown in FIG. 35, for user selection when the input data from the user includes a Music pattern. In the embodiment shown in FIG. 35, the keyboard application manager is directed to display the Music List icon 1480 on the display 20 since the input data includes the text, "song". In various embodiments, if at block 206, the keyboard application manager detects selection of the Music List icon 1480, the keyboard application manager is directed to activate or invoke the Music List application by invoking a flowchart 1490 as shown in FIG. 36.

As described for the flowchart 300 shown in FIG. 11, the flowchart 1490 may be encoded in a different block of codes from the block of codes 32 and, more particularly, the flowchart 1490 may be encoded in a Music List application block of codes within the block of codes 34. Thus, in various embodiments, the flowchart 1490 depicts a process effected by the Music List application. In various embodiments, the flowchart 1490 may include generally similar processes as those involved in the flowchart 300 shown in FIG. 11.

The flowchart 1490 begins with block 1492 which directs the Music List application to find and display a list of songs for user selection. In various embodiments the Music List application may find and display only songs related to the input data. For example, if the input data included the word "country", the Music List application may find and display only country songs. In various embodiments, the songs are stored in memory (e.g. in the location 47 of the variable memory 16). In various embodiments, the songs may be stored on a server in communication with the personal computing device 10 through a network, such as the one or more networks 27 shown in FIG. 18, for example. In various embodiments, the user may need to login to an account in order to access the songs. In various embodiments, the songs displayed at block 1492 are songs that have been most recently listened to, downloaded or accessed by the user. In various embodiments, the block 1492 may direct the Music List application to display a list of other music such as, for example, albums or artists instead of the list of songs.

Block 1493 directs the Music List application to detect user selection of one of the displayed songs.

Block 1494 directs the Music List application to display at least one song information field related to the selected song on the display 20, for selection by the user. Some exemplary song information fields may be a song title, album name, artist name, recording date, or genre of the song. Block 1494 also directs the Music List application to display a Back icon, a Done icon, a Clip icon, and a Pin icon on the display 20 for user selection.

Block 1495 directs the Music List application to determine whether the Back icon has been selected by the user, and if the Back icon has been selected the Music List application is directed to return to block 1492 to redisplay the list of songs on the display 20.

Block 1496 then directs the Music List application to detect selection of at least one of the song information fields.

Block 1498 directs the Music List application to detect selection of one of the Done, Clip and Pin icons. If at block 1498, the Music List application detects selection of the Done icon, the process proceeds to block 1500.

Block 1500 directs the Music List application to add the selected at least one of the song information fields to the input data stored in memory (e.g. in the location 38 of the variable memory 16) and cause the keyboard to be redisplayed. In various embodiments block 1500 may also direct the Music List application to include connecting text with the selected song information fields and add the connecting text and the selected song information fields to the input data.

If at block 1498, the Music List application detects selection of the Clip icon, the process proceeds to block 1502. Block 1502 directs the Music List application to store the selected at least one of the song information fields in memory (e.g. in the location 39 for storing clipboard copied data) for later insertion into the input data or another editable field or document. In various embodiments, block 1498 directs the Music List application to cause the keyboard to be redisplayed. However in other embodiments, block 1498 may direct the Music List application to continue to display the song information fields, generally similar to as described above having regard to block 312 shown in FIG. 11.

If at block 1498, the Music List application detects selection of the Pin icon, the process proceeds to block 1504. Block 1504 directs the Music List application to generate state information defining a state of the Music List application and store the state information in memory (e.g. in the location 46 of the variable memory 16). Block 1504 also directs the Music List application to cause the keyboard to be redisplayed and cause the keyboard application manager to display a resume state icon on the display 20 generally as described and shown above having regard to FIG. 17, for example.

Advertising Application

In various embodiments, the plurality of patterns detectable by the keyboard application manager include Advertisement patterns for identifying text that corresponds to a particular product to be advertised and applying the category test involves determining whether the input data from the user (e.g. the input data stored in the location 38 of the variable memory 16) includes one of the Advertisement patterns to determine whether the input data falls within an Advertisement category.

In certain embodiments, the Advertisement category may be a Vehicle Sale category and block 202 may direct the keyboard application manager to determine whether the input data includes text that corresponds to vehicles, such as for example: "Chevrolet™", Ford™, "Toyota™", "Honda™", "new car", or "new truck", etc to determine whether the input data falls within a Vehicle Sale category.

Figure 37:
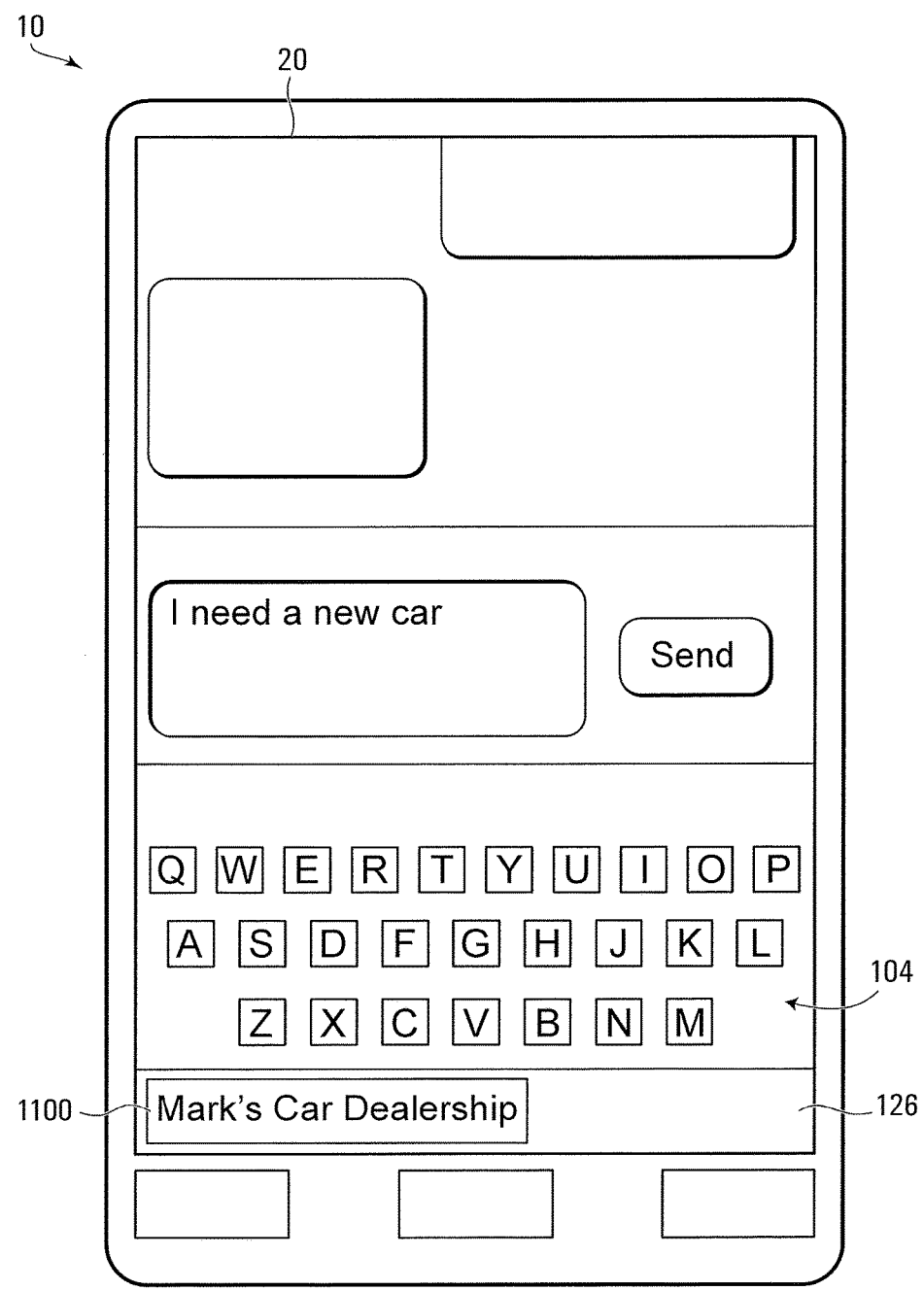
FIG. 37 is a front view of the personal computing device shown in FIG. 18 including a display showing a screenshot in accordance with one embodiment of the invention.

Various secondary applications may be associated with certain Advertisement categories. In some variations, for example, a Vehicle Advertisement application may be provided as a form of secondary application for finding and displaying vehicle advertisements related to the input data received from the user and may be associated with the Vehicle Sale category. In such embodiments, the Vehicle Advertisement application may be defined in the block 34 of the program memory 14 shown in FIG. 18. In such embodiments, a Vehicle Advertisement application data structure having a similar format to the Contact Manager application data structure 240 shown in FIG. 6, but including an Vehicle category identifier may be stored in the variable memory 16 (e.g. in the location 44). Accordingly, block 204 may direct the keyboard application manager to display a Vehicle Advertisement icon 1100 on the display 20 for user selection, as shown in FIG. 37, when the input data from the user includes a text that corresponds to vehicles. In the embodiment shown in FIG. 37, the keyboard application manager is directed to display the Vehicle Advertisement icon 1100 on the display 20 because the input data includes text corresponding to vehicles (i.e. "new car").

In various embodiments, an Advertisement icon such as the Vehicle Advertisement icon 1100 need not be displayed in the status notification bar 126. In various embodiments, the Advertisement icon may be displayed above, below, within, above, or to the side of the keyboard 104, for example. In some embodiments the Advertisement icon may be displayed below the status notification bar 126. In some embodiments, the Advertisement icon may not be selectable by the user, and acts merely as an advertisement. In various embodiments the Advertisement icon may be a banner advertisement.

Figure 38:
FIG. 38 is a depiction of a block of code for directing the personal computing device shown in FIG. 18 to effect Advertisement application functions in accordance with one embodiment of the invention.

In various embodiments, if at block 206, the keyboard application manager detects selection of an Advertisement icon such as the Vehicle advertisement icon 1100, the keyboard application manager is directed to invoke a block 1110, as shown in FIG. 38.

The block 1110 may be encoded in a different block of codes from the block of codes 32 and, more particularly, the block 1110 may be encoded in an Advertisement application block of codes within the block of codes 34. Thus, the block 1110 depicts a process effected by the Advertisement application.

Block 1110 directs the Advertisement application to activate or invoke a device application associated with the Advertisement application. In one embodiment, block 1110 directs the Advertisement application to invoke a web browser application and to open a website associated with the Advertisement application on the web browser application. For example, in the embodiment described above with regard to FIGS. 37 and 38, the Vehicle Advertisement application may be directed to open a website associated with "Mark's Car dealership".

One of ordinary skill in the art would understand that various advertisement applications associated with various patterns in the input data may be similarly implemented.

Recently Used Applications

In various embodiments, the plurality of patterns detectable by the keyboard application manager may include a recently used secondary application identifier and applying the category test may involve determining whether the input data from the user (e.g. the input data stored in location 38 of the variable memory 16) includes the recently used secondary application identifier to determine whether the input data falls within a Recently Used Application category. A list of identifiers corresponding to recently used secondary applications may be stored, for example in location 48 of the variable memory 16 as shown in FIG. 18. In various embodiments, block 202 shown in FIG. 5 may thus direct the keyboard application manager to determine whether the input data includes a secondary application identifier corresponding to a secondary application identifier stored in location 48 of the variable memory 16 to determine whether the input data falls within a particular Recently Used Application category.

In various embodiments, for example, where the Contact Manager identifier 242, as shown in FIG. 6, comprises the text, "Contact Manager", and the Contact Manager identifier 242 is stored in memory as a recently used application (e.g. in the location 48), block 202 may direct the keyboard application manager to determine whether the input data includes the text, "Contact Manager" to determine whether the input data falls within a Recently Used Contact Manager category. As shown in FIG. 6, the Contact Manager application data structure includes a Recently Used Contact Manager category identifier 254 and thus, the keyboard application manager may be directed to display the Contact Manager icon on the display 20 if the keyboard application manager determines that the input data stored in memory (e.g. in the location 38 of the variable memory 16) includes the text, "Contact Manager" and thus falls within the Recently Used Contact Manager category. Other well known symbolic mechanisms may be used for tracking which applications have been recently used including, for example, a queue.

In various embodiments, there is provided a Recently Installed Application Category similar to the Recently Used Application category except that Recently Installed Application identifiers rather than the Recently Used Application identifiers are stored in the memory, such as at the location 65 shown in FIG. 18, and compared to the input data.

In various embodiments, there is provided a Relevant Application Category similar to the Recently Used Application category except that Relevant Application identifiers rather than the Recently Used Application identifiers are stored in memory and compared to the input data. Relevancy of secondary applications may be based on relevancy criteria using methods known to persons skilled in the art for determining whether secondary applications are relevant based on their relevancy to the input data.

Persistent Applications

In various embodiments, one or more secondary applications act as persistent applications that may be accessed by the user at any time and are associated with icons which are persistently displayed on the display 20 or are otherwise persistently accessible to the user (e.g. via a pop-up display, window or notification bar). In various embodiments, the persistent applications may not be associated with any category monitored by the keyboard application manager and instead their icons may be persistently shown by the keyboard application manager, without determining whether the icons are stored in association with a category within which the input data falls.

In various other embodiments, a Persistent category may be provided which is assigned as being active or always determined to be fulfilled. Accordingly, secondary applications associated with the Persistent category are configured to act as persistent applications and may always have an associated icon displayed on the display 20 or which is otherwise accessible to the user. In various embodiments, the user may control which of the secondary applications are associated with the Persistent category.

Search Applications

Figure 39:
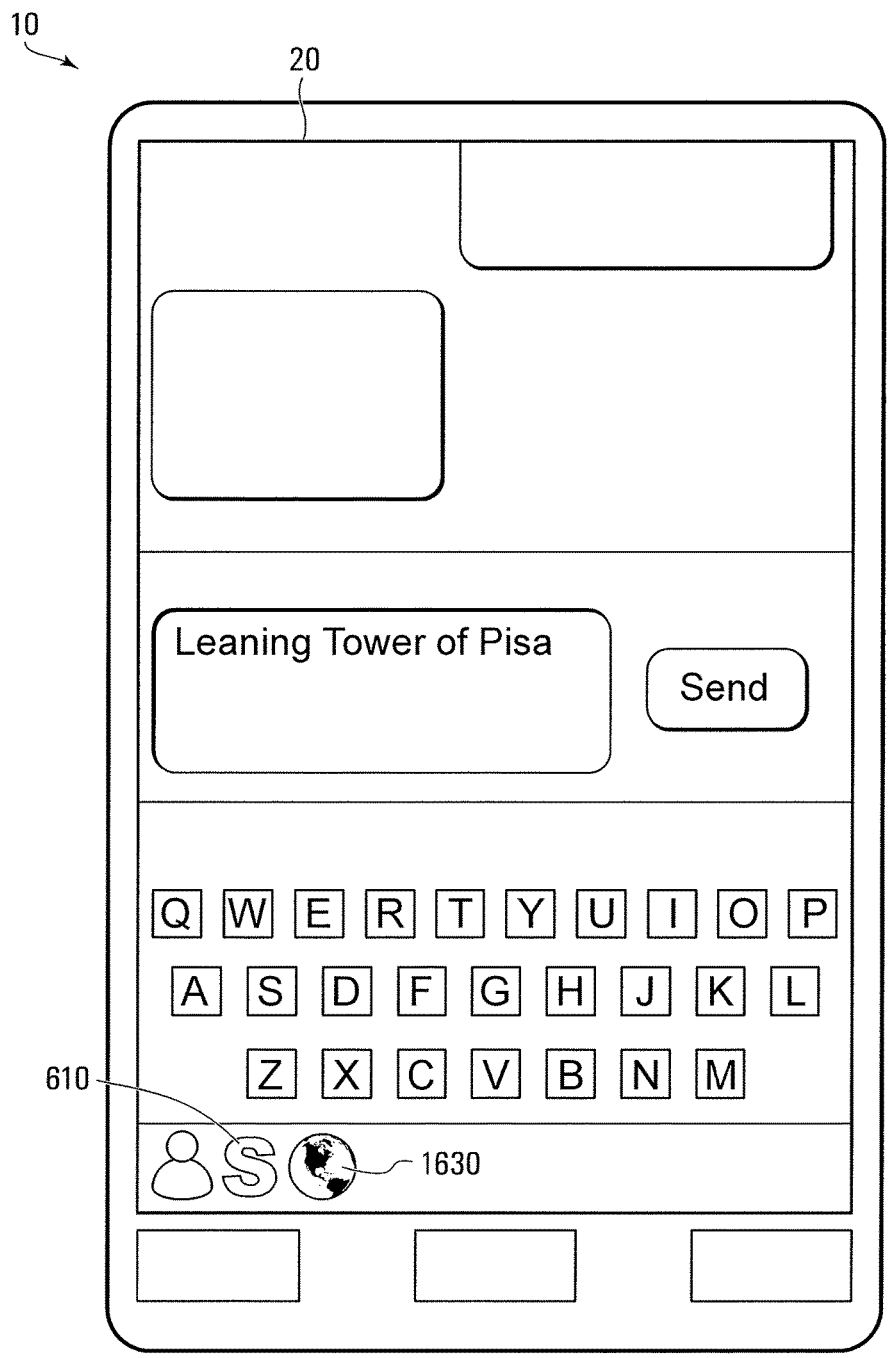
FIG. 39 is a front view of the personal computing device shown in FIG. 18 including a display showing a screenshot in accordance with one embodiment of the invention.
Figure 40:
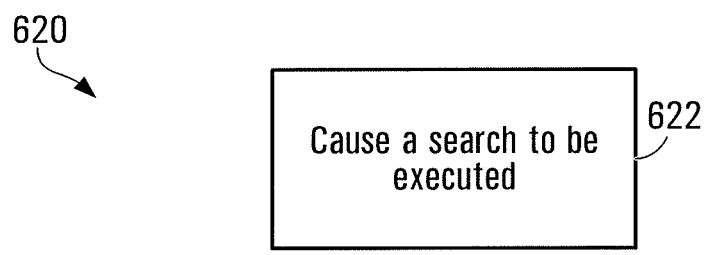
FIG. 40 is a flowchart depicting blocks of code for directing the personal computing device shown in FIG. 18 to effect Search application functions in accordance with one embodiment of the invention.

In various embodiments, a Search application may be provided as a form of secondary application for searching for information and may be associated with the Persistent category. In various embodiments, the Search application may be defined in the block 34 of the program memory 14 shown in FIG. 18. In such embodiments, a Search application data structure having a similar format to the Contact Manager application data structure 240 shown in FIG. 6, but including a Persistent category identifier, may be stored in the variable memory 16 (e.g. in the location 44). Accordingly, block 204 shown in FIG. 5 may direct the keyboard application manager to, for example, display a Search icon 610 on the display 20 for user selection, as shown in FIG. 39, whenever the input data is found to fall into the Persistent category (i.e., optionally at all times). In various embodiments, if at block 206, the keyboard application manager detects selection of the Search icon 610, the keyboard application manager is directed to activate or invoke the Search application (e.g. by invoking causing a search to be executed as illustrated by flowchart 620 in FIG. 40).

As described for the flowchart 300 shown in FIG. 11, the flowchart 620 may be encoded in a different block of codes from the block of codes 32. For example, the flowchart 620 may be encoded in a Search application block of codes within the block of codes 34. Thus, in various embodiments, the flowchart 620 depicts a process effected by the Search application once activated or invoked.

The flowchart 620 begins at block 622 which directs the Search application to cause a search to be executed. In various embodiments, block 622 directs the Search application to invoke a device application to execute a search. The device application may be a web browser application or a device search application and block 622 may direct the Search application to cause the device application to search for text included in the input data. In the embodiment shown in FIG. 39, where for illustration purposes the input data includes the text, "Leaning Tower of Pisa", block 622 may direct the Search application to invoke a web browser application to search for "Leaning Tower of Pisa", such as by a Google™ web search site (e.g. www.google.com). In various embodiments, other search websites or search applications may be used, such as a news website or news application, or a website or application associated with Twitter™, a social media website such as Facebook™, or Yellowpages™, for example, to search for the text included in the input data.

In various embodiments, the web site or search application may use location information to provide yet more search results. For example, location information may be retrieved via the GPS receiver and transmitter 21, the NFC receiver and transmitter 23, the I/O interface 18 as shown in FIG. 18, and stored in memory (e.g. in the location 52 of the variable memory 16). In some variations, for example, the GPS receiver and transmitter 21 may determine the location information using GPS information, the NFC receiver and transmitter 23 may determine the location information using TecTiles™, and the I/O interface 18 may determine the location information by analyzing connection data such as a wireless Service Set Identifier ("SSID"). In some embodiments, the I/O interface 18 may also or alternatively determine the location information using Wi-Fi™ triangulation or mobile phone tower triangulation. In various embodiments, the personal computing device 10 may include an altimeter and at least a portion of the location information may be retrieved via the altimeter. In various embodiments, the personal computing device 10 may include a camera which has taken and stored an image of a portion of the environment surrounding or proximate to the personal computing device 10. The location information may be retrieved based on image identification or point of interest processing based on the image of the environment. In other embodiments, other equivalent forms of location determination may be used to determine the location information.

Figure 41:
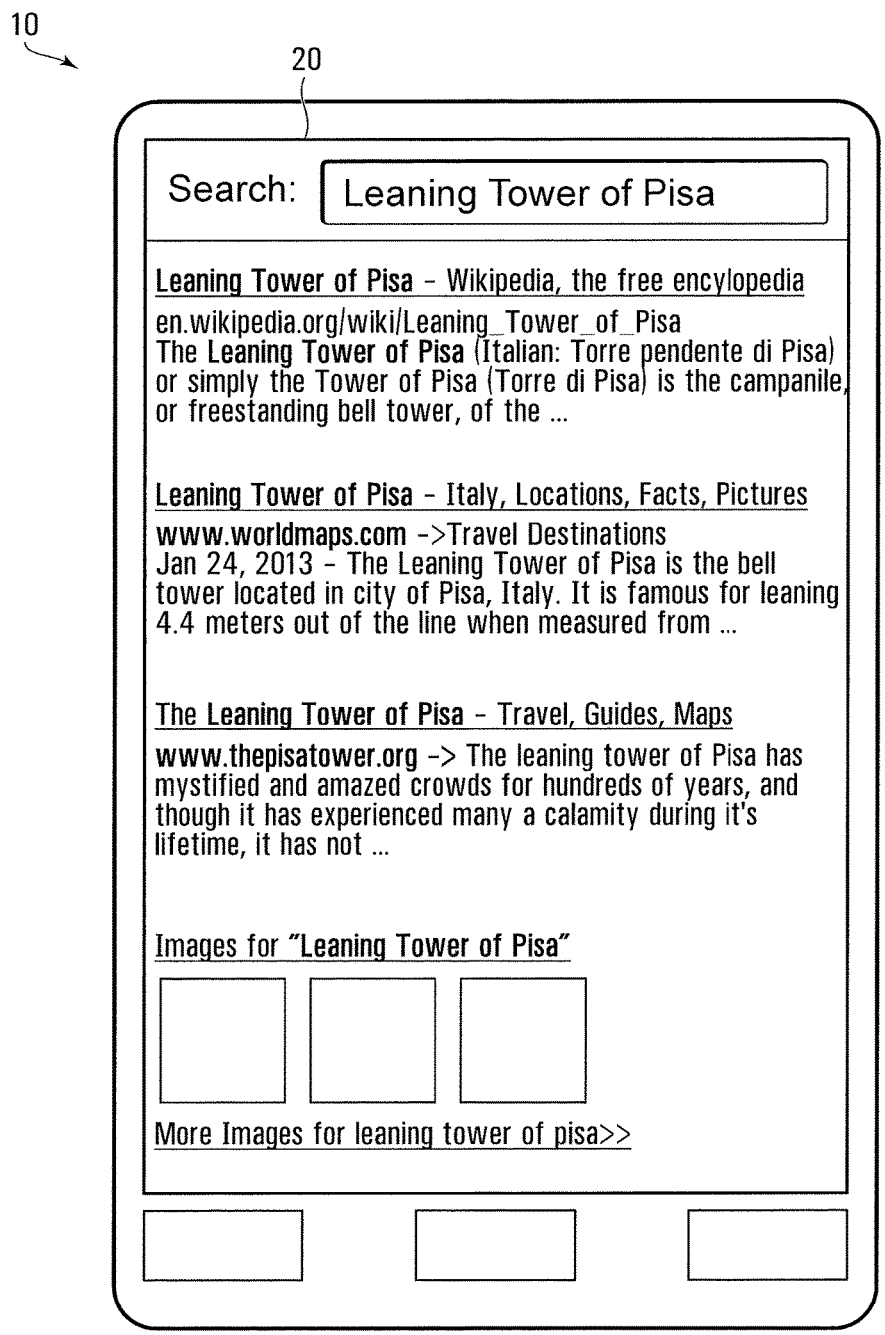
FIG. 41 is a front view of the personal computing device shown in FIG. 18 including a display showing a screenshot in accordance with one embodiment of the invention.

In various embodiments, the invoked device application may display the results of the search on the display 20, as shown in FIG. 41 and the user may interact with the invoked device application as they normally would.

In various embodiments, the device application invoked at block 622 may be associated with advertising. For example, where block 622 invokes a web browser, the web browser may be directed to a website associated with an advertising company (e.g. www.groupon.com for Groupon™). In such embodiments, the device application invoked at block 622 may find and display advertisements or deals based on location information of the personal computing device 10, a time of day, or the input data received from the user (e.g. stored in the location 38 of the variable memory 16), for example. In various embodiments, the device application invoked at block 622 may display a Quick Response ("QR") code on the display 20, the QR code being associated with a particular advertisement or deal.

In various embodiments, block 622 directs the Search application to execute a search as described above and display results of the search on the display 20, optionally without using a device application. In such embodiments, the Search application may act generally similarly to the search device applications described above.

Location-Related Application

Figure 42:
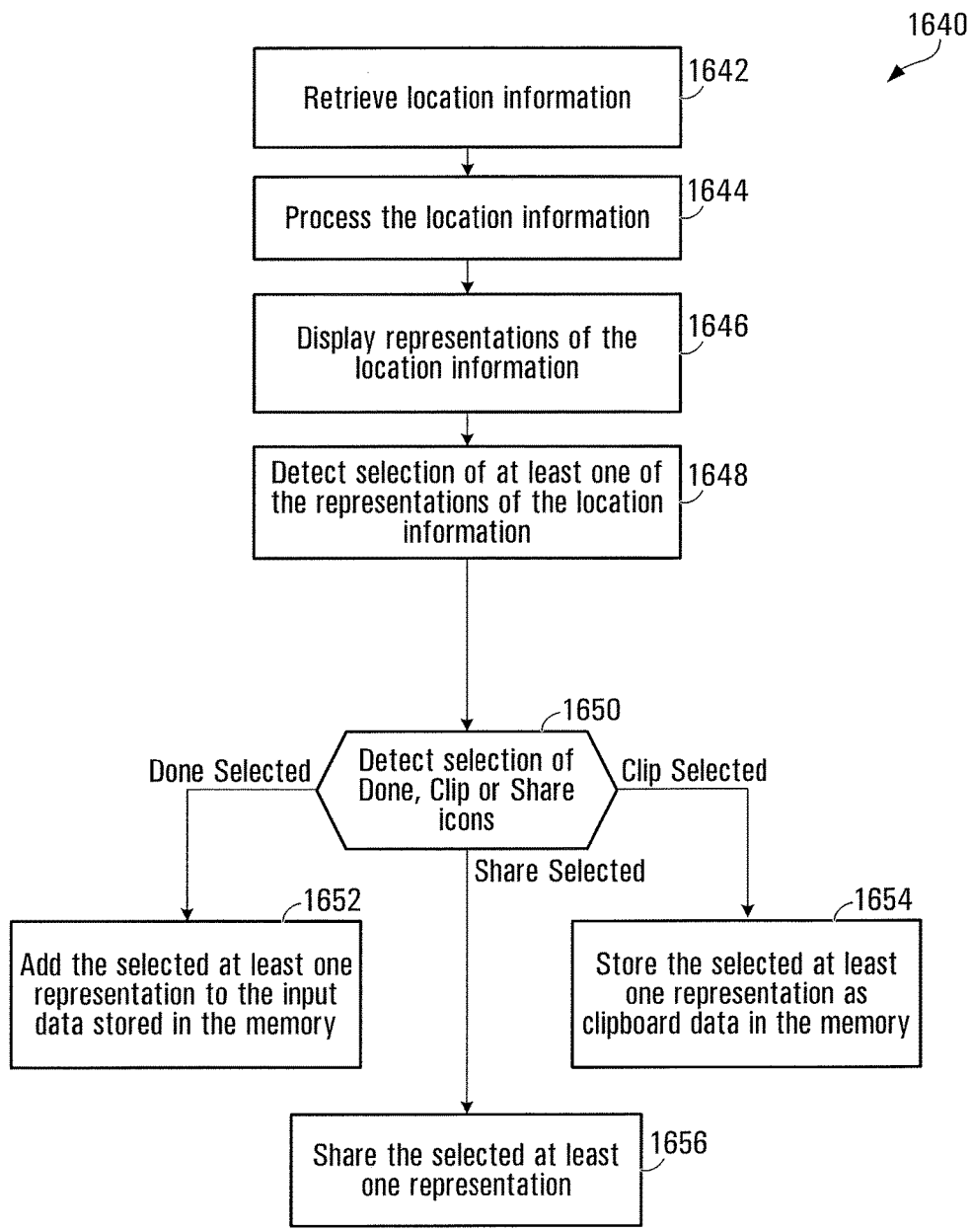
FIG. 42 is a flowchart depicting blocks of code for directing the personal computing device shown in FIG. 18 to effect Location Related application functions in accordance with one embodiment of the invention.

In various embodiments, a Location Related application may be provided as one form of secondary application for retrieving and processing location information may be associated with the Persistent category. In various embodiments, the Location Related application may be defined in the block 34 of the program memory 14 shown in FIG. 18. In such embodiments, a Location Related application data structure having a similar format to the Contact Manager application data structure 240 shown in FIG. 6, but including a Persistent category identifier, may be stored in the variable memory 16 (e.g. in the location 44). Accordingly, block 204 shown in FIG. 5 may direct the keyboard application manager to display a Location Related icon 1630 on the display 20 for user selection, as shown in FIG. 39 optionally at all times. In various embodiments, if at block 206, the keyboard application manager detects selection of the Location Related icon 1630, the keyboard application manager is directed to activate or invoke the Location Related application by invoking a flowchart 1640 as shown in FIG. 42.

As described for the flowchart 300 shown in FIG. 11, the flowchart 1640 may be encoded in a different block of codes from the block of codes 32 and, more particularly, the flowchart 1640 may be encoded in a Location Related application block of codes within the block of codes 34. Thus, in various embodiments, the flowchart 1640 depicts a process executed by the Location Related application.

The flowchart 1640 begins at block 1642 which directs the Location Related application to retrieve location information. The location information may be retrieved as described above earlier in this specification. In various embodiments, the location information may include a latitude and longitude of the personal computing device 10, for example. In various embodiments, the location information may also or alternatively include a street address, an altitude, or an SSID, for example, Block 1644 then directs the Location Related application to process the location information. In various embodiments, block 1644 directs the Location Related application to produce representations of the location information, based on the location information. Where the location information includes a latitude and longitude, block 1644 may direct the Location Related application to determine a street address associated with the latitude and longitude. In various embodiments, block 1644 may direct the Location Related application to invoke a device application, such as a mapping application in communication with a mapping database over a network, such as the Internet, for example, and/or query the OS running on the personal computing device 10 in order to determine the street address. The determined street address acts as a representation of the location information. In various embodiments, the representation of the location information may include a city or country identification or any other location information associated with a location of the user.

In various embodiments, block 1644 may also direct the Located Related application to retrieve a map image representation of the location information. In various embodiments, block 1644 may direct the Location Related application to invoke a device application, such as a mapping application in communication with a mapping database over a network, such as the Internet, for example, and/or query the operating system running on the personal computing device 10 in order to retrieve the map image representation of the location information.

Figure 43:
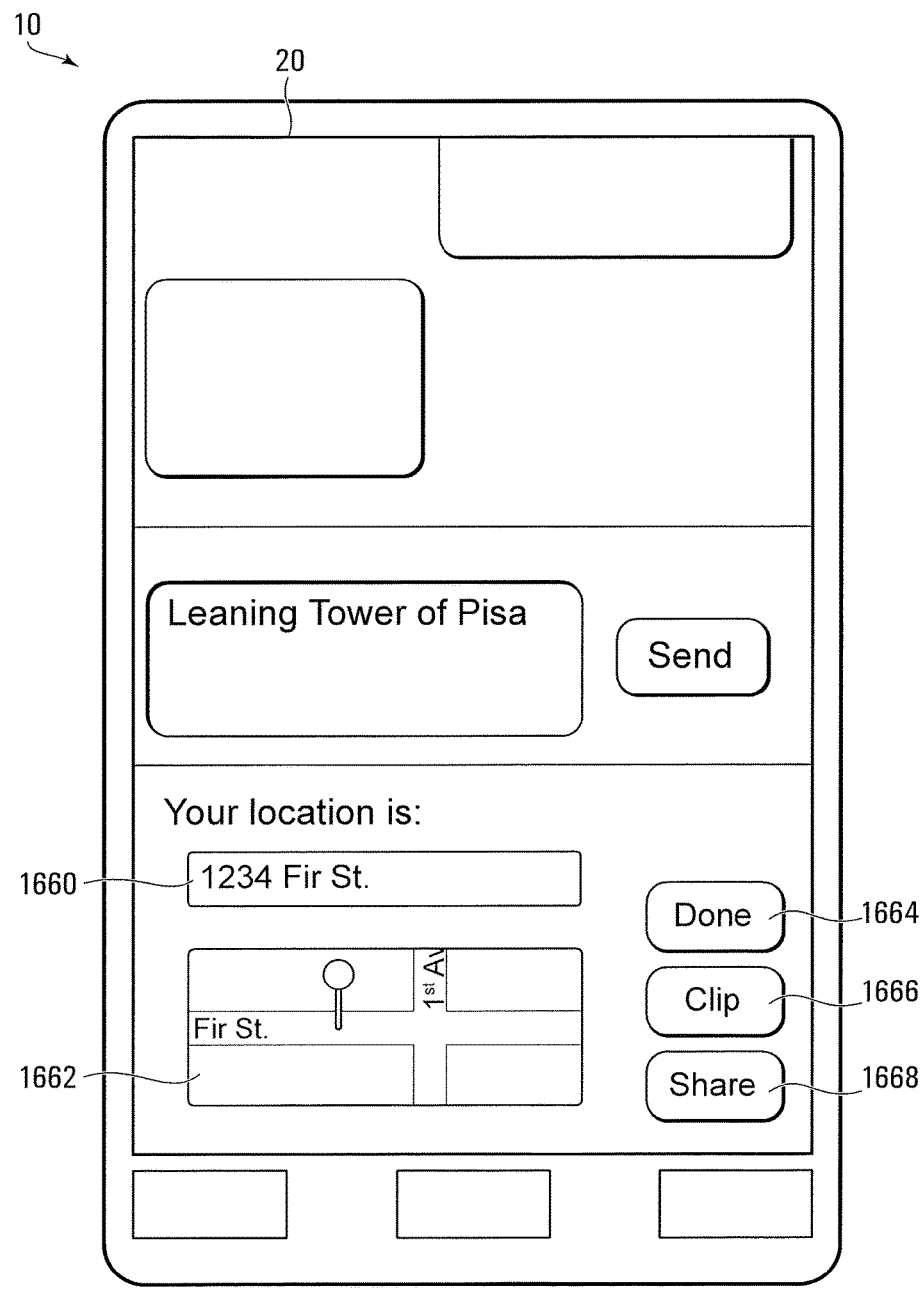
FIG. 43 is a front view of the personal computing device shown in FIG. 18 including a display showing a screenshot in accordance with one embodiment of the invention.

Block 1646 then directs the Location Related application to display the representations of the location information on the display 20. In the embodiment shown in FIG. 43, the location information has been processed at block 1644 to produce a street address representation 1660 and a map image representation 1662 of the location information and block 1646 directs the Location Related application to display these representations on the display 20 at 1660 and 1662 respectively. In the embodiment shown in FIG. 43, the text "Your location is:" is also displayed on the display 20 above the representations 1660 and 1662. Block 1646 directs the Location Related application to display a Done icon 1664, a Clip icon 1666, and a Share icon 1668 on the display 20.

Block 1648 directs the Location Related application to detect selection of at least one of the representations of location information. For various embodiments such as the one illustrated in FIG. 43, block 1648 directs the Location Related application to detect selection of at least one of the street address representation 1660 and the map image representation 1662.

Block 1650 directs the Location Related application to detect selection of one of the Done, Clip, and Share icons 1664, 1666, and 1668. If at block 1650, the Location Related application detects selection of the Done icon 1664, the process proceeds to block 1652.

Block 1652 directs the Location Related application to add the selected at least one representation to the input data stored in memory (e.g. in the location 38 of the variable memory 16) and cause the keyboard to be redisplayed. For example, where the street address representation 1660 has been selected by the user, block 1652 directs the Location Related application to add the street address representation 1660 to the input data stored in memory (e.g. in the location 38 of the variable memory 16) and causes the keyboard to be redisplayed. As with all secondary applications, in various embodiments, the Location Related application may cause the representation of the location information to be added to the input data stored in memory by amending the input data stored in the location 38 of the variable memory 16 directly or by sending the representation of the location information to the keyboard application manager, for example.

If at block 1650, the Location Related application detects selection of the Clip icon 1666, the process proceeds to block 1654. Block 1654 directs the Location Related application to store the selected at least one representation in memory (e.g. in the location 39 for storing clipboard copied data) for later insertion into the input data or another editable field or document. In various embodiments, block 1654 directs the Location Related application to cause the keyboard to be redisplayed. However in other embodiments, block 1654 may direct the Location Related application to continue to display the representations 1660 and 1662, generally similar to as described above having regard to block 312 shown in FIG. 11.

If at block 1650, the Location Related application detects selection of the Share icon 1668, the process proceeds to block 1656. Block 1656 directs the Location Related application to cause the selected at least one representation to be shared. In various embodiments, for example, block 1656 may direct the Location Related application to invoke a device application which may be an email application or a social networking device application such as a version or adaptation of a web browser, a Facebook™ application, a Twitter™ application, or a Google Plus™ application and cause the device application to post the selected at least one representation to a social networking platform (e.g. Facebook™, Twitter™, or Google Plus™).

In alternative embodiments, the Location Related application may not be a persistent application. In some variations, for example, the Location Related application may be associated with a Location Information Available category that is triggered when location information is available for the personal computing device 10. Block 202 may direct the keyboard application manager to determine whether the input data (e.g. as stored in the location 52 of the variable memory 16) includes valid location information to determine whether the input data falls within the Location Information Available category. Location information may be retrieved periodically, as described above. In various embodiments, the location information may include a flag that indicates whether the location information is valid. Thus, in various embodiments, the keyboard application manager determines at block 202 whether the input data (stored in the location 52, for example) includes a flag indicating that the location information is valid to determine whether the input data falls within the Location Information Available category.

In various embodiments, the Location Related application may be associated with a Location Related Pattern category. In such embodiments, the plurality of patterns detectable by the keyboard application manager may include Location Related patterns for identifying input data associated with a user location and applying the category test involves determining whether the input data from the user (e.g. the input data stored in the location 38 of the variable memory 16) includes one of the Location Related patterns to determine whether the input data falls within the Location Related Pattern category. In such embodiments block 202 may direct the keyboard application manager to determine whether the input data includes one of the Location Related patterns. By way of example only, the Location Related patterns may include any or all of the following text: "I am at", "I am lost", "I am almost there", "I am near", "I am leaving", "my coords are", or some other location-related input pattern.

Application Suggestion

Figure 44:
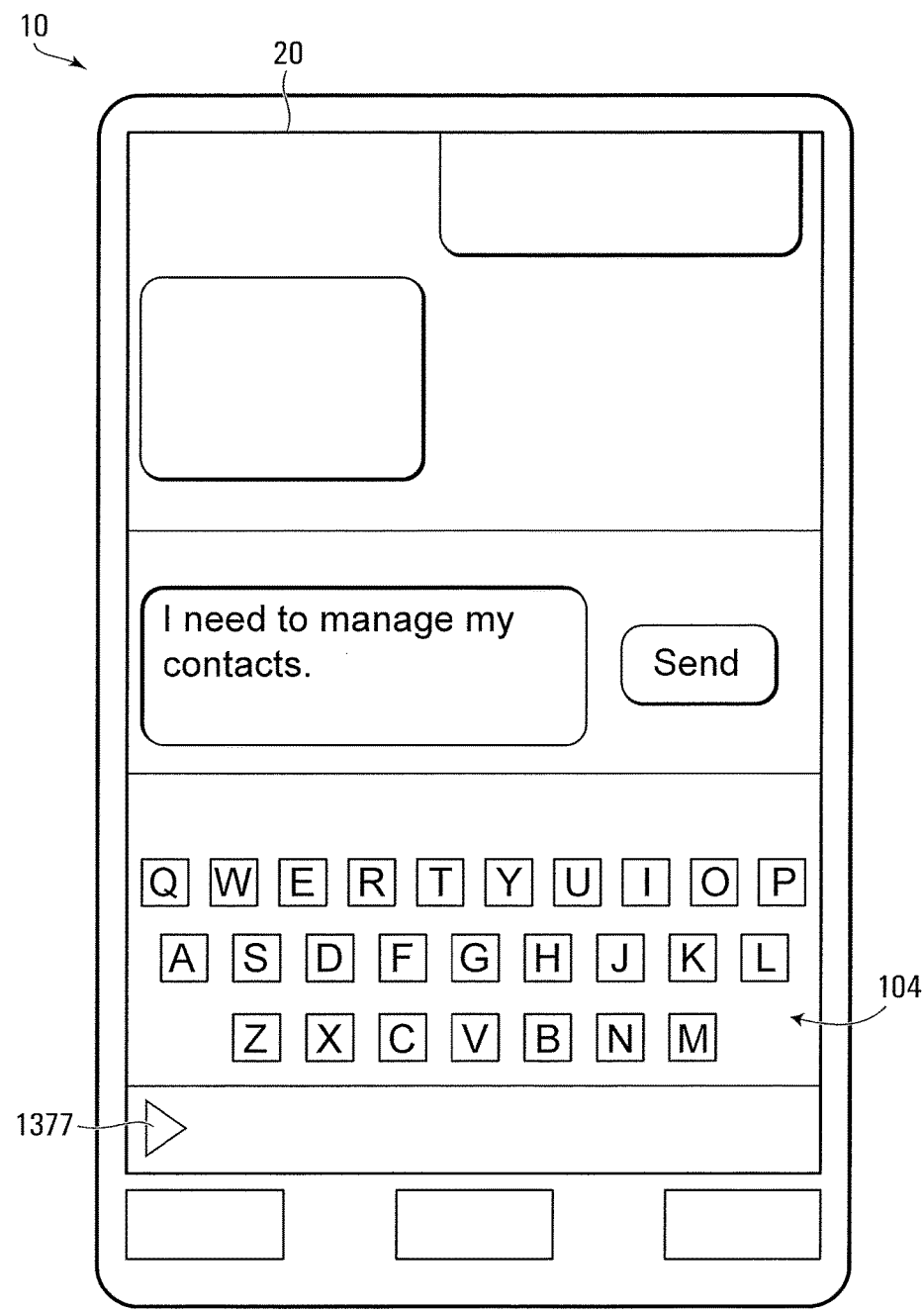
FIG. 44 is a front view of the personal computing device shown in FIG. 18 including a display showing a screenshot in accordance with one embodiment of the invention.
Figure 45:
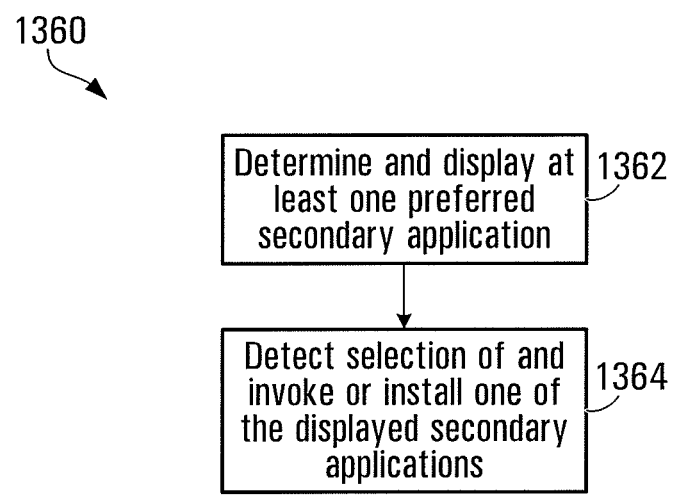
FIG. 45 is a flowchart depicting blocks of code for directing the personal computing device shown in FIG. 18 to effect Application Suggestion application functions in accordance with one embodiment of the invention.

In various embodiments, an Application Suggestion application may be provided as a form of secondary application for finding and displaying applications that the user may wish to invoke. The Application Suggestion application may be associated with the Persistent category. The Application Suggestion application may be defined in the block 34 of the program memory 14 as shown in FIG. 18. In such embodiments, an Application Suggestion application data structure including the Persistent category identifier may be stored in memory (e.g. in the location 44 of the variable memory 16). Accordingly, block 204 shown in FIG. 5 may direct the keyboard application manager to display an Application Suggestion icon 1377 as shown in FIG. 44 on the display 20 for user selection when the keyboard application determines that the input data falls within the Persistent category (i.e. optionally at all times). If at block 206, the keyboard application manager detects selection of the Application Suggestion icon 1377, the keyboard application manager may be directed to activate or invoke a flowchart 1360 as shown in FIG. 45.

As described for the flowchart 300 shown in FIG. 11, the flowchart 1360 may be encoded in a different block of codes from the block of codes 32 and, more particularly, the flowchart 1360 may be encoded in an Application Suggestion application block of codes within the block of codes 34. Thus, in various embodiments, the flowchart 1360 depicts a process effected by the Application Suggestion application.

The flowchart 1360 begins with block 1362 which directs the Application Suggestion application to determine at least one preferred secondary application and display at least one of the preferred secondary applications for user selection. In various embodiments, the preferred secondary applications may be applications which are already installed on the personal computing device 10 or applications which have not been installed on the personal computing device. In various embodiments, the Application Suggestion application may determine whether a particular secondary application is a preferred application by comparing information associated with the particular secondary application with contextual information regarding the personal computing device 10 or the input data. In various embodiments, the information associated with a particular secondary application may be stored in memory.

In various embodiments, the information associated with the secondary application may include a frequency with which the application is used, a time of day when the application is usually used, a location where the application is used, a user selected preference for the application, a keyword associated with the application, social networking information associated with the application (i.e. whether social networking "friends" have indicated a preference for the application), or review information associated with the application. In various embodiments, the above information for a particular application may be compared with other secondary applications' frequency of use, a current time of day, location information of the personal computing device 10, other secondary applications' selected preferences, input data received from the user (e.g. stored in the location 38 of the variable memory 16), other secondary applications' social networking information, or other secondary applications' review information in order to determine whether the particular application is a preferred application.

In various embodiments, block 1364 directs the Application Suggestion application to detect selection of one of the preferred applications, and upon selection, invoke the application or, in some embodiments, if the selected application has not been installed on the personal computing device 10, cause the selected application to be installed on the personal computing device 10.

Context Based

While in the some of the foregoing embodiments, block 202 shown in FIG. 5 has been described as directing the keyboard application manager to apply category tests to input data received via the keyboard program and stored in the location 38, block 202 may also direct the keyboard application manager to apply category tests to input data read from other locations of the variable memory 16. For example, referring to FIG. 18, in various embodiments, input data may be read from the locations 40, 41, 50, and 52 of the variable memory 16, for example, or from a different memory device altogether, including a remote device accessible via a network.

In various embodiments, input data may be generated by the keyboard application manager based on selection of a data input box displayed by a text entry device application and the input data may include a context indicator for indicating the context of data expected to be input into the selected data input box. In various embodiments, the input data may be stored in the variable memory 16 (e.g. in the location 41).

Figure 46:
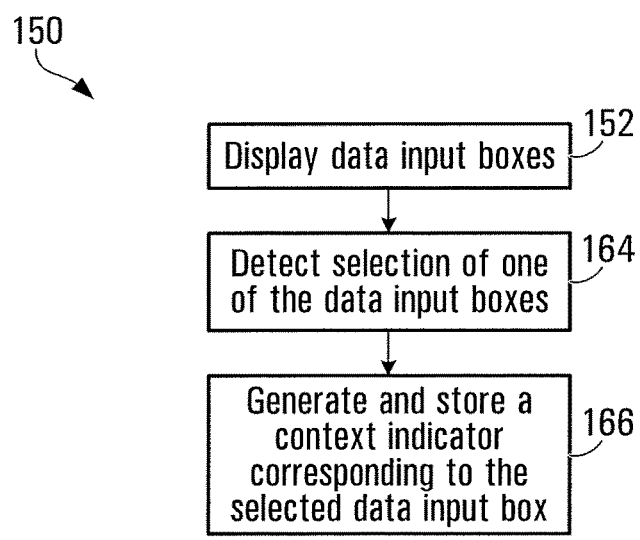
FIG. 46 is a flowchart depicting blocks of code for directing the personal computing device shown in FIG. 18 to perform context generating functions in accordance with one embodiment of the invention.

Referring now to FIG. 46, a flowchart for directing the personal computing device 10 shown in FIG. 18 to perform context generating functions in accordance with various embodiments is shown generally at 150. The flowchart 150 may be encoded in the block of codes 32 for directing the personal computing device 10 to effect keyboard application manager functions or it may be encoded in another block of codes such as the block of codes 36 for directing the personal computing device 10 to effect device application functions, for example. Thus the flowchart 150 may depict a process effected by the keyboard application manager, or by a text entry device application such as a web browser application, or by both.

Figure 47:
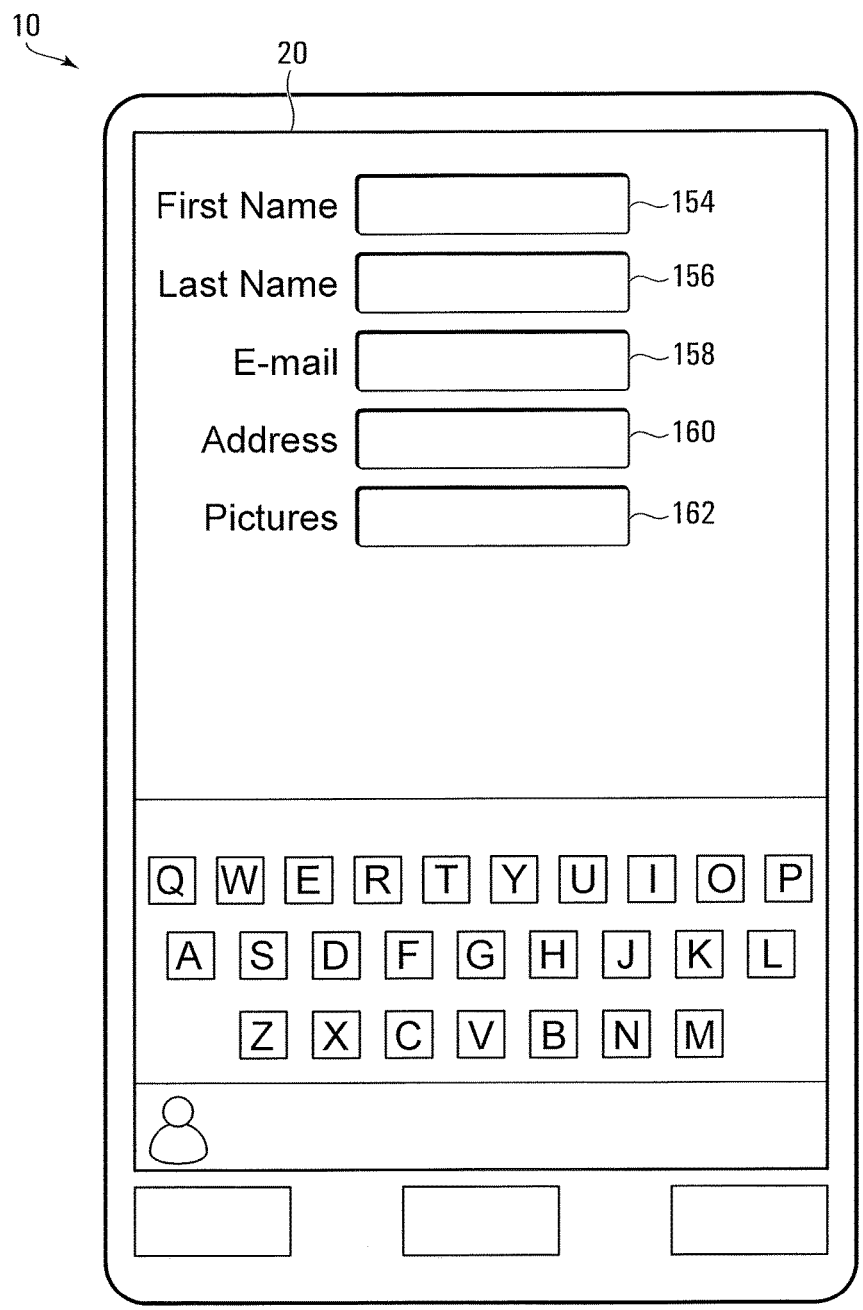
FIG. 47 is a front view of the personal computing device shown in FIG. 18 including a display showing a screenshot in accordance with one embodiment of the invention.

The flowchart 150 begins with block 152 which directs a text entry application to cause the display 20 to display a plurality of data input boxes. In various embodiments, the text entry application may be any text entry application that accepts form-based input such as, for example, a web browser. In the embodiment shown in FIG. 47, the data input boxes include a first name data input box 154, a last name data input box 156, an e-mail data input box 158, an address data input box 160, and an image data input box 162.

Block 164 directs the keyboard application manager to detect selection of one of the data input boxes 154, 156, 158, 160, or 162.

Block 166 directs the keyboard application manager to generate a context indicator corresponding to the selected one of the data input boxes 154, 156, 158, 160, or 162 and to store the generated context indicator as input data in memory (e.g. in the location 41 of the variable memory 16).

In various embodiments, if the keyboard application manager detects selection of the first name data input box 154, then block 166 directs the keyboard application manager to generate a first name context indicator that indicates that input data to be entered in the selected box should be first name data and block 166 directs the keyboard application manager to store the first name context indicator in location 41 of the variable memory 16. If the keyboard application manager detects selection of the last name data input box 156 then block 166 directs the keyboard application manager to generate a last name context indicator indicating that input data to be entered in the selected box expects to receive should be last name data and block 166 directs the keyboard application manager to store the last name context indicator in location 41 of the variable memory 16. If the keyboard application manager detects selection of the e-mail data input box 158 then block 166 directs the keyboard application manager to generate an email context indicator indicating that input data to be entered in the selected box expects to receive should be email data and block 166 directs the keyboard application manager to store the email context indicator in location 41 of the variable memory 16. If the keyboard application manager detects selection of the address data input box 160 then block 166 directs the keyboard application manager to generate an address context indicator indicating that input data to be entered in the selected box expects to receive should be address data and block 166 directs the keyboard application manager to store the address context indicator in location 41 of the variable memory 16. If the keyboard application manager detects selection of the image data input box 162 then block 166 directs the keyboard application manager to generate an image context indicator indicating that input data to be entered in the selected box expects to receive should be image data and block 166 directs the keyboard application manager to store the image context indicator in location 41 of the variable memory 16.

One of ordinary skill in the art would recognize that many other context indicators may be envisioned and used similarly to those described above. In some variations, for example, there is provided a text context indicator, indicating that the input data to be entered in the selected box will include text. In various embodiments, the first name, last name, email, and address context indicators may include the text context indicator. In various embodiments, other data input boxes such as username data input boxes and password data input boxes, for example, associated with corresponding context indicators, may also be implemented similarly. In various embodiments, attachment data input boxes (e.g. for attaching documents to emails) may be associated with a corresponding attachment context indicator.

In various embodiments, context indicators may also include contextual information such as information indicating what application is currently being executed and displayed on the display 20 (e.g. the other contextual information may indicate that a certain social media application is currently being executed).

Context Categories Associated with Certain Secondary Applications

As described above, in various embodiments, block 202 of the flowchart 200 shown in FIG. 5 may direct the keyboard application manager to apply category tests to input data stored in various locations in memory (e.g. in the location 41 of the variable memory 16). In various such embodiments, block 202 may direct the keyboard application manager to determine whether the input data includes a context indicator corresponding to a stored context indicator to determine whether the input data falls within a particular context category. Stored context indicators may be stored in memory (e.g. in the location 62 of the variable memory 16), in association with a category identifier, for example.

In various embodiments, the block 202 may direct the keyboard application manager to determine whether the input data (e.g. as stored in the location 41 of the variable memory 16) includes context indicators corresponding to one of a first name, last name, email, or address context indicator stored in the location 62 of the variable memory 16 to determine whether the input data falls within one of a First Name, Last Name, Email, or Address Context category. In the embodiment shown in FIG. 6, the Contact Manager application data structure 240 includes a First Name Context category identifier 256, a Last Name Context category identifier 258, an Email Context category identifier 260, and an Address Context category identifier 262 and thus block 204 may direct the keyboard application manager to display the Contact Manager icon 244 on the display 20 for selection if the input data (e.g. as stored in the location 41 of variable memory 16) includes a context indicator corresponding to any of a first name context indicator, a last name context indicator, an email context indicator, and an address context indicator and thus is determined to fall within any of the First Name, Last Name, Email, or Address Context categories.

If at block 206 the keyboard application manager detects selection of the Contact Manager icon after the keyboard application manager has determined that the input data falls within one of the First Name, Last Name, Email or Address Context categories described above, which act as contact information context categories, the keyboard application manager may be directed to activate or invoke the Contact Manager application by invoking the flowchart 300 as shown in FIG. 11. In various embodiments, the keyboard application manager may send the input data or the context category identifier corresponding to the context category within which the input data was found to fall to the Contact Manager application. In various embodiments, the block 302 may direct the Contact Manager application to find and display a list of contacts on the display 20, wherein each contact within the list of contacts has a contact information field corresponding to the particular context category within which the input data stored in the location 41 of the variable memory 16 was found to fall. For example, if the keyboard application manager found that the input data falls within the E-mail Context category, block 302 may direct the Contact Manager to find and display a list of contacts on the display, wherein each of the contacts in the list of contacts has a non-null email contact information field.

Further, in various embodiments, block 304 directs the Contact Manager application to include in the at least one contact information field displayed on the display 20, at least one contact information field corresponding to the particular context category within which the input data stored in the location 41 was found to fall. For example, if the keyboard application manager found that the input data falls within the E-mail Context category, block 304 may direct the Contact manager to display at least the email field of the selected contact on the display 20.

Login Management

In various embodiments, block 202 may direct the keyboard application manager to determine whether the input data (e.g. as stored in the location 41 of the variable memory 16) includes a context indicator corresponding to a user name context indicator or a password context indicator to determine whether the input data falls within a Login Management category. In the embodiment shown in FIG. 48, the user has selected a username data input box 650 displayed by a device application, and as described above in FIG. 46, block 166 or a block similar to block 166 directs the keyboard application manager to generate a username context indicator and store the username context indicator as input data (e.g. in the location 41 of the variable memory 16). In this embodiment, the keyboard application manager determines at block 202 that the input data includes a context indicator corresponding to a user name context indicator and thus falls within a Login Management category.

Figure 48:
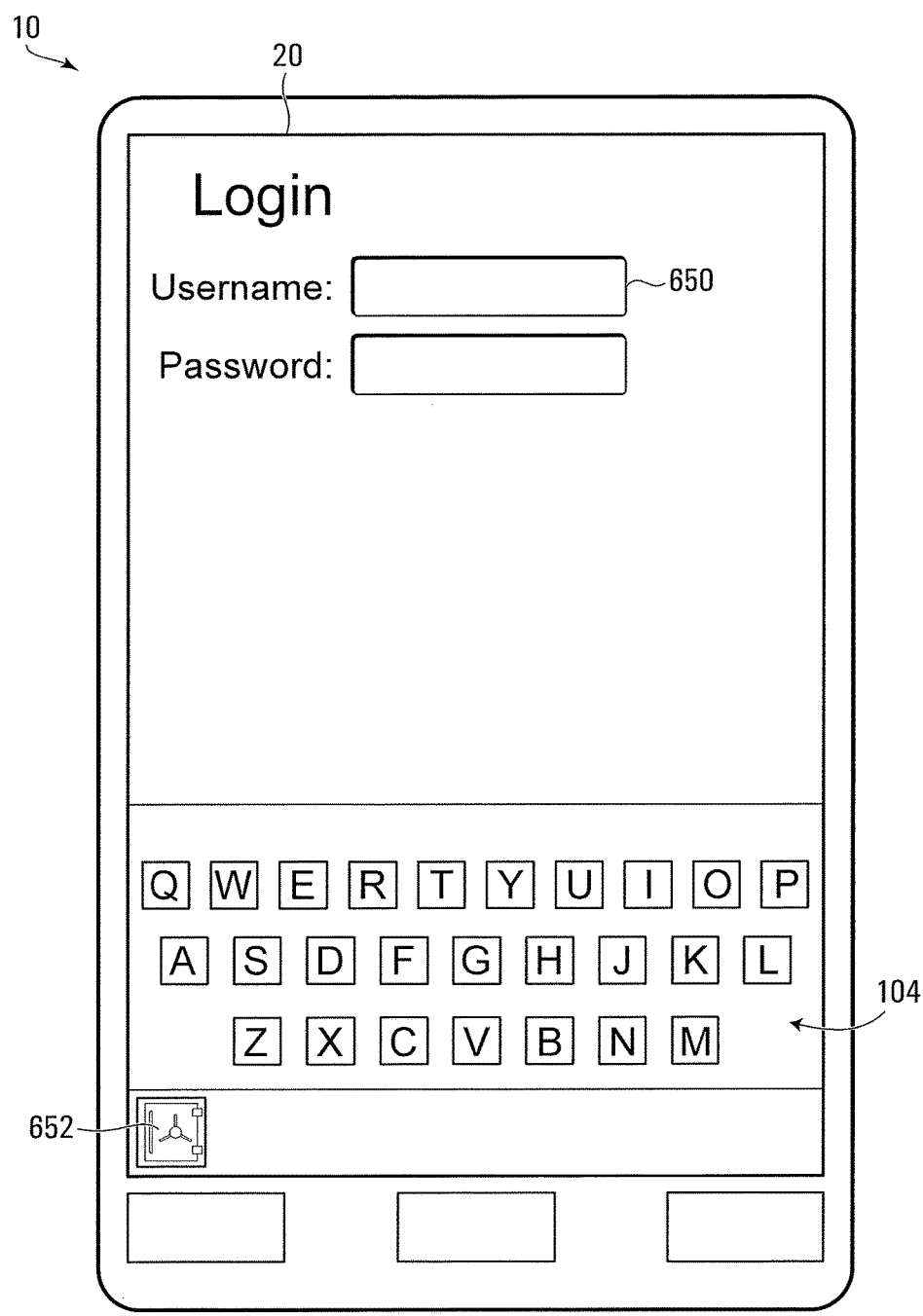
FIG. 48 is a front view of the personal computing device shown in FIG. 18 including a display showing a screenshot in accordance with one embodiment of the invention.
Figure 49:
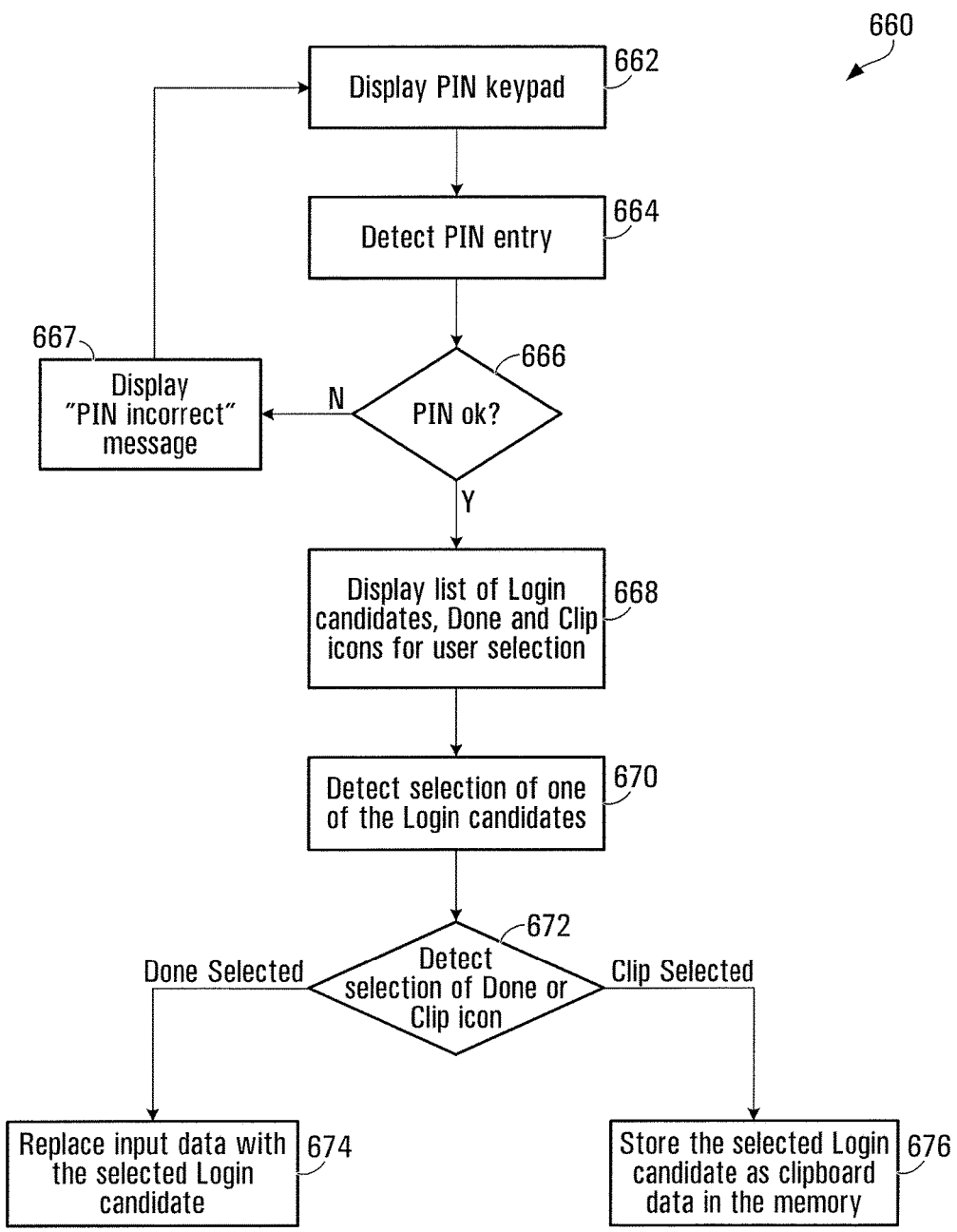
FIG. 49 is a flowchart depicting blocks of code for directing the personal computing device shown in FIG. 18 to effect Login Management application functions in accordance with one embodiment of the invention.

Various secondary applications may be associated with the Login Management category. In some variations, for example, a Login Management application may be provided as a form of secondary application for finding login candidates related to the input data and may be associated with the Login Management category. In various embodiments, the Login Management application may be defined in the block 34 of the program memory 14. In such embodiments, a Login Management application data structure having a Login Management category identifier identifying the Login Management category may be stored in memory (e.g. in the location 44 of the variable memory 16). Accordingly, in various embodiments, block 204 shown in FIG. 5 may direct the keyboard application manager to display a Login Management application icon 652 on the display 20 for user selection as shown in FIG. 48 when the keyboard application manager determines at block 202 that the input data falls within the Login Management category. If at block 206, the keyboard application manager detects selection of the Login Management icon, the keyboard application manager is directed to activate or invoke the Login Management application for generating user names and/or passwords by invoking a flowchart 660 as shown in FIG. 49. Of course as with all invocations of secondary applications, in various embodiments, the keyboard application manager may send the input data or a portion thereof to the Login Management application.

As described for the flowchart 300 shown in FIG. 11, the flowchart 660 may be encoded in a different block of codes from the block of codes 32 and, more particularly, the flowchart 660 may be encoded in a Login Management application block of codes within the block of codes 34. Thus, in various embodiments, the flowchart 660 depicts a process effected by the Login Management application.

Figure 50:
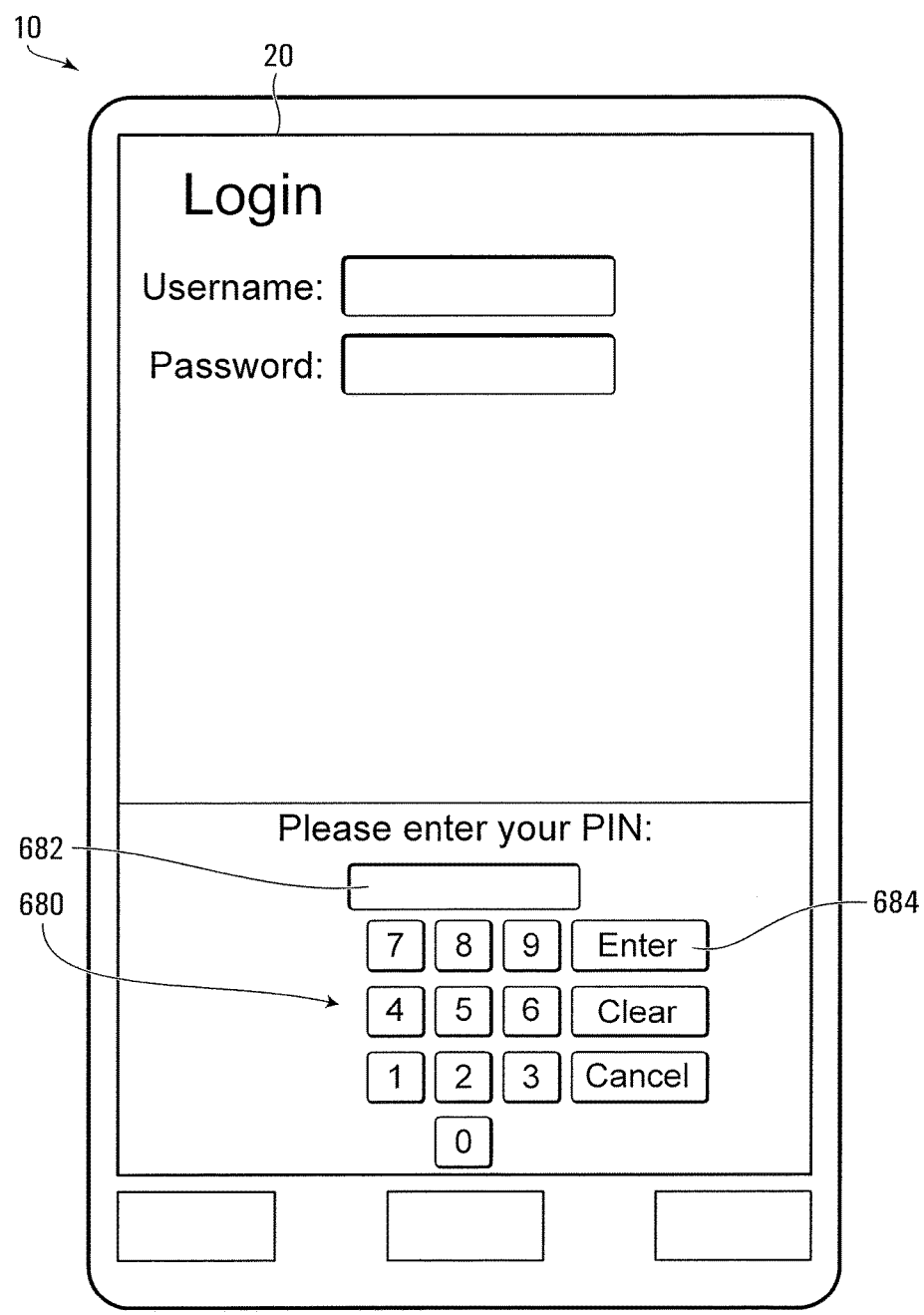
FIG. 50 is a front view of the personal computing device shown in FIG. 18 including a display showing a screenshot in accordance with one embodiment of the invention.

The flowchart 660 begins at block 662 which directs the Login Management application to display on the display 20 a Personal Identification Number (PIN) keypad 680 as shown in FIG. 50. Block 662 also directs the Login Management application to display instructions to "Please enter your pin:" and provides a PIN box 682 for displaying entered numbers of the PIN as *'s.

Block 664 directs the Login Management application to detect PIN entry. Block 664 directs the Login Management application to move on to block 666 once the Login Management application determines that an Enter key 684 has been selected.

Block 666 directs the Login Management application to verify that the PIN that was entered at block 664 matches a PIN stored in memory (e.g. at the location 54 in the variable memory 16). In various embodiments, the PIN may be encrypted in memory and/or may be stored in memory on a device in communication with the personal computing device 10 via the one or more networks 27. If at block 666, the Login Management application determines that the PIN does not correspond with the stored PIN, the process proceeds to block 667 which directs the Login Management application to display a "PIN incorrect" message on the display 20 and then the process returns to block 662.

Figure 51:
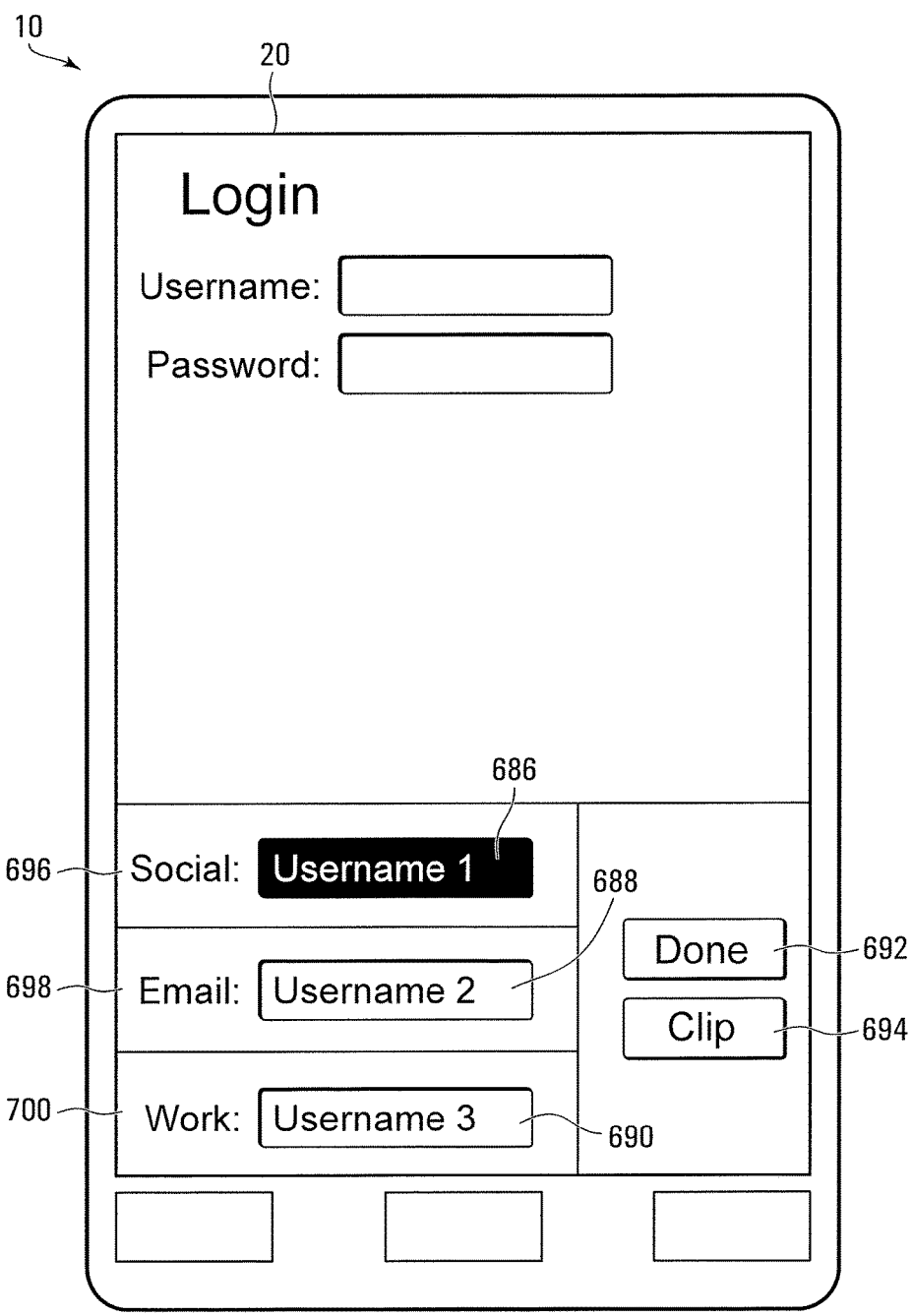
FIG. 51 is a front view of the personal computing device shown in FIG. 18 including a display showing a screenshot in accordance with one embodiment of the invention.

If at block 666, the Login Management application determines that the PIN correspond with the stored PIN, the process proceeds to block 668. Block 668 directs the Login Management application to display a list of login candidates 686, 688, and 690 along with Done and Clip icons 692 and 694 for user selection as shown in FIG. 51. The login candidates 686, 688, and 690 are displayed on the display 20 in association with respective labels 696, 698, and 700.

In various embodiments, block 668 directs the Login Management application to display login candidates that correspond to the context indicator included in the input data. Thus, in the embodiment shown, where the input data included a username context indicator, the selectable login candidates 686, 688, and 690 are chosen from usernames stored in memory or retrieved from an external device which may be in communication with the personal computing device 10 via the one or more networks 27 for example. In various embodiments, if the input data includes a password context indicator, block 668 may direct the Login Management application to display login candidates chosen from passwords.

In various embodiments, block 668 may direct the Login Management application to only display login candidates that correspond to other contextual information In some embodiments, the other contextual information may indicate a type of username expected. In some variations, for example, the device application displaying the username data input box 650 as shown in FIG. 48 is a web browser which stores a website URL identifier in memory (e.g. in the location 69), the website URL identifier being associated with a website currently being viewed. In such embodiments block 668 may direct the Login Management application to read from the memory (e.g. the location 69) the website URL identifier to determine what website is currently being viewed and display login candidates that correspond to the website URL identifier. For example, if the Login Management application determines at block 668 that the device application is displaying a website located at www.facebook.com, block 668 may direct the Login Management application to only display login candidates that correspond to www.facebook.com (i.e. usernames for Facebook™ accounts). In various other embodiments, the other contextual information may indicate what application is currently being executed and displayed on the display 20 (e.g. the other contextual information may indicate that a certain social media application such as a version of a Facebook™ application is currently being executed).

In various embodiments, block 668 may direct the Login Management application to display a list of groups or folders of login candidates. The user may select a group or folder and block 668 may direct the Login Management application to display a specific URL or website for user selection. Block 668 may then direct the Login Management application to retrieve login candidates associated with the selected URL or website and display the login candidates for user selection.

Referring back to FIG. 49, block 670 directs the Login Management application to detect selection of one of the login candidates 686, 688, and 690. In the embodiment shown in FIG. 51, the Login Management application detects selection of the login candidate 686 and thus an area surrounding the login candidate 686 is shown as shaded.

Block 672 directs the Login Management application to detect selection of one of the Done and Clip icons 692 and

694. If at block 672, the Login Management application detects selection of the Done icon 692, the process proceeds to block 674.

Figure 52:
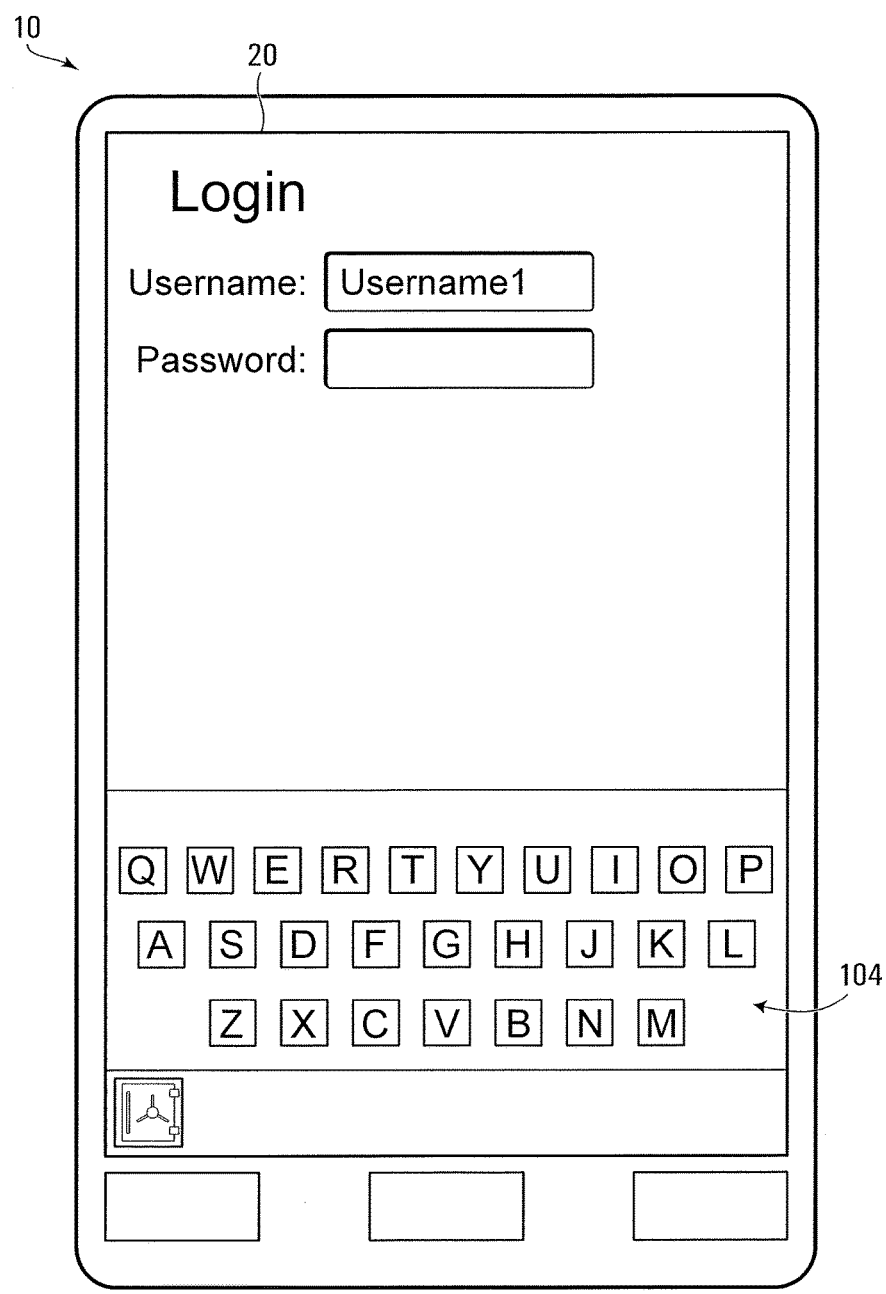
FIG. 52 is a front view of the personal computing device shown in FIG. 18 including a display showing a screenshot in accordance with one embodiment of the invention.

Block 674 directs the Login Management application to replace the input data to be input into the username data input box 650 (e.g. as stored in the location 38 of the variable memory 16) with the selected login candidate. In the embodiment shown in FIG. 51, where the selected login candidate is the login candidate 686, block 674 directs the Login Management application to cause the input data (e.g. as stored in the location 38 of the variable memory 16) to include the text "Username1" as shown in FIG. 52. Block 674 then directs the Login Management application to cause they keyboard to be redisplayed on the display 20.

If at block 672, the Login Management application detects selection of the Clip icon 694, the process proceeds to block 676. Block 676 directs the Login Management application to store the selected login candidate in memory (e.g. in the location 39 for storing clipboard copied data) for later insertion into the input data or another editable field or document. In various embodiments, block 676 may direct the Login Management application to cause the keyboard to be redisplayed. However in other embodiments, block 676 may direct the Login Management application to remain in control of the display such that the user can select and paste multiple login candidates without redisplaying the keyboard.

Image Management

In another embodiment, the block 202 may direct the keyboard application manager to determine whether input data (e.g. as stored in the location 41 of the variable memory 16) includes a context indicator corresponding to an image context indicator to determine whether the input data falls within an Image category. In various embodiments, block 202 may direct the keyboard application manager to determine whether input data (e.g. as stored in the location 41 of the variable memory 16) includes a context indicator corresponding to an attachment context indicator to determine whether the input data falls within an Image category.

Figure 53:
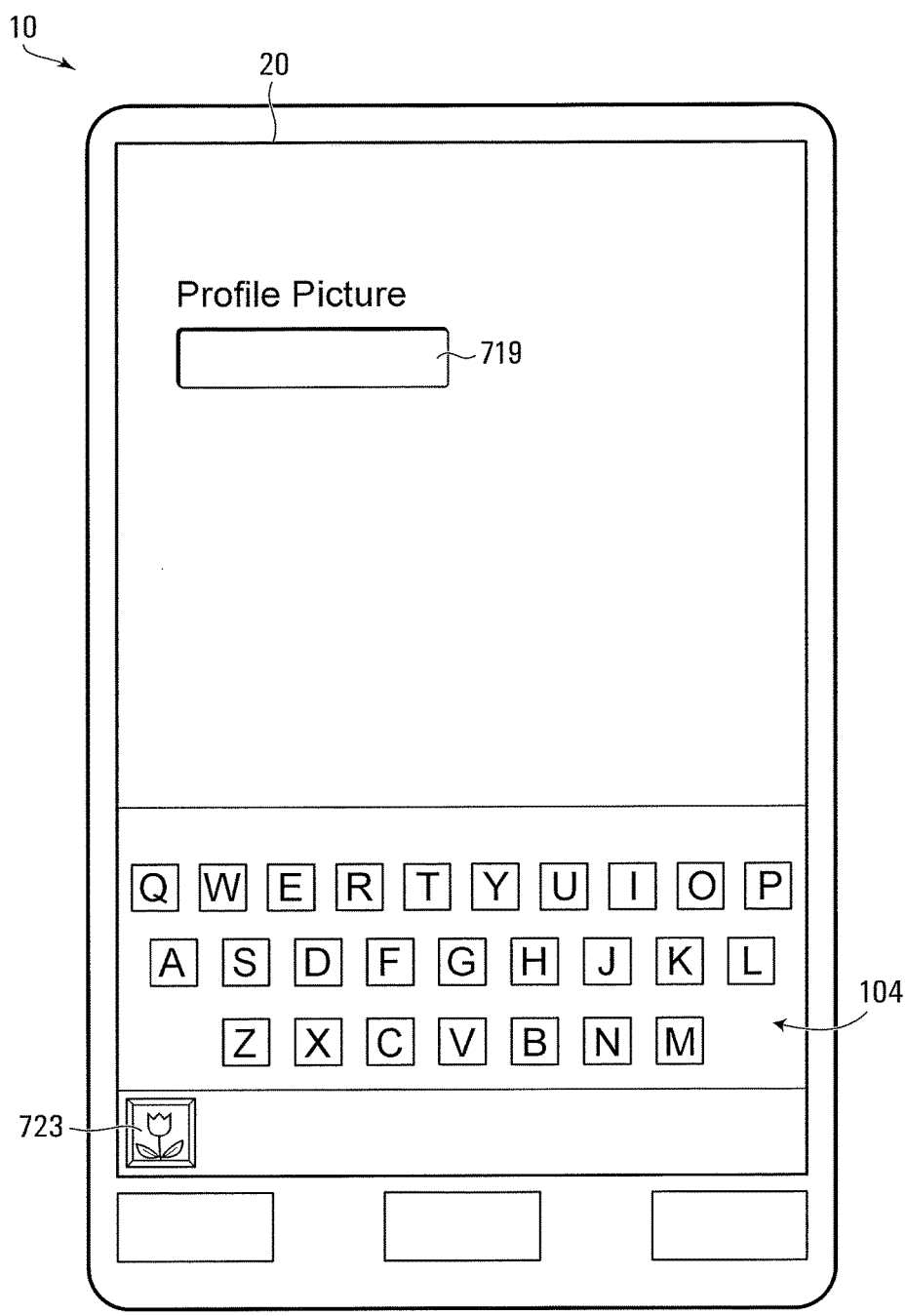
FIG. 53 is a front view of the personal computing device shown in FIG. 18 including a display showing a screenshot in accordance with one embodiment of the invention.

In the embodiment shown in FIG. 53, a device application displays an image data input box 719 on the display 20. The image data input box 719 expects to receive image data, and thus user selection of the data input box causes block 166, or a block similar to block 166 shown in FIG. 46 to generate and store an image context indicator in memory (e.g. in the location 41 of the variable memory 16).

Figure 54:
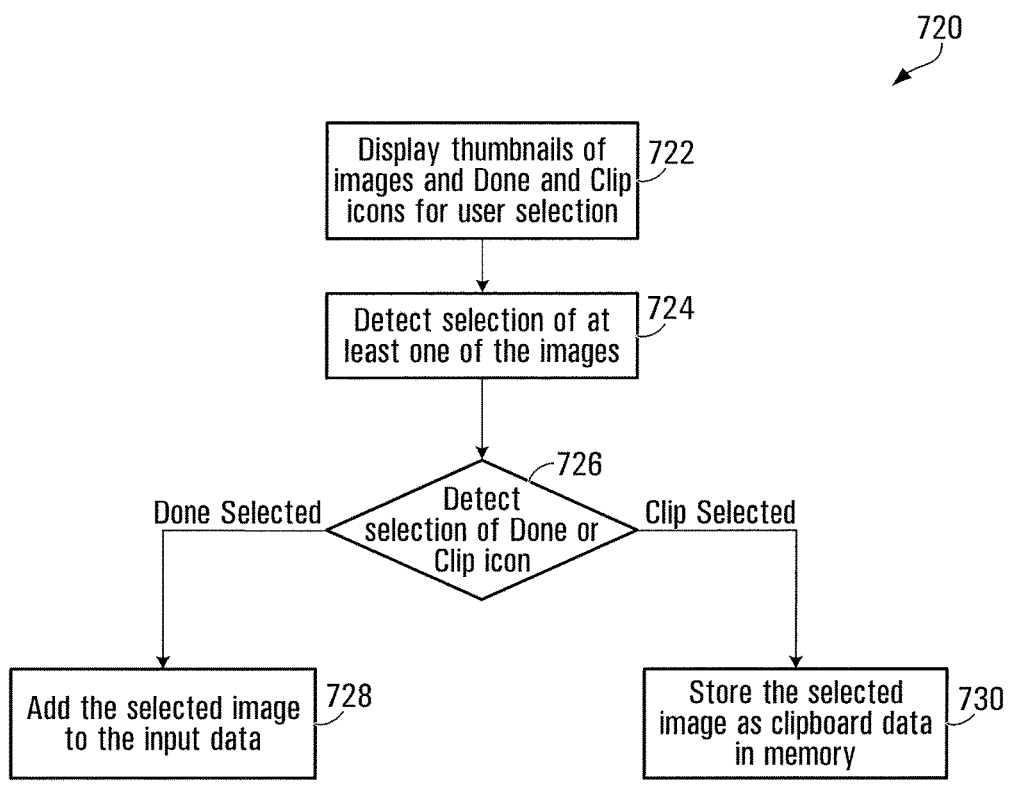
FIG. 54 is a flowchart depicting blocks of code for directing the personal computing device shown in FIG. 18 to effect Image Management application functions in accordance with one embodiment of the invention.

Various secondary applications may be associated with the Image category. In some variations, for example, an Image Management application may be provided as a form of secondary application for finding and displaying images for entry into a data input box and may be associated with the Image category. In various embodiments, the Image Management application may be defined in the block 34 of the program memory 14 shown in FIG. 18. In such embodiments, an Image Management application data structure having an Image category identifier identifying the Image category may be stored in memory (e.g. in the location 44 of the variable memory 16). Accordingly, in various embodiments, block 204 shown in FIG. 5 may direct the keyboard application manager to display an Image Management application icon 723 on the display 20 for selection by the user, as shown in FIG. 53, when the keyboard application manager determines at block 202 that the input data falls within the Image category. If at block 206, the keyboard application manager detects selection of the Image Management application icon 723, the keyboard application manager is directed to activate or invoke the Image Management application by invoking a flowchart 720 as shown in FIG. 54.

As described for the flowchart 300 shown in FIG. 11, the flowchart 720 may be encoded in a different block of codes from the block of codes 32 and, more particularly, the flowchart 720 may be encoded in an Image Management application block of codes within the block of codes 34. Thus, in various embodiments, the flowchart 720 depicts a process effected by the Image Management application.

Figure 55:
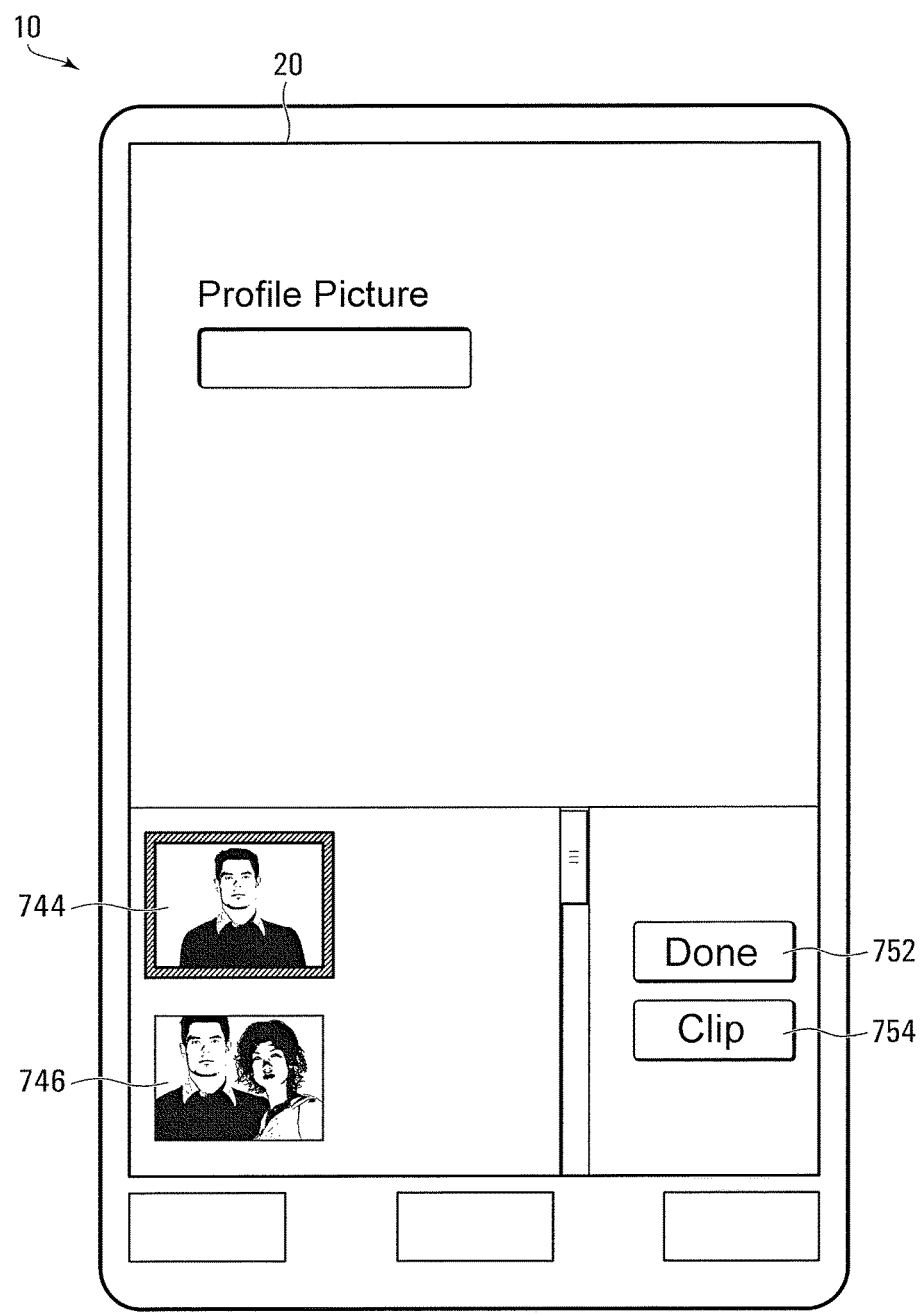
FIG. 55 is a front view of the personal computing device shown in FIG. 18 including a display showing a screenshot in accordance with one embodiment of the invention.

The flowchart 720 begins at block 722 which directs the Image Management application to read images from memory (e.g. from the location 64 of the variable memory 16), and display the images on the display 20 as thumbnails for user selection. In various embodiments, the images may be read from local memory or they may be retrieved via a network, e.g. the Internet, from a remote server (e.g. Dropbox™). In various embodiments, the images may be displayed on the display in order of date taken, with the most recent being displayed first. In the embodiment shown in FIG. 55, images 744 and 746 are displayed on the display 20. In various embodiments, the ten most recently modified images may be displayed on the display 20. Block 722 also directs the Image Management application to display a Done icon 752 and a Clip icon 754 for user selection.

Block 724 directs the Image Management application to detect selection of at least one of the images 744 and 746. In this way, the user can select which of the images that the user wishes to eventually store or use. In the embodiment shown in FIG. 55, the Image Management application detects selection of the image 744 and thus an area surrounding the image 744 is shown as shaded.

Block 726 directs the Image Management application to detect selection of one of the Done and Clip icons 752 and 754. If at block 726, the Image Management application detects selection of the Done icon 752, the process proceeds to block 728.

Block 728 directs the Image Management application to add the selected at least one of the images to the input data stored in memory (e.g. in the location 38 of the variable memory 16) and cause the keyboard to be redisplayed. Where the image 744 has been selected by the user, block 728 directs the Image Management application to add the image 744 to the input data stored in memory (e.g. in the location 38 of the variable memory 16) and causes the keyboard to be redisplayed.

If at block 726, the Image Management application detects selection of the Clip icon 754, the process proceeds to block 730. Block 730 directs the Image Management application to store the selected at least one of the images in memory (e.g. in the location 39 for storing clipboard copied data) for later insertion into the input data or another editable field or document. In various embodiments, block 730 directs the Image Management application to cause the keyboard to be redisplayed. However in other embodiments, block 730 may direct the Image Management application to continue to display the images 744 and 746, generally similar to as described above having regard to block 312 shown in FIG. 11.

In various embodiments, the plurality of patterns detectable by the keyboard application manager include Image patterns for identifying input data associated with images and applying the category test involves determining whether the input data from the user (e.g. the input data stored in the location 38 of the variable memory 16) includes one of the Image patterns to determine whether the input data falls within an Image category. In such embodiments block 202 may direct the keyboard application manager to determine whether the input data includes one of the Image patterns. In various embodiments, the Image patterns may include the following text, for example: "photo", "picture", "image", "camera", or another image-related input pattern.

Text Context Indicator

In various embodiments, there is provided a Text category and input data is found to fall within the Text category whenever text is expected at the input. As with the Persistent category, in various embodiments, whether a secondary application is associated with the Text category may be user selectable.

In various embodiments, block 202 shown in FIG. 5 may direct the keyboard application manager to determine whether the input data (e.g. as stored in the location 41 of the variable memory 16) includes a context indicator corresponding to a text context indicator to determine whether the input data falls within the Text category. In the embodiment shown in FIG. 56, the input data stored in memory includes a text context indicator and accordingly block 202 determines that the input data falls within the Text category.

Various secondary applications may be associated with the Text category. In some variations, for example, a Translator application may be provided as a form of secondary application for translating text and may be associated with the Text category. In various embodiments, the Translator application may be defined in the block 34 of the program memory 14 shown in FIG. 18. In such embodiments a Translator application data structure including a Text category identifier may be stored in memory (e.g. in the location 44 of the variable memory 16). Accordingly, in various embodiments, block 204 shown in FIG. 5 directs the keyboard application manager to display a Translator icon 760 on the display 20 for user selection when the keyboard application determines that the input data falls within the Text category. If at block 206, the keyboard application manager detects selection of the Translator icon, the keyboard application manager may be directed to activate or invoke the Translator application by invoking a flowchart 780 as shown in FIG. 57.

As described for the flowchart 300 shown in FIG. 11, the flowchart 780 may be encoded in a different block of codes from the block of codes 32 and, more particularly, the flowchart 780 may be encoded in a Translator application block of codes within the block of codes 34. Thus, in various embodiments, the flowchart 780 depicts a process effected by the Translator application.

The flowchart 780 begins at block 782 which directs the Translator application to display the input data and a first language indicator associated with the input data on the display 20. In the embodiment shown in FIG. 58, the input data (i.e. "Awesome") is displayed at 800 and the first language indicator (i.e. "English") is displayed at 802.

Figure 57:
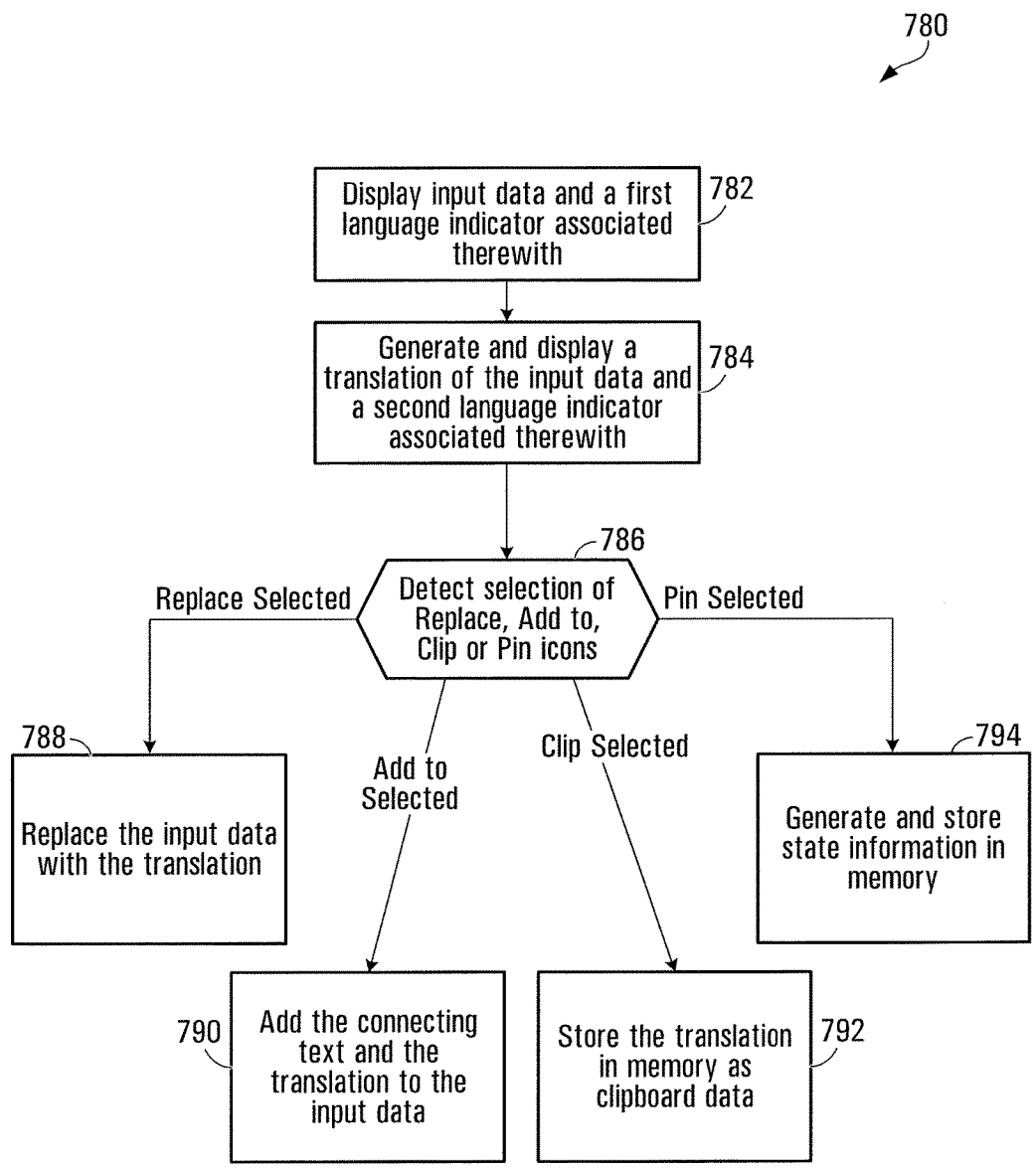
FIG. 57 is a flowchart depicting blocks of code for directing the personal computing device shown in FIG. 18 to effect Translator application functions in accordance with one embodiment of the invention.
Figure 58:
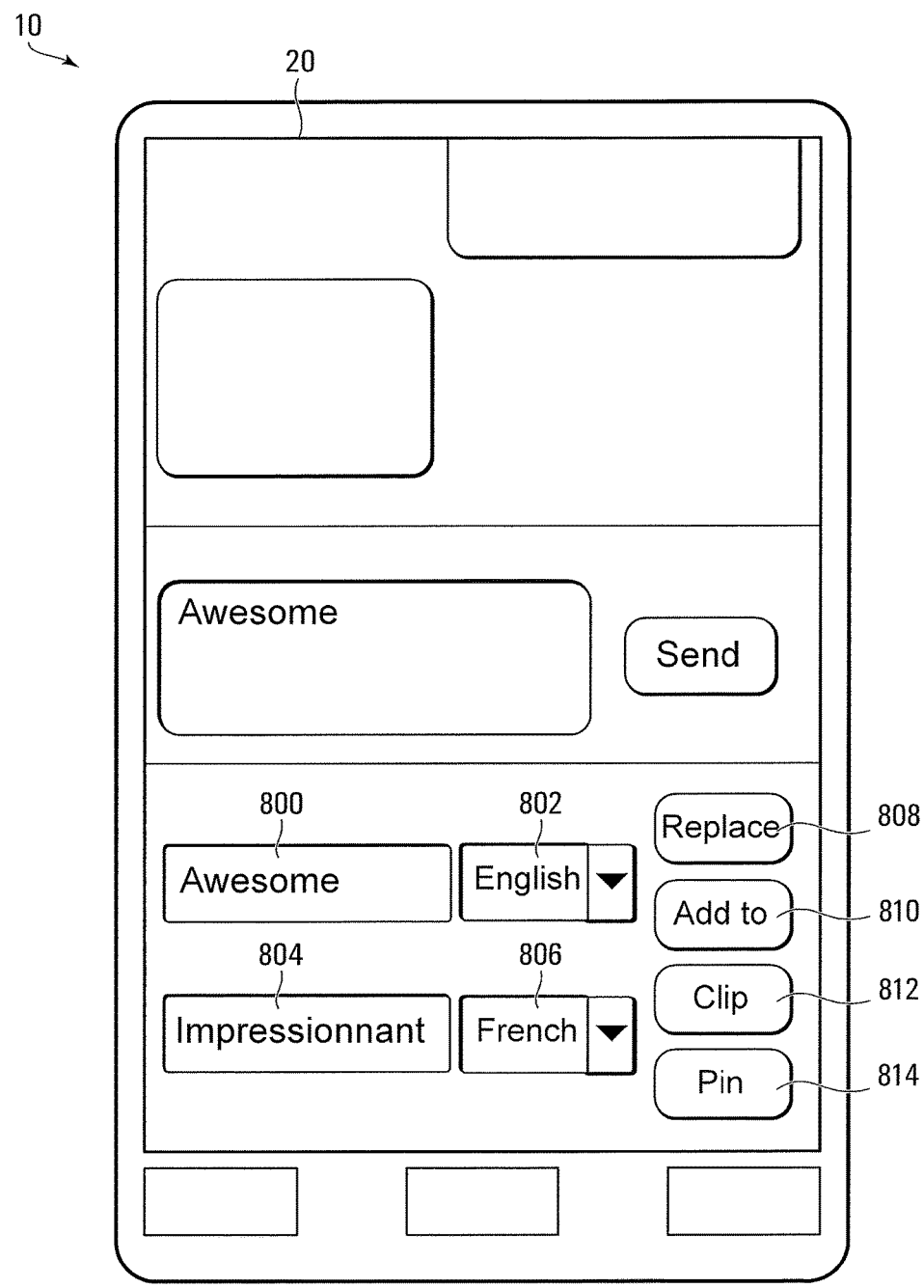
FIG. 58 is a front view of the personal computing device shown in FIG. 18 including a display showing a screenshot in accordance with one embodiment of the invention.

Referring to FIGS. 57 and 58, block 784 directs the Translator application to generate and display a translation 804 of the input data and a second language indicator 806 associated with the translation 804. In various embodiments, the Translator may communicate with an external device via the one or more networks 27 to generate the translation. The second language indicator 806 indicates what language the Translator application has translated the input data into. In the embodiment shown, the second language indicator 806 indicates that the Translator application has translated the input data into French. Block 784 also directs the Translator application to display a Replace icon 808, an Add To icon 810, a Clip icon 812, and a Pin icon 814 for user selection. In various embodiments, the user may use a pull down menu displayed with the first and second language indicators 802 and 806 to change the languages associated with the first or second language indicators.

Block 786 directs the Translator application to detect selection of one of the Replace, Add To, Clip, or Pin icons 808, 810, 812, or 814. If at block 786, the Translator application detects selection of the Replace icon 808, the process proceeds to block 788.

Block 788 directs the Translator application to replace the input data stored in memory (e.g. in the location 38 of the variable memory) with the translation as generated by the Translator application. Block 788 then directs the Translator application to cause the keyboard to be redisplayed on the display 20.

If at block 786, the Translator application detects selection of the Add To icon 810, the process proceeds to block 790. Block 790 directs the Translator application to add connecting text and the translation to the input data stored in memory (e.g. in the location 38 of the variable memory 16) and cause the keyboard to be redisplayed. In various embodiments, the connecting text may include, for example, the text "which means" preceding the translation and may include text indicating what language the translation is in, such as, for the embodiment shown where the second language indicator 806 indicates that the translation 804 is in French, for example, the text "in French". Accordingly, in various embodiments, adding the connecting text and translation to the input data causes the input data to include the text "Awesome which means Impressionnant in French".

If at block 786, the Translator application detects selection of the Clip icon 812, the process proceeds to block 792. Block 792 directs the Translator application to store the translation in memory (e.g. in the location 39 for storing clipboard copied data) for later insertion into the input data or another editable field or document. In various embodiments, block 792 directs the Translator application to cause the keyboard to be redisplayed. However in other embodiments, block 792 may direct the Translator application to continue to control the display 20, such that the user may clip multiple translations without redisplaying the keyboard.

If at block 786, the Translator application detects selection of the Pin icon 814, the process proceeds to block 794 which directs the Translator application to generate and store state information in the memory (e.g. in the location 46 of the variable memory 16). Block 786 then directs the Translator application to cause the keyboard to be redisplayed on the display 20 and to cause the keyboard application manager to display a resume state icon on the display 20 generally as described and shown above having regard to FIG. 17, for example.

Thesaurus

Figure 56:
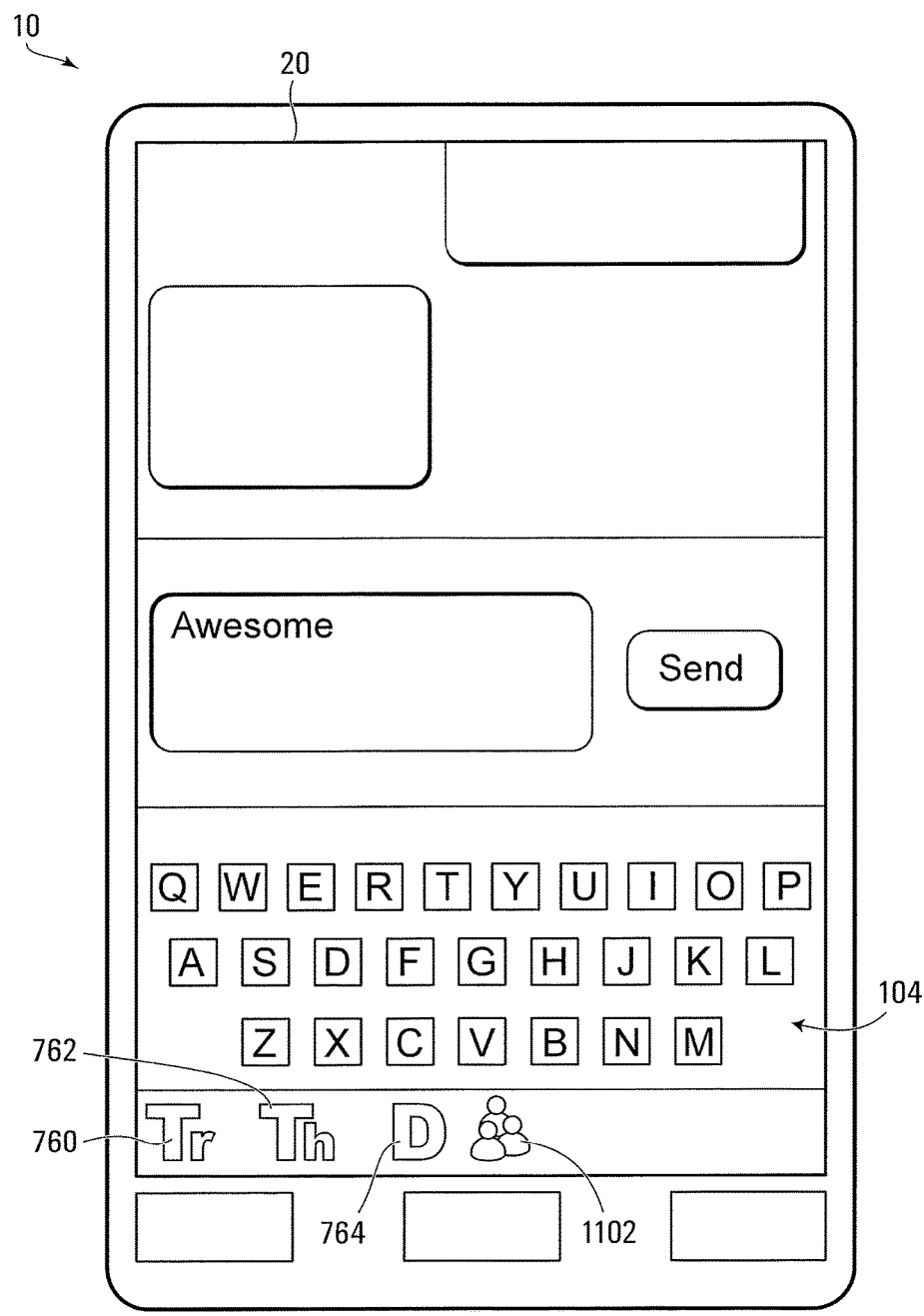
FIG. 56 is a front view of the personal computing device shown in FIG. 18 including a display showing a screenshot in accordance with one embodiment of the invention.
Figure 59:
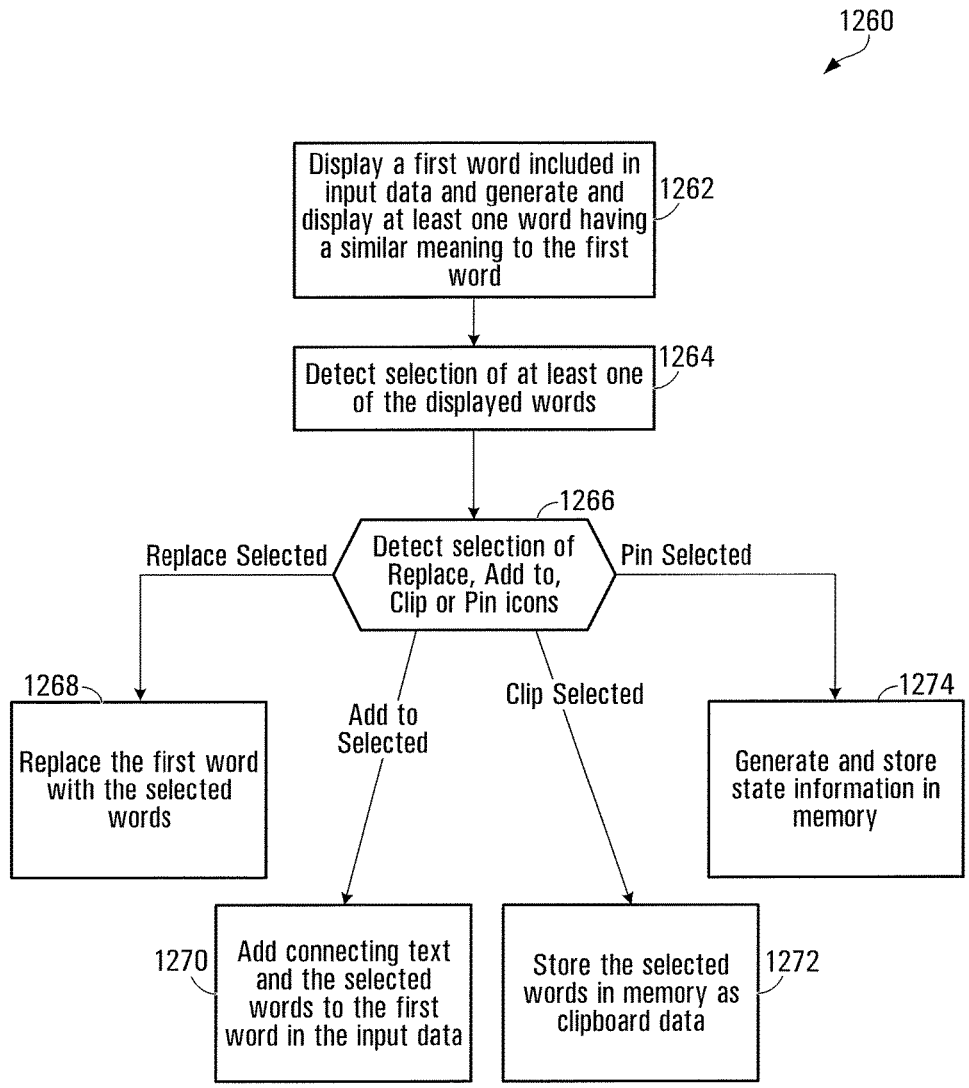
FIG. 59 is a flowchart depicting blocks of code for directing the personal computing device shown in FIG. 18 to effect Thesaurus application functions in accordance with one embodiment of the invention.

In various embodiments, a Thesaurus application may be provided as a form of secondary application for finding synonyms or words similar to a word included in the input data. The Thesaurus application may be associated with the Text category. In various embodiments, the Thesaurus application may be defined in the block 34 of the program memory 14. In such embodiments, a Thesaurus application data structure including the Text category identifier may be stored in the variable memory 16 (e.g. in the location 44). Accordingly, block 204 shown in FIG. 5 may direct the keyboard application manager to display a Thesaurus icon 762 on the display 20 for user selection as shown in FIG. 56 when the keyboard application determines that the input data falls within the Text category. If at block 206, the keyboard application manager detects selection of the Thesaurus icon 762, the keyboard application manager may be directed to activate or invoke a flowchart 1260 as shown in FIG. 59.

As described for the flowchart 300 shown in FIG. 11, the flowchart 1260 may be encoded in a different block of codes from the block of codes 32 and, more particularly, the flowchart 1260 may be encoded in a Thesaurus application block of codes within the block of codes 34. Thus, in various embodiments, the flowchart 1260 depicts a process effected by the Thesaurus application.

Figure 60:
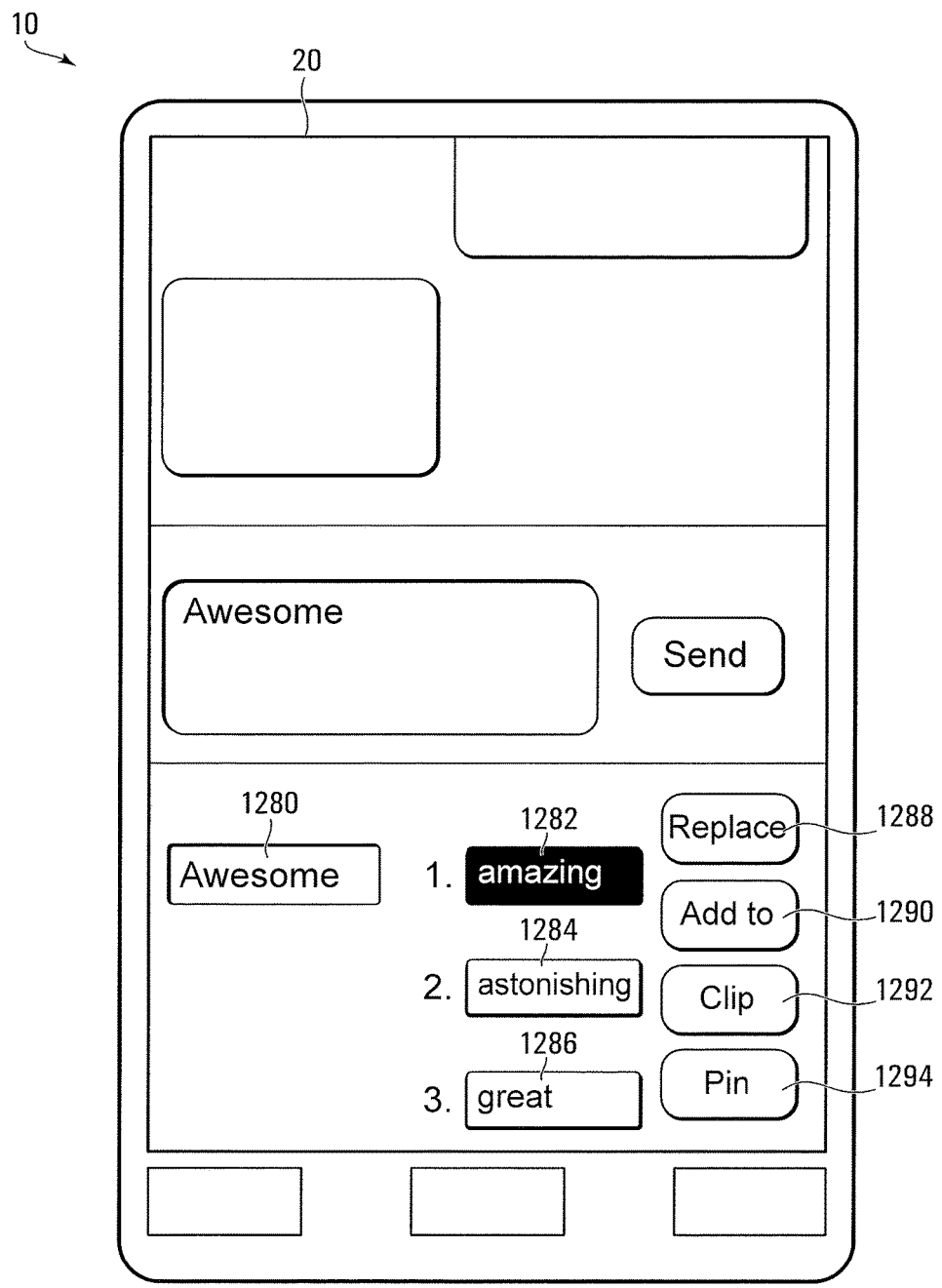
FIG. 60 is a front view of the personal computing device shown in FIG. 18 including a display showing a screenshot in accordance with one embodiment of the invention.

The flowchart 1260 begins at block 1262 which directs the Thesaurus application to display a first word 1280 included in the input data, as shown in FIG. 60 and to generate and display words 1282, 1284 and 1286 having a similar meaning to the first word 1280 for user selection. In various embodiments, the Thesaurus application may communicate with a device via the one or more networks 27 to generate the words having similar meaning. In the embodiment shown in FIG. 60, the first word 1280 is "Awesome" and the Thesaurus application displays the words 1282, 1284 and 1286 which are "amazing", "astonishing", and "great" respectively. Block 1262 also directs the Thesaurus application to display a Replace icon 1288, an Add To icon 1290, a Clip icon 1292 and a Pin icon 1294 for user selection.

Block 1264 directs the Thesaurus application to detect user selection of at least one of the displayed words 1282, 1284 and 1286. In the embodiment shown in FIG. 60, the Thesaurus application detects selection of the word 1282 and thus an area surrounding the word 1282 is shown as shaded.

Block 1266 directs the Thesaurus application to detect selection of one of the Replace, Add To, Clip, or Pin icons 1288, 1290, 1292, or 1294. If at block 1266, the Thesaurus application detects selection of the Replace icon 1288, the process proceeds to block 1268.

Block 1268 directs the Thesaurus application to replace the first word included in the input data stored in memory (e.g. in the location 38 of the variable memory 16) with the selected word 1282. Block 1268 then directs the Thesaurus application to cause the keyboard to be redisplayed.

If at block 1266, the Thesaurus application detects selection of the Add To icon 1290, the process proceeds to block 1270. Block 1270 directs the Thesaurus application to add connecting text and the selected word to the first word of the input data stored in memory (e.g. in the location 38 of the variable memory 16) and cause the keyboard to be redisplayed. In the embodiment shown in FIG. 60, the connecting text may be "or" and thus block 1270 may direct the Thesaurus application to amend the input data to include "Awesome or amazing". In various embodiments, where more than one of the words 1282, 1284, and 1286 have been selected, block 1270 directs the Thesaurus application to add additional connecting text between the selected words before adding the selected words to the input data. For example, if the user selected the words 1282 and 1284 (i.e. "amazing" and "astonishing"), block 1270 may direct the Thesaurus application to add connecting text and the word 1282 and 1284 to the input data such that the input data includes, "Awesome or amazing or astonishing".

If at block 1266, the Thesaurus application detects selection of the Clip icon 1292, the process proceeds to block 1272. Block 1272 directs the Thesaurus application to store the selected word as clipboard data in memory (e.g. in the location 39 for storing clipboard copied data) for later insertion into the input data or another editable field or document. In various embodiments, block 1272 then directs the Thesaurus to cause the keyboard to be redisplayed. However in other embodiments, block 1272 may direct the Thesaurus application to continue to control the display 20 and display the words 1282, 1284 and 1286, such that the user can clip multiple words into the input data without redisplaying the keyboard, generally similar to as described above having regard to block 312 shown in FIG. 11.

If at block 1266, the Thesaurus application detects selection of the Pin icon 1294, the process proceeds to block 1274 which directs the Thesaurus application to generate and store state information in memory (e.g. in the location 46 of the variable memory 16). Block 1274 also directs the Thesaurus application to cause the keyboard to be redisplayed and to cause the keyboard application manager to display a resume state icon on the display 20 generally as described and shown above having regard to FIG. 17, for example.

Dictionary

Figure 61:
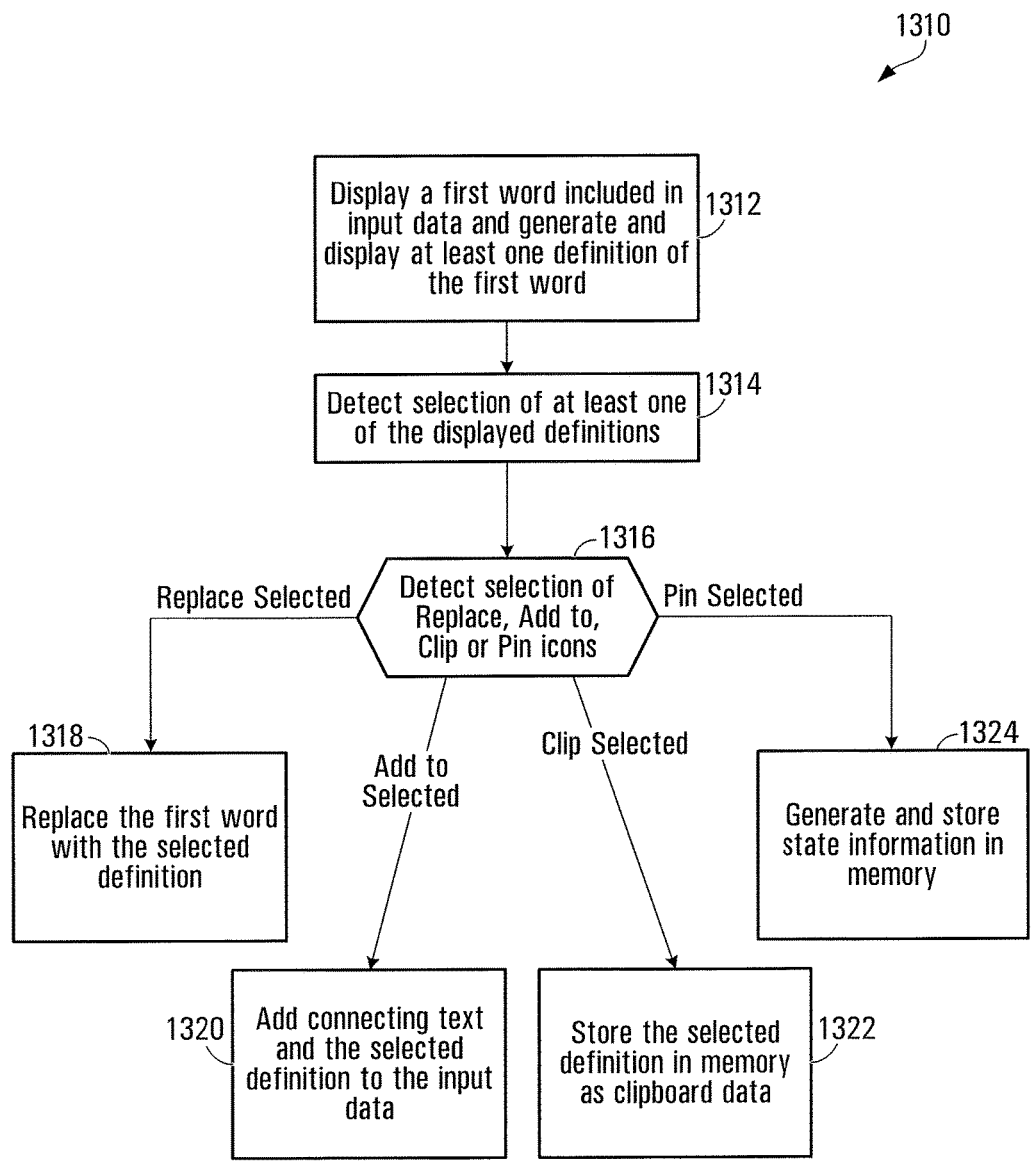
FIG. 61 is a flowchart depicting blocks of code for directing the personal computing device shown in FIG. 18 to effect Dictionary application functions in accordance with one embodiment of the invention.

In various embodiments, a Dictionary application may be provided as a form of secondary application for finding definitions of words included in the input data. The Dictionary application may be associated with the Text category. In various embodiments, the Dictionary application may be defined in the block 34 of the program memory 14 shown in FIG. 18. In such embodiments, a Dictionary application data structure including the Text category identifier may be stored in memory (e.g. in the location 44 of the variable memory 16). Accordingly, referring to FIG. 5, block 204 may direct the keyboard application manager to display a Dictionary icon 764 as shown in FIG. 56 on the display 20 for user selection when the keyboard application determines that the input data falls within the Text category. If at block 206, the keyboard application manager detects selection of the Dictionary icon 764, the keyboard application manager may be directed to activate or invoke a flowchart 1310 as shown in FIG. 61.

As described for the flowchart 300 shown in FIG. 11, the flowchart 1310 may be encoded in a different block of codes from the block of codes 32 and, more particularly, the flowchart 1310 may be encoded in a Dictionary application block of codes within the block of codes 34. Thus, in various embodiments, the flowchart 1310 depicts a process effected by the Dictionary application.

Figure 62:
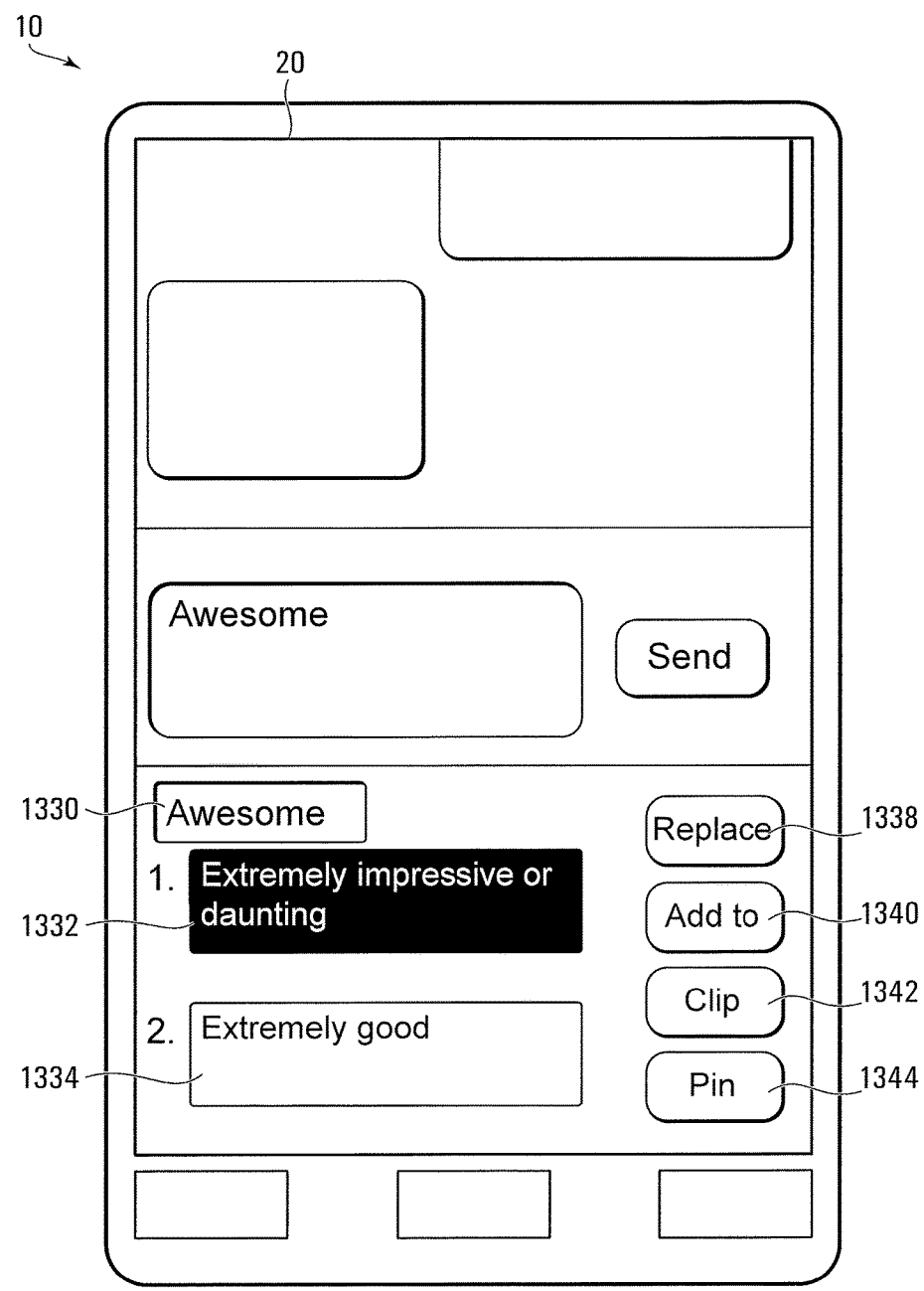
FIG. 62 is a front view of the personal computing device shown in FIG. 18 including a display showing a screenshot in accordance with one embodiment of the invention.

The flowchart 1310 begins at block 1312 which directs the Dictionary application to display a first word 1330 from the input data (e.g. as stored in the location 38 of the variable memory 16) or received from the keyboard application manager on the display 20, as shown in FIG. 62. In various embodiments, the first word 1330 may be chosen as the most recently entered word in the input data. Block 1312 also directs the Dictionary application to generate and display definitions 1332 and 1334 of the first word 1330 for user selection. In various embodiments, the Dictionary application may communicate with an external device via the one or more networks 27 to generate the definitions. In the embodiment shown in FIG. 62, the first word 1330 is "Awesome" and the definitions 1332 and 1334 are "Extremely impressive or daunting", and "Extremely good", respectively. Block 1312 also directs the Dictionary application to display a Replace icon 1338, an Add To icon 1340, a Clip icon 1342, and a Pin icon 1344, for user selection.

Block 1314 directs the Dictionary application to detect user selection of at least one of the displayed definitions 1332 and 1334. In the embodiment shown in FIG. 62, the Dictionary application detects selection of the definition 1332 and thus an area surrounding the definition 1332 is shown as shaded.

Block 1316 directs the Dictionary application to detect selection of one of the Replace, Add To, Clip, or Pin icons 1338, 1340, 1342, or 1344. If at block 1316, the Dictionary application detects selection of the Replace icon 1338, the process proceeds to block 1318.

Block 1318 directs the Dictionary application to replace the first word 1330 as stored within the input data stored in the memory (e.g. in the location 38 of the variable memory 16) with the selected definition 1332. Block 1318 then directs the Dictionary application to cause the keyboard to be redisplayed on the display.

If at block 1316, the Dictionary application detects selection of the Add To icon 1340, the process proceeds to block 1320. Block 1320 directs the Dictionary application to add connecting text and the selected definition to the input data stored in memory (e.g. in the location 38 of the variable memory 16) and cause the keyboard to be redisplayed. In the embodiment shown, the connecting text may be "which means" and the input data may thus be amended to read, "Awesome which means extremely impressive or daunting". In various embodiments, where more than one of the definitions 1332 and 1334 have been selected, block 1320 directs the Dictionary application to add further connecting text between the selected definitions before adding the selected definitions to the input data. For example, if the user selected the definitions 1332 and 1334, block 1320 may direct the Dictionary application to add connecting text and the definitions 1332 and 1334 to the input data such that the input data reads, "Awesome which means extremely impressive or daunting, or extremely good".

If at block 1316, the Dictionary application detects selection of the Clip icon 1342, the process proceeds to block 1322. Block 1322 directs the Dictionary application to store the selected definition as clipboard data in memory (e.g. in the location 39 for storing clipboard copied data) for later insertion into the input data or another editable field or document. In various embodiments, block 1322 then directs the Dictionary application to cause the keyboard to be redisplayed. However in other embodiments, block 1322 may direct the Dictionary application to continue to control the display 20 and display the definitions 1332 and 1334 for user selection and the user may exit the secondary application and pass control back to the keyboard program and the keyboard application manager, such as by selecting a close icon, for example, generally as described above having regard to block 312 of the flowchart 300 shown in FIG. 11.

If at block 1316, the Dictionary application detects selection of the Pin icon 1344, the process proceeds to block 1324 which directs the Dictionary application to generate and store state information in memory (e.g. in the location 46 of the variable memory 16). Block 1324 also directs the Dictionary application to cause the keyboard to be redisplayed and to cause the keyboard application manager to display a resume state icon on the display 20 generally as described and shown above having regard to FIG. 17, for example.

Social Networking

Figure 63:
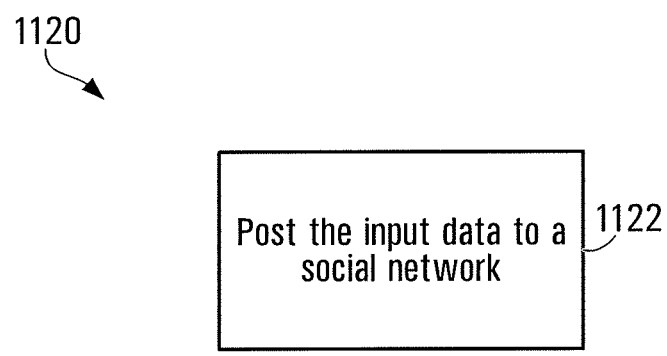
FIG. 63 is a flowchart depicting blocks of code for directing the personal computing device shown in FIG. 18 to effect Social Networking application functions in accordance with one embodiment of the invention.

In various embodiments, a Social Networking application may be provided as a form of secondary application for posting content to a social network. The Social Networking application may be associated with the Text category. In various embodiments, the Social Networking application may be defined in the block 34 of the program memory 14 shown in FIG. 18. In such embodiments a Social Networking application data structure including the Text category identifier may be stored in memory (e.g. in the location 44 of the variable memory 16). Accordingly, block 204 shown in FIG. 5 may direct the keyboard application manager to display a Social Networking icon 1102 on the display 20 for user selection as shown in FIG. 56 when the keyboard application determines that the input data falls within the Text category. If at block 206, the keyboard application manager detects selection of the Social Networking icon 1102, the keyboard application manager may be directed to activate or invoke the Social Networking application by invoking a flowchart 1120 as shown in FIG. 63.

As described for the flowchart 300 shown in FIG. 11, the flowchart 1120 may be encoded in a different block of codes from the block of codes 32 and, more particularly, the flowchart 1120 may be encoded in a Social Networking application block of codes within the block of codes 34. Thus, in various embodiments, the flowchart 1120 depicts a process effected by the Social Networking application.

The flowchart 1120 begins at block 1122 which directs the Social Networking application to cause the input data to be posted to a social network. In various embodiments, block 1122 may direct the Social Networking application to invoke a device application which may be a social networking device application such as a version of a web browser, a Facebook™ application, a Twitter™ application, or a Google™ Plus application and cause the device application to post the input data (e.g. as stored in the location 38 of the variable memory 16) to a social networking platform (e.g. Facebook™, Twitter™, or Google™ Plus).

In other embodiments, block 1122 may direct the Social Networking application to post the input data to a social networking platform, without the use of a device application.

Multiple Secondary Application Icons Displayed at Once

In various embodiments, a plurality of secondary applications may be stored in association with a given category, or input data may be determined to fall within a plurality of categories and thus block 204 shown in FIG. 5 may direct the keyboard application manager to display a plurality of secondary application icons on the display 20 at the same time.

Figure 64:
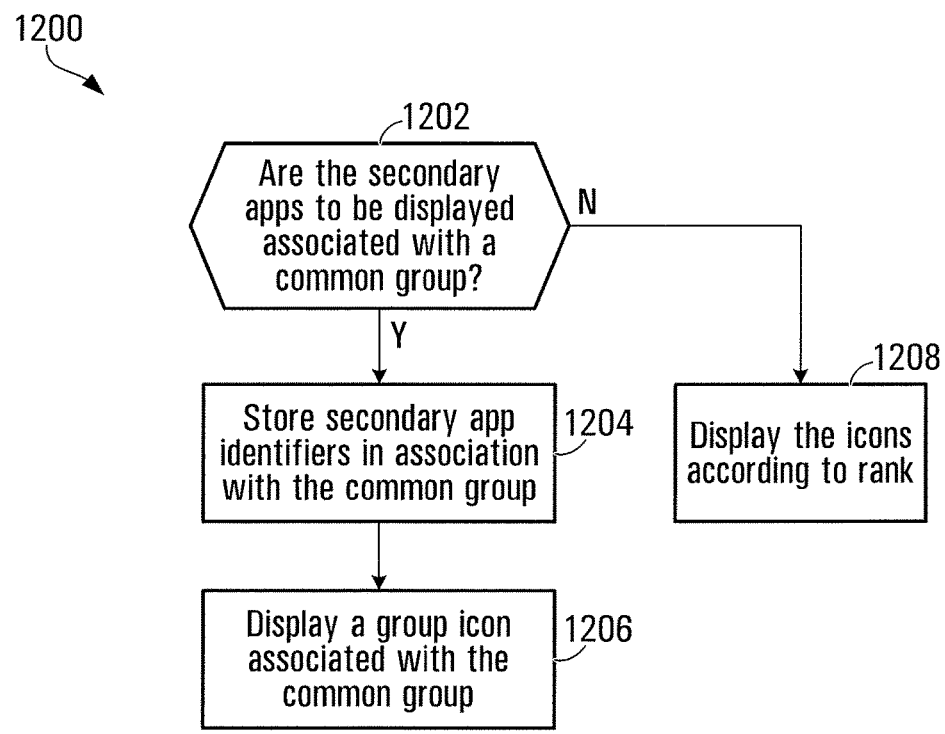
FIG. 64 is a flowchart depicting blocks of code for directing the personal computing device shown in FIG. 18 to display more than one secondary application icon in accordance with one embodiment of the invention.

In various embodiments, if the keyboard application manager is directed by block 204 to display more than one secondary application icon, the keyboard application manager invokes flowchart 1200 as shown in FIG. 64. The flowchart 1200 may be encoded in the block of codes 34. Thus, in various embodiments, the flowchart 1200 depicts a process effected by the keyboard application manager.

The flowchart 1200 begins with block 1202 which directs the keyboard application manager to determine whether the plurality of secondary applications to be displayed are associated with a common group. If the keyboard application manager determines at block 1202 that the plurality of secondary applications to be displayed are associated with a common group, the process proceeds to block 1204. Secondary applications may be associated with groups based on their respective data structures, as stored in memory (e.g. in the location 44 of the variable memory 16). For example, referring back to FIG. 6, the Contact Manager application data structure 240 includes a contact management group ID 265 indicating that the contact manager application is associated with a contact management group.

In various embodiments, an additional contact manager application installed on the personal computing device 10 may also be associated with the contact management group. In such embodiments, where both the Contact Manager icon and the additional contact manager icon are to be displayed at block 204, the keyboard application determines at block 1202 that the Contact Manager application and the additional contact manager application are associated with a common group (i.e. the contact management group) and thus the process proceeds to block 1204.

Block 1204 directs the keyboard application manager to store in memory (e.g. in the location 66 of the variable memory 16), secondary application identifiers associated with the secondary applications which were found to be associated with the common group. In various embodiments, block 1204 directs the keyboard application manager to store identifiers for the Contact Manager application and the additional contact manager application in the location 60 of the variable memory 16, in association with a contact management group identifier.

Block 1206 then directs the keyboard application manager to display a group icon associated with the common group. In the embodiment shown in FIG. 65, the keyboard application manager displays a contact management icon 1220 which acts as a group icon and is associated with the contact management group ID.

If the keyboard application manager determines at block 1202 that the plurality of secondary applications to be displayed are not associated with a common group, the process proceeds to block 1208.

Block 1208 directs the keyboard application manager to cause each of the plurality of icons to be displayed in order according to a rank of the respective secondary applications associated with each of the plurality of icons. In various embodiments, the rank may be based on a historic frequency indicating how many times each of the icons have been selected. In such embodiments, a historic frequency may be included in each application data structure. For example, a historic frequency number 264 included in the Contact Manager data structure may indicate the number of times that the Contact Manager application has been invoked.

In such an embodiment, block 204 may direct the keyboard application manager to display icons in the status notification bar 126 on the display 20 such that icons associated with higher historic frequencies are displayed to the left of icons associated with lower historic frequencies, for example.

In other various embodiments, the rank may be based on any other way of ranking the secondary applications. For example, in various embodiments, the rank may be based on a degree with which the input data received from the user (e.g. stored in the location 38 of the variable memory 16) corresponds to particular data associated with the secondary application. In various embodiments, the rank may be based on a degree with which a context indicator acting as input data (e.g. stored in the location 44 of the variable memory 16) corresponds to a context indicator associated with the secondary application. In various embodiments, the rank may also be based on a degree with which the location information stored in memory (e.g. in the location 52 of the variable memory 16) corresponds to a location associated with the secondary application.

Figure 65:
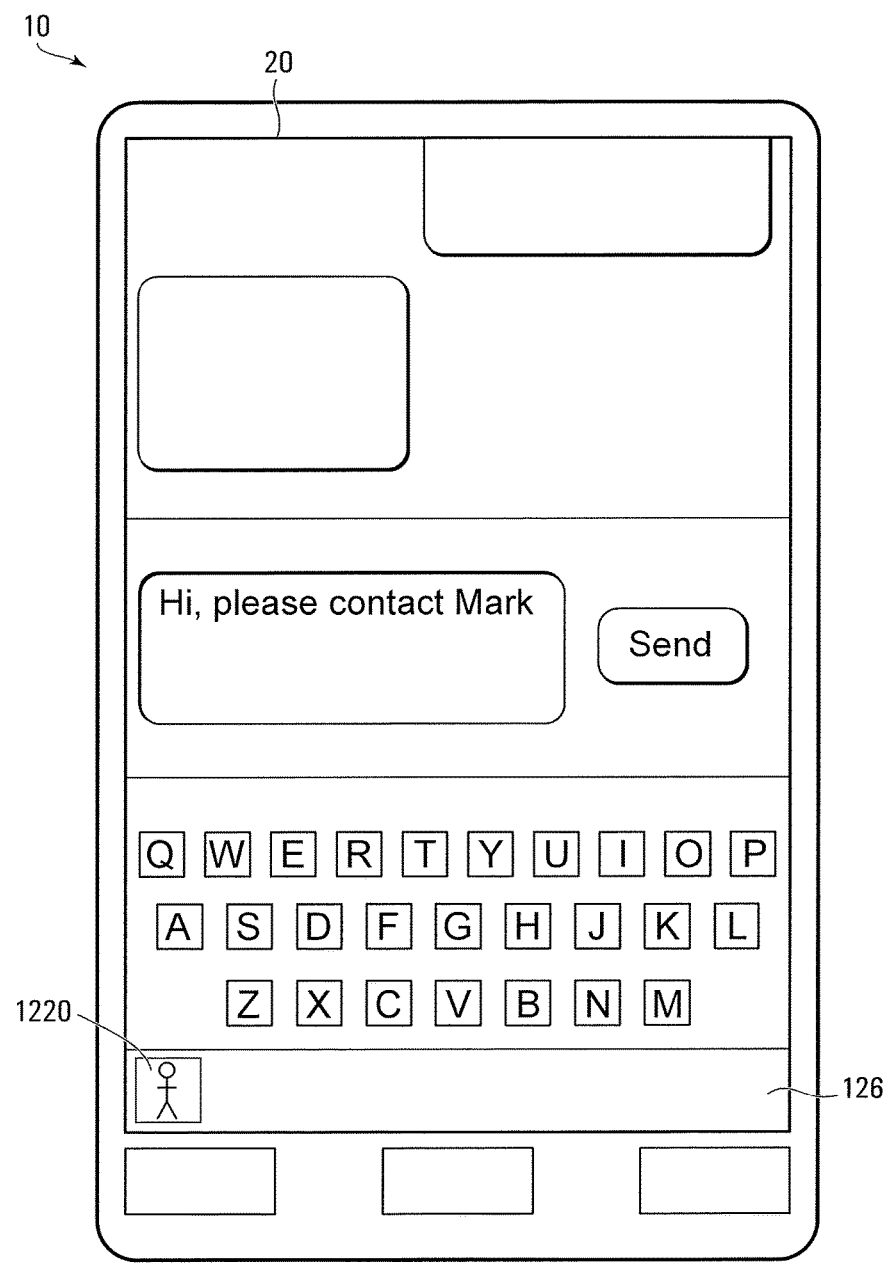
FIG. 65 is a front view of the personal computing device shown in FIG. 18 including a display showing a screenshot in accordance with one embodiment of the invention.
Figure 66:
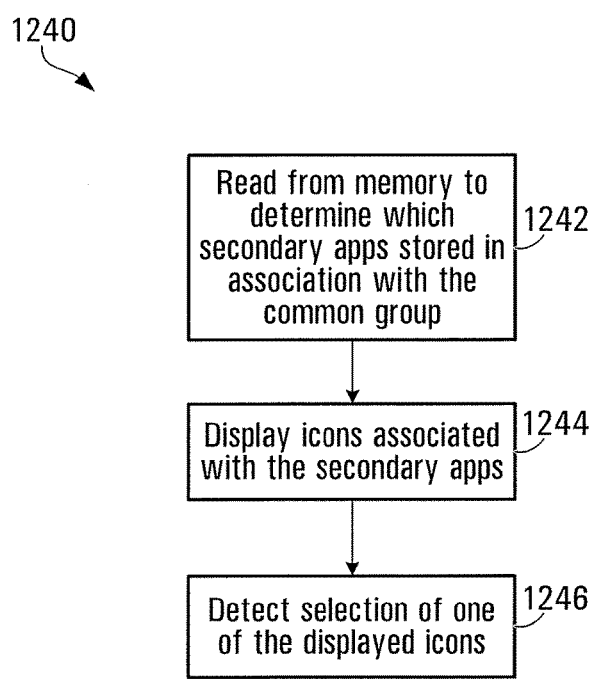
FIG. 66 is a flowchart depicting blocks of code for directing the personal computing device shown in FIG. 18 to effect a process for displaying secondary applications grouped together in accordance with one embodiment of the invention.

Referring now to FIGS. 65 and 66, in various embodiments, when the keyboard application manager detects selection of an icon associated with a group icon, such as the contact management icon 1220, at block 206 shown in FIG. 5, the keyboard application manager is directed to invoke flowchart 1240. In various embodiments, the flowchart 1240 may be encoded in the block of codes 34. Thus, in various embodiments, the flowchart 1240 depicts a process effected by the keyboard application manager.

The flowchart 1240 begins with block 1242 which directs the keyboard application manager to read from memory (e.g. in the location 66 of the variable memory 16) to determine which secondary applications are associated with the selected group icon. For the embodiment shown in FIG. 65, the Contact Manager application ID and the additional contact manager application ID were stored in the location 66 in association with the contact manager group ID. Accordingly, the keyboard application manager determines at block 1242 that the Contact Manager application and the additional contact manager application are associated with the selected contact management group icon 1220.

Figure 67:
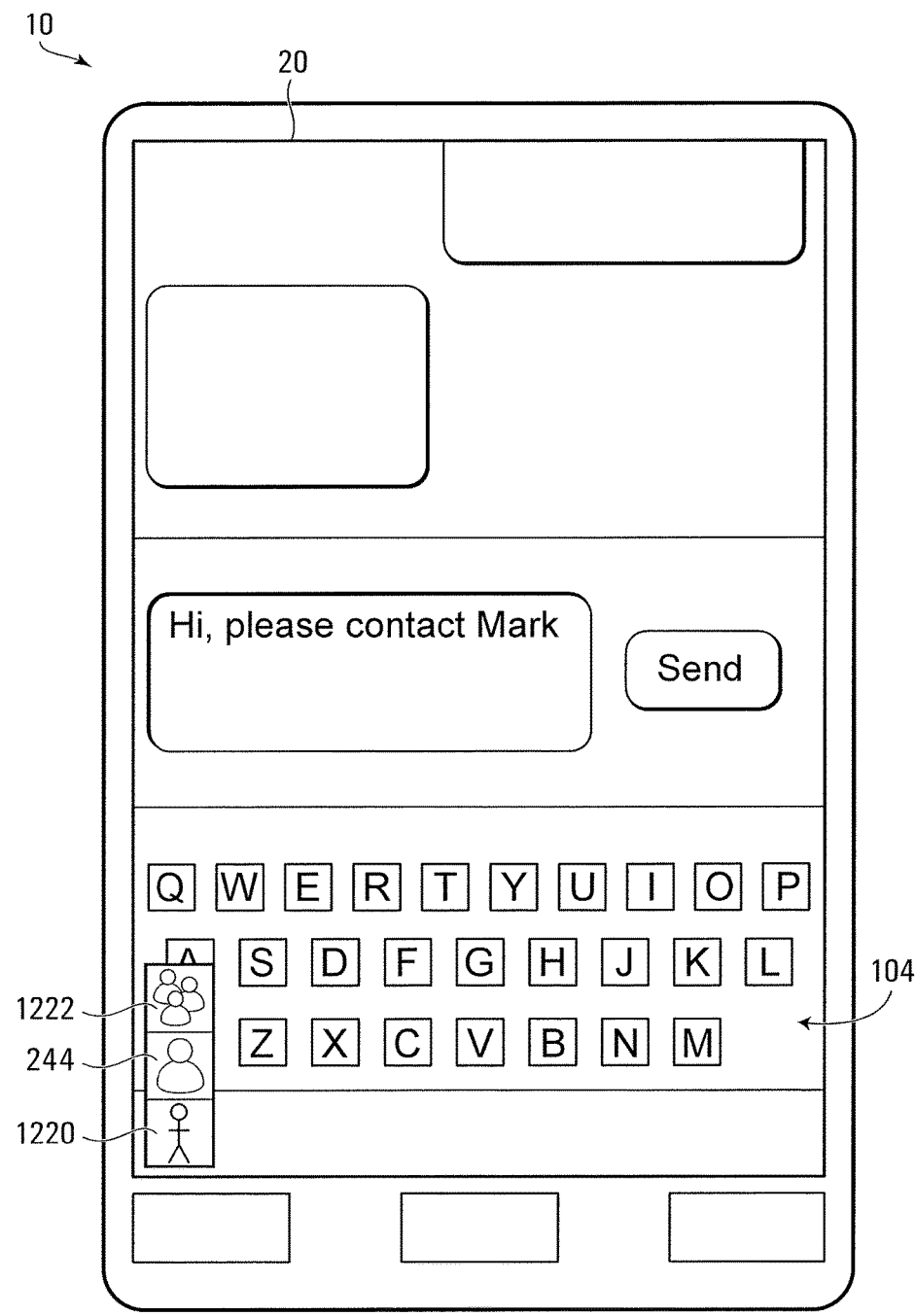
FIG. 67 is a front view of the personal computing device shown in FIG. 18 including a display showing a screenshot in accordance with one embodiment of the invention.

Block 1244 directs the keyboard application manager to display on the display 20 icons associated with the secondary applications associated with the selected group icon. In the embodiment shown in FIG. 67, block 1244 directs the keyboard application manager to display the Contact Manager icon 244 and an additional contact manager icon 1222 above the contact management group icon 1220 for selection by the user.

Block 1246 directs the keyboard application manager to detect selection of one of the displayed icons. Upon detecting selection of one of the displayed icons, the process proceeds as described above where the keyboard application manager detects selection of an icon at block 206 of FIG. 5. For example, in the embodiment shown, if the keyboard application manager detects selection of the Contact Manager icon 244 at block 1246, the keyboard application manager invokes the flowchart 300.

In various embodiments, the keyboard application may detect selection of the contact management group icon 1220 by detecting a tap on the display 20 or a click by a pointer at a position corresponding to the contact management group icon 1220 and may detect selection of the Contact Manager icon 244 by detecting a second tap on the display 20 or a second click by a pointer at a position corresponding to the Contact Manager icon 244. However in other various embodiments, the keyboard application manager may detect selection of the contact management group icon 1220 at block 204 by detecting the user holding contact with the display 20 or holding down selection with a pointer on the contact management group icon 1220. In such embodiments, the user may select a desired one of the secondary applications associated with the selected group icon by releasing contact with the display or no longer holding down selection with the pointer while pointing at the desired secondary application.

Word Selector Generating Input Data

In various embodiments, input data may be generated by a multi-select application acting as a text or data selector and stored in memory (e.g. in the location 40 of the variable memory 16). In such embodiments, block 202 may direct the keyboard application manager to apply a category test to the input data stored in the memory (e.g. in the location 40 of the variable memory 16). While a particular version of a multi-select application is described in detail below, in various embodiments, other text selecting methods may be used to select input data to store in memory which the keyboard application manager may apply category tests to in block 202.

Figure 68:
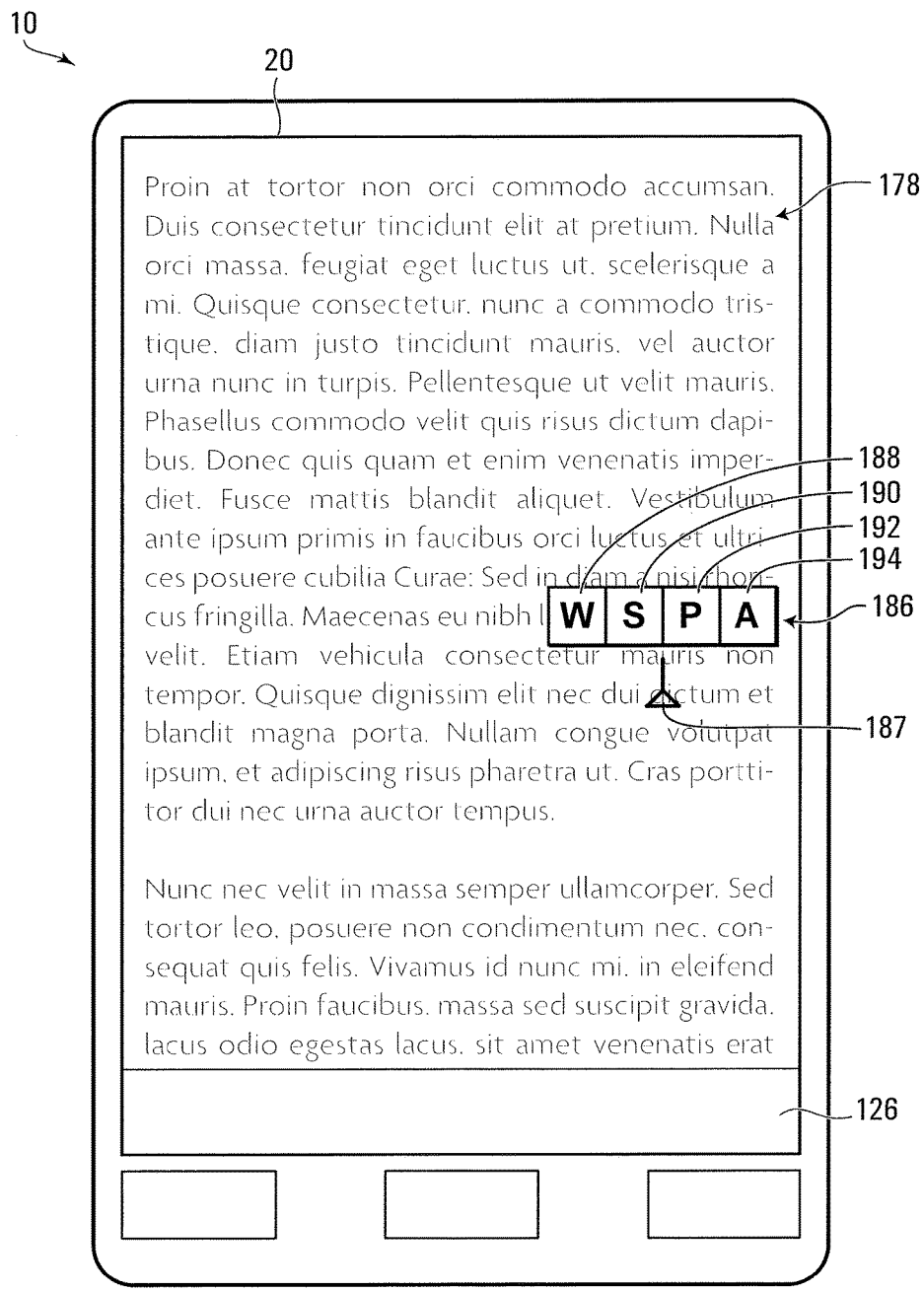
FIG. 68 is a front view of the personal computing device shown in FIG. 18 including a display showing a screenshot in accordance with one embodiment of the invention.

In various embodiments, the multi-select application may select and store portions of selectable text 178 displayed on the display 20 as shown in FIG. 68, by a device application, such as a web browser application defined in the block 36 of the program memory 14.

Figure 69:
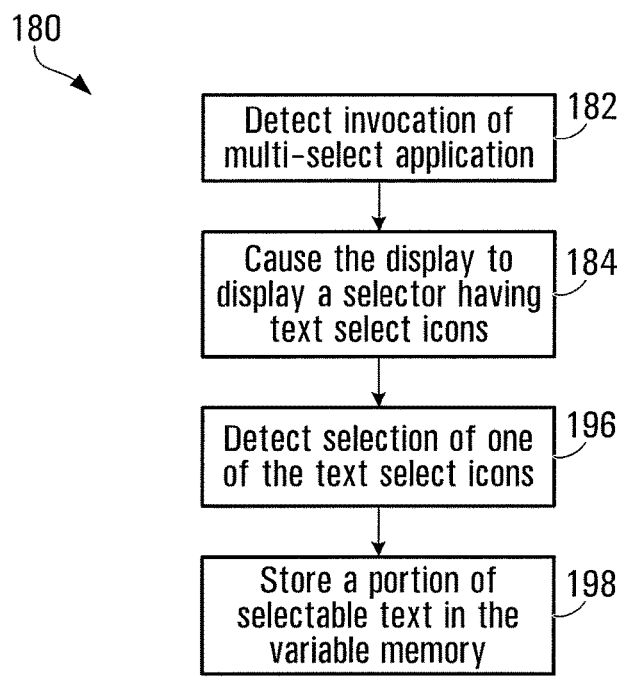
FIG. 69 is a flowchart depicting blocks of code for directing the personal computing device shown in FIG. 18 to effect multi-select application functions in accordance one embodiment of the invention.

Referring to FIGS. 68 and 69, a flowchart for directing the personal computing device 10 shown in FIG. 1 to perform multi-select functions in accordance with various embodiments is shown generally at 180. The flowchart 180 may be encoded in the block of codes 37 for directing the personal computing device 10 to effect multi-select application functions as shown in FIG. 18. Thus, in various embodiments, the flowchart 180 depicts a process effected by the multi-select application.

The flowchart 180 begins with block 182 which directs the personal computing device 10 to detect invocation of the multi-select application. In various embodiments, the personal computing device 10 may detect that the user has invoked the multi-select application by determining that the user has contacted the display 20 at a location corresponding to the selectable text 178 being displayed on the display 20 for a period of time greater than a threshold time period. In various embodiments, the threshold time period may be 3 seconds.

Next, block 184 directs the multi-select application of the personal computing device 10 to cause the display 20 to display a selector 186 having a word select icon 188, a sentence select icon 190, a paragraph select icon 192, and a select all icon 194 as shown in FIG. 68. The word select icon 188, the sentence select icon 190, the paragraph select icon 192, and the select all icon 194 act as text select icons. The selector 186 also includes a pointer 187 for pointing to a home position of the selector 186.

Block 196 directs the multi-select application of the personal computing device 10 to detect selection of one of the plurality of text select icons 188, 190, 192, or 194.

Block 198 then directs the multi-select application of the personal computing device 10 to store a portion of the selectable text 178 corresponding to the selected one of the text select icons 188, 190, 192, or 194 in memory (e.g. in the location 40 of the variable memory 16). For example, if the multi-select application detects selection of the word select icon 188, block 198 directs the multi-select application to store a word of the selectable text 178 preceding the pointer 187 of the selector 186 in memory (e.g. in the location 40 of the variable memory 16). If the multi-select application detects selection of the sentence select icon 190, block 198 directs the multi-select application to store a sentence of the selectable text 178 preceding the pointer 187 of the selector 186 in memory (e.g. in the location 40 of the variable memory 16). If the multi-select application detects selection of the paragraph select icon 192, block 198 directs the multi-select application to store a paragraph of the selectable text 178 preceding the pointer 187 of the selector 186 in memory (e.g. in the location 40 of the variable memory 16). If the multi-select application detects selection of the select all icon 194, block 198 directs the multi-select application to store all of the selectable text 178 preceding the pointer of the selector 186 in memory (e.g. in the location 40 of the variable memory 16).

The input data stored in memory (e.g. in the location 40) may be read from the location 40 by the keyboard application manager and treated in the same way that the keyboard application manager treats the input data received from the keyboard and stored in memory (e.g. stored in the location 38). Accordingly, icons discussed herein may be displayed on the status notification bar 126, based on the input data stored by the multi-select application in memory (e.g. in the location 40).

In various embodiments block 196 directs the multi-select application to detect a position of the user's pointer along the selected text select icon. In various embodiments, the multi-select application detects sliding of the user's pointer (which may include any pointing device, such as for example a finger on a touch screen) along the text select icon to detect the position of the user's pointer along the selected text select icon. In such embodiments, block 198 may direct the multi-select application to store a portion of the selectable text 178 corresponding to the selected one of the text select icons 188, 190, 192, or 194 and to the detected position of the pointer along the selected text select icon. In some variations, for example, where the multi-select application determines that the user's pointer is positioned on a left side of the word select icon 188, block 198 directs the multi-select application to store one word of the selectable text 178 preceding the pointer 187 in memory and as the user's pointer slides to the right, block 198 directs the multi-select application to store additional words of the selectable text 178 preceding the pointer 187 in memory. Thus, in various embodiments, for example, where the multi-select application determines that the user's pointer has slid from the left side to the middle of the word select icon 188, block 198 directs the multi-select application to store 3 words of the selectable text 178 preceding the pointer 187 in memory and in various embodiments, for example, where the multi-select application determines that the user's pointer has slid from the left side to the middle of the word select icon 188, block 198 directs the multi-select application to store 10 words of the selectable text 178 preceding the pointer 187 in memory. The other text select icons 190, 192, and 194 may be treated similarly.

Multi-select Widget

Figure 70:
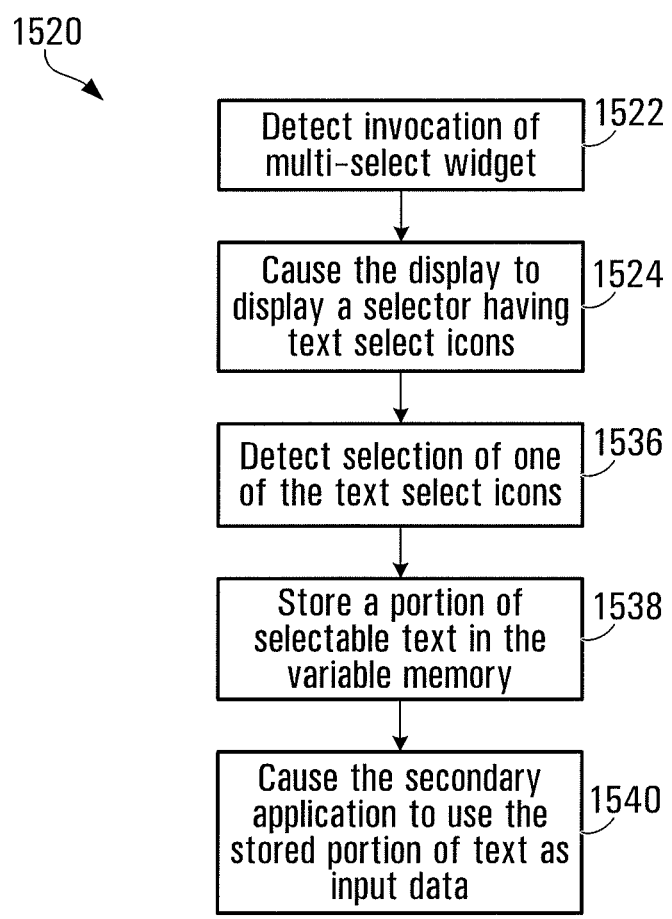
FIG. 70 is a flowchart depicting blocks of code for directing the personal computing device shown in FIG. 18 to effect multi-select widget functions in accordance with embodiments of the invention.

In various embodiments there is provided a multi-select widget which may function generally similarly to the multi-select application described above but can be invoked by a secondary application to select text. In various embodiments, once a secondary application has been invoked, the secondary application may activate the multi-select widget by invoking a flowchart 1520 as shown in FIG. 70. In the embodiment shown in FIG. 71, the user has entered text 630 and has selected the Translation icon to invoke the flowchart 780 shown in FIG. 57 and the Translation application has invoked the multi-select widget.

The flowchart 1520 may be encoded in the block of codes 32 and, more particularly, the flowchart 1520 may be encoded in a multi-select widget block of codes within the block of codes 32. Thus, in various embodiments, the flowchart 1520 depicts a process effected by the multi-select widget.

In some embodiments, where the secondary application has not already invoked the multi-select widget, the flowchart 1520 begins with block 1522 which directs the multi-select widget to detect invocation of the multi-select widget. In various embodiments, the personal computing device 10 may detect that the user has invoked the multi-select widget by determining that the user has contacted the display 20 at a location corresponding to the text 630 for a period of time greater than a threshold time period. In various embodiments, the threshold time period may be 3 seconds. In other various embodiments, the multi-select widget may be automatically invoked by the secondary application upon invocation of the secondary application and thus block 1522 may be unnecessary.

Figure 71:
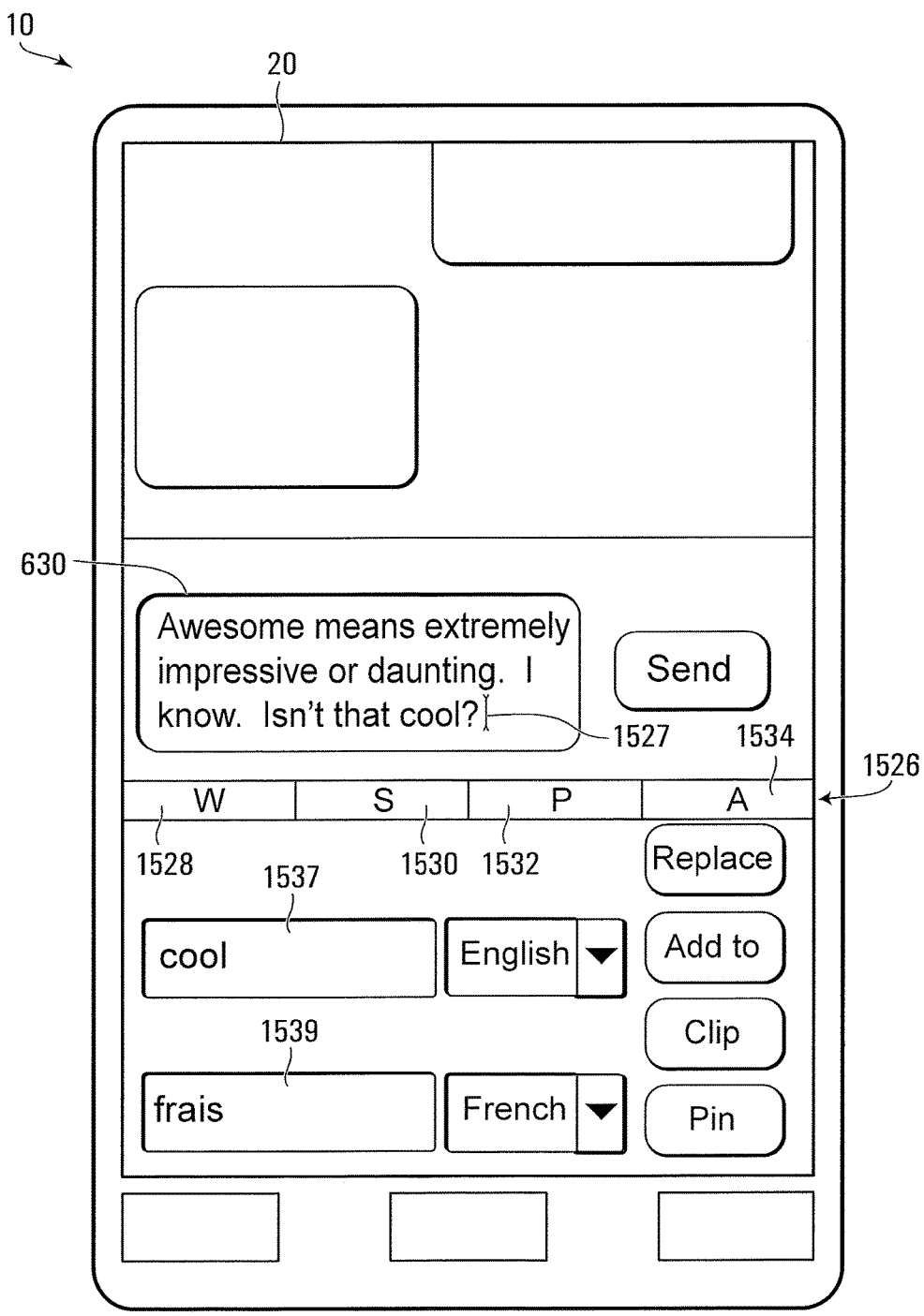
FIG. 71 is a front view of the personal computing device shown in FIG. 18 including a display showing a screenshot in accordance with one embodiment of the invention.

Next, block 1524 directs the multi-select widget to cause the display 20 to display a selector 1526 having a word select icon 1528, a sentence select icon 1530, a paragraph select icon 1532, and a select all icon 1534 as shown in FIG. 71. The word select icon 1528, the sentence select icon 1530, the paragraph select icon 1532, and the select all icon 1534 act as text select icons and are treated generally similarly to the text select icons 188, 190, 192, or 194 described above and shown in FIG. 68 except that they act on the text 630 shown in FIG. 71 rather than the selectable text 178 shown in FIG. 68. The selector 1526 also includes a pointer 1527 for pointing to a home position of the selector 1526.

Block 1536 directs the multi-select widget of the personal computing device 10 to detect selection of one of the plurality of text select icons 1528, 1530, 1532, or 1534.

Block 1538 directs the multi-select widget to store a portion of the text 630 corresponding to the selected one of the text select icons 1528, 1530, 1532, or 1534 in memory (e.g. in the location 40 of the variable memory 16). For example, if the multi-select widget detects selection of the word select icon 1528, block 1538 directs the multi-select widget to store a word of the text 630 preceding the pointer 1527 of the selector 1526 in memory (e.g. in the location 40 of the variable memory 16). If the multi-select widget detects selection of the sentence select icon 1530, block 1538 directs the multi-select widget to store a sentence of the text 630 preceding the pointer 1527 of the selector 1526 in memory (e.g. in the location 40 of the variable memory 16). If the multi-select widget detects selection of the paragraph select icon 1532, block 1538 directs the multi-select widget to store a paragraph of the text 630 preceding the pointer 1527 of the selector 1526 in memory (e.g. in the location 40 of the variable memory 16). If the multi-select widget detects selection of the select all icon 1534, block 1538 directs the multi-select widget to store all of the text 630 preceding the pointer of the selector 1526 in memory (e.g. in the location 40 of the variable memory 16). Thus, for example, in the embodiment shown in FIG. 71, the word select icon 1528 has been selected by the user and thus, block 1534 directs the multi-select widget to store the word "cool" in memory (e.g. in the location 40).

In various embodiments block 1536 directs the multi-select widget to detect a position of the user's pointer along the selected text select icon and store input data similar to as described above having regard to blocks 196 and 198 of the flowchart 180 shown in FIG. 69.

Block 1540 directs the multi-select widget to cause the secondary application to use the stored portion of text as input data. In various embodiments, block 1540 may direct the multi-select widget to store an indicator indicating that a portion of the input data has been selected by the multi-select widget in memory (e.g. in the location 40) accessible to the secondary application. In such embodiments, the secondary application monitors memory (e.g. the location 40) looking for such an indicator, and once the secondary application determines that the indicator indicates that the multi-select widget has stored input data in memory, the secondary application treats the input data stored by the multi-select widget (e.g. in the location 40 of the variable memory 16) as described above for the input data from the keyboard stored in the memory (e.g. in the location 38 of the variable memory 16). In other embodiments, the multi-select widget may send a message to the secondary application indicating that a portion of text has been selected using the multi-select widget. For the embodiment shown in FIG. 71, block 1540 directs the multi-select widget to cause the Translator application to treat the word "cool" stored in memory by the multi-select widget as input data and thus the word "cool" is displayed at 1537 by the Translator application and a translation of "cool" (i.e. "frais") is generated and displayed at 1539 by the Translator Application.

Network Connection Data

In various embodiments, the keyboard application manager may be directed by a block of code included in the block of codes 32 of the program memory 14 to query a network connection such as the I/O interface 18, determine whether there is a network connection and store network connection data associated with the network connection in memory (e.g. in the location 50 of the variable memory 16). In various embodiments, the network connection data may act as input data. In such embodiments, block 202 may direct the keyboard application manager to apply a category test to the network connection data stored in memory (e.g. in the location 50 of the variable memory 16).

In various embodiments, the network connection data may include a cost indicator indicating a cost of accessing the network. In various embodiments, the network connection data may also include a bandwidth indicator for indicating a bandwidth of the network connection.

In various embodiments, block 202 shown in FIG. 5 may direct the keyboard application manager to determine whether the network connection data stored in the location 50 indicates that the cost of accessing the network is less than or equal to a threshold cost and thus determine whether the network connection data falls within a Low Cost Network category. In various embodiments, the threshold cost may be $0 and thus the keyboard application manager may determine whether the cost of accessing the network is free.

In various embodiments, block 202 may direct the keyboard application manager to determine whether the network connection data stored in the location 50 indicates that the bandwidth of the network is greater than or equal to a threshold bandwidth and thus determine whether the network connection data falls within a High Bandwidth Network category. In various embodiments, the threshold bandwidth may correspond to a high-speed bandwidth connection, for example a connection able to transfer data at more than 1 Mb/s.

In various embodiments, there may be provided secondary applications which use a large quantity of bandwidth and thus require a free network connection to be desirable to the user. For example, a high bandwidth use secondary application may include an application data structure stored in the location 44 which includes a Low Cost Network category identifier identifying the Low Cost Network category. In such an embodiment, block 204 may direct the keyboard application manager to display an icon associated with a high bandwidth application on the display 20 for selection by the user, only when the keyboard application manager determines at block 202 that the network connection data falls within the Low Cost Network category.

In some variations, for example a secondary application such as a Movie application may be provided as a form of secondary application and may require high bandwidth and thus a Movie application data structure stored in memory (e.g. in the location 44 of the variable memory 16) may include a Low Cost Network category identifier identifying the Low Cost Network category. In such embodiments, block 204 may direct the keyboard application manager to display a Movie application icon on the display 20 for selection by the user, only when the keyboard application manager determines at block 202 that the network connection data falls within the Low Cost Network category.

An example of a network connection which may be associated with network connection data falling within a Low Cost Network category may be an internet connection such as a Wifi™ connection, or if the user has an unlimited data subscription, a mobile network connection such as a 4G or LTE connection.

In various embodiments, there may be provided high bandwidth use secondary applications which require a high-speed connection in order to be desirable to the user. In various embodiments, the high bandwidth use secondary applications may include in their respective application data structures stored in the location 44 a High Bandwidth Network category identifier identifying the High Bandwidth Network category. In such embodiments, block 204 shown in FIG. 5 may direct the keyboard application manager to display the high bandwidth use secondary application icon on the display 20 for selection by the user, only when the keyboard application manager determines at block 202 that the network connection data falls within the High Bandwidth Network category.

For example, a secondary application such as the Movie application may be a high bandwidth use application and thus a Movie application data structure stored in the location 44 may include High Bandwidth Network category identifier identifying the High Bandwidth Network category. In such an embodiment, block 204 may direct the keyboard application manager to display the Movie application icon on the display 20 for selection by the user, when the keyboard application manager determines at block 202 that the network connection data falls within the High Bandwidth Network category.

An example of such a network connection may be a 4G or LTE connection or an internet connection such as a Wifi™ connection.

Combination Categories

In various embodiments, secondary application data structures may include a combination category identifier which identifies more than one category and thus allows a secondary application to be associated with more than one category such that the secondary application's icon is displayed only when a certain combination of categories are fulfilled.

In various embodiments, each time that block 202 shown in FIG. 5 is invoked, block 202 may direct the keyboard application manager to store the results of a category test in memory (e.g. in the location 59 of the variable memory 16). In such embodiments, block 202 may apply a combination category test to determine whether the results stored in memory (e.g. in the location 59) fall within a combination category by reading the stored results of the category tests from memory (e.g. the location 59 of the variable memory 16) and determining whether all of the categories associated with the combination category have been met.

In some variations, for example, the Movie application data structure may include a combination category identifier identifying both the Bandwidth category and the Low Cost Network category and in such embodiments, the keyboard application manager is directed by block 202 to determine whether results stored in memory (e.g. in the location 59) indicate that the Bandwidth category and the Low Cost Network category have been met to determine whether the results stored in memory fall within the combination category identifier identifying both the Bandwidth category and the Low Cost Network category. Thus block 204 directs the keyboard application manager to display the Movie application icon on the display for selection by the user only when the keyboard application manager determines that the network connection falls within both the High Bandwidth Network and Low Cost Network categories.

Location Based

In various embodiments, location information may be retrieved by the keyboard application manager via the GPS receiver and transmitter 21, the NFC receiver and transmitter 23 or the I/O interface 18 and stored in memory (e.g. in the location 52 of the variable memory 16).

In various embodiments, the location information may act as input data and thus, in various embodiments, block 202 shown in FIG. 5 may direct the keyboard application manager to determine whether the location information (e.g. as stored in the location 52 of the variable memory 16) corresponds to an allowed location stored in memory (e.g. in the location 56 of the variable memory 16) to determine whether the location information falls within a category associated with the allowed location. In some variations, for example the allowed location stored in memory may be a work location and block 202 may direct the keyboard application manager to determine whether the location information stored in memory (e.g. in the location 52 of the variable memory 16) corresponds to the work location stored in memory (e.g. in the location 56 of the variable memory 16) to determine whether the location information falls within a Work Location category. The Work Location category may be, for example, associated with secondary applications that should be accessed at work. In various embodiments, there may be many different "allowed locations" stored in memory, each associated with a particular category.

In various embodiments, there may be provided a location sensitive secondary application which is only desirable to the user when the user is in a particular location. Accordingly, a data structure for the location sensitive secondary application may include a category identifier identifying a location category associated with the particular location where the location sensitive application is desirable.

Employee Management Application

In various embodiments, there may be provided a secondary application which is an Employee Management application. A user who is a human resources manager may only wish to access the Employee Management application when the user is at work. Thus, in various embodiments, the allowed location stored in memory (e.g. in the location 56 of the variable memory 16) may include work location information corresponding to the user's work location and block 202 shown in FIG. 5 may direct the keyboard application manager to determine that the location information stored in memory (e.g. in the location 52 of the variable memory 16) falls within a Work Location category when the location information corresponds to the work location information and thus indicates that the user is at work.

In various embodiments, an Employee Management application data structure stored in the location 44 of the variable memory 16 may include a combination category identifier that includes a Work Location category identifier and the Proper Noun category identifier.

Figure 72:
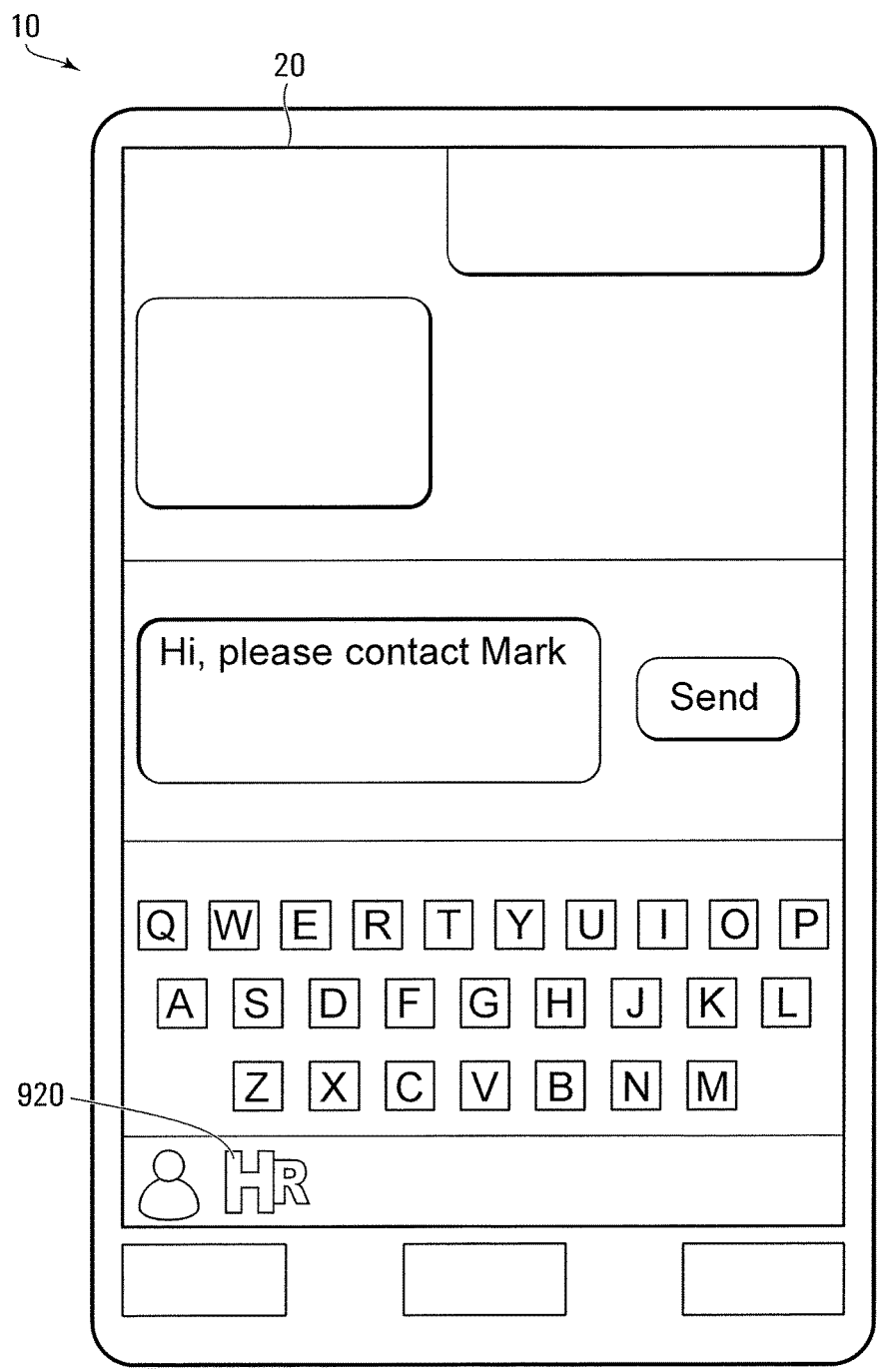
FIG. 72 is a front view of the personal computing device shown in FIG. 18 including a display showing a screenshot in accordance with one embodiment of the invention.

In various embodiments, such as the embodiment shown in FIG. 72, the keyboard application manager may determine at block 202 that the location information stored in memory (e.g. in the location 52 of the variable memory 16) corresponds to the work location stored in memory (e.g. in the location 56 of the variable memory 16) and thus the location information falls within the Work Location category. The keyboard application manager may also determine at another iteration of an embodiment of block 202 that the input data stored in memory (e.g. in the location 38 of the variable memory 16) falls within the Proper Noun category described above. As described above, in various embodiments, the keyboard application manager may be directed to store the results of the Work Location category test and the Proper Noun category test in memory (e.g. in the location 59). Accordingly, in various embodiments, the keyboard application manager determines at another iteration of block 202 that the results stored in memory (e.g. in the location 59 of the variable memory 16) fall within the combination category that includes the Work Location category identifier and the Proper Noun category identifier. Accordingly, block 204 may direct the keyboard application manager to display an Employee Management application icon 920 on the display 20 for selection by the user.

Figure 73:
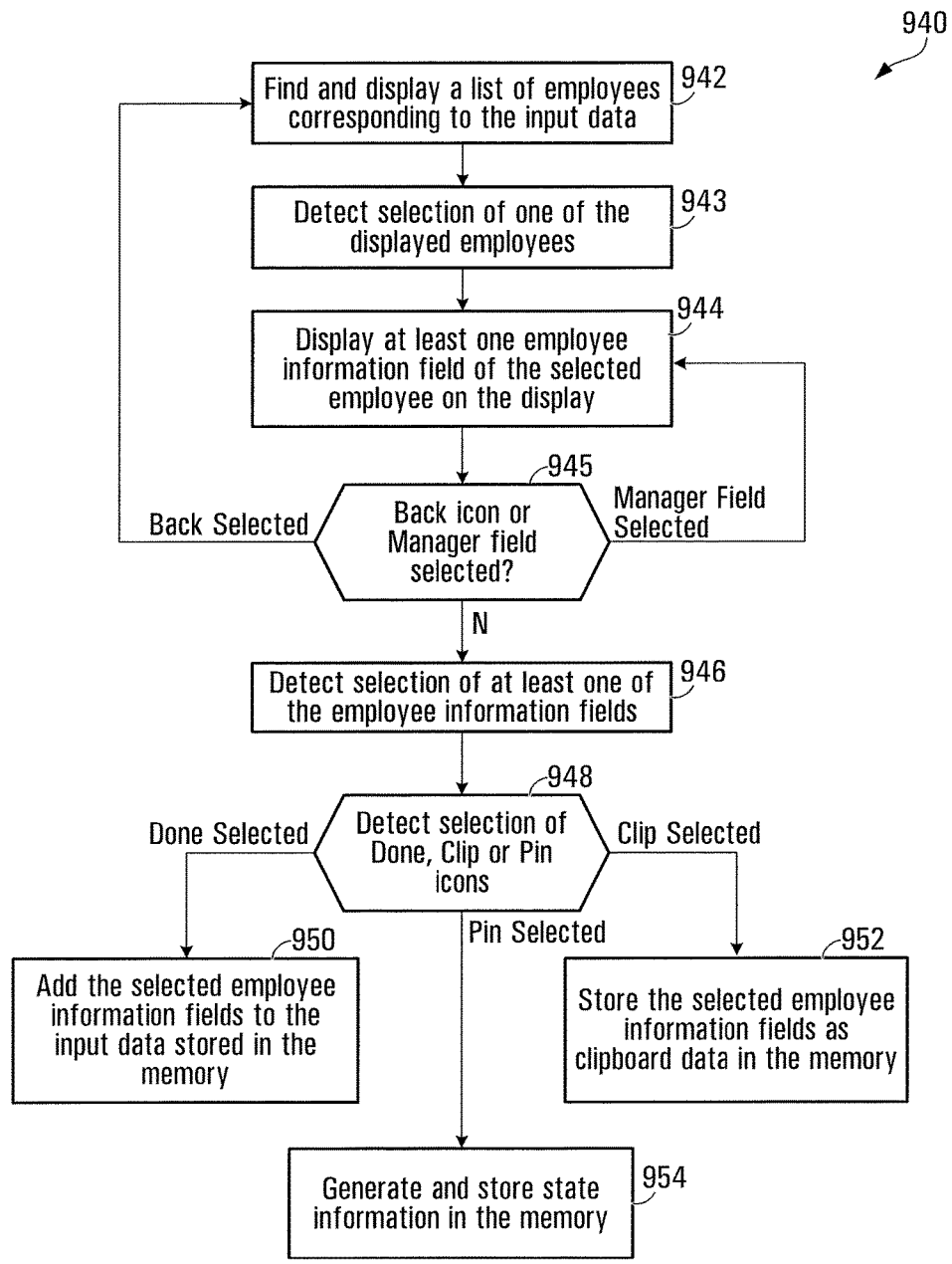
FIG. 73 is a flowchart depicting blocks of code for directing the personal computing device shown in FIG. 18 to effect Employee Management application functions in accordance with one embodiment of the invention.

If at block 206, the keyboard application manager detects selection of the Employee Management application icon 920, the keyboard application manager is directed to activate or invoke the Employee Management application by invoking a flowchart 940 as shown in FIG. 73.

As described for the flowchart 300 shown in FIG. 11, the flowchart 940 may be encoded in a different block of codes from the block of codes 32 of the program memory 14 for directing the personal computing device 10 to effect keyboard application manager functions. The flowchart 940 may be encoded in an Employee Management application block of codes within the block of codes 34. Thus, in various embodiments, the flowchart 940 depicts a process effected by the Employee Management application. The flowchart 940 may include steps generally similar to those included in the flowchart 300 described above in FIG. 11.

The flowchart 940 begins with block 942 which directs the Employee Management application to read employee information stored in memory (e.g. in the location 58 of the variable memory 16) to find and display a list of employees having respective employee information fields corresponding to the input data (e.g. as stored in the location 38 of the variable memory 16). An employee may be formatted similar to the contact 320 shown in FIG. 12. Employee information fields may be generally similar to the contact information fields and may include a first name field, a last name field, a hire date, an employee photo, a termination date, a manager, a title, a department, a position, an internal extension number, and an office number. Other employee fields may include, for example, any of the contact information fields described above having regard to the contact 320 shown in FIG. 12.

Block 943 directs the Employee Management application to detect user selection of one of the displayed employees. Once the Employee management application detects selection of one of the displayed employees, the process proceeds to block 944.

Block 944 directs the Employee Management application to display at least one of the employee information fields of the selected employee on the display 20, for selection by the user. Block 944 also directs the Employee Management application to display a Back icon, a Done icon, a Clip icon, and a Pin icon on the display 20 for user selection, similar to the embodiment shown in FIG. 14 for displaying the contact information fields of the contact 320.

Block 945 directs the Employee Management application to determine whether the Back icon has been selected by the user, and if the Back icon has been selected the Employee Management application is directed to return to block 942 to redisplay the list of employees on the display 20. Block 945 also directs the Employee Management application to determine whether the manager field has been selected. If the manager field has been selected, block 945 directs the Employee Management application to return to block 944 and display on the display 20 for selection by the user at least one employee information field of the employee that corresponds to the manager field selected. Thus, the Employee Management application allows the user to view the employee information fields of the manager by selecting the manager field.

Block 946 then directs the Employee Management application to detect selection of at least one of the employee information fields.

Block 948 directs the Employee Management application to detect selection of one of the Done, Clip and Pin icons. If at block 948, the Employee Management application detects selection of the Done icon, the process proceeds to block 950.

Block 950 directs the Employee Management application to add the selected at least one of the employee information fields to the input data stored in memory (e.g. in the location 38 of the variable memory 16) as described above having regard to block 310 of the flowchart 300 shown in FIG. 11, and cause the keyboard to be redisplayed. In various embodiments, block 950 directs the Employee Management application to add connecting text to the input data.

If at block 948, the Employee Management application detects selection of the Clip icon, the process proceeds to block 952. Block 952 directs the Employee Management application to store the selected at least one of the employee fields 952 in memory (e.g. in the location 39 for storing clipboard copied data) for later insertion into the input data or another editable field or document. In various embodiments, block 952 directs the Employee Management application to cause the keyboard to be redisplayed. However in other embodiments, block 952 may direct the Employee Management application to continue to control the display 20 and display the employee information fields for user selection and the user may exit the secondary application and pass control back to the keyboard program and the keyboard application manager, such as by selecting a close icon, for example, generally as described above having regard to block 312 shown in FIG. 11.

If at block 948, the Employee Management application detects selection of the Pin icon, the process proceeds to block 954. Block 954 directs the Employee Management application to generate state information defining a state of the Employee Management application and store the state information in the variable memory 16 (e.g. in the location 46). Block 954 also directs the Employee Management application to cause the keyboard to be redisplayed and to cause the keyboard application manager to display a resume state icon on the display 20 generally as described and shown above having regard to FIG. 17, for example.

Access to Secondary Applications and Memory Via the Internet

Figure 74:
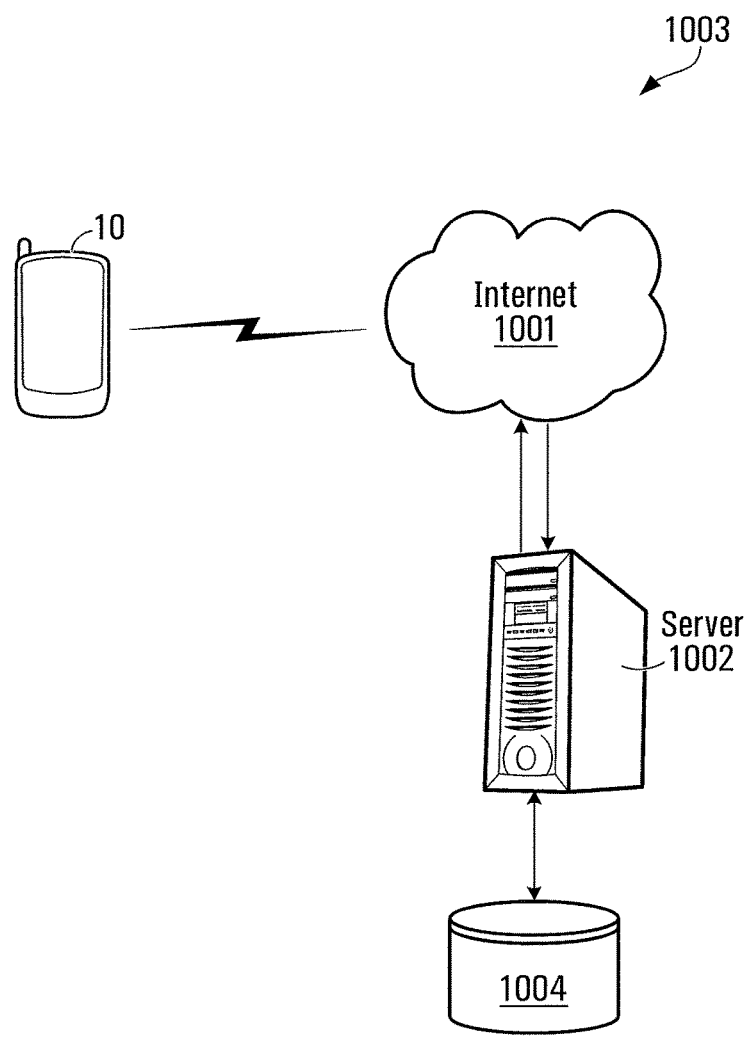
FIG. 74 is a block diagram of a system for executing an action related to data input including the personal computing device generally as shown in FIG. 18 in accordance with one embodiment.

Referring now to FIG. 74, there is shown a system 1003 for executing an action related to data input by a user in accordance with one embodiment. In various embodiments, the system 1003 includes the personal computing device 10 generally as shown in FIG. 18, a network 1001 such as the Internet, a server 1002 and server memory 1004. In various embodiments, the blocks of code 34 defining the secondary applications described herein as stored in the program memory 14 of the personal computing device 10 may also or alternatively be stored in the server memory 1004. Further, in various embodiments, the data described herein as stored in the variable memory 16 may also or alternatively be stored in the server memory 1004. In various embodiments, the personal computing device 10 may access the server memory 1004 via the network 1001.

In various embodiments, data stored in the variable memory 16 of the personal computing device as described herein, may instead be stored in the server memory 1004 and accessed by the personal computing device 10 via the network 1001. For example, the contact information or the employee information described herein as stored in the variable memory 16 may instead be stored in the server memory 1004. In various embodiments, the server memory 1004 may be configured to store a database such as a corporate database or a web services database.

Similarly, in various embodiments the blocks stored in the program memory 14 shown in FIGS. 1 and 18, such as the blocks defining secondary applications, described herein as stored in the program memory 14 may instead be stored in the server memory 1004 and accessed by the personal computing device 10 via the network 1001.

In various embodiments, the personal computing device 10 may access the network 1001 via the I/O interface 18, NFC receiver and transmitter 23 or the Bluetooth receiver and transmitter 25, as shown in FIG. 18, for example.

Some examples of secondary applications which may be accessed via the Internet or may store memory via the Internet include but are not limited to: advertising applications, translation applications, contact manager applications, restaurant reservation applications, hotel/airline reservation applications, car leasing applications, and stock quote retrieving applications.

Pattern Recognizer

In various embodiments, determining whether the input data includes one of a plurality of patterns in block 202 of FIG. 5 may involve using code defining a pattern recognizer which in various embodiments may include a semantic engine.

In various embodiments, the pattern recognizer may be encoded in the block of codes 32 for directing the personal computing device 10 to effect keyboard application manager functions. In other embodiments, the pattern recognizer may be encoded separately from the keyboard application manager. In some variations, for example, the pattern recognizer may be encoded in the block of codes 35 of the program memory 14 as shown in FIG. 18. Alternatively, in various embodiments, the pattern recognizer may be implemented by an external device other than the personal computing device 10, such as the server 1002 shown in FIG. 74 and codes defining the pattern recognizer may be stored in memory external to the personal computing device 10 such as, for example, in the server memory 1004

In various embodiments the pattern recognizer may determine whether the input data falls within a particular category using generally the same processes described herein having regard to the keyboard application manager and block 202 shown in FIG. 5.

In various embodiments, the pattern recognizer may act as a semantic engine and determine the meaning or context of text included in the input data. In such embodiments, the pattern recognizer may identify parts of speech in the input data. In some variations, for example, the pattern recognizer may determine whether a particular proper noun is a name, a place, a car, or a sports team based on surrounding text within the input data and/or context.

In various embodiments, where the pattern recognizer is executed by an external device other than the personal computing device 10, block 202 of FIG. 5 may direct the keyboard application manager to send an input data message to the external device (e.g. the server 1002), the input data message including the input data or a portion thereof read from memory (e.g. the location 38 of the variable memory 16) or received from the keyboard program. In such embodiments, block 202 may direct the keyboard application manager to then receive a pattern message from the external device (e.g. the server 1002), the pattern message including pattern information and, based on the pattern information, determine whether the input data falls within a category.

The pattern recognizer may generate the pattern information based on the input data. In various embodiments, the pattern information may indicate for example, whether the input data falls within a particular pattern, such as a Name pattern associated with a Name category. The pattern information may also include information associated with the input data or text within the input data. In some variations, for example, where the pattern recognizer determines that one word in the input data is a name, the pattern information may identify the particular word as a name.

In various embodiments, block 202 of FIG. 5 may direct the keyboard application manager to send input data including "Hi, please contact Mark" to the pattern recognizer. For example, if the pattern recognizer is implemented by the server 1002 shown in FIG. 74, block 202 may direct the keyboard application manager to send the input data to the server 1002 via the I/O interface 18 in an input data message. The pattern recognizer may analyze the input data and generate pattern information based thereon. If the pattern recognizer is implemented by the server 1002 shown in FIG. 74, the server 1002 may then send the pattern information to the personal computing device 10 via the I/O interface 18.

Block 202 may then direct the keyboard application manager to receive and read the pattern information, and determine whether the input data falls within a category, based on the pattern information.

In some variations, for example, where the pattern information includes a Name category identifier indicating that the input data falls within a Name category, the keyboard application manager may determine, based on the pattern information (i.e. the Name category identifier) at block 202 that the input data falls within a Name category. In another embodiment where the pattern information identifies a certain word within the input data as a place and not a name, the keyboard application manager may, based on this information, determine that the input data does not fall within a Name category, but rather falls within a Place category.

Secondary Applications Involved in Category Determination

In various embodiments, determining whether the input data includes one of a plurality of patterns in block 202 of FIG. 5 may involve using a secondary application. In some variations, for example, block 202 may direct the keyboard application manager to invoke a block of codes defining a secondary application within the block of codes 34 of the program memory 14 to determine whether the input data stored in memory (e.g. in the location 38 of the variable memory 16) falls within a category.

In various embodiments, block 202 may direct the keyboard application manager to invoke a block of codes included in the Contact Manager application block of codes to determine whether input data corresponds to contact information fields associated with one of the contacts stored in memory (e.g. in the location 49 of the variable memory 16). In such embodiments, for example, the keyboard application manager may cause the Contact Manager application to determine whether a Proper Noun within the input data in memory corresponds to a first name field or a last name field of one of the contacts stored in memory. The Contact Manager application may store or send to the keyboard application manager a message including "TRUE" if the Proper Noun corresponds to a first name field or a last name field of one of the contacts and including "FALSE" if the Proper Noun does not correspond to a first name field or a last name field of one of the contacts stored in memory.

Block 202 shown in FIG. 5 may then direct the keyboard application manager to determine whether the input data falls within a Proper Noun Contact category based on the message. In various embodiments, the Contact Manager data structure may include a Proper Noun Contact category identifier and not the Proper Noun category identifier, and thus block 206 may direct the keyboard application manager to display the Contact Manager icon on the display 20 when the input data is found to fall within the Proper Noun Contact category, but not necessarily whenever the input data is found to fall within the Proper Noun category.

In various embodiments, block 202 may direct the keyboard application manager to invoke a block of codes included in the Login Management application block of codes to determine whether contextual information indicating a type of username expected corresponds to any login candidates stored in memory. In such embodiments, for example, the keyboard application manager may cause the Login Management application to read a website URL identifier from memory (e.g. the location 69) and determine whether the website URL identifier corresponds to a login candidate stored in memory. In various embodiments, Login Management application may store or send to the keyboard application manager a message including "TRUE" if the website URL identifier corresponds to a login candidate and including "FALSE" if the website URL identifier does not correspond to a login candidate stored in memory.

Block 202 may then direct the keyboard application manager to determine whether the input data falls within a Corresponding Login Candidate category based on the message. In various embodiments, the Login Management data structure may include a Corresponding Login Candidate category identifier, and not the Login Management category, and thus block 206 may direct the keyboard application manager to display the Login Management icon on the display 20 when the input data is found to fall within the Corresponding Login Candidate category but not necessarily whenever the input data is found to fall within the Login Management category.

Reservations

In various embodiments, the plurality of patterns detectable by the keyboard application manager include restaurant patterns (or restaurant reservation patterns) and applying the category test involves determining whether the input data from the user (e.g. the input data stored in the location 38 of the variable memory 16) corresponds to one of the restaurant patterns and thus falls within a Restaurant category. In such embodiments, block 202 may direct the keyboard application manager to determine whether the input data includes any of the following text, for example: "starved", "starving", "going out", "reservation", "restaurant", "hungry", or some other restaurant related input pattern. In the embodiment shown in FIG. 75, the input data includes the text, "I am starving." and the keyboard application manager determines at block 202 that the input data includes one of the restaurant patterns (i.e. "starving") and that the input data falls within the Restaurant category.

Figure 75:
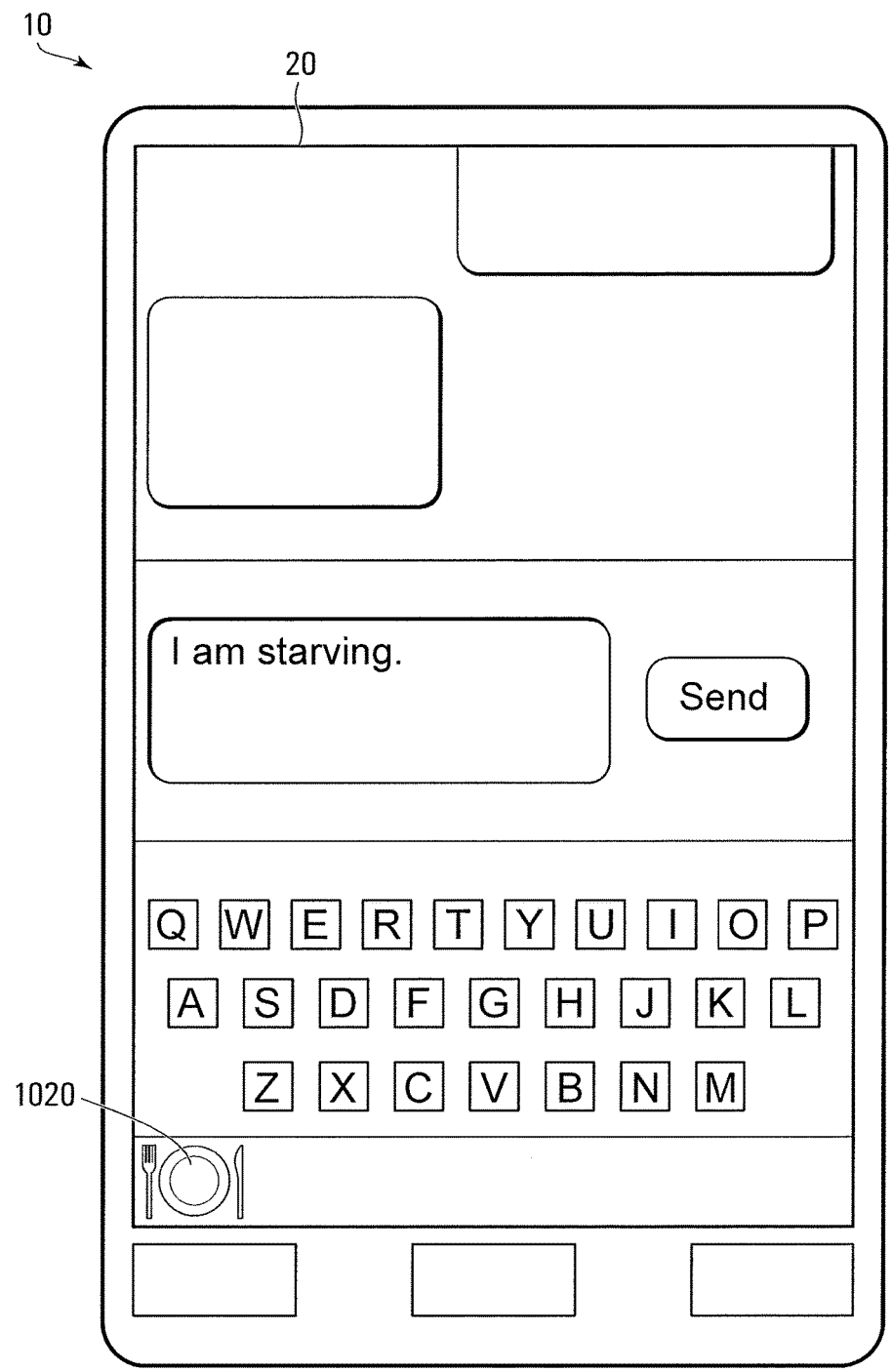
FIG. 75 is a front view of the personal computing device shown in FIG. 18 including a display showing a screenshot in accordance with one embodiment of the invention.
Figure 76:
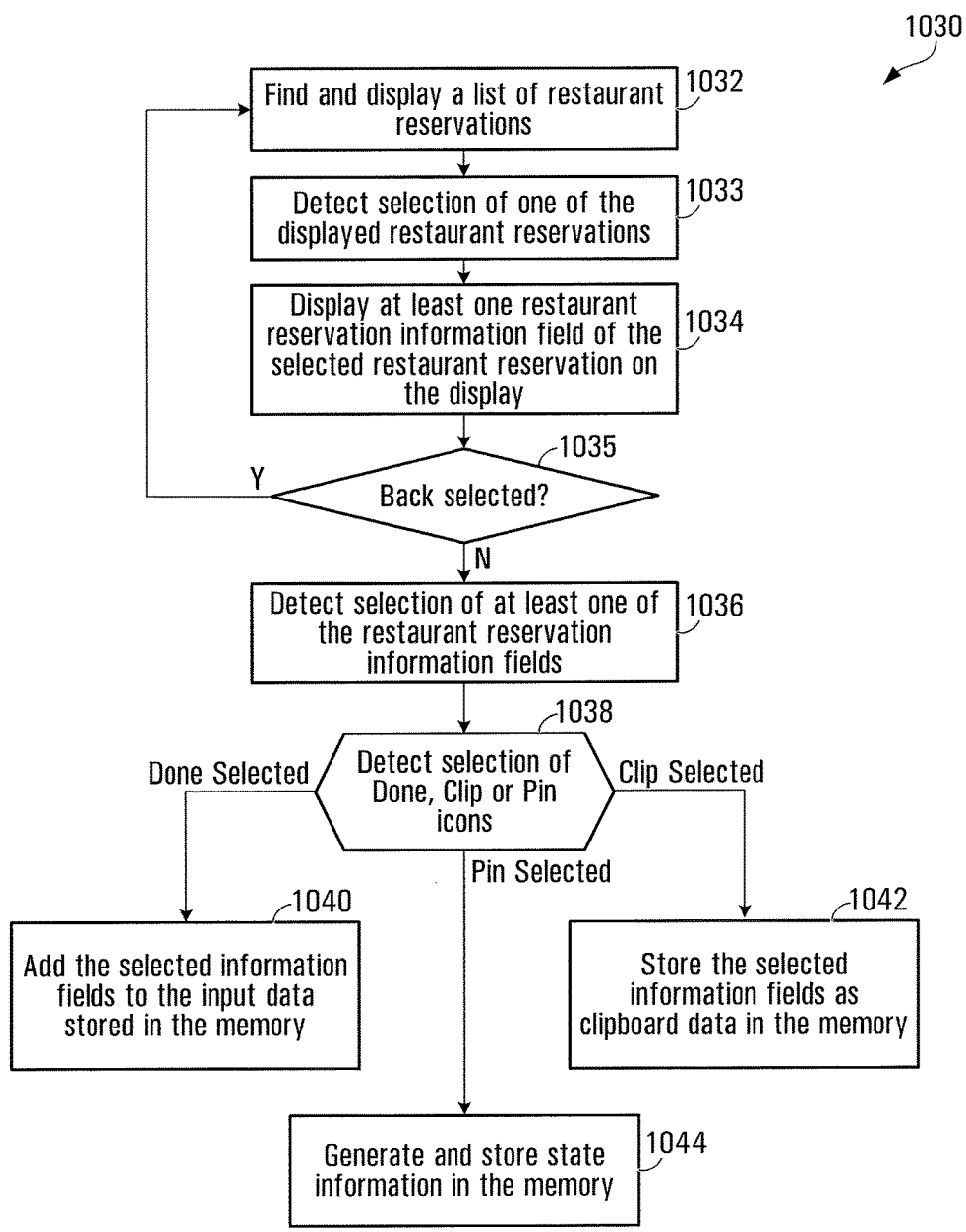
FIG. 76 is a flowchart depicting blocks of code for directing the personal computing device shown in FIG. 18 to effect Restaurant reservation application functions in accordance with one embodiment of the invention.

Various secondary applications may be associated with the Restaurant category. In some variations, for example, a Restaurant Reservation application may be provided as a form of secondary application for finding and displaying restaurant reservation information related to input data received from the user and may be associated with the Restaurant category. In various embodiments, the Restaurant Reservation application may be defined in the block 34 of the program memory 14 shown in FIG. 18. In such embodiments, a Restaurant Reservation application data structure similar in format to the Contact Manager application data structure 240 shown in FIG. 6, but including a Restaurant category identifier may be stored in memory (e.g. in the location 44 of the variable memory 16). Thus, in various embodiments, block 204 directs the keyboard application manager to display a Restaurant Reservation icon 1020 on the display 20 for selection when the input data stored in memory (e.g. in the location 38 of the variable memory 16) is found to fall within the Restaurant category, as shown in FIG. 75. If at block 206, the keyboard application manager detects selection of the Restaurant Reservation icon 1020, the keyboard application manager may activate or invoke the Restaurant Reservation application by invoking a flowchart 1030 as shown in FIG. 76.

As described for the flowchart 300 shown in FIG. 11, the flowchart 1030 may be encoded in a different block of codes from the block of codes 32 for directing the personal computing device 10 to effect keyboard application manager functions. More particularly, the flowchart 1030 may be encoded in a Restaurant Reservation application block of codes within the block of codes 34. Thus, in various embodiments, the flowchart 1030 depicts a process effected by the Restaurant Reservation application. In various embodiments, the flowchart 1030 may include generally similar processes as those involved in the flowchart 300 shown in FIG. 11.

Figure 77:
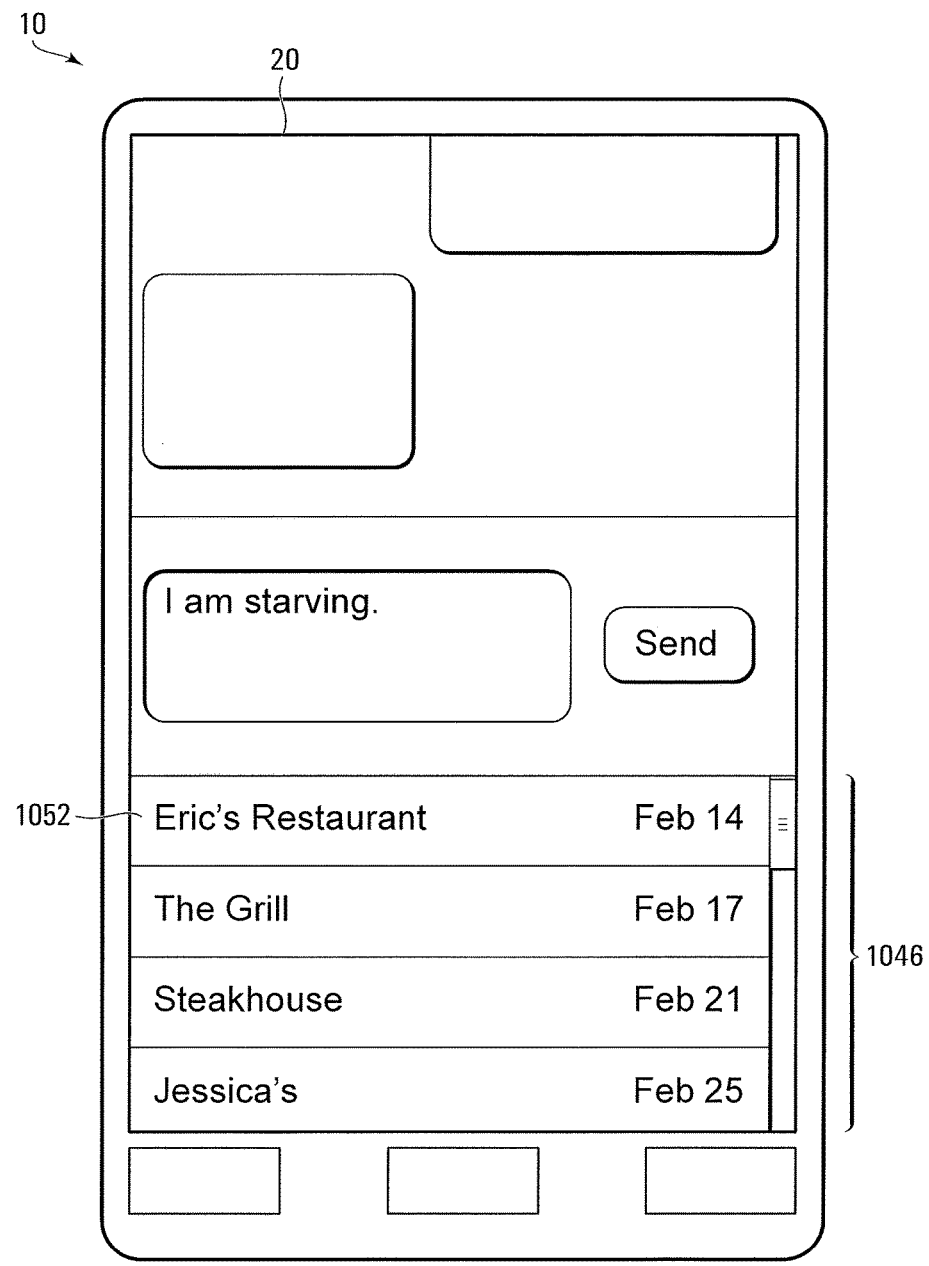
FIG. 77 is a front view of the personal computing device shown in FIG. 18 including a display showing a screenshot in accordance with one embodiment of the invention.

The flowchart 1030 begins with block 1032 which directs the Restaurant Reservation application to read restaurant reservation information from an external device such as a server on the internet such as the server 1002 shown in FIG. 74, to find and display a list of restaurant reservations 1046 on the display 20, as shown in FIG. 77. In various embodiments, the list of restaurant reservations 1046 may include restaurant reservations related to the input data. In the embodiment shown, each of the listed restaurant reservations includes a respective restaurant name and reservation date, as read from restaurant reservation information retrieved from the server 1002. In various embodiments, the restaurant reservation information may also be read from memory (e.g. the variable memory 16).

Block 1033 directs the Restaurant Reservation application to detect user selection of one of the displayed restaurant reservations 1046. Once the Restaurant Reservation application detects selection of one of the displayed restaurant reservations 1046, the process proceeds to block 1034. In this embodiment, the Restaurant Reservation application detects selection of a first reservation 1052.

Figure 78:
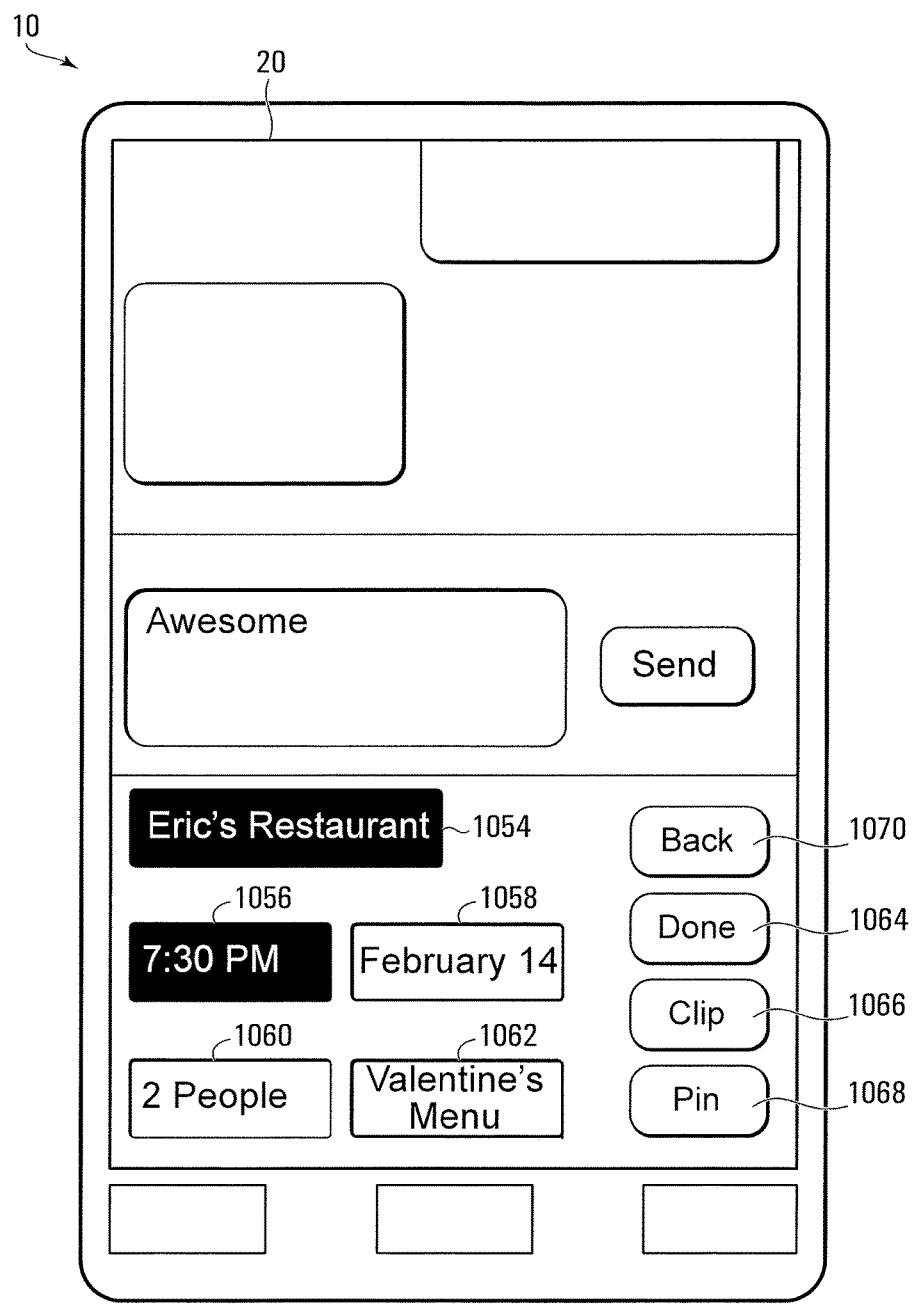
FIG. 78 is a front view of the personal computing device shown in FIG. 18 including a display showing a screenshot in accordance with one embodiment of the invention.

Block 1034 directs the Restaurant Reservation application to display at least one restaurant reservation information field (or restaurant information field) associated with the selected restaurant reservation and retrieved from the server 1002 on the display 20, for selection by the user. In the embodiment shown in FIG. 78, the Restaurant Reservation application causes the display 20 to display the following restaurant reservation information fields associated with the first reservation 1052: a restaurant name 1054, a reservation time 1056, a reservation date 1058, a reservation count 1060, and special menu information 1062 for user selection. In various embodiments, other restaurant reservation fields may include, for example, restaurant ratings, restaurant descriptions and restaurant menus. Block 1034 also directs the Restaurant Reservation application to display a Back icon 1070, a Done icon 1064, a Clip icon 1066, and a Pin icon 1068 on the display 20 for user selection.

Block 1035 directs the Restaurant Reservation application to determine whether the Back icon 1070 has been selected by the user, and if the Back icon 1070 has been selected, the Restaurant Reservation application is directed to return to block 1032 to redisplay the list of restaurant reservations 1046 on the display 20 as shown in FIG. 77.

Block 1036 directs the Restaurant Reservation application to detect selection of at least one of the restaurant reservation information fields. In the embodiment shown in FIG. 78, the Restaurant Reservation application has detected selection of the restaurant name 1054 and the reservation time 1056, and thus these fields are shown as shaded.

Block 1038 directs the Restaurant Reservation application to detect selection of one of the Done, Clip and Pin icons 1064, 1066, and 1068. If at block 1038, the Restaurant Reservation application detects selection of the Done icon 1064, the process proceeds to block 1040.

Block 1040 directs the Restaurant Reservation application to add connecting text and the selected restaurant reservation fields to the input data stored in memory (e.g. in the location 38 of the variable memory 16) and cause the keyboard to be redisplayed. Where the restaurant name 1054 and the reservation time 1056 have been selected by the user, block 1040 directs the Restaurant Reservation application to add the connecting text, "We have a reservation at" followed by the restaurant name 1054 followed by the connecting text "at", followed by the reservation time 1056 to the text. Thus, in the embodiment shown, the Restaurant Reservation application would add the text, "We have a reservation at Eric's Restaurant at 7:30 pm" to the input data stored in memory. The input data is displayed by the personal computing device 10 as if the input data including the connecting text and the selected restaurant reservation fields had been provided by the keyboard. Of course, as with all connecting text, in various embodiments, other connecting text may be used. The connecting text may be chosen according to which reservation information fields have been selected.

If at block 1038, the Restaurant Reservation application detects selection of the Clip icon 1066, the process proceeds to block 1042. Block 1042 directs the Restaurant Reservation application to store the selected at least one of the restaurant reservation fields in memory (e.g. in the location 39 for storing clipboard copied data) for later insertion into the input data or another editable field or document. In various embodiments, block 1042 directs the Restaurant Reservation application to cause the keyboard to be redisplayed. However in other embodiments, block 1042 may direct the Restaurant Reservation application to continue to control the display 20 and display the restaurant reservation fields for user selection and the user may exit the secondary application and pass control back to the keyboard program and the keyboard application manager, such as by selecting a close icon, for example, generally similar to as described having regard to block 312 of the flowchart 300 shown in FIG. 11.

If at block 1038, the Restaurant Reservation application detects selection of the Pin icon 1068, the process proceeds to block 1044. Block 1044 directs the Restaurant Reservation application to generate state information defining a state of the Restaurant Reservation application and store the state information in memory (e.g. in the location 46 of the variable memory 16). In this embodiment, for example, the state information may include a reservation identifier corresponding to the first reservation 1052 which was selected at block 1033. Block 1044 also directs the Restaurant Reservation application to cause the keyboard to be redisplayed and to cause the keyboard application manager to display a resume state icon on the display 20 generally as described and shown above having regard to FIG. 17, for example.

Theatre Listings

In various embodiments, the plurality of patterns detectable by the keyboard application manager in block 202 shown in FIG. 5 may include Movie Name patterns and applying the category test involves determining whether the input data from the user (e.g. the input data stored in the location 38 of the variable memory 16) and stored in the memory corresponds to one of the Movie Name patterns and falls within a Movie Name category. In such embodiments the Movie Name patterns may be accessible by the personal computing device 10 via a network such as the Internet. For example, the Movie Name patterns may be stored in a database in the server memory 1004 and may be accessed via the server 1002 shown in FIG. 74. In various embodiments, the Movie Name patterns may be stored in the variable memory 16 and may be periodically updated via the Internet.

The Movie Name patterns may include any currently playing movie names. In various embodiments, the Movie Name pattern may be used in combination with the category test for determining whether input data includes a proper noun such that a determination as to whether the input data includes one of the Movie Name patterns may only need to be made once it has been determined that the input data includes a proper noun.

Accordingly, in various embodiments, block 202 may direct the keyboard application manager to determine whether the input data begins with an uppercase letter and, only if the keyboard application determines that the input data does begin with an uppercase letter, the keyboard application determines whether the input data includes one of the Movie Name patterns. In the embodiment shown in FIG. 79, the input data includes the text, "The Shark" Because, "The Shark" is included in the Movie Name patterns, the keyboard application manager determines at block 202 that the input data includes one of the Movie Name patterns and that the input data falls within the Movie Name category.

Figure 79:
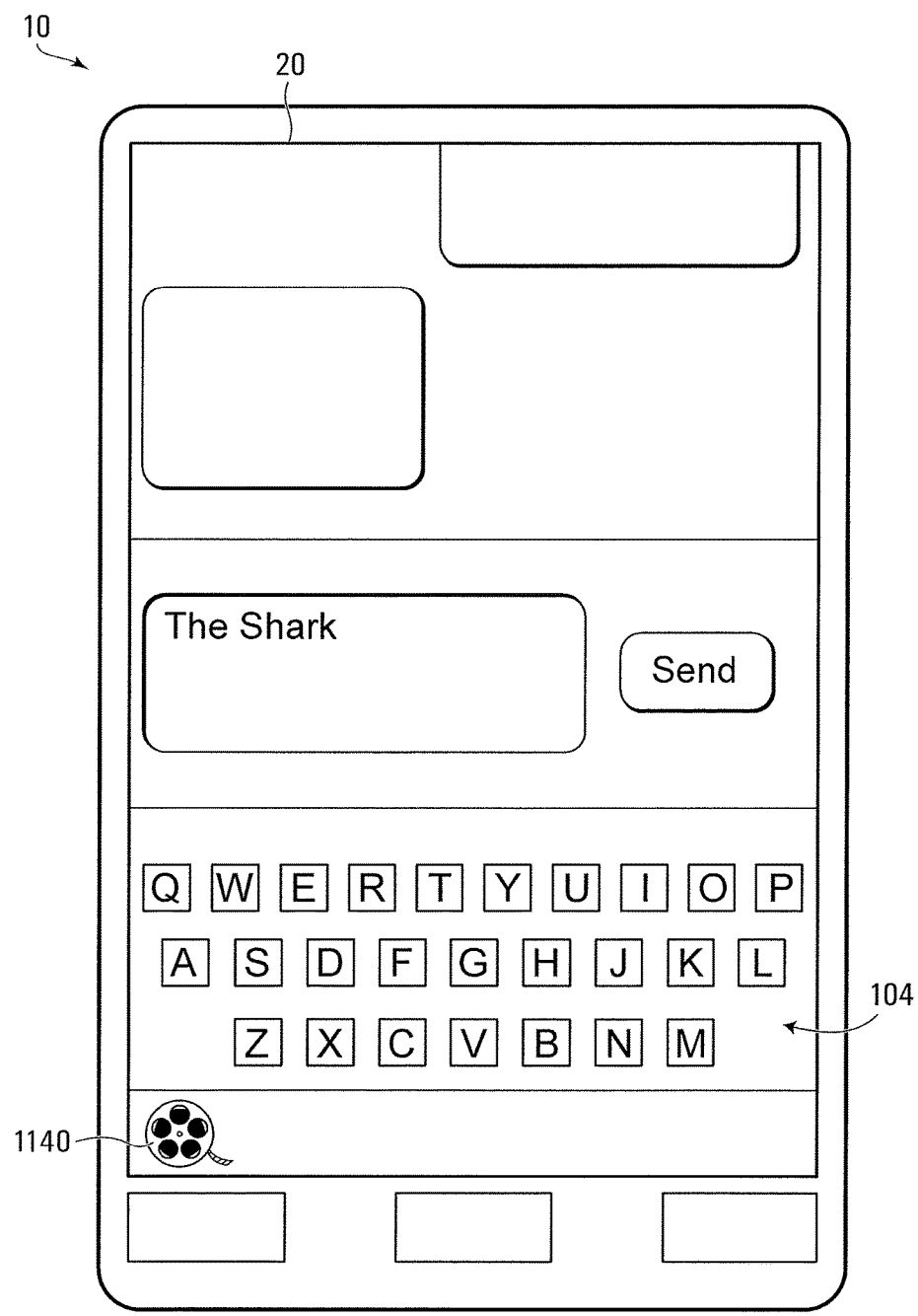
FIG. 79 is a front view of the personal computing device shown in FIG. 18 including a display showing a screenshot in accordance with one embodiment of the invention.
Figure 80:
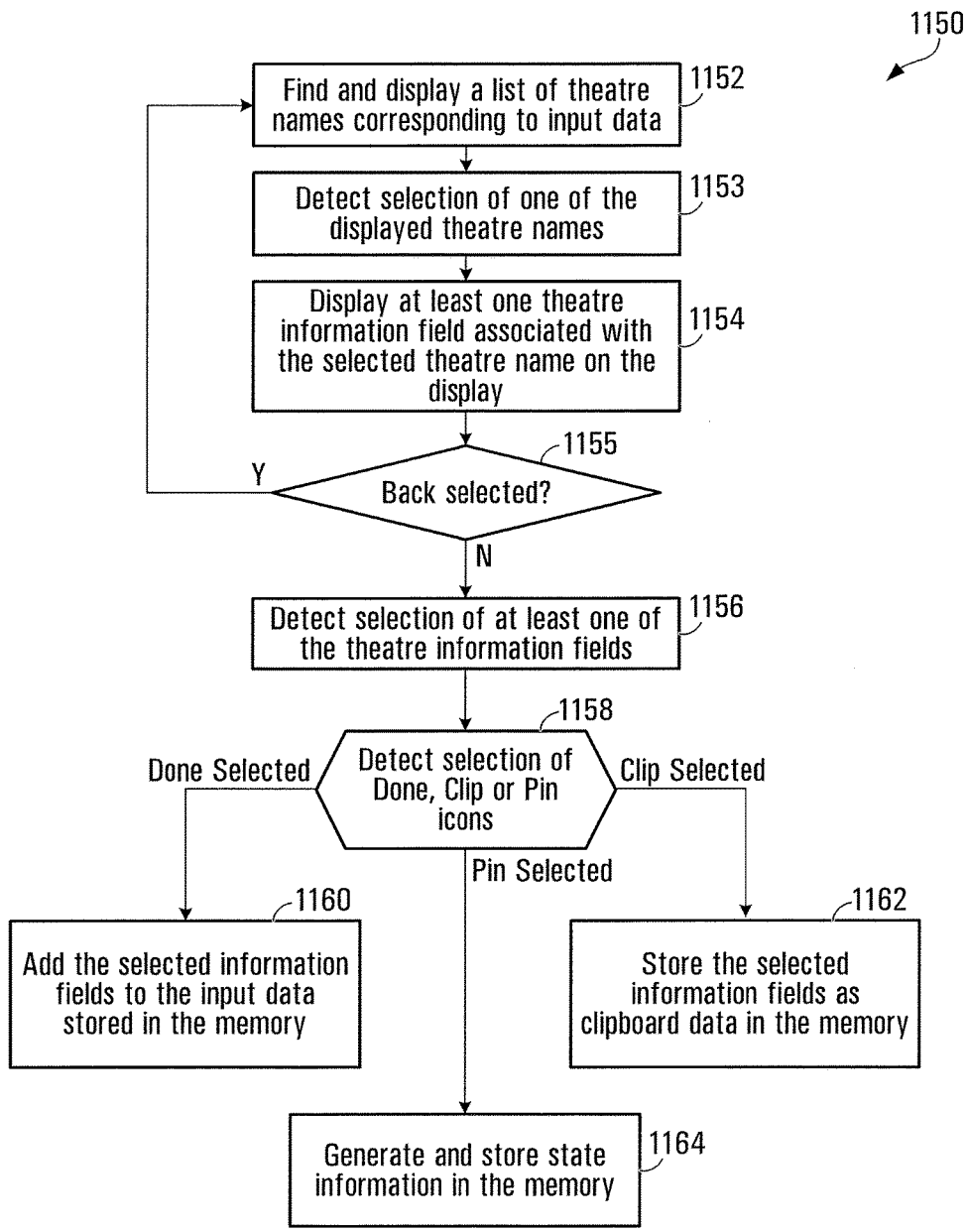
FIG. 80 is a flowchart depicting blocks of code for directing the personal computing device shown in FIG. 18 to effect Theatre Listing application functions in accordance with one embodiment of the invention.

Various secondary applications may be associated with the Movie Name category. In some variations, for example, a Theatre Listing application may be provided as a form of secondary application for finding and displaying theatre listings related to the input data and may be associated with the Movie Name category. In various embodiments, the Theatre Listing application defined in the block 34 of the program memory 14. In such embodiments, a Theatre Listing application data structure similar in format to the Contact Manager application data structure 240 shown in FIG. 6, but including a Movie Name category identifier may be stored in memory (e.g. in the location 44). In various embodiments, block 204 directs the keyboard application manager to display a Theatre Listing icon 1140 on the display 20 for selection when the input data stored in memory (e.g. in the location 38 of the variable memory 16) is found to fall within the Movie Name category, as shown in FIG. 79. If at block 206, the keyboard application manager detects selection of the Theatre Listing icon 1140, the keyboard application manager may activate or invoke the Theatre Listing application by invoking a flowchart 1150 as shown in FIG. 80. In various embodiments, the keyboard application may send the particular one of the Movie Name patterns that the input data was found to include to the Theatre Listing application upon invoking the Theatre Listing application.

As described for the flowchart 300 shown in FIG. 11, the flowchart 1150 may be encoded in a different block of codes from the block of codes 32 for directing the personal computing device 10 to effect keyboard application manager functions. The flowchart 1150 may be encoded in a Theatre Listing application block of codes within the block of codes 34. Thus, in various embodiments, the flowchart 1150 depicts a process effected by the Theatre Listing application.

Figure 81:
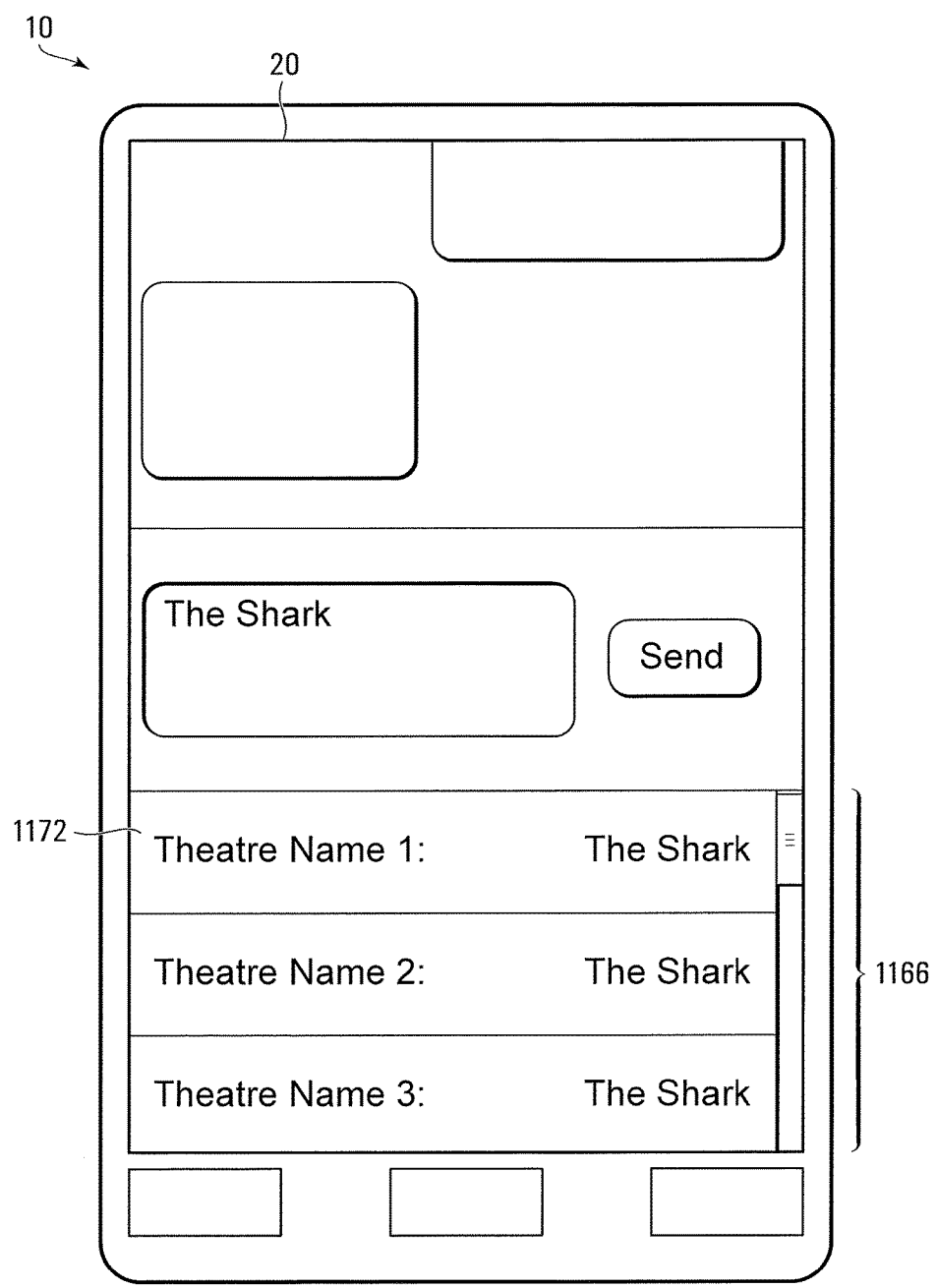
FIG. 81 is a front view of the personal computing device shown in FIG. 18 including a display showing a screenshot in accordance with one embodiment of the invention.

The flowchart 1150 begins with block 1152 which directs the Theatre Listing application to read Theatre Listing information from a server on the internet such as the server 1002 shown in FIG. 74 to determine what theatres located near the user are playing movies having a movie name corresponding to the input data. In various embodiments, the Theatre Listing application may use the Movie Name pattern that the input data was found to include and the location information stored in memory (e.g. in the location 52 of the variable memory 16) to lookup the Theatre Listing information. Block 1152 directs the Theatre Listing application to display on the display 20 a list 1166 of theatres located near the user that are playing a movie corresponding to the input data, as shown in FIG. 81. In the embodiment shown in FIG. 81, the Theatre Listing application displays movie names corresponding to the input data along with the listed theatre names.

Block 1153 directs the Theatre Listing application to detect user selection of a theatre name from the list 1166. Once the Theatre Listing application detects selection of one of the theatre names, the process proceeds to block 1154. In the embodiment shown, the Theatre Listing application detects selection of a first theatre name 1172.

Block 1154 directs the Theatre Listing application to display on the display 20 at least one theatre listing information field associated with the selected theatre name and corresponding movie name for selection by the user. In various embodiments, the theatre listing information fields may be retrieved from an external device such as, for example, the server 1002. In other embodiments, the theatre listing information fields may be retrieved from the personal computing device 10 memory (e.g. the variable memory 16). In the embodiment shown in FIG. 82, the Theatre Listing application causes the display 20 to display the following theatre listing information fields: a movie name 1173, a theatre name 1174, which in this embodiment corresponds to the selected first theatre name 1172, first, second, and third showing times 1176, 1178 and 1180, and a movie rating 1182 for user selection. Block 1154 also directs the Theatre Listing application to display a Back icon 1190, a Done icon 1184, a Clip icon 1186, and a Pin icon 1188 on the display 20 for user selection.

Referring back to FIG. 80, block 1155 directs the Theatre Listing application to determine whether the Back icon 1190 has been selected by the user, and if the Back icon 1190 has been selected, the Theatre Listing application is directed to return to block 1152 to redisplay the list of theatre names 1166 on the display 20 as shown in FIG. 81.

Block 1156 directs the Theatre Listing application to detect selection of at least one of the Theatre Listing information fields. In the embodiment shown in FIG. 82, the Theatre Listing application has detected selection of the theatre name 1174, the first showing time 1176, and the second showing time 1178, and thus these are shown as shaded.

Block 1158 directs the Theatre Listing application to detect selection of one of the Done, Clip and Pin icons 1184, 1186, and 1188. If at block 1158, the Theatre Listing application detects selection of the Done icon 1184, the process proceeds to block 1160.

Figure 82:
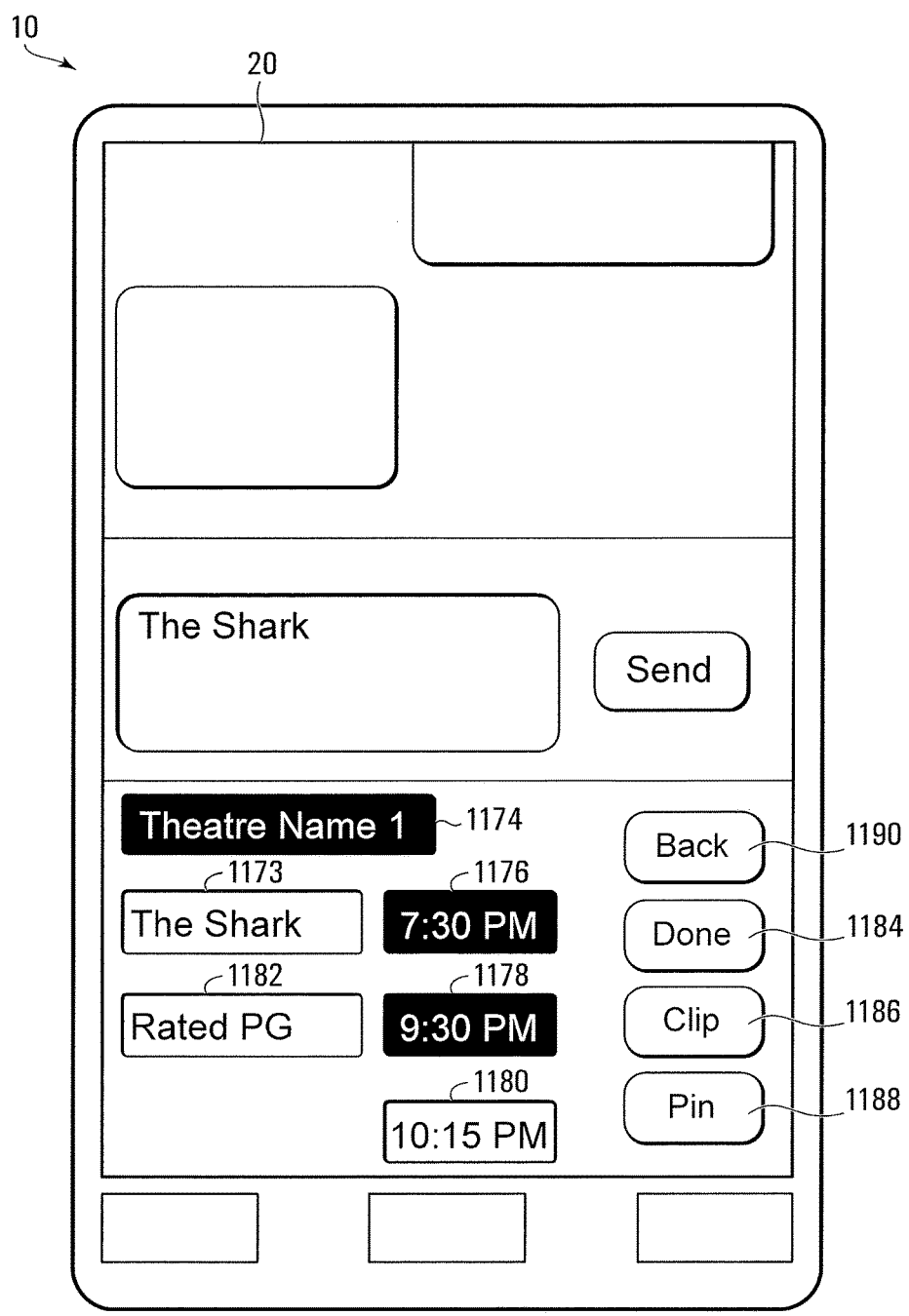
FIG. 82 is a front view of the personal computing device shown in FIG. 18 including a display showing a screenshot in accordance with one embodiment of the invention.

Block 1160 directs the Theatre Listing application to add connecting text and the selected theatre listing information fields to the input data stored in memory (e.g. in the location 38 of the variable memory 16) and to cause the keyboard to be redisplayed. Where the theatre name 1174, the first showing time 1176, and the second showing time 1178 have been selected by the user, as shown in FIG. 82, block 1160 directs the Theatre Listing application to add the connecting text, "is playing at" followed by the theatre name 1174, followed by the connecting text "at", followed by the first showing time 1176, followed by the connecting text "and", followed by the second showing time 1178 to the input data. Thus, in the embodiment shown, the Theatre Listing application would add the text, "is playing at Theatre name 1 at 7:30 pm and 9:30 pm" to the input data stored in memory (e.g. in the location 38 of the variable memory 16) such that the input data includes the phrase, "The Shark is playing at Theatre name 1 at 7:30 pm and 9:30 pm". The input data may then be displayed by the device application as if the input data including the connecting text and the selected theatre listing fields had been provided by the keyboard. In various embodiments, other connecting text may be used according to which fields have been selected.

If at block 1158, the Theatre Listing application detects selection of the Clip icon 1186, the process proceeds to block 1162. Block 1162 directs the Theatre Listing application to store the selected at least one of the theatre listing fields in the memory (e.g. in the location 39 for storing clipboard copied data) for later insertion into the input data or another editable field or document. In various embodiments, block 1162 directs the Theatre Listing application to cause the keyboard to be redisplayed. However in other embodiments, block 1162 may direct the Theatre Listing application to continue to control the display 20 and display the theatre listing information fields for user selection and the user may exit the secondary application and pass control back to the keyboard program and the keyboard application manager, such as by selecting a close icon, for example, generally similar to as described having regard to block 312 of the flowchart 300 shown in FIG. 11, for example.

If at block 1158, the Theatre Listing application detects selection of the Pin icon 1188, the process proceeds to block 1164. Block 1164 directs the Theatre Listing application to generate state information defining a state of the Theatre Listing application and store the state information in the memory (e.g. in the location 46). In this embodiment, the state information may include a theatre identifier and a movie identifier corresponding to the first theatre name 1172 and the movie name identified as corresponding to the input data. Block 1164 also directs the Theatre Listing application to cause the keyboard to be redisplayed and to cause the keyboard application manager to display a resume state icon on the display 20 generally as described and shown above having regard to FIG. 17, for example.

Activating the Status Notification Bar/Notification Region

Figure 83:
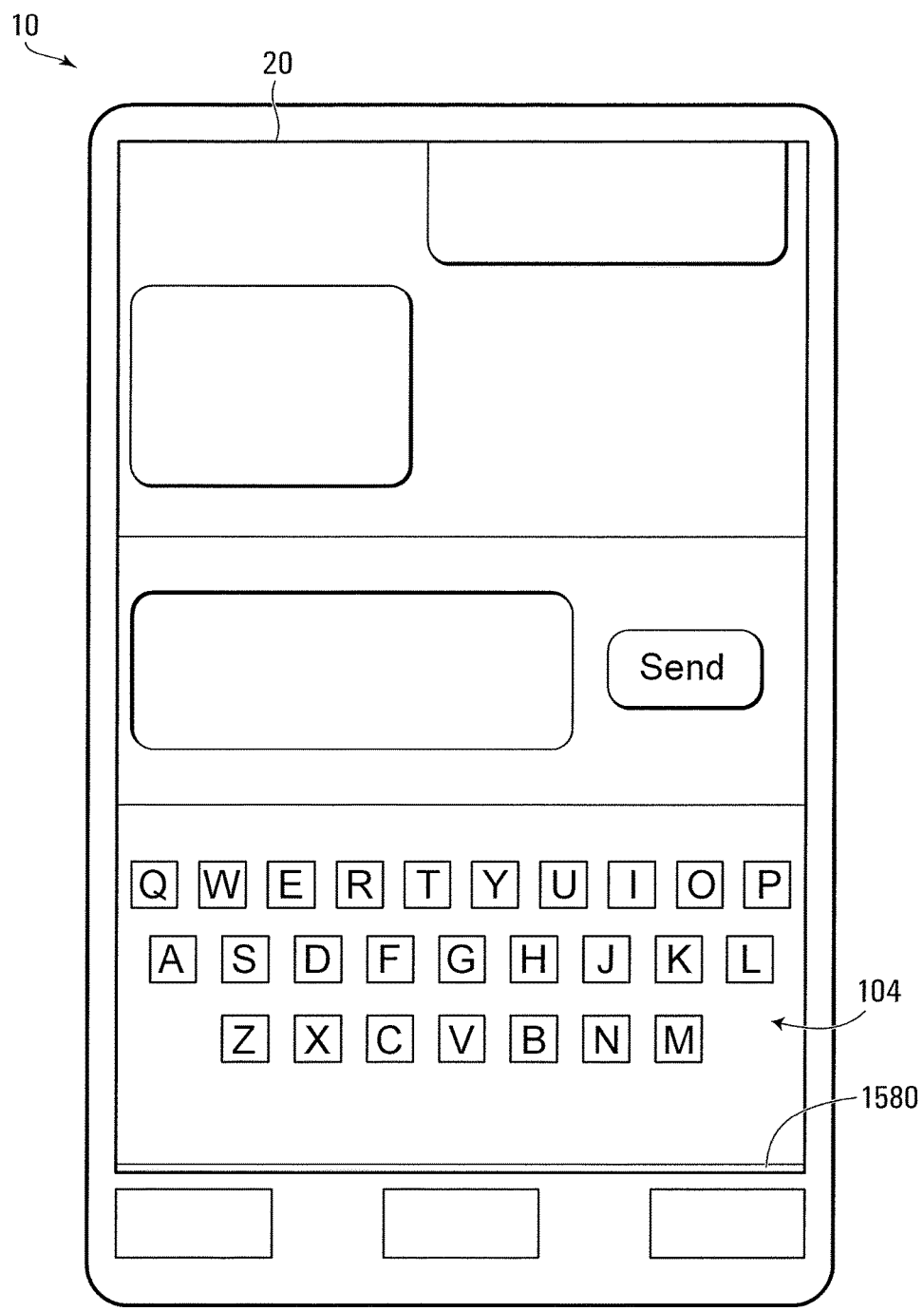
FIG. 83 is a front view of the personal computing device shown in FIG. 18 including a display showing a screenshot in accordance with one embodiment of the invention.

Referring now to FIG. 83, in various embodiments, the keyboard 104 may be displayed on the display 20 without the status notification bar 126 (shown in FIG. 4, for example). Instead, in various embodiments, such as the one shown in FIG. 83, the keyboard 104 may be displayed in conjunction with a notifier. In the embodiment shown in FIG. 83, a notifier bar 1580 acts as the notifier. In various embodiments, the notifier bar 1580 may take up less area on the display 20 than the status notification bar 126 and therefore may allow for more area on the display dedicated to the keyboard 104, for example. For illustration purposes, the notifier bar 1580 is displayed as a narrow strip that is user selectable, although in other embodiments the notifier may be another visually distinctive graphical element displayed on the user interface to alert the user of the availability of user selectable secondary applications.

A change in appearance of the notifier bar 1580 may be used to notify a user that one or more icons associated with one or more secondary applications are available for display and user selection from the status notification bar 126 if the status notification bar 126 were activated by the user and displayed on the user interface. Accordingly, in various embodiments the notifier bar 1580 may change in appearance under the same conditions that would cause an icon to be displayed on the status notification bar 126, as described above. In various embodiments, the display of icons associated with persistent secondary applications in the status notification bar 126 may not result in a change in In the embodiment shown in FIG. 83, the notifier bar 1580 is shown having a first, unchanged appearance. In this mode of operation, no status notification bar 126 is displayed on the user interface until the notifier bar 1580 changes appearance to indicate the availability of one or more secondary applications associated with current input data, and the user then activates the display of the status notification bar 126 within which are displayed icon(s) corresponding to those one or more secondary applications. An illustration of the operation of the notifier bar 1580 in cooperation with the status notification bar 126 is set out below.

Figure 84:
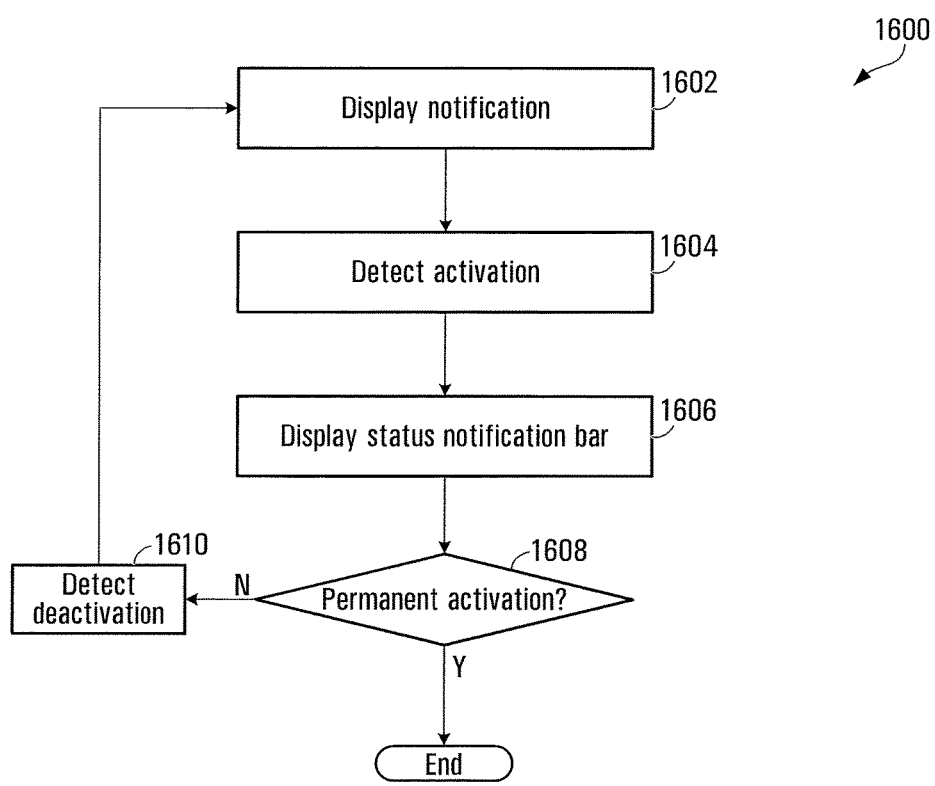
FIG. 84 is a flowchart depicting blocks of code for directing the personal computing device shown in FIG. 18 to effect keyboard application manager functions in accordance with one embodiment of the invention.

Referring back to FIG. 5, block 202 of the flowchart 200 directs the keyboard application manager to read input data from memory and determine whether the input data falls within a category. In various embodiments such as, for example, the embodiment shown in FIG. 83, wherein the keyboard 104 is displayed on the display 20 in conjunction with the notifier bar 1580, if it is determined at block 202 that input data falls within a category, block 204 of FIG. 5 may direct the keyboard application manager to activate or invoke a process depicted by flowchart 1600, as shown in FIG. 84. In some embodiments, the flowchart 1600 may be encoded as part of the block of codes 32 of the personal computing device shown in FIG. 1, for example.

Figure 85:
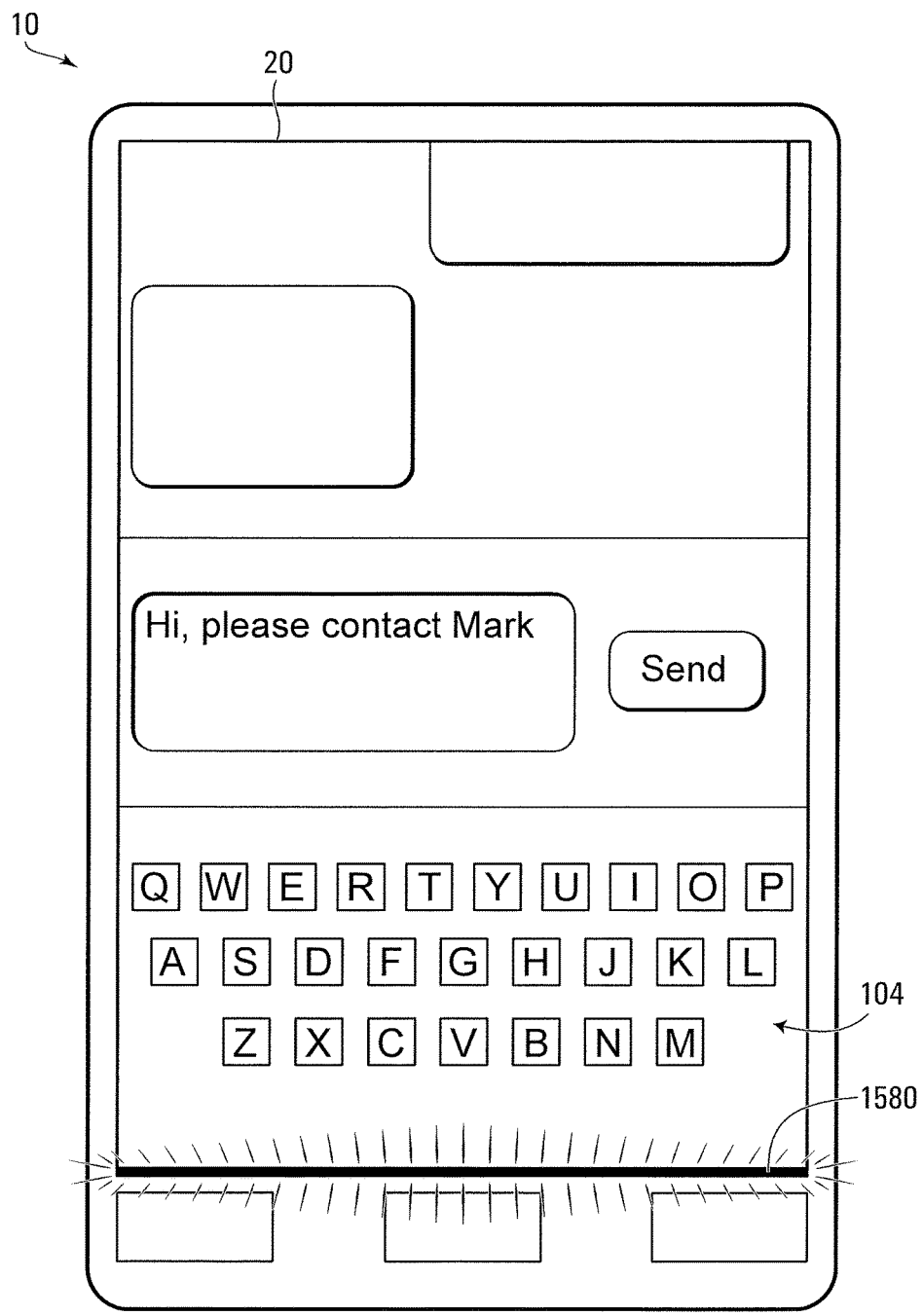
FIG. 85 is a front view of the personal computing device shown in FIG. 18 including a display showing a screenshot in accordance with one embodiment of the invention.

Referring now to FIGS. 5 and 85, where for illustration purposes the input data includes input text, "Hi, please contact Mark", block 202 may direct the keyboard application manager to determine that the input data falls within the Proper Noun category, and block 204 may direct the keyboard application manager to read from memory to determine whether an icon is stored in association with the Proper Noun category. Once the keyboard application manager has determined that an icon is stored in association with the Proper Noun category, block 204 may cause the keyboard application manager to invoke the flowchart 1600.

The flowchart 1600 begins with block 1602 which directs the keyboard application manager to cause the display device 20 to display a notification. The display of the notification indicates to a user that at least one icon associated with a predetermined category which the input data has been determined to fall within is available for display on the status notification bar 126.

In the embodiment shown in FIG. 85, where the notifier bar 1580 acts as the notifier, the keyboard application manager is directed by block 1602 to cause the display device 20 to alter an appearance of the notifier bar 1580. In the embodiment shown in FIG. 85, the notifier bar 1580 is shown having a second altered appearance.

For illustration purposes with the embodiment shown in FIG. 85, block 1602 causes the display 20 to alter the appearance of the notifier bar by causing the notifier bar 1580 to appear as highlighted. In various embodiments, block 1602 may also or alternatively cause the display 20 to alter the appearance of the notifier bar by causing a color displayed in association with the notifier bar 1580 to be changed. For example, block 1602 may cause the notifier bar 1580 to change from a black color to a blue color (although any other colors may be used as well, both for the initial or inactive mode indicating no icons are available for selection and the notification mode notifying of at least one icon being available).

In some embodiments, the notifier may not be displayed on the display 20 until a notification is to be displayed. In some variations, for example, the notifier bar 1580 may be hidden or not displayed in an inactive mode and altering the appearance of the notifier bar 1580 may involve causing the notifier bar 1580 to be displayed on the display 20.

Block 1604 then directs the keyboard application manager to detect activation of the status notification bar 126 (shown in FIG. 4, for example). In various embodiments, a user may activate the status notification bar 126 by selecting the notification (e.g. by selecting the notifier bar 1580). In some embodiments, a user may activate the status notification bar 126 using a gesture. For example, the gesture may involve moving a pointing device, such as a finger touching the display device 20 near the notifier bar 1580, upward. Accordingly, block 1604 may direct the keyboard application manager to detect selection of the notifier bar 1580 or to detect a gesture associated with activation of the status notification bar 126.

Figure 86:
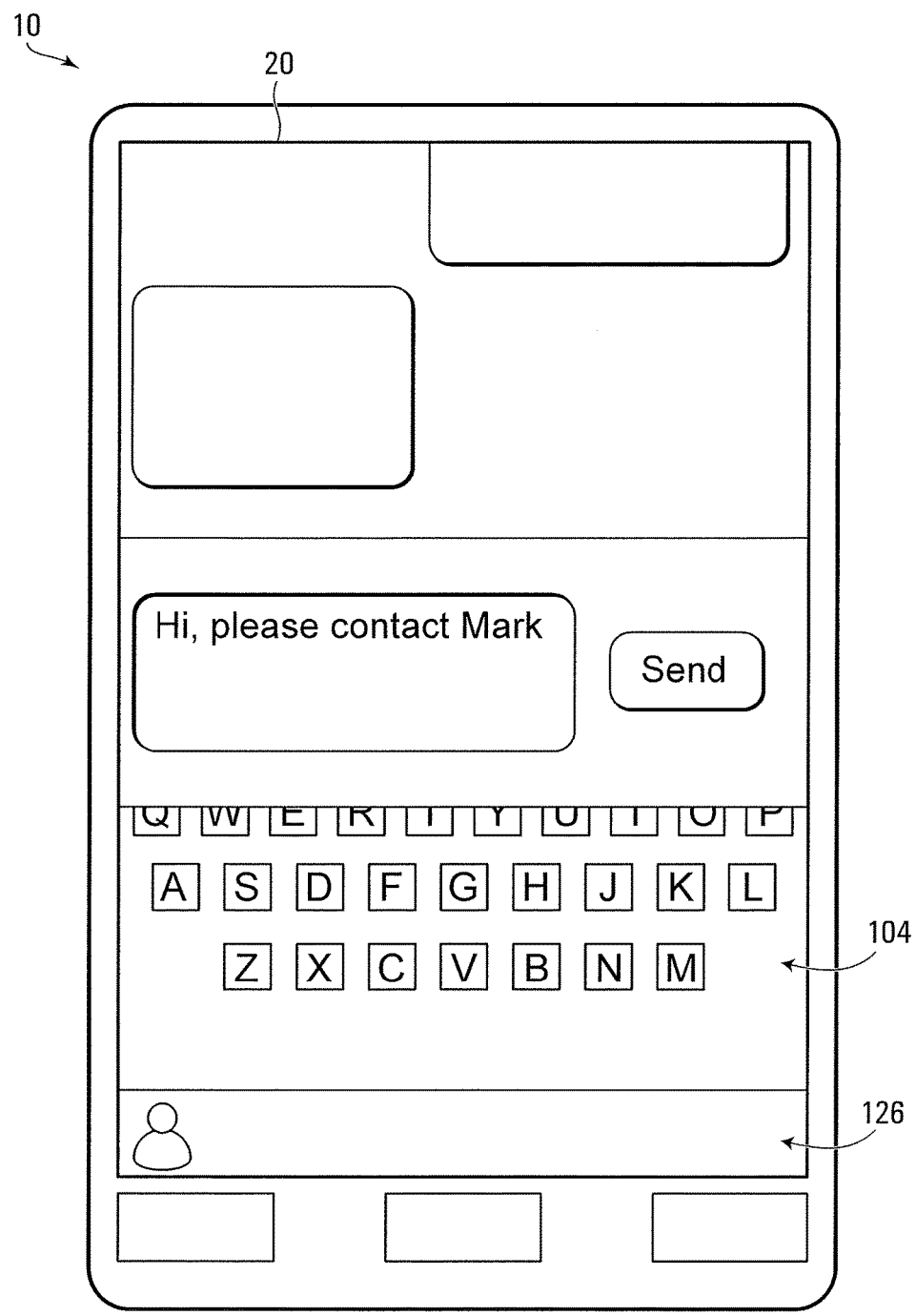
FIG. 86 is a front view of the personal computing device shown in FIG. 18 including a display showing a screenshot in accordance with one embodiment of the invention.

In response to detecting activation of the status notification bar 126, block 1606 then directs the keyboard application manager to display an icon (e.g. the icon 244) on the display 20 in the status notification bar 126, generally as described above having regard to block 204 of FIG. 5, and as shown in FIG. 4. In some embodiments, block 1606 may direct the keyboard application manager to cause the display 20 to display the keyboard 104 as shifted upward to allow for the display of the status notification bar 126, as shown in FIG. 86.

Block 1608 then directs the keyboard application manager to determine whether the detected activation is a permanent activation. In various embodiments, certain gestures may be considered as permanent activations. For example, dragging of a pointer such as a user finger, stylus or other pointing device, more than halfway up the display 20 may be considered a permanent activation. In another embodiment, selection of the notifier bar 1580 for greater than a threshold time limit such as, by way of example only, about 1-2 seconds, may be considered a permanent activation (other longer or shorter time limits may be used sufficient to provide a trigger indicating a permanent activation). Accordingly, in various embodiments block 1608 may direct the keyboard application manager to determine whether the activation was a permanent activation by determining whether a gesture or a selection has been detected that corresponds to permanent activation. In various embodiments, block 1608 may direct the keyboard application manager to determine whether a pointer has been dragged more than halfway up the display 20. In another embodiment, block 1608 may direct the keyboard application manager to determine whether a selection of the notifier bar for greater than a predetermined time limit (e.g. about 1-2 seconds or more) has been detected.

If at block 1608 it is determined that the user activation was not a permanent activation, the process proceeds to block 1610 which directs the keyboard application manager to detect user deactivation of the status notification bar, and once deactivation is detected, cause the display 20 to remove the status notification bar 126 from the display. In various embodiments, block 1610 may direct the keyboard application manager to detect user deactivation of the status notification bar 126 by detecting a release of the user's finger from contact with the display 20.

Once deactivation is detected, block 1610 directs the keyboard application manager to cause the display 20 to remove the status notification bar 126 from the display, causing the display 20 to appear as shown in FIG. 85, for example. Accordingly, a user may take a temporary "peek"

at the status notification bar by using a non-permanent activation. After block 1610 concludes, the process returns to block 1602.

If at block 1608 it is determined that the activation detected was a permanent activation, the flowchart 1600 ends, with the status notification bar 126 displayed on the display 20. The end of the flow chart 1600 may end block 204 shown in FIG. 5, and the process shown in FIG. 5 may continue at block 206 generally as described above.

Display of Keyboard and Secondary Application Concurrently

In various embodiments disclosed in this description, control of a portion of the display 20 is handed over from the keyboard application and/or keyboard application manager to various secondary applications. For example, in the embodiment shown in FIG. 21, the Measurement Conversion application is given control of a portion of the display 20 that previously displayed the keyboard 104 and status notification bar 126 (shown in FIG. 19, for example). The Measurement Conversion application then causes a user interface to be displayed in place of the keyboard 164 and status notification bar 126, within which user interface may be displayed the first number 424, first unit 422, second number 428, second unit 426, Replace icon 430, Add to icon 432, Clip icon 434, and Pin icon 436. However in various alternative embodiments, the keyboard 104 and/or status notification bar may continue to be displayed on the display 20 together with portions of the display 20 controlled by any of the secondary applications, such as, for example, as shown in the embodiment shown in FIG. 87.

Figure 87:
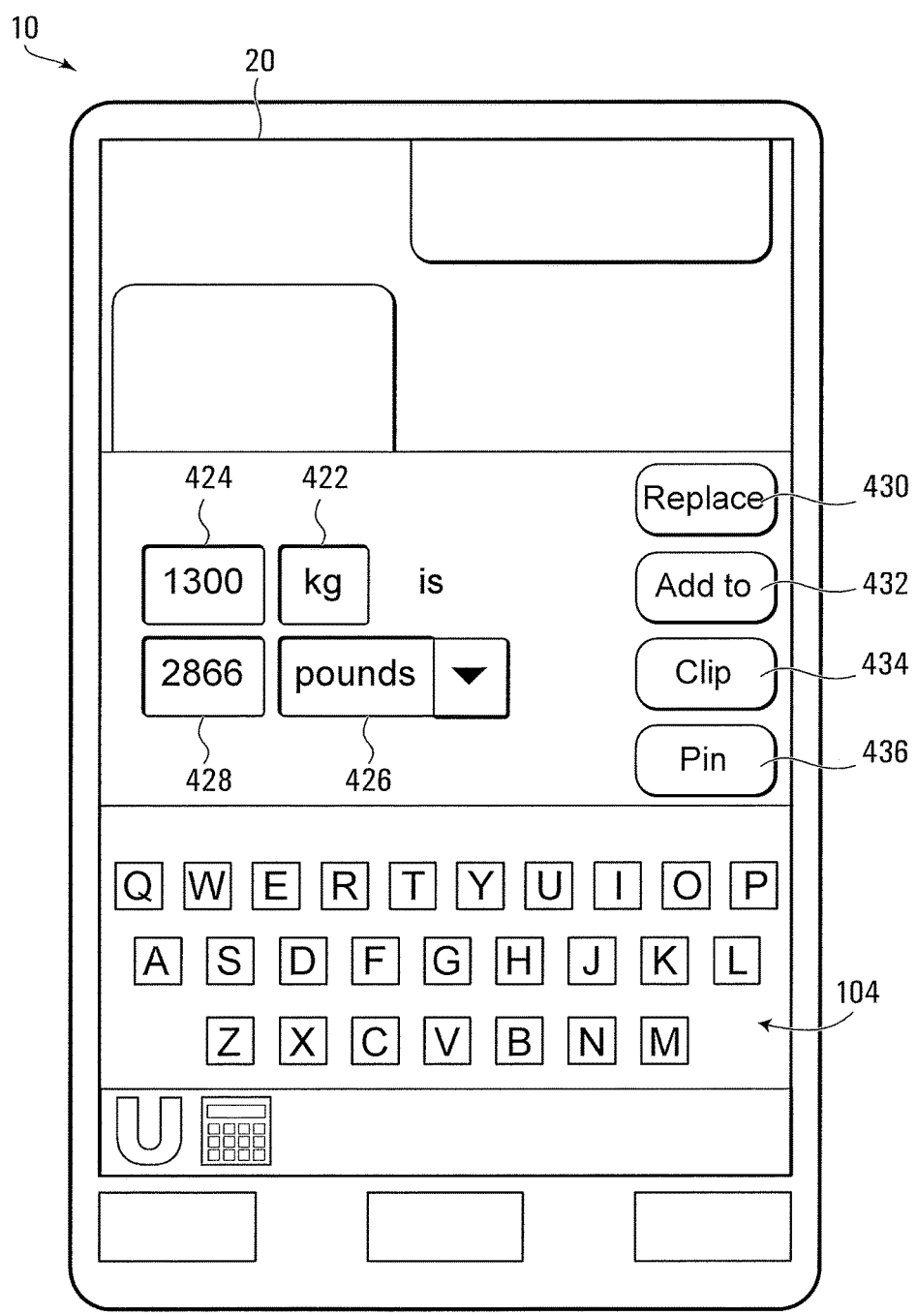
FIG. 87 is a front view of the personal computing device shown in FIG. 18 including a display showing a screenshot in accordance with one embodiment of the invention.

In the embodiment shown in FIG. 87, the Measurement Conversion application is given control of a portion of the portion 106 of the display 20, formerly controlled by the device application. Accordingly, the first number 424, first unit 422, second number 428, second unit 426, Replace icon 430, Add to icon 432, Clip icon 434, and Pin icon 436 are displayed, using the Measurement Conversion application, above the keyboard 104.

Displaying the keyboard 104 in combination with the secondary application may allow a user to use the keyboard 104 to interact with the secondary application. For example, in the embodiment shown in FIG. 87, a user may modify the first number 424, first unit 422, second number 428, or second unit 426, for example, by selecting one of the first number 424, first unit 422, second number 428, and second unit 426 and typing on the keyboard 104.

Voice-based User Input and Icon Presentation

In various embodiments, keyboard entry may be replaced or supplemented with voice recognition as another form of user input. In some variations, for example, the keyboard can be replaced with a voice-based user input system for the entry of user input, in which case the keyboard application manager may be substituted with an input application manager configured to perform equivalent operations but through the processing of voice-based user input. In various embodiments, the voice-based user input system can be used to not only generate input but to also to make various user selections using voice recognition-based commands in place of keystrokes or keyboard-based commands. In such embodiments, a user may optionally switch between generating input and making commands via a virtual or physical button or switch on the personal computing device 10, for example, that can be used to provide multi-modal control (e.g. one mode being generating input, the other mode being command entry).

As with other equivalent keyboard-based embodiments described above, with voice-based entry of user input, the input application manager can run concurrently with the voice-base user input system, can read the input data received from the user via the voice-based user input system (and optionally from the keyboard program or other form of input program where both forms of data entry systems are provided), and monitors the input data as described above to determine whether the input data falls into various predetermined categories. In some variations, for example, the input application manager may monitor the input data for various patterns associated with various predetermined categories. When the input data is found to fall within a predetermined category, secondary applications associated with the predetermined category are made available, activated and used in the manner previously described in this specification in connection with keyboard-based data entry systems.

Input Pattern Activity Notification

In various embodiments, a secondary application may be registered with the keyboard application manager to automatically receive an input pattern activity notification when the keyboard application manager identifies a predetermined type of input received from the user. In various such embodiments, the secondary application is registered to receive such input pattern activity notifications when user input falls within one or more categories monitored by the keyboard application manager. When the keyboard application manager recognizes a portion of input data received from the user via the keyboard (or other input device) as matching the one or more categories for which the secondary application is registered to receive the input pattern activity notification, the keyboard application manager may send a message or signal to the secondary application informing the secondary application of the particular categories (or topics associated with those categories) that have matched up with the user input.

The secondary application may then take an action based on the received input pattern activity notification. In some variations, for example, the secondary application may retrieve additional topical information related to the particular categories identified in the input pattern activity notification.

The additional topical information associated with the user's input pattern activity recognized by the keyboard application manager using pre-assigned categories can take many different forms. For instance, the additional topical information may include further related descriptive information or data, one or more hyperlinks to more information associated with the categories (or associated topics) that triggered the input pattern activity notification, graphical images associated with the categories or topics, and/or audio/visual files (or links to those files for playback). In some variations, the secondary application may, upon receiving the input pattern activity notification, automatically, or at the option of the user, activate the retrieval and display of a video (e.g. a YouTube™ video).

The additional topical information may be retrieved via the secondary application locally from the personal computing device 10, remotely from a remote server in communication with the secondary application, or through the combination of local and remote retrieval of such additional topical information.

Secondary Virtual Display

In various embodiments, once the additional topical information is retrieved by or via the secondary application, the additional topical information may be presented to the keyboard application manager for further manipulation (including optional insertion into the text or file that the user is generating via the keyboard) or the additional topical information may be displayed on (or transmitted for display on) a secondary display region for user interaction. The secondary display region may be a region of the active portion of a current user interface displayed on display 20, a separate window displayed on the user interface or accessible for display via the user interface, a web browser activated by the secondary application or the keyboard application manager (or the server in communication therewith) based on the additional topical information, or a user notification tool supported by the operating system (e.g. the Android™ notification system or iOS™ notification system that allows a user to pull down a list of recent notifications or messages from various applications via the user interface for the operating system). Alternatively, the secondary display region may be part of a secondary display device configured to communicate (remotely or locally, including on the same device) with the keyboard application manager via the personal computing device 10.

In various embodiments the secondary display region may be a "floating" display region that can be moved around the user interface by the user. In other embodiments the secondary display region may be a semi-transparent display region that allows for the display of and interaction with the additional topical information while allowing a user to see information displayed on the user interface beneath the secondary display region.

In other embodiments the additional topical information may be sent from the remote server or locally from the personal computing device 10 (e.g. at the initiation of the secondary application) via text messaging, email to an email address, Facebook account, twitter account or other online or social networking account associated with the user currently logged in and using the keyboard application manager (or to another email address, twitter account or other online or social networking account configured for such transmission by the user).

In various embodiments, for example, a Travel application may be a secondary application that is registered to receive an input pattern activity notification when the keyboard application manager identifies any of the following patterns in the input data received from the keyboard: "South America", "Brazil", "Chile", "Europe", "France", "England", or another form of input identifying a country, state, region or continent. For example, the patterns, "South America", "Brazil", and "Chile" may be associated with a "South America" topic and the patterns "Europe", "France", and "England" may be associated with a "Europe" topic.

In one illustration, for example, the user may input the pattern "Brazil" via the keyboard and this causes the keyboard application manager to send to the Travel application an input pattern activity notification including a topic identifier identifying the "South America" topic. In response, the Travel application may retrieve additional topical information, such as, for example, flight deals for flights to cities in South America and related hotel options and deals, from a server in communication with the Travel application over the Internet. The Travel application may then cause a notification to be displayed on the personal computing device 10, including information associated with the flight deals and related hotel options and deals, and/or the Travel application may cause a hyperlink to be displayed that can link the user to a website for booking one or more of those flights and/or hotels.

In another embodiment, a Reservation application may, by way of example, be a secondary application that is registered to receive an input pattern activity notification when the keyboard application manager identifies any of the following patterns in the input data received from the keyboard: "steak", "lobster", "foie gras", "burger", "fries", "soda", or other similar food related terms. In such a case, for example, the patterns, "steak", "lobster", and "foie gras" may be associated with a "fine dining" topic and the patterns "burger", "fries", and "soda" may be associated with a "fast food" topic.

In one illustration of the foregoing example, the user may input the pattern "steak" via the keyboard and this causes the keyboard application manager to send to the Reservation application an input pattern activity notification including a topic identifier identifying the "fine dining" topic. In response, the Reservation application may retrieve additional topic information, such as, for example, a list of fine dining restaurants near the user (the Reservation application may determine location information to refine this list) wherein there is an available table. The Reservation application may retrieve the list via a server over the Internet for example. The Reservation application may then cause a floating or virtual display region to be displayed on the personal computing device 10, displaying the list of fine dining restaurants, with links to reserve tables at those restaurants, on the display 20, for example.

In another example, an Group Deals application may serve as a secondary application that is registered to receive an input pattern activity notification when the keyboard application manager identifies any of the following patterns in the input data received from the keyboard: "eat", "food", "dinner", "play", "bored", "doing", or another term or phrase associated with predetermined categories for which deals may be available via the Group Deals application. For example, the patterns, "eat", "food", and "dinner" may be associated with a "food" topic and the patterns "play", "bored", and "doing" may be associated with an "activities" topic.

In one illustration of the foregoing example, the user may input the pattern, "play" via the keyboard and this causes the keyboard application manager to send to the Group Deals application an input pattern activity notification including a topic identifier identifying the "activities" topic. In response, the Group Deals application may, for example, retrieve additional topic information, such as, for example, a list of deals available via a company associated with the Group Deals application that are activity based (e.g. golfing, dancing, laser-tag, or some other activity-related input pattern). The Group Deals application may retrieve the list via a server over the Internet for example. The Group Deals application may then send a text message to the user via the personal computing device 10, including in the text message information and/or links associated with the list of activity based deals, for example.

In various other embodiments, various secondary applications may be registered to receive input pattern notification messages, such as, for example, secondary applications associated with any or all of the following: Amazon™, Walmart™, eBay™, BestBuy™, JCPenney™, Target™, Kohls™, Google™, and Overstock™-.

By using an input pattern notification such as one of those described above, only limited information related to a user and their input activity may be transmitted to third parties through secondary applications in various embodiments. This optionally allows one to avoid sharing with a third party large amounts of personal or private information related to a user when input patterns are being monitored for user interests. Thus, the user may retain a degree of privacy while still allowing various secondary applications to be alerted to categories of user activity so that those secondary applications may provide enhanced functionality or information to the user through predictions based on topics and categories associated with the user's input data. In effect, the categorization of types of user input data allows the keyboard application manager in various embodiments to inform secondary applications of certain patterns of user activity without having to share the specific input data entered by the user. The keyboard application manager can thereby act both as a conduit for additional services or functionality via secondary application, and also as a screen, limiting what personal input data is passed on to third parties.

In various embodiments, many of the secondary applications described herein may share generally similar steps. Accordingly, in various embodiments described herein, blocks in the flowcharts describing the functions of the secondary applications may include generally similar steps or processes when compared to other blocks in the flowcharts of other secondary applications. Any of these similar blocks may include any or all of the steps or processes of any or all of the other similar blocks and in various embodiments the blocks may be consolidated to perform the same steps.

For illustration purposes, certain embodiments have been shown and described above, using particular embodiments of various secondary applications including a contact manager application, conversion applications, a calculator application, or a translation application, for example. However, other secondary applications could be used in place of or in conjunction with those illustrated secondary applications. Further, in various embodiments, additional secondary applications not described herein may also be similarly implemented in the personal computing device 10 provided they cooperate with the keyboard application manager as described herein.

In various embodiments, any or all of the secondary applications may be associated with any or all of the above described categories.

Various examples of connecting text have been described above. One skilled in the art would understand that the exemplary connecting text described herein is merely presented by way of example and any connecting text that allows the user to more easily understand an amendment to the input data may also be used.

While specific embodiments of the invention have been described and illustrated, such embodiments should be considered illustrative of the invention only and not as limiting the invention as construed in accordance with the accompanying claims.

The embodiments of the invention in which an exclusive property or privilege is claimed are defined as follows:

1. A method of executing an action related to data input by a user via a personal computing device, the method comprising:
   receiving, with a primary application, first input data including alphanumeric characters via a first portion of a display device with a primary input action;
   monitoring, with the primary application, at least the alphanumeric characters of the first input data to determine if the first input data is associated with a first predetermined category corresponding to one or more of a plurality of secondary applications forming a corresponding application set, each secondary application being:
   (i) configured to perform different functions,
   (ii) operable to support a secondary input action via a second portion of the display device, each secondary input action being different from the primary input action, the second portion of the display device being located differently from the first portion of the display device,
   (iii) configured to generate second data including a user interface contextually associated with at least one calculation performable with the secondary application via the second portion of the display device to support one of the different functions, each user interface comprising a calculating portion and an outputting portion, and
   (iv) available to the user via the personal computing device;
   associating, with the primary application, if the alphanumeric characters of the first input data are associated with the first predetermined category, the first input data with the one or more of the plurality of secondary applications forming the corresponding application set;
   causing one or more icons to be displayed on the display device for selection, each icon being associated with a corresponding secondary application from the corresponding application set and providing an identifier for the at least one calculation performable by the corresponding secondary application;
   monitoring, with the primary application, for a user selection of one icon of the one or more icons;
   activating, with the primary application, in response to detecting the user selection of the one icon, the corresponding secondary application associated with the one icon through the primary application to support the secondary input action by assuming control of the second portion of the display device;
   generating, with the corresponding secondary application, the second data based on the first input data to include the user interface for display on the second portion of the display device;
   displaying, with the corresponding secondary application, the user interface via the second portion of the display device;
   receiving, with the corresponding secondary application, second input data via the calculation portion of the user interface with the secondary input action;
   performing, with the corresponding secondary application, the at least one calculation based on the first input data and the second input data;
   displaying, with the corresponding secondary application, second output data via the calculation portion of the user interface based on the at least one calculation;
   receiving, with the corresponding secondary application, third input data via the outputting portion of the user interface with a third input action; and
   performing, with the corresponding secondary application, one of a plurality of output functions in response to the third input data, each output function being contextually associated with the at least one calculation; and
   wherein the plurality of output functions comprises displaying the second output data together with the first input data via the first portion of the display and storing the second output data together with the first input data in a memory.

2. The method of claim 1 further comprising associating, with the primary application, the first input data with at least one additional secondary application available to the user via the personal computing device by causing at least one additional icon to be displayed on the display device for selection, the at least one additional icon associated with the at least one additional secondary application.

3. The method of claim 1 wherein monitoring the first input data to determine if the first input data is associated with the predetermined category comprises:
applying a category test to the first input data to determine whether the first input data falls within the predetermined category; and
determining that the secondary application is associated with said predetermined category based on applying said category test.

4. The method of claim 3 wherein applying the category test comprises determining whether the first input data includes at least one of a plurality of patterns associated with the predetermined category.

5. The method of claim 4 further comprising:
receiving location information identifying a location of the personal computing device; and
wherein applying the category test further comprises applying a location based category test to the location information.

6. The method of claim 1 wherein generating said second data comprises:
retrieving at least one contact having a plurality of contact information fields, at least one of said plurality of contact information fields corresponding to said first input data; and
generating said second data to include at least one of said plurality of contact information fields.

7. The method of claim 1 wherein the alphanumeric characters of the first input data include a first number and wherein generating said second data comprises:
displaying said first number and at least one calculator key on the user interface for selection by the user;
detecting selection of at least one of said at least one calculator key;
generating a second number based on said first number and the selection of the at least one selected calculator key; and
generating said second data to include said second number.

8. The method of claim 1 wherein the first input data includes a formula and wherein generating said second data comprises solving said formula and generating said second data to include a solution to said formula.

9. The method of claim 1 wherein the alphanumeric characters of the first input data include a first number and a first unit and wherein generating said second data with the secondary application comprises:
generating a second number based on said first number and generating a second unit based on said first unit; and
generating said second data to include at least one of said second number and said second unit.

10. The method of claim 1 wherein generating said second data comprises:
retrieving at least one restaurant reservation having a plurality of restaurant reservation information fields; and
generating said second data to include at least one of said plurality of restaurant reservation information fields.

11. The method of claim 1 wherein generating said second data comprises:
retrieving at least one theatre having a plurality of theatre information fields, at least one of said plurality of theatre information fields corresponding to said first input data; and
generating said second data to include at least one of said plurality of theatre information fields.

12. The method of claim 1 wherein generating said second data comprises:
retrieving at least one appointment having a plurality of appointment information fields, at least one of said plurality of appointment information fields corresponding to said first input data; and
generating said second data to include at least one of said plurality of appointment information fields.

13. The method of claim 1 wherein generating said second data comprises:
retrieving at least one task having a plurality of task information fields, at least one of said plurality of task information fields corresponding to said first input data; and
generating said second data to include at least one of said plurality of task information fields.

14. The method of claim 1 wherein generating said second data comprises:
retrieving at least one song having a plurality of song information fields, at least one of said plurality of song information fields corresponding to said first input data; and
generating said second data to include at least one of said plurality of song information fields.

15. A system for executing an action related to data input by a user via a personal computing device, the system comprising:
means for receiving, with a primary application, first input data including alphanumeric characters via a first portion of a display device with a primary input action;
means for monitoring, with the primary application, at least the alphanumeric characters of the first input data to determine if the first input data is associated with a first predetermined category corresponding to one or more of a plurality of secondary applications forming a corresponding application set, each secondary application being:
(i) configured to perform different functions,
(ii) operable to support a secondary input action via a second portion of the display device, each secondary input action being different from the primary input action, the second portion of the display device being located differently from the first portion of the display device,
(iii) configured to generate second data including a user interface contextually associated with at least one calculation performable with the secondary application via the second portion of the display device to support one of the different functions, each user interface comprising a calculating portion and an outputting portion, and
(iv) available to the user via the personal computing device;
means for associating, with the primary application, if the alphanumeric characters of the first input data are associated with the predetermined category, the first input data with the one or more of the plurality of secondary applications forming the corresponding application set;
means for causing one or more icons to be displayed on the display device for selection, each icon being associated with a corresponding secondary application from the corresponding application set and providing an identifier for the at least one calculation performable by the corresponding secondary application;
means for monitoring, with the primary application, for a user selection of one icon of the one or more icons;

means for activating, with the primary application, in response to detecting the user selection of the one icon, the corresponding secondary application associated with the one icon through the primary application to support the secondary input action by assuming control of the second portion of the display device;

means for generating, with the corresponding secondary application, the second data based on the first input data to include the user interface for display on the second portion of the display device;

means for displaying, with the corresponding secondary application, the user interface via the second portion of the display device;

means for receiving, with the corresponding secondary application, second input data via the calculation portion of the user interface with the secondary input action;

means for performing, with the corresponding secondary application, the at least one calculation based on the first input data and the second input data; and means for displaying, with the corresponding secondary application, second output data via the calculation portion of the user interface based on the at least one calculation;

means for receiving, with the corresponding secondary application, third input data via the outputting portion of the user interface with a third input action; and means for performing, with the corresponding secondary application, one of a plurality of output functions in response to the third input data, each output function being contextually associated with the at least one calculation; and wherein the plurality of output functions comprises displaying the second output data together with the first input data via the first portion of the display and storing the second output data together with the first input data in a memory.

16. The method of claim 4 wherein the plurality of patterns are selected from a group consisting of:
number patterns;
upper case word patterns;
unit of measurement patterns;
currency patterns;
phone number patterns;
address patterns;
email address patterns;
recently used application patterns;
recently installed application patterns;
advertisement patterns;
restaurant patterns;
movie patterns;
appointment patterns;
task list patterns;
music patterns;
name patterns;
location patterns;
event patterns;
book patterns; and
any patterns of searchable content.

17. The method of claim 1 wherein associating the first input data with the secondary application comprises automatically causing the icon to be displayed on the display device for selection if the first input data is associated with a predetermined category.

18. A method of executing an action related to data input by a user via a personal computing device, the method comprising:

receiving, with a primary application, first input data including alphanumeric characters via a first portion of a display device with a primary input action;

monitoring, with the primary application, at least the alphanumeric characters of the first input data to determine if the first input data is associated with a first predetermined category corresponding to one or more of a plurality of secondary applications forming a corresponding application set, each secondary application being:
  (i) configured to perform different functions,
  (ii) operable to support a secondary input action via a second portion of the display device, each secondary input action being different from the primary input action, the second portion of the display device being located differently from the first portion of the display device,
  (iii) configured to generate second data including a user interface contextually associated with at least one calculation performable with the secondary application via the second portion of the display device to support one of the different functions, each user interface comprising a calculating portion and an outputting portion, and
  (iv) available to the user via the personal computing device;

associating, with the primary application, if the alphanumeric characters of the first input data are associated with the first predetermined category, the first input data with the one or more of the plurality of secondary applications forming the corresponding application set;

causing one or more icons to be displayed on the display device for selection, each icon being associated with a corresponding secondary application from the corresponding application set and providing an identifier for the at least one calculation performable by the corresponding secondary application;

monitoring, with the primary application, for a user selection of one icon of the one or more icons;

activating, with the primary application, in response to detecting the user selection of the one icon, the corresponding secondary application associated with the one icon through the primary application to support the secondary input action by assuming control of the second portion of the display device;

generating, with the corresponding secondary application, the second data based on the first input data to include the user interface for display on the second portion of the display device;

displaying, with the corresponding secondary application, the user interface via the second portion of the display device;

receiving, with the corresponding secondary application, second input data via the calculation portion of the user interface with the secondary input action;

performing, with the corresponding secondary application, the at least one calculation based on the first input data and the second input data;

displaying, with the corresponding secondary application, second output data via the calculation portion of the user interface based on the at least one calculation;

receiving, with the corresponding secondary application, third input data via the outputting portion of the user interface with a third input action; and performing, with the corresponding secondary application, one of a plurality of output functions in response to the third input data, each output function being contextually associated with the at least one calculation, the plurality of output functions comprising at least displaying the second output data together with the first input data via the first portion of the display; and wherein the plurality of output functions further comprises displaying the second output data together with the first input data via the first portion of the display and storing the second output data together with the first input data in a memory.

19. The method of claim 18 wherein said first input data is stored in a database and wherein causing the second data to be stored in said database comprises replacing said first input data stored in said database with said second data.

20. The method of claim 19 wherein causing the second data to be stored in said database comprises storing connecting text with said second data in said database.

21. The method of claim 19 wherein causing the second data to be stored in said database comprises causing said second data to be stored in a first location in said database and wherein the method further comprises receiving a paste message and, in response to receiving said paste message, copying said second data from said first location to a second location in said database such that said second data is displayed on said display device.

22. The method of claim 19 wherein generating said second data comprises:
causing the secondary application to store state information associated with said second data in said database;
causing a resume state icon to be displayed on said display device for selection by said user;
detecting selection of the resume state icon; and
in response to detecting selection of said resume state icon, retrieving said state information from said database and activating the secondary application to generate said second data for display on the display device based on said state information.

23. A method of executing an action related to data input by a user via a personal computing device, the method comprising:
monitoring, with a primary application, at least alphanumeric characters of first input data received via a first portion of a display device with a primary input action to identify one or more of a plurality of secondary applications forming a corresponding application set, each secondary application being:
(i) configured to perform different functions,
(ii) operable to support a secondary input action via a second portion of the display device, each secondary input action being different from the primary input action, the second portion of the display device being located differently from the first portion of the display device,
(iii) configured to generate second data including a user interface contextually associated with at least one calculation performable with the secondary application via the second portion of the display device to support one of the different functions, each user interface comprising a calculating portion and an outputting portion, and
(iv) available to the user via the personal computing device;
displaying, with the primary application, one or more icons on a display device, each icon being associated with a corresponding secondary application from the corresponding application set and providing an identifier for the at least one calculation performable by the corresponding secondary application;
monitoring, with the primary application, for a selection of one icon of the one or more icons;
activating, with the primary application, in response to said selection, the corresponding secondary application associated with the one icon through the primary application to support the secondary input action by assuming control of the second portion of the display device;
generating, with the corresponding secondary application, the second data based on the first input data to include the user interface for display on the second portion of the display device;
displaying, with the corresponding secondary application, the user interface via the second portion of the display device;
receiving, with the corresponding secondary application, second input data via the calculation portion of the user interface with the secondary input action;
performing, with the corresponding secondary application, the at least one calculation based on the first input data and the second input data;
displaying, with the corresponding secondary application, second output data via the calculation portion of the user interface based on the at least one calculation;
receiving, with the corresponding secondary application, third input data via the outputting portion of the user interface with a third input action; and
performing, with the corresponding secondary application, one of a plurality of output functions in response to the third input data, each output function being contextually associated with the at least one calculation; and
wherein the plurality of output functions comprises displaying the second output data together with the first input data via the first portion of the display and storing the second output data together with the first input data in a memory.

24. The method of claim 23 wherein the at least one calculation includes a numerical calculation.

* * * * *

UNITED STATES PATENT AND TRADEMARK OFFICE
CERTIFICATE OF CORRECTION

PATENT NO. : 10,228,819 B2
APPLICATION NO. : 14/168309
DATED : March 12, 2019
INVENTOR(S) : Mark Dostie and Justin Robert Desjardins Page 1 of 1

It is certified that error appears in the above-identified patent and that said Letters Patent is hereby corrected as shown below:

On the Title Page

Item (73) next to the Assignee, please delete "602531 British Cilumbia Ltd., Vancouver (CA)" and insert -- 602531 British Columbia Ltd., Vancouver (CA) --

Signed and Sealed this
Thirtieth Day of April, 2019

Andrei Iancu
*Director of the United States Patent and Trademark Office*